United States Patent [19]

Couper et al.

[11] 4,422,070

[45] Dec. 20, 1983

[54] CIRCUIT FOR CONTROLLING CHARACTER ATTRIBUTES IN A WORD PROCESSING SYSTEM HAVING A DISPLAY

[75] Inventors: Robert A. Couper, Sunnyvale; John K. Frediani, Santa Cruz; Terrance L. Lillie, Palo Alto, all of Calif.

[73] Assignee: Pitney Bowes Inc., Stamford, Conn.

[21] Appl. No.: 177,651

[22] Filed: Aug. 12, 1980

[51] Int. Cl.[3] ................................................ G09G 1/06

[52] U.S. Cl. .................................... 340/723; 340/709; 340/731

[58] Field of Search ................ 340/711, 723, 701, 703

[56] References Cited

U.S. PATENT DOCUMENTS

| | | | |
|---|---|---|---|
| 3,336,587 | 8/1967 | Brown | 340/723 |
| 3,786,429 | 1/1974 | Goldman et al. | 340/711 X |
| 3,868,673 | 2/1975 | Mau et al. | 340/723 X |
| 4,057,849 | 11/1977 | Ying et al. | 364/200 |
| 4,203,107 | 5/1980 | Lovercheck | 340/711 X |
| 4,290,064 | 9/1981 | Traster | 340/723 |

*Primary Examiner*—David L. Trafton

*Attorney, Agent, or Firm*—William D. Soltow, Jr.; David E. Pitchenik; Robert H. Whisker

[57] ABSTRACT

An attribute control system is provided in a word processing system of the type having a keyboard for entering alpha numeric data. A display control circuit is coupled between a display, which displays a plurality of lines of alpha numeric text, and the keyboard. The display control circuit controls the information exhibited on the display. The display control circuit means includes a character attribute control circuit having a latch for latching attribute signal information entered from the keyboard. The attribute signal information remains in the latch until the attribute latch is cleared or another attribute signal is entered from the keyboard.

15 Claims, 120 Drawing Figures

METHOD OF 8085 COMMUNICATING WITH A PERIPHERAL

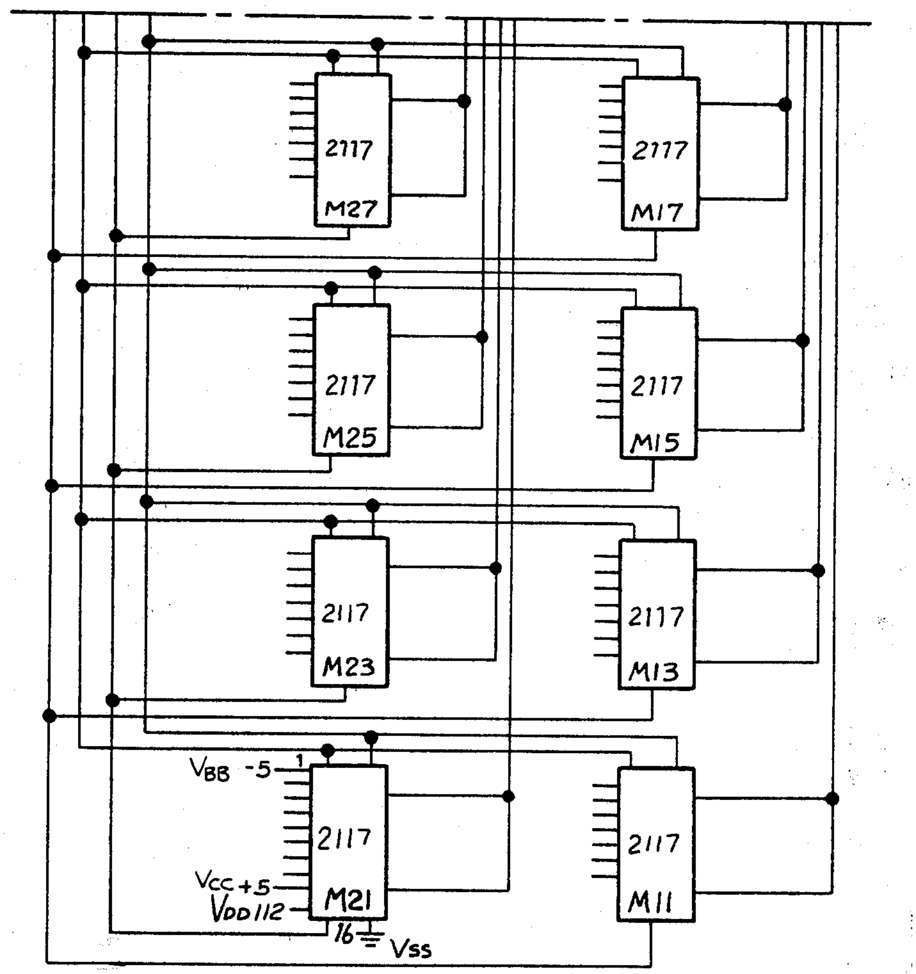
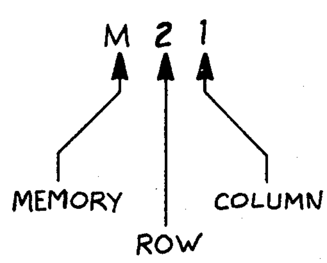
Fig. 12j

CIRCUIT FOR CONTROLLING CHARACTER ATTRIBUTES IN A WORD PROCESSING SYSTEM HAVING A DISPLAY

FIELD OF THE INVENTION

The present invention relates to circuits for displaying character attributes and more particularly to a word processing system having a display upon which characters with various attributes are to be exhibited.

BACKGROUND OF THE INVENTION

It is desirable in word processing equipment having a display to generate an image on the display which replicates, as near as possible, the information which is ultimately printed on a document. This accurate replication includes the attributes of the characters ultimately printed on the document. Typical printed character attributes include bolded characters, underscored characters and double underscored characters.

Character attributes have been exhibited in the past in word processing equipment. These character attributes have been exhibited, however, in a manner which typically differs from the form they are printed on the document. As an example, one system uses a bold character on a display to signify that the character on the printed document is to be underlined. Additionally, other word processing equipment display attributes by the exhibition of control information on the screen.

In U.S. Pat. No. 4,057,849 granted to Ying, et al, a system is disclosed which supports several character attributes on a display. These character attributes include reverse video, bold, blinking and single underline. These character attributes, however, are incorporated in the information for each alphanumeric character as text characters defining words stored in sequence in the memory; they are not stored in a separate storage memory, thus requiring additional storage space. Moreover, the character attributes are not an accurate replication of the attribute or character printed on the page. In proportional printing, for example, character widths vary. Thus, the letter "M" occupies a greater space than the letter "i". Consequently, the character attribute displayed by the word processing equipment must similarly be a proportional representation. The structure disclosed in the aforementioned patent does not provide the ability to achieve this objective.

SUMMARY OF THE INVENTION

In accordance with the structure of the present invention the attributes for various characters printed by word processing equipment are closely replicated on a display. The character attributes vary in the space occupied on the display in accordance with the space occupied by the attribute when printed on a document. Thus, the attributes of bold character, single and double underscore are the same width as the character with which they are to be associated. In the present system, it should be noted that provision is made for the inclusion of a double underscore to be exhibited on the screen as a character attribute. The double underscore is also a replica of the double underscore on the printed document, being of the same width as the character with which it is associated.

An attribute control system embodying the present invention is provided in a word processing system of the type having a keyboard for entering alpha numeric data. A display control circuit is coupled between a display, which displays a plurality of lines of alpha numeric text, and the keyboard. The display controlled circuit controls the information exhibited on the display. The display control circuit means includes a character attribute control circuit having a latch for latching attribute signal information entered from the keyboard. The attribute signal information remains in the latch until the attribute latch is cleared or another attribute signal is entered from the keyboard.

BRIEF DESCRIPTION OF THE DRAWINGS

A complete understanding of the present invention may be obtained by reference to the accompanying drawings, when taken in conjunction with the detailed description thereof and in which.

DETAILED DESCRIPTION OF THE PREFERRED EMBODIMENT

Figure 1:
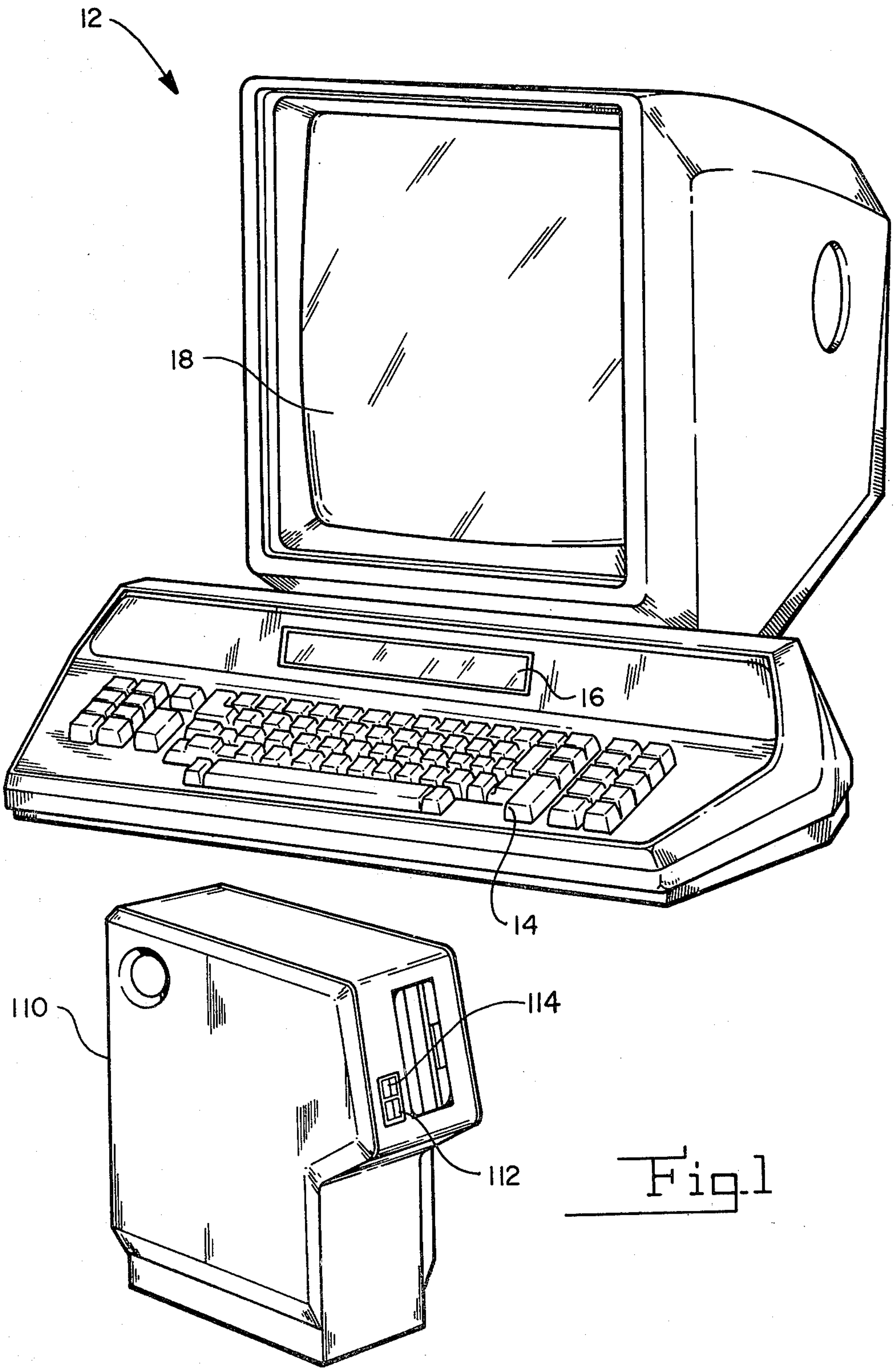
FIG. 1 is a perspective view of a word processing system in accordance with the present invention.

Reference is now made to FIG. 1. A word processing system 12 includes a keyboard 14 having a one line display 16. The one line display is employed to exhibit entered alphanumeric data and other command information in the operation of the word processing system 12. A full page CRT display 18 is provided and is operably connected to the keyboard 14. The CRT display 18 and the one line display 16 operate cooperatively as will be explained in detail hereinafter. A floor module 110 is provided with a floppy type disk drive. The floppy disk drive can be a single or dual disk drive and additionally is suitable for use with both single density and double density recorded disk formats. The floppy disk floor module 110 includes a power switch 112, which when actuated initializes the circuits of the word processing system 12. A system reset switch 114 is provided on the floor module 110. The reset switch 114, when activated as explained in greater detail hereinafter, resets the operating system.

A daisy wheel type printing unit, not shown, may be provided for use in the word processing system 12. Alternatively, a configuration, as is explained in greater detail hereinafter, employs a keyboard display typewriter unit. When the keyboard display typewriter unit is employed, the printer is not necessary for inclusion in the system unless special features associated with the printing unit are desired.

Figure 2:
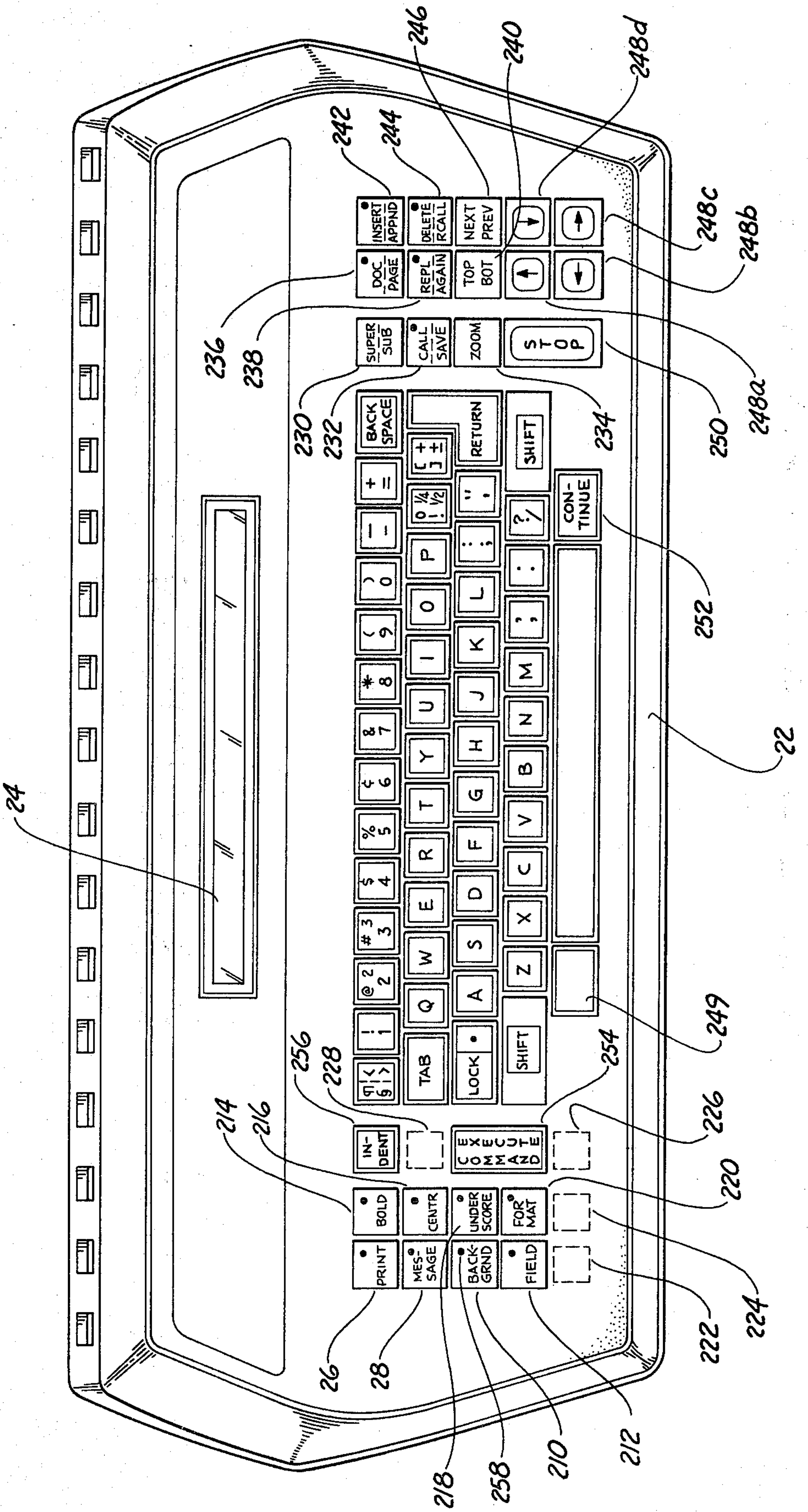
FIG. 2 is a top view of a keyboard for use in the word processing system shown in FIG. 1.

Referring now also to FIG. 2, a keyboard 22 is provided for use in the word processing system. The keyboard 22, as previously described, includes a one line display 24. The one line display 24 may be a standard plasma matrix type display. The keyboard 22 includes the general alphanumeric keys associated with standard word processing systems. These keys are alterable depending upon the language to be employed by the user and the particular application. For example, special purpose mathematical, statistical and scientific type keys and associated print elements may be provided.

The keyboard 22 includes certain special purpose function keys which operate in conjunction with the associated circuits as is explained in greater detail hereinafter. The special purpose keys represent frequently used commands and include a PRINT key 26, a MESSAGE key 28, a BACKGROUND key 210, a FIELD key 212, a BOLD key 214, a CENTER key 216, an UNDERSCORE key 218 and a FORMAT key 220. Additional space is provided for auxiliary keys 222, 224, 226 and 228. These keys can include, for example, a DOUBLE UNDERSCORE key.

Additional special purpose keys which have dual functions include a SUPERSCRIPT/SUBSCRIPT key 230, a CALL/SAVE key 232, a ZOOM key 234, a DOCUMENT/PAGE key 236, a REPLACE/AGAIN key 238, a TOP/BOTTOM key 240, an INSERT/APPEND key 242, a DELETE/RECALL key 244 and a NEXT/PREVIOUS key 246. Cursor control keys 248A, 248B, 248C and 248D are also provided.

The above mentioned special purpose function keys 230 through 248D, except for the ZOOM key 234, are dual function keys. These keys are labeled with two colors: black and blue or white and blue. (The cursor control keys 248A through 248D are labeled with only one color.)

These keys are used in conjunction with a blue colored key 249. Dual function keys serve two purposes. To perform the top (black label) function, a dual function key is normally depressed. To perform the bottom (blue label) function, the blue colored key 249 is held down while a dual function key is depressed. In other words, when held down in conjunction with a dual function key, the blue key 249 activates the dual blue engraved function of that key.

In operation, the SUPERSCRIPT/SUBSSCRIPT key 230 moves the baseline of text up or down in increments of $\frac{1}{4}$ line. The CALL/SAVE key 232 saves a string of text by a phrase name that can be recalled in the document or in another document. The DOCUMENT/PAGE key 236 selects or creates a document, or it selects a specified page in a document. The REPLACE/AGAIN key 238 deletes and replaces a specified string of text. The TOP/BOTTOM key 240 moves the cursor to the top or bottom of the text on the CRT screen. The INSERT/APPEND key 242 inserts text at the cursor position and readjusts the text. When used with the blue colored key 249, the INSERT/APPEND key 242 positions the cursor at the end of the document to append more text to the document. The DELETE/-RECALL key 244 deletes and recalls text. The NEXT/PREVIOUS key 246 creates a new page when typing, or provides access to the next page. When used with the blue colored key 249, the NEXT/PREVIOUS key 246 provides access to the previous page.

The cursor control keys include an up arrow, left arrow, right arrow and down arrow key, 248A, 248B, 248C and 248D, respectively. When depressed normally, these keys move the cursor up, left, right and down one character at at time on the CRT screen. When used with the blue colored key 249, they scroll the text on the CRT screen up, to the left, to the right and down, respectively.

Additional keys are provided including a STOP key 250, a CONTINUE key 252, a COMMAND EXECUTE key 254 and an INDEX key 256.

Several of the keys operate in two modes. The mode of operation is determined by whether a visual indicator is actuated. Thus, for example, the BACKGROUND key 210 includes a light emitting diode (LED) 258 which is mounted in the key switch mechanism 210. As is explained hereinafter, the LED 258 is illuminated and/or caused to blink, depending on whether the key 210 is actuated to cause the word processing system to function in a background or in a foreground mode of operation.

One of the features of the present word processing system is the ability to handle several different jobs simultaneously. It is useful to be able to perform background printing and sorting operations while inputting or editing text. Moreover the system is expandable to allow a number of key stations to be associated with one floor module, as hereafter described. In general, architecture used in prior word processing systems utilizes a single microprocessor with memory on adjacent printed circuit boards. In those systems, the microprocessor is attached via a bus to memory. Other circuitry is provided in those systems to handle input/output (I/O) operations for a floppy disk controller and a typewriter.

While this architecture is sufficient for single-terminal standalone systems, several key stations on one system and foreground/background operations would tax the throughput of even a high power single processor. A multiprocessor environment, with dedicated processors to handle different key stations and background operations, requires novel architecture, as hereafter described.

Figure 3:
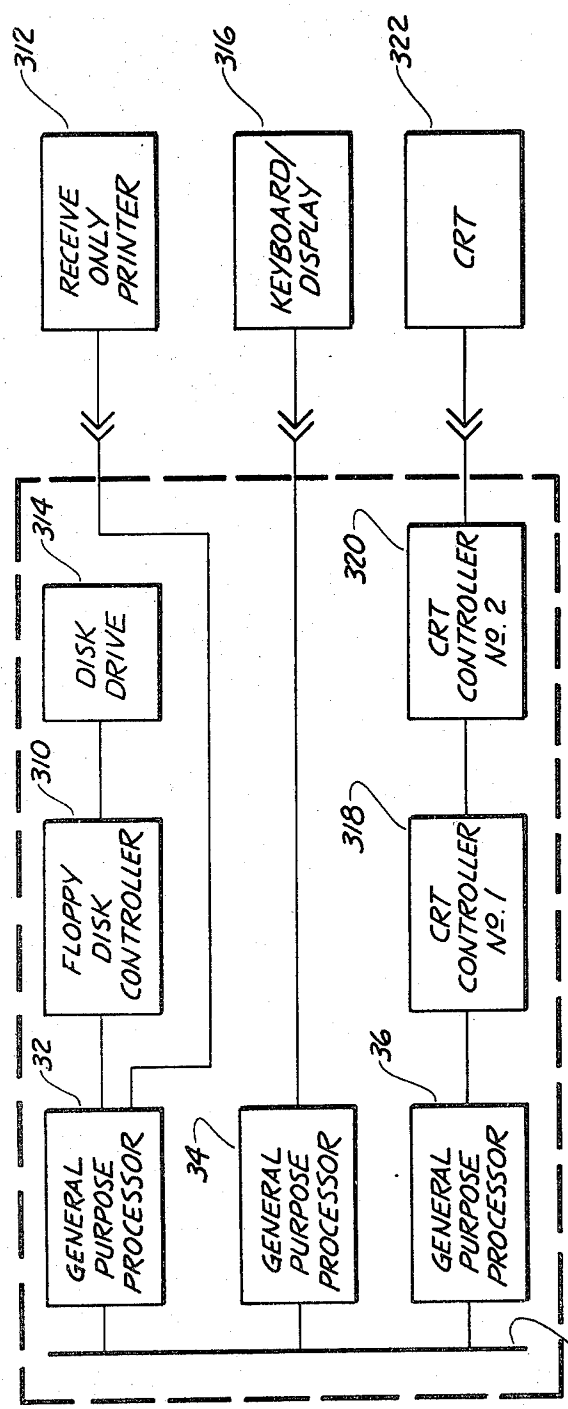
FIGS. 3, 4 and 5 are block diagrams of three configurations of word processing systems embodied in the present invention.

Referring now also to FIG. 3, in one configuration of the word processing system, three general purpose processors 32, 34 and 36 are interconnected by a backplane bus 38. The general purpose processor 32 is connected to a floppy disk controller 310 and a receive only printer 312. The floppy disk controller 310 is connected to a disk drive unit 314.

General purpose processor 34 is connected to a keyboard display 316. The keyboard display 316 is of the type shown in FIG. 2.

The general purpose processor 36 is connected via a first CRT controller (CRT1) circuit 318 and a second CRT controller (CRT2) circuit 320 to a CRT unit 322.

Figure 4:
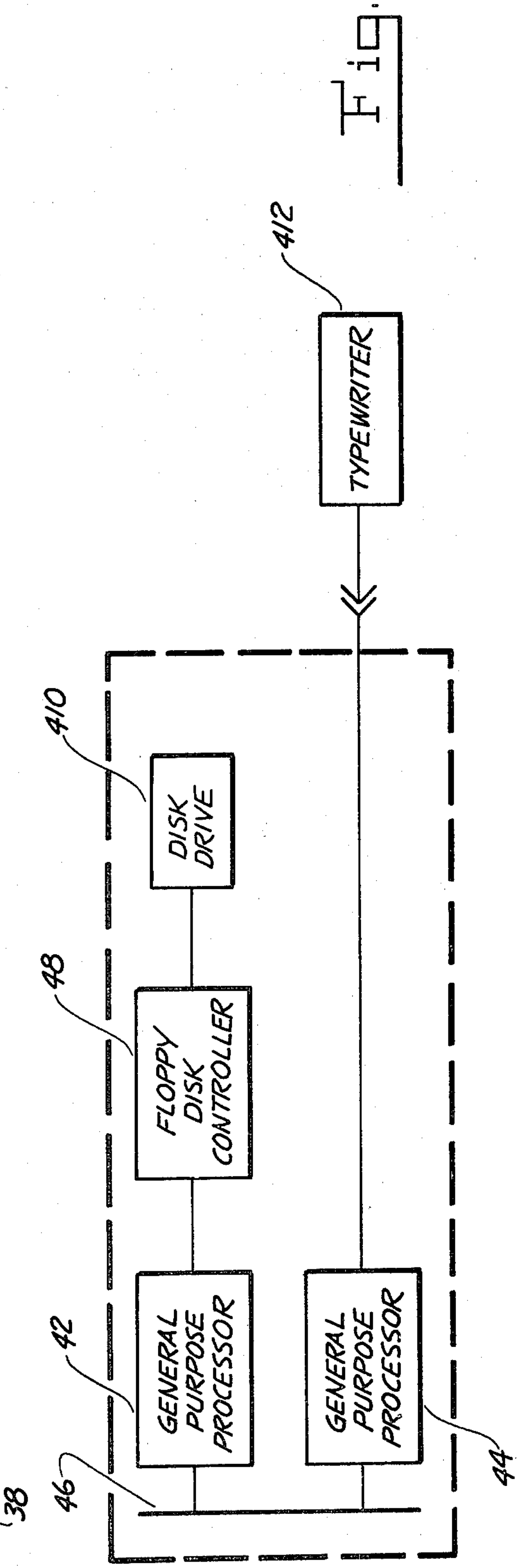

Referring now also to FIG. 4, two general purpose processors 42 and 44 are provided. The general purpose processors 42 and 44 are interconnected by a back plane bus 46. General purpose processor 42 is connected to a floppy disc controller 48 which, in turn, is connected to a disc drive 410. General processor 44 is connected to a typewriter 412. The typewriter 412 is of the type which includes a keyboard, a one line display and a daisy wheel typewriter printing mechanism.

Figure 5:
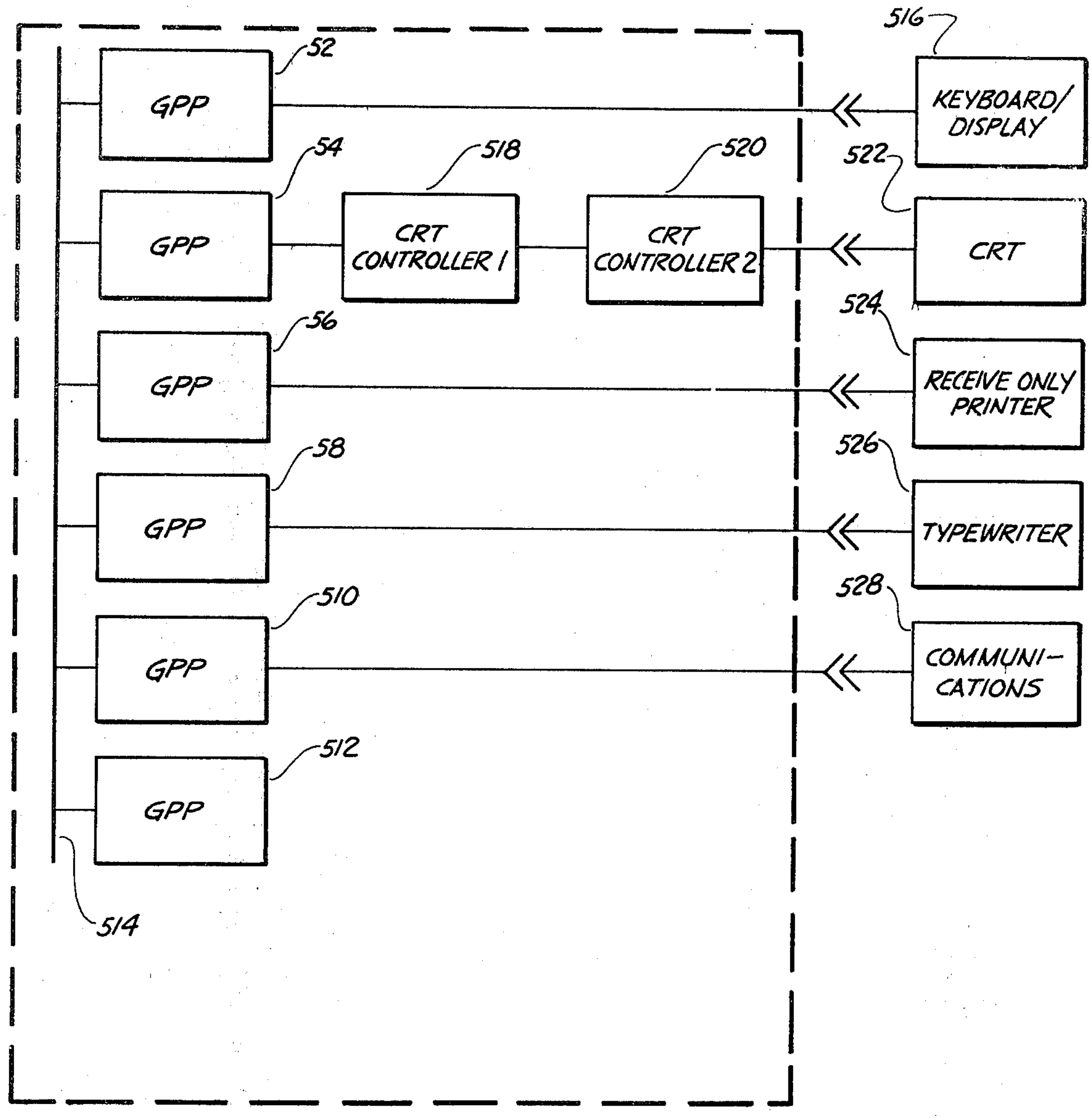

Referring now also to FIG. 5, a plurality of general purpose processors 52, 54, 56, 58, 510, and 512 is provided. These general purpose processors are interconnected via a back plane bus 514. Although only six general purpose processors are shown in one configuration of the word processing system, up to 16 general purpose processors may be connected to the back plane bus 514. As is explained in greater detail hereinafter, the physical position of each general purpose processor on the back plane bus has significance in operation of the general purpose processor system circuitry.

The general purpose processor 52 is connected to a keyboard display unit 516. The keyboard display unit includes a keyboard and one line display. The general purpose processor 54 is connected via CRT controller (CRT1) and (CRT2) circuits 518 and 520, respectively, to a CRT display unit 522. The general purpose processor 56 is connected to a receive only printer 524. The general purpose processor 58 is connected to a typewriter unit 526. This unit includes the keyboard, a one line display and a typewriter unit printing mechanism. The general purpose processor 510 is connected to an optional communications unit 528 to facilitate communications with remotely located word processing systems or for other suitable systems.

A general purpose processor 512 is shown unconnected to any other unit. This general purpose processor 512 is shown to denote the flexibility of adding functions to the word processing system. The system can be configured to meet the particular needs of a user by connecting additional general purpose processors such as unit 512, to the back plane 514 in conjunction with associated controlled units coupled to the processor.

As can be seen in the present configuration, two data entry stations are provided, one being a keyboard display unit 516 and the other being a typewriter unit 526. The keyboard display unit 516 may have its alphanumeric input information printed out when desired on the receive only printer 524 while the typewriter unit 526 may have its alphanumeric input information printed by its own associated printer.

It should be recognized that a disc drive such as unit 410 shown in FIG. 4 or 314 shown in FIG. 3 could also be provided for the word processing system configuration shown in FIG. 5.

Figure 6:
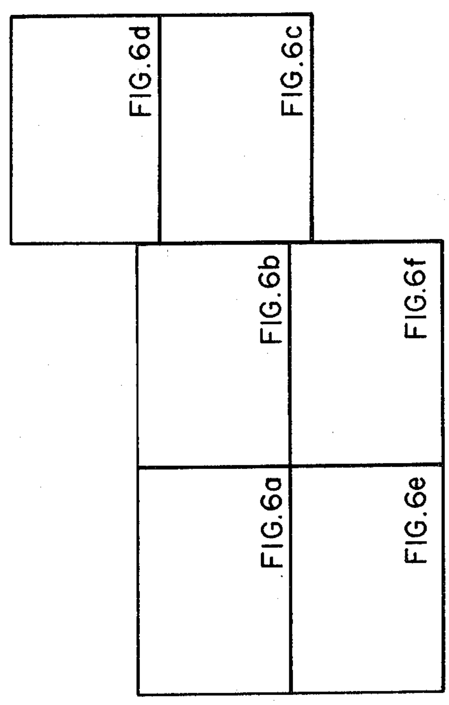
FIG. 6 is an interconnection diagram of FIGS. 6*a* through 6*f* which when taken together are a block diagram of an entire word processing system, in accordance with the present invention, with each of the subsystems shown in block diagram form (the detailed schematic circuit diagrams of which are shown in subsequent figures)
Figure 6A:
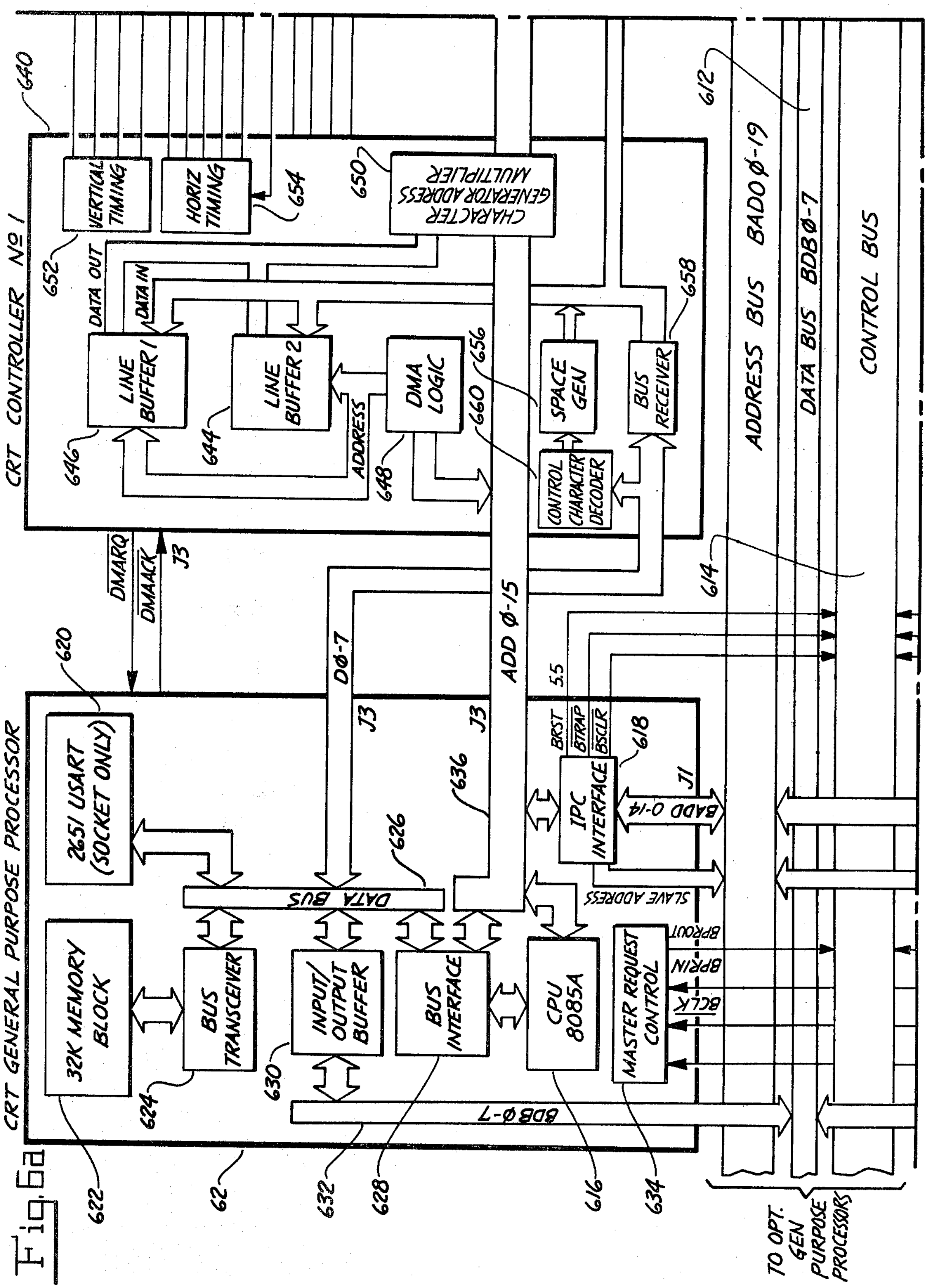
Figure 6B:
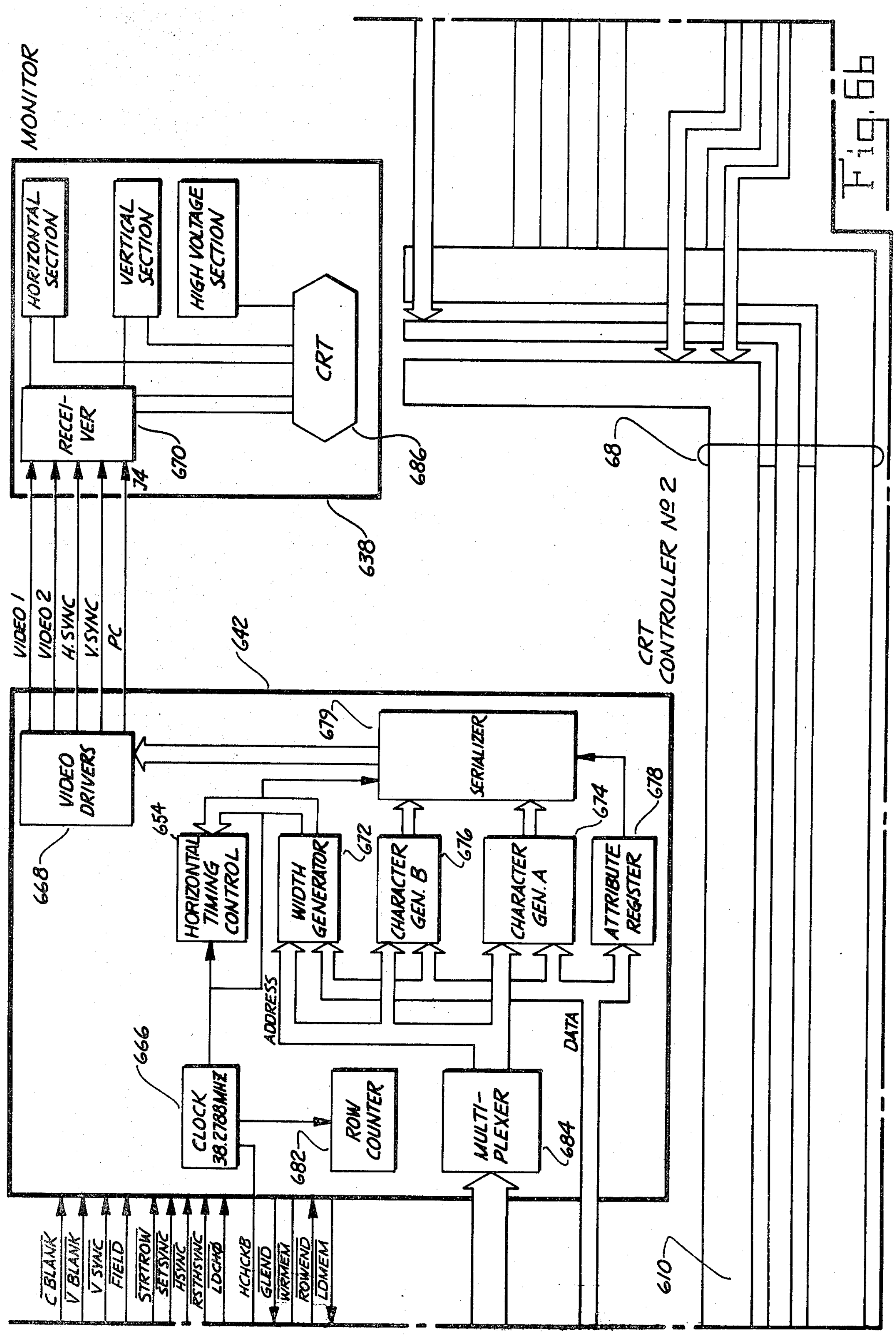
Figure 6C:
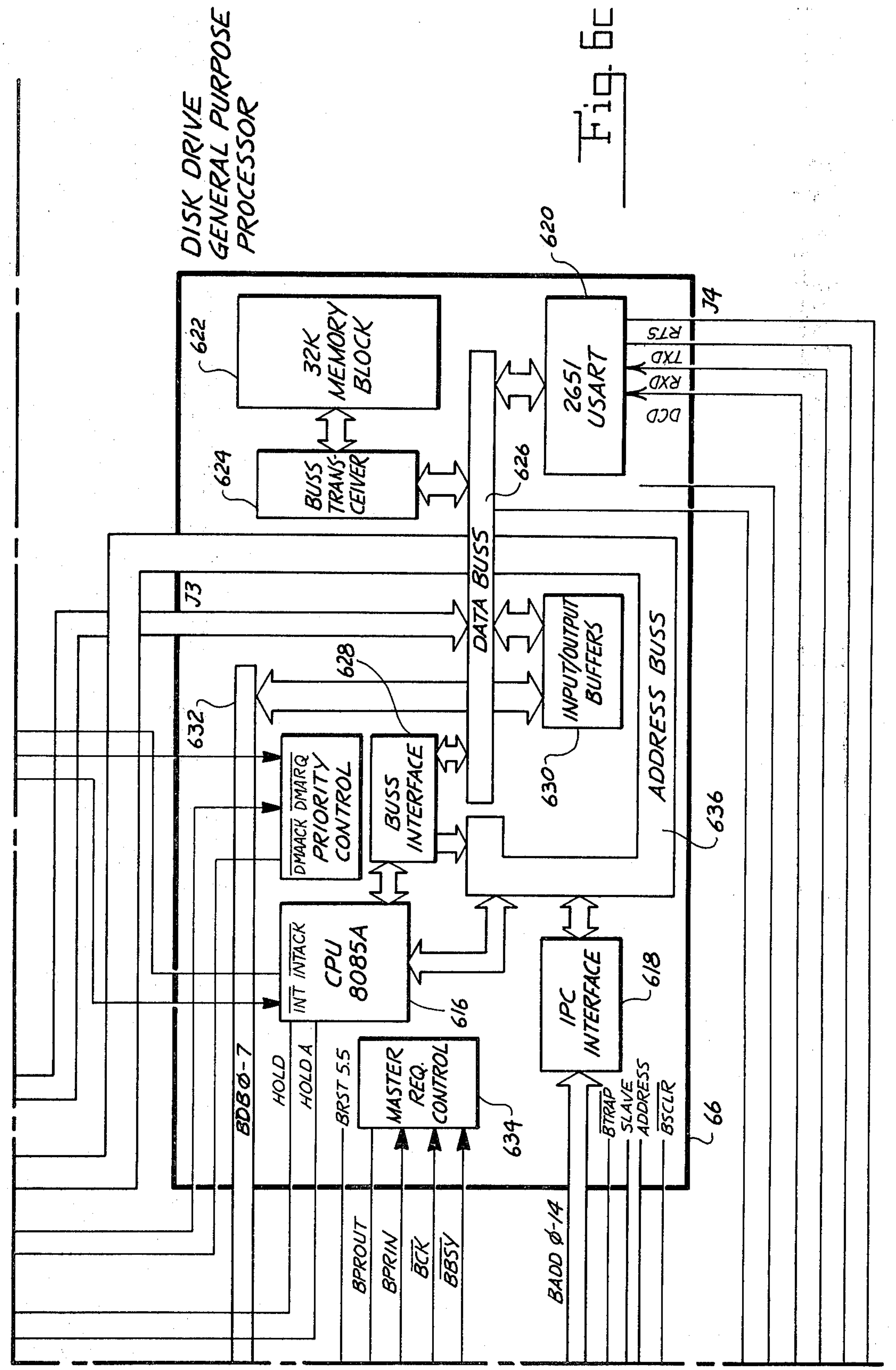
Figure 6D:
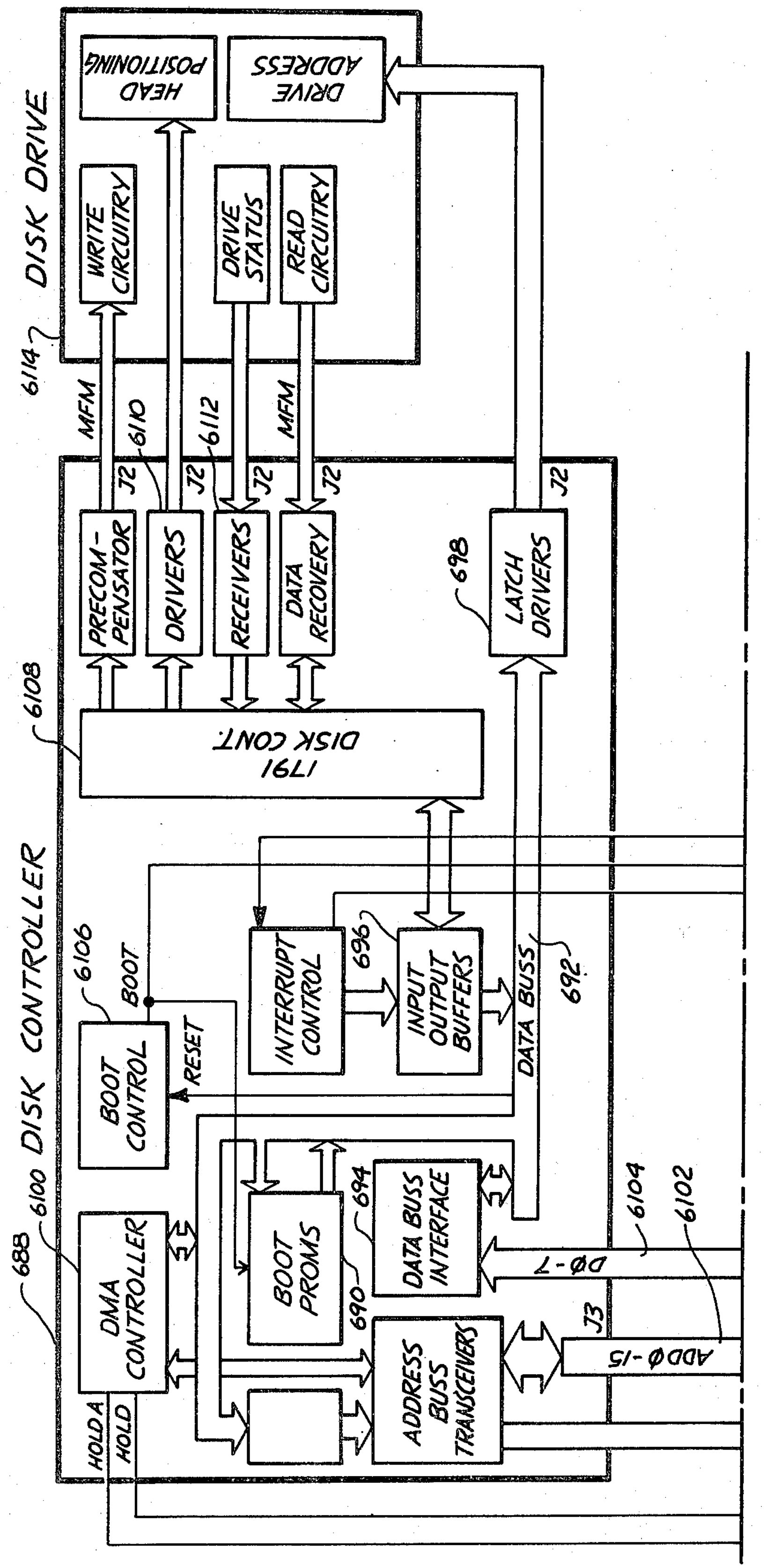
Figure 6E:
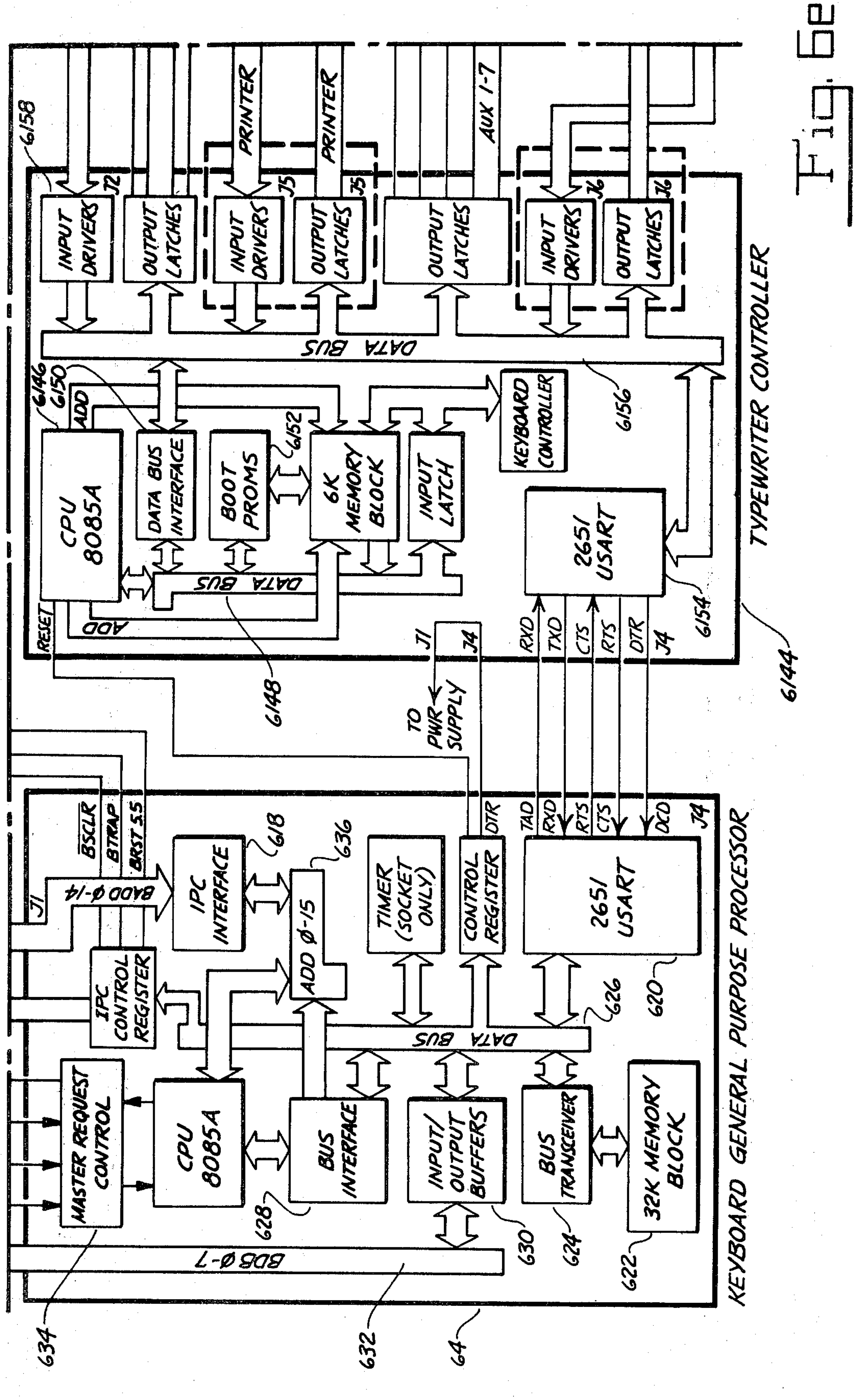
Figure 6F:
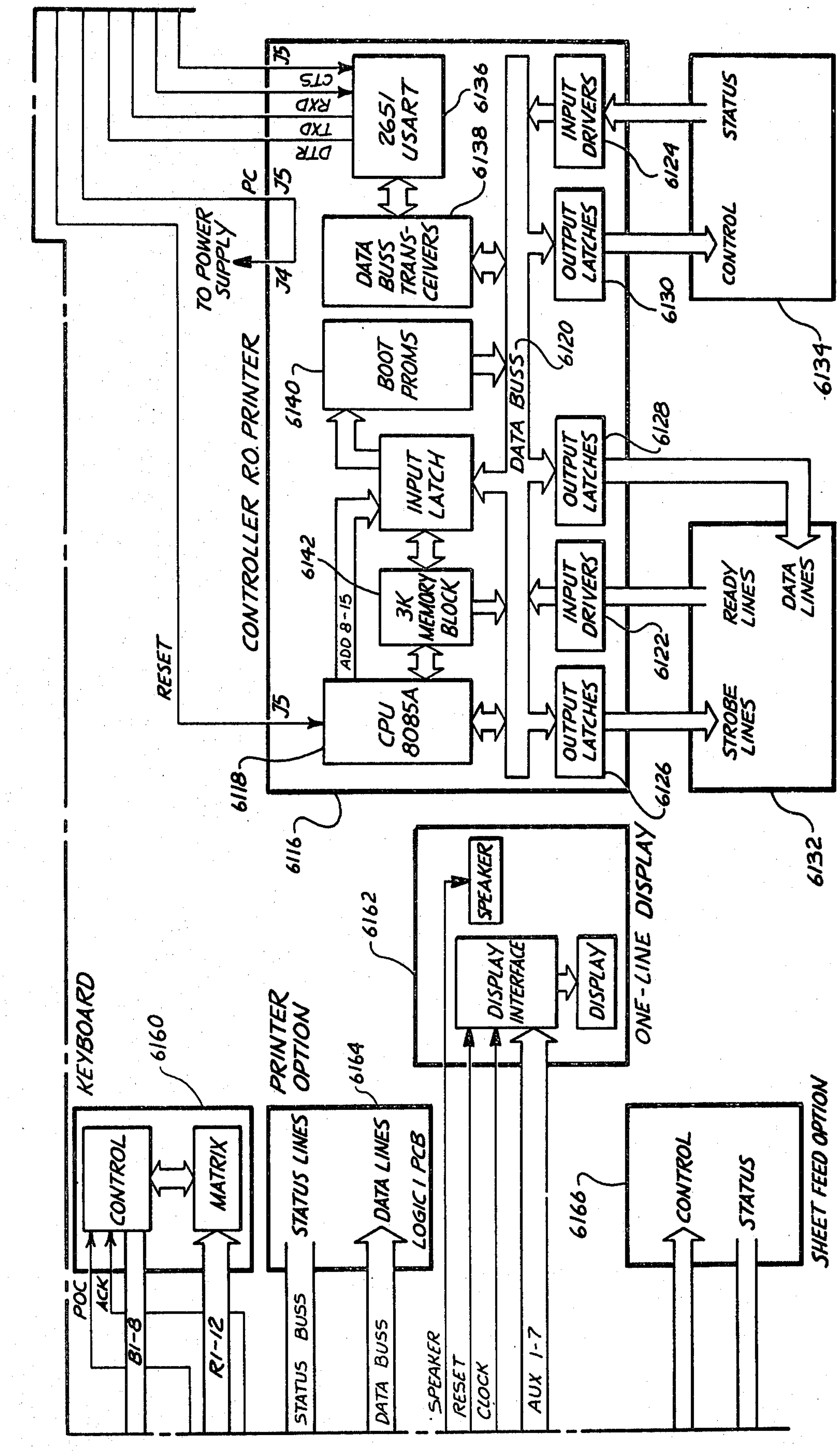

Referring now also to FIG. 6, it should be noted that the detailed schematic circuit diagram of each of the various modules shown therein is described in detail hereinafter. The system includes a plurality of general purpose processors 62, 64 and 66 which are interconnected via the back plane bus 68. The back plane bus 68 includes an address bus BADD0 through BADD19 610, a databus BDB0 through BDB7 612 and a control bus 614. It should be recognized that additional general purpose processors can be connected to the back plane bus 68.

Each general purpose processor, such as for example general purpose processor 62, includes an Intel 8085A central processing unit (CPU) 616, an interprocessor communications (IPC) interface 618 and a USART 620. A random access memory 622 having provision for 32K bytes of memory (plus additional address space, as is described in greater detail hereinafter) is connected via a bus transceiver 624, an internal databus 626 and a bus interface 628 to the central processing unit 616.

The internal databus 626 is connected via an input/output buffer unit 630 and connecting data bus BDB0 through BDB7 632 to the back plane databus 612. Appropriate timing units may be connected to the internal databus 626, as shown in general purpose processor 64. A master request controller 634 is connected to the back plane control bus 614. The CPU 616 is connected via an internal address bus ADD0 through ADD15 636 and the interprocessor communications interface unit 618 to the back plane address bus 610.

General purpose processor 62 is connected to a CRT monitor unit 638 via a CRT1 controller module 640 and a CRT2 controller module 642. The CRT modules 640 and 642 include circuitry which is shown in greater detail hereinafter, for controlling the CRT monitor 638. The CRT1 controller 640 includes line buffers 644, and 646 and DMA logic 648. A character generator address multiplexer 650 as well as vertical timing circuitry 652 and horizontal timing circuitry 654 are coupled to the CRT2 controller 642.

The CRT1 controller 640 further includes a space generator 656, a bus receiver 658 and a control character decoder 660.

The CRT2 controller 642 includes a 38.2788 MHz clock 666 connected to the horizontal timing circuits 654 and to a row counter 682.

Video drivers 668 are coupled to a receiver input unit 670 of the CRT monitor 638.

The CRT2 controller 642 includes a width generator 672, a character generator A 674, a character generator B 676 coupled to a multiplexer 684. An attribute register 678 and the two character generators 674 and 676 are coupled to a serializer 679.

The monitor 638 includes a cathode ray tube (CRT) 686.

A disk controller 688 is coupled to the disk drive general purpose processor 66. The disk controller 688 includes boot PROMs 690 coupled to a data bus 692 which in turn is connected to a data bus interface 694, input/output (I/O) buffers 696, latch drivers 698, and a DMA controller 6100. An address bus ADD0 through ADD15 6102 and a databus D0 through D7 6104 interface the disc controller 688 to the disk drive general purpose processor 66.

A boot control and reset is provided at reference numeral 6106. A disk controller circuit 6108 is coupled to the I/O buffers 696 and is coupled to drivers and receivers 6110 and 6112, respectively, which drivers and receivers are coupled to a disk drive 6114.

The disk drive general purpose processor 66 is also coupled to a receive only (RO) printer controller 6116. The RO printer controller 6116 includes an 8085A microprocessor 6118 coupled via a databus 6120 to input drivers 6122 and 6124 and to output latches 6126, 6128 and 6130, some of which (6126, 6122 and 6128) are connected to an RO printer logic printed circuit board 6132 and the rest of which (6130 and 6124) are connected to a sheet feeder 6134.

The RO printer controller 6116 also includes a USART 6136 coupled to the databus 6120 via databus transceivers 6138. Boot PROMs 6140 and random access memory 6142 are also coupled to the databus 6120 of the RO printer controller 6116.

The keyboard general purpose processor 64 is coupled to a typewriter controller 6144. The typewriter controller 6144 has a microprocessor 6146 coupled via a databus 6148 to a databus interface 6150 and boot PROMs 6152. A USART 6154 is provided to receive data from and transmit data to the keyboard general purpose processor 64. This USART 6154 is coupled to a databus 6156 in the typewriter controller 6144. The databus 6156 is connected to input drivers and output latches shown generally at reference numeral 6158 to control a keyboard 6160, a one line plasma display 6162, an optional printer 6164 and an optional sheet feeder 6166.

Figure 7:
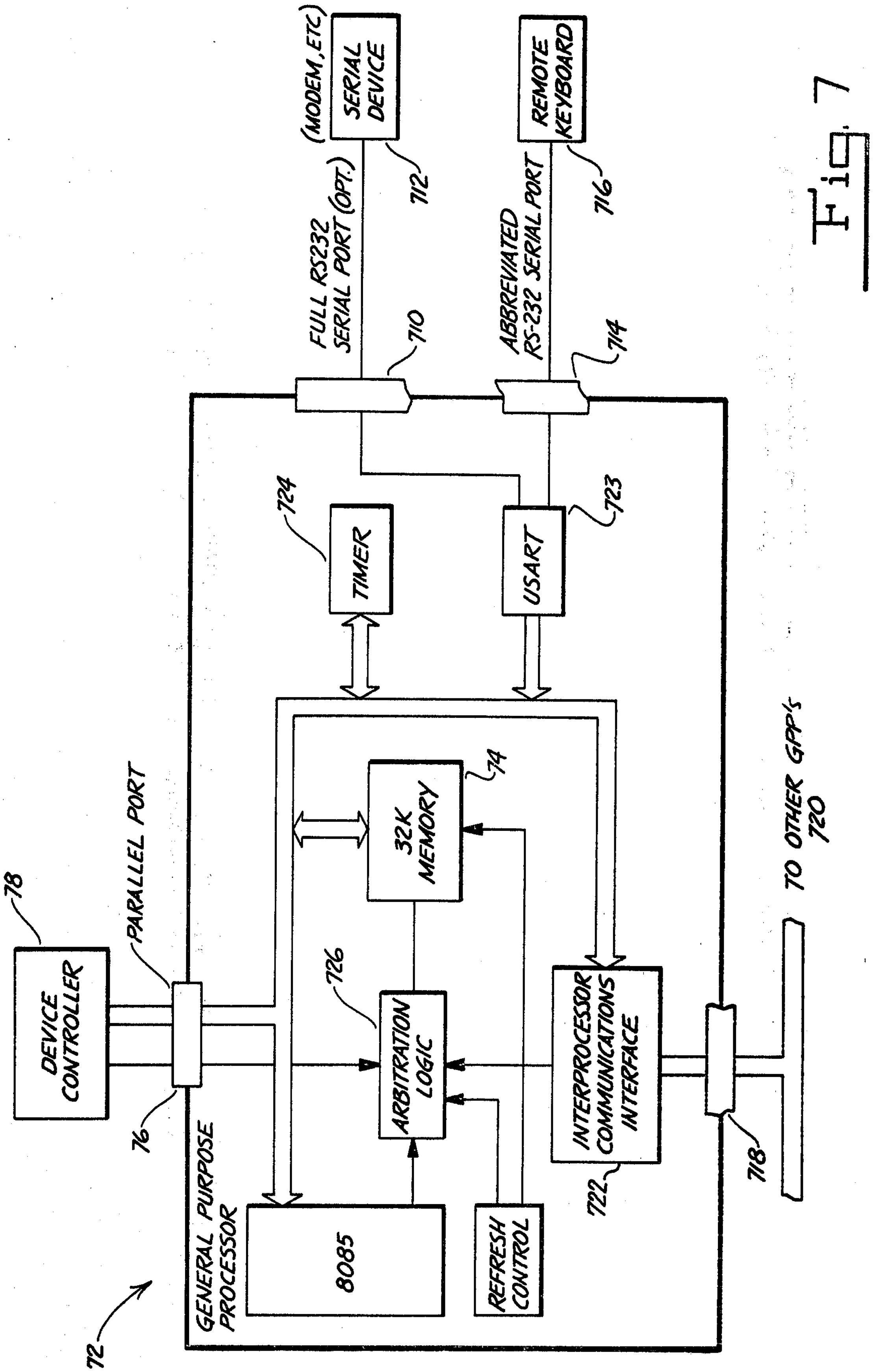
FIG. 7 is a block diagram of a general purpose processor for use in a word processing system employing plural processors, such as shown in the preceding figures.

Referring to FIG. 7, a number of general purpose processors (GPP) 72 are provided in the system. Each processor 72 has a Model 8085 microprocessor. The processors 72 each have 32K bytes of memory 74 and each processor 72 has several different ports to enable it to perform different kinds of functions. In particular there is a parallel port 76 on each general purpose processor 72 which communicates with different device controllers 78 in the system.

There is also an optional serial port 710 on each general purpose processor 72 which communicates with serial devices 712 such as a keyboard or printer. There are two adjacent ports on each general purpose processor 72: one is an RS232 serial communications port 710 used to handle devices such as communications modems; and the other port is an abbreviated port 714 for handling and driving most common devices such as a typewriter controller, referred to generally as numeral 716.

At the lower end of the general purpose processor 72 board is an interprocessor communications interface (IPC) 722 which allows the processor 72 to communicate with other processors in the system, referred to generally as reference numeral 720.

A universal synchronous/asynchronous receiver/-transmitter (USART) 723 is coupled to the 8085 of general purpose processor 72.

Additionally, on each processor board 72 is an optional timer 724 to allow the processor 72 to perform a time out function for disk operations during communications applications. Associated with an external device controller 78 is a direct memory access (DMA) channel to allow the external device controller 78 to read from and write into the memory 74 of external general purpose processors 72 via arbitration logic 726 without processor 72 intervention.

At any time there are several devices that may contend for the memory 74 on the general purpose processor 72. The memory of each processor 72 in the system is shared. That is, any processor 72 in the system can access the 32K bytes of memory 74 of any other processor 72. The several devices that may contend for the memory 74 include device controllers 78, which transfer data in and out of memory 74, the 8085 of the processor 72 itself, and other processors in the system 720, communicating via the internal bus also may access the 32K memory 74.

If several devices wanted access to this memory 74 at the same time, and several different devices were to gain control of the internal bus simultaneously, spurious results would occur. Accordingly, arbitration logic 726 is included to resolve memory contention.

Figure 8:
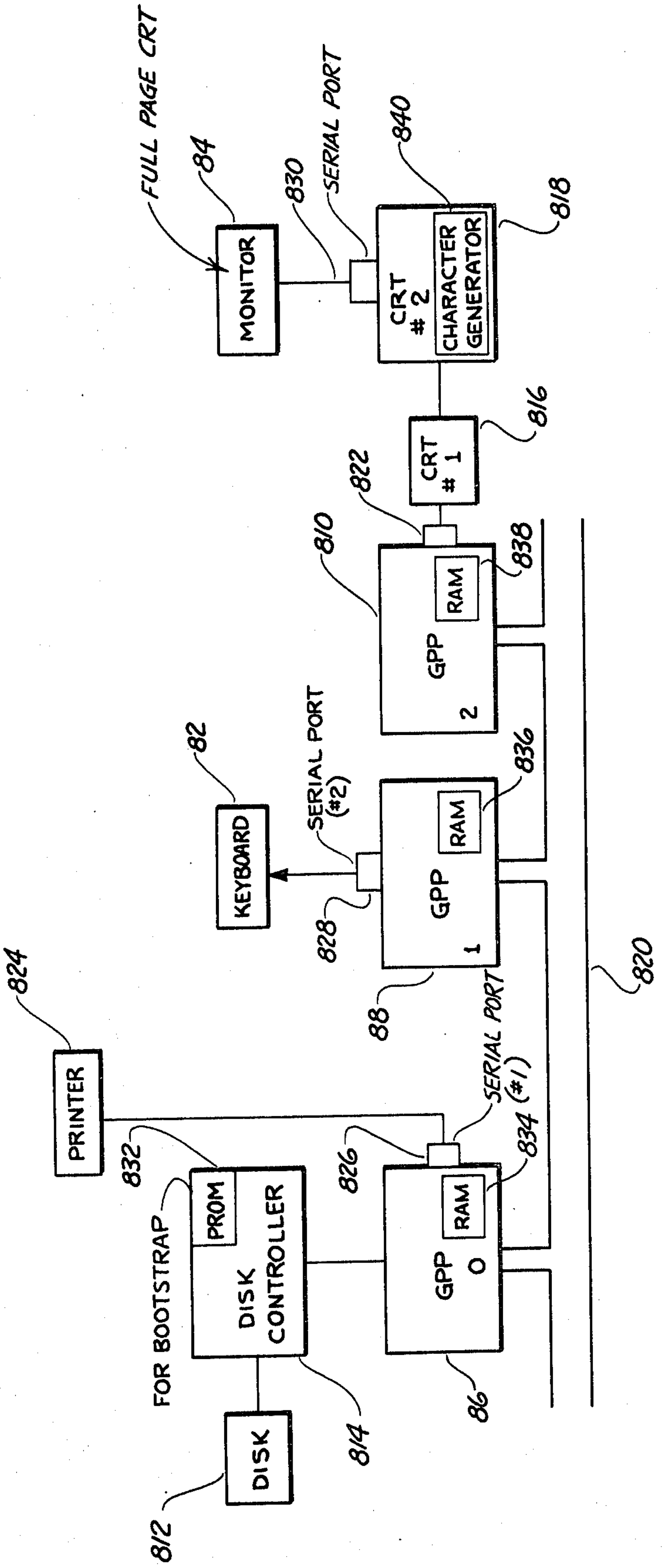
FIG. 8 is a block diagram of a configuration of a word processing system embodying the present invention.

Referring to FIG. 8, a preferred embodiment configuration consists of a keyboard B2 and a full page cathode ray tube CRT 84 is shown. The configuration has three general purpose processors (GPP0, GPP1 and GPP2) 86, 88 ad 810. The general purpose processors are each identified by a 4-bit address. Therefore up to 16 processors can run in the system simultaneously. GPP0 86 is coupled to a disk controller 814. All of the input-/output associated with the disk controller 812 is coupled to the GPP0 86. GPP1 88 is attached to the keyboard 82; GPP2 810 is attached to CRT boards 816 and 818 and moves text on the CRT screen. The two CRT boards 816 and 818 do not interface the back plane bus 820, but are connected through the device controller port 822 on GPP2 810. An 8085 microprocessor is associated with each of the general purpose processors 86, 88 and 810.

A printer 824 is connected to serial port 826. The key board 82 is also attached through a serial port 828 to GPP1 88. There are, therefore, two serial lines 826 and 828 that are connected to the back of the floor module. One video cable from the CRT2 card 818 is connected to the monitor 84. In this configuration, there are actually five processors in the system. An 8085 microprocessor resides on each of the processor boards 86, 88 and 810, and one resides on the controller for the printer 824 that mounts in the printer card cage. Another 8085 resides on the controller that mounts on the keyboard 82.

Another aspect of this system is that the machine, with the exception of 256 bytes of PROM 832 on the disk controller 814, is all programmable. That is, the program that is executed in each processor is loaded from the disk 812 at the beginning of a session. When power is applied to the system, a reset button on the front of the floor module is actuated. The processor 86 begins executing under the PROM 832 on the disk controller, and it pulls in the first sector on the disc 812. This data is loaded into GPP0's 86 memory 834, and GPP0 86 begins executing from the code which is loaded from the first sector. GPP1 88 and GPP2 810 are both in a reset condition, not running, during that time. The first sector that is loaded from the disk 814 during initalization contains a boot program. The boot operation allows the GPP0 86 to access more information from the disk 814 and load the operating system into its memory 834. At that point it begins transferring information from the disk 814 through the back plane 820 to GPP1 86 and GPP2 88 and loads their memory 836 and 838 with the program. Once this initialization process has occurred, the GPP0 86 releases the other two processors 88 and 810 to begin execution.

A character generator 840 is provided on CRT2 818 which also must be loaded during initilization. The characters visible on the CRT screen of the monitor 84 are soft-loaded characters. That means the character set can be changed, for example, from pica to proportional. The information in the character generator 840 is loaded from the disk 814 and is transferred to GPP2 810. When this processor 810 begins executing its program, the character set is transferred through CRT1 816 into the memory on CRT2 818. Characters are then ready for display on the CRT screen 84.

GENERAL PURPOSE PROCESSOR CONFIGURATION

To execute a particular instruction, the machine may run through several machine cycles. For a simple instruction it may run through only one cycle. A machine cycle consists of machine states called T states. The duration of each T state is one period of a Phi (o32I) clock. One instruction can be composed of between one and five machine cycles; each machine cycle can be composed of between three and six T states. While the clock is running, the processor runs through T1, T2, T3, T4 and T5 and then back to T1 again. The actual number of executed states depends upon which machine cycle of which instruction it is executing. A combined data bus and address bus are provided. During T1, the processor starts outputting address information. A latch is provided, as hereafter described, to demultiplex the address/data bus.

During T1 and T2 the processor generates address information. Because the address/data bus is time multiplexed, the processor generates address information during states T1 and T2. The signal address latch enable (ALE) is generated in T1. During T3 the actual data transfer takes place.

In the preferred embodiment 200 to 250 nanoseconds are required before data becomes available. By T3 the data should be stable on the bus. If the processor is executing a write instruction it is expected to be latched at T3. If it is executing an input instruction or a memory read it expects to receive data back during T3. This is where the actual memory transfer takes place. During T4, T5 or T6, the execution of the instructions performed.

Figure 9:
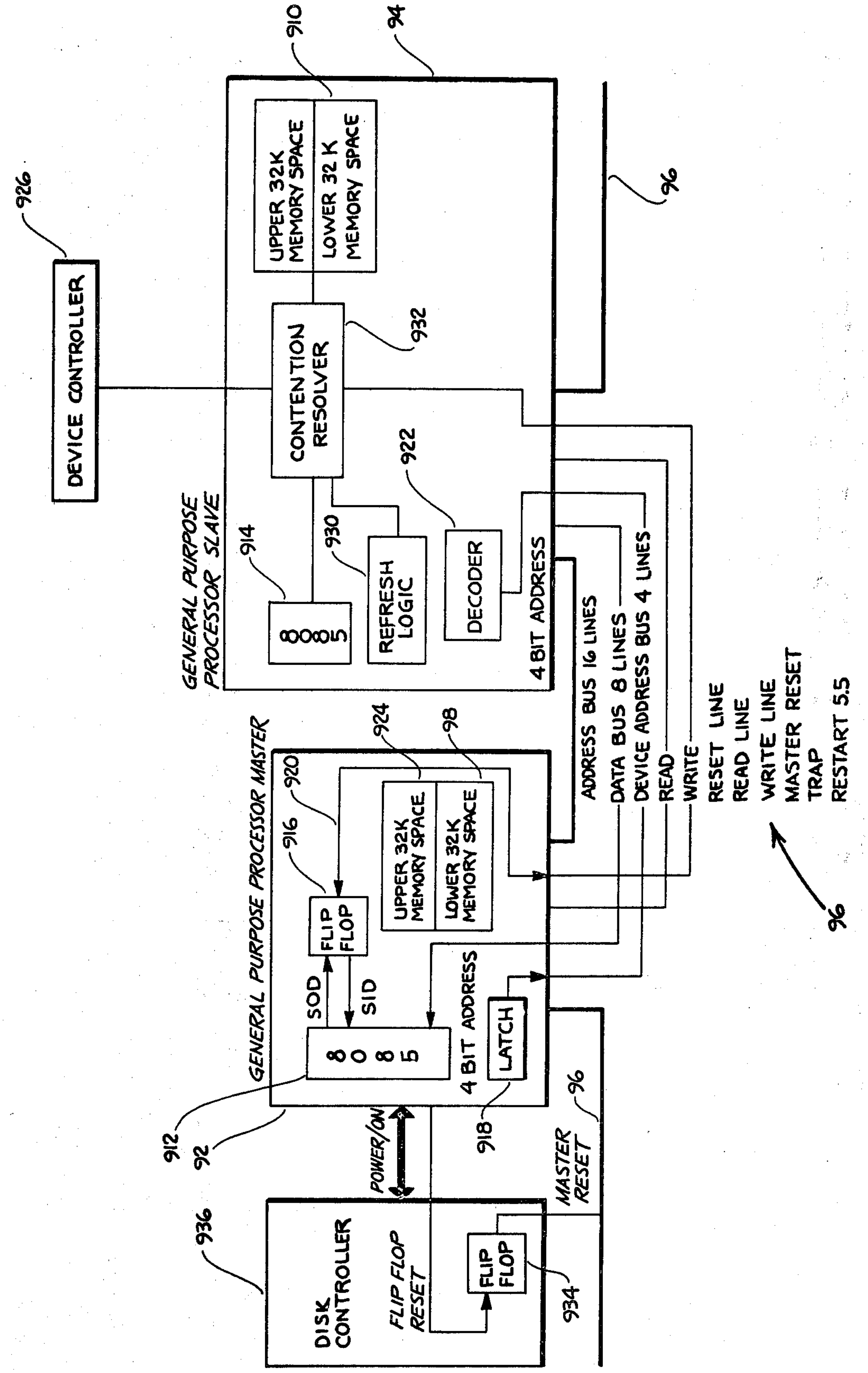
FIG. 9 is a block diagram helpful in an understanding of the general purpose processor communications via the word processing system back plane bus.

Referring to FIG. 9, information is transferred between processors as shown. General purpose processors 92 and 94 are connected to each another through the back plane bus 96 for communication. Each processor has 32K bytes of memory 98 and 910 associated with it. The addressing space on the 8085 912, however, is 64K bytes of memory. For one processor 92 to communicate with another 94, data is passed between a particular processor 92 and the memory 910 on the second processor 94.

A master-slave relationship is initiated on the back plane 96. That is, the processor 92 of the transferring device becomes the master. The processor 914 on the slave 94 device is unaware that its memory 910 is being accessed. The device that is going to become the master 92 waits for the bus 96 to become inactive. The SOD output on the 8085 912 runs out to the flip flop 916 through logic that determines whether the bus 96 is busy. If it is busy, then the processor 92 waits for the bus to be released.

If it is not busy, then the processor 92 takes control of the bus 96. Each one of the processors 92 and 94 has a latch 918 associated with it, used to designate the address of the selected slave processor. The master processor executes code to load the latch 918 with a device address other than its own. It loads a four bit address into the latch 918 that corresponds to the device address of the desired slave processor 94. Then it activates the SOD line, monitoring the state of the SID line. When the SID line becomes active it indicates that the bus is ready. The master-slave relationship is then initiated. As soon as the signal called BUS BUSY 920 is inactive, the processor 92 enables the contents of the four bit latch 918 to be driven onto the bus 96. It then activates the bi-directional bus busy (BUS BUSY) line 920. A decoder 922 receives the four bit address from the back plane 96, and detects its address. It also sees that the bus is busy. It recognizes its address and establishes itself as a slave. The output of the decoder 922 generates the signal called SLAVE. This entire operation is transparent to the slave processor 914.

The processor 92 generates an address corresponding to the upper 32K bank 924 in its memory space. The lower 32K bank 98 in the memory space is assigned to its own memory. The upper 32K bank 924 of the memory is assigned to slave memory 910. Once the master-slave relationship is established, location 0 through 7FFF hex are the lower 32K on 92. Locations 8000 hex through FFFF hex are on slave processor 94. For the master processor 92 to write into location 0 on the slave processor's 94 memory, once it has established the master-slave relationship, the master processor 92 reads or writes to location 8000 as though location 8000 were in its own memory. In actuality, logic, not shown, indicates that the processor 92 is communicating with an address at or above location 8000, not on the master processor 92 board. A read or write signal is sent over the bus 96 which is coupled to the slave board 94. This board 94 recognizes that it has been established as a slave, and sees a read or write signal coming from the bus 96, indicating that another processor is trying to communicate with its memory. If location 8000 has been loaded on the address bus 96, that is translated to the first location of slave processor 94 memory 910 which is location 0. The bus 96 is frozen in that state until that memory location is accessed.

The address bus 96 has 16 lines attached to it and the data bus 96 has an 8 lines attached to it. There is also a 4 bit address bus 96 which has another four lines attached to it. Consequently there are 20 bits of address space. The maximum amount of addressable memory within the system is $2^{20}$.

When the master processor executes a memory read to location 8000, the BUS READ line on bus 96 is activated with other control signals, and the address is loaded onto the address bus 96. The signal is sent to board 94 which recognizes that it is the active slave in the system. It detects the READ line which indicates that there is a processor 92 trying to perform a read. It converts the address from location 8000 to location 0. There is an attempt made to access that location in memory. Memory is capable of being shared by several different devices on a card-shared by the 8085 914, shared by the device controller 926, and also shared by the interprocessor commuications (IPC) bus 928. Also, because the memory on the card is dynamic, it must be refreshed periodically. The device controller 926, the 8085 914, refresh logic 930, and IPC 928 may be contending for memory. They may not all be contending at once but if two of them make an attempt to try to access memory at the same time, there has to be a way of resolving the contention. For that purpose, arbitration logic 932 is provided.

The IPC 928 has lowest priority in contention arbitration. If any other device is using memory 910 during the current memory cycle, the IPC 928 is not granted access to it. It waits until all other devices are not attempting memory access. The master processor 912 enters a wait state. The master processor 912 makes a memory access request into memory 910 and the control signal is sent back on this processor 912 to lower the READY line until it can gain access to that location 910. Once all the other devices are off the bus the IPC 928 grants the master processor 912 access and the address that waits on the IPC bus is passed to memory 910. Data from the slave processor's memory 910 is passed onto the IPC bus and the ready line on the master processor 912 is released.

An IPC transfer usually takes longer than a regular transfer from its own memory 98. It usually takes two or more T-states depending upon the processing occurring in the slave processor 94. All of this happens invisibly to the slave processor due to the contention resolver 932 and due to the fact that memory is being interleaved among the device controller 926, the 8085 914, the refresh logic 930, and the IPC 928. The slave processor 914 is unaware that a transfer has taken place, and discovers it only if it accesses that location 910, and detects that it is different than it was before.

A flip flop 934 on the disk controller 936 controls the master reset line in the IPC bus 96. When the floor module is initialized, the disk controller 936 generates two signals: a power on signal to the processor 92 to initialize its processor 912 and a signal to the master reset latch 934 on the disk controller 936. When the boot operation is finished, then the master processor 912 executes an output instruction that resets the master reset flip flop 934 to release all of the rest of the processors.

The interprocessor communications bus 96 has 16 address lines, eight data lines, four device address lines, bus write, bus read and the master reset for the non-disk processors running in the system. There is also a trap line and a restart 5.5 line which allows a master processor to signal a slave processor to indicate when a transfer is completed. These lines operate in a manner similar to the above described memory transfer operations. A particular processor establishes itself as master on the bus 96. It selects a slave by performing an output to latch 918. It then sets additional bits to control the trap and restart 5.5 lines in the address bus 96. The slave processor 94 decodes its address lines via the decoder 922. If either the trap or the restart 5.5 lines becomes active on the back plane 96 then it is routed to the slave 8085 914 restart 5.5 and trap inputs. By using these lines, the master processor 92 can request attention from the slave processor 94.

Figure 10:
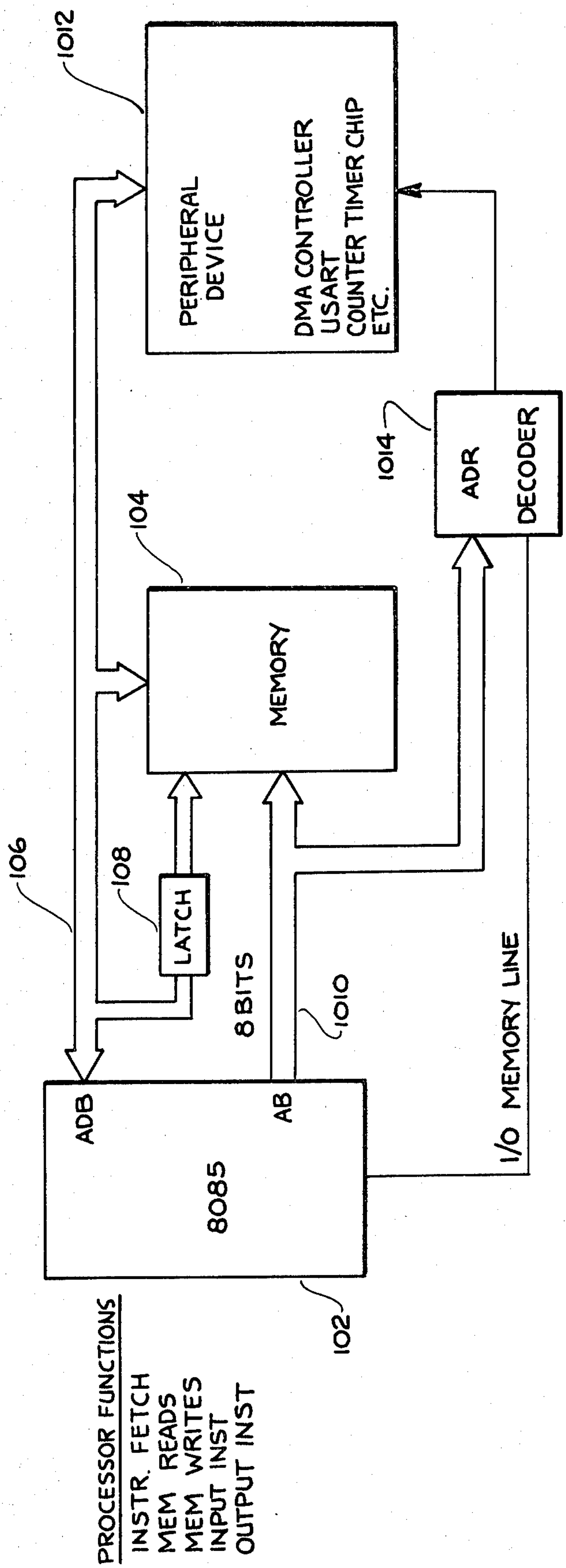
FIG. 10 is a block diagram helpful to an understanding of the means by which the general purpose processor communicates with a peripheral device.

Referring now to FIG. 10, showing the internal portions of a general purpose processor, an 8085 102 communicates with a block of memory 104. An address bus 106 is connected from the 8085 102 to a latch 108. The 8085 102 generates an address to memory 104 and then either reads or writes to memory on the data bus. The peripheral device 1012 could be a DMA controller, a USART, or a counter timer chip. The 8085 102 communicates with such a peripheral device over data bus 106.

The processor 102 usually communicates with a peripheral device 1012 such as a floppy disc controller by generating an address on the address bus 1010. That address is decoded by address decoder 1014 using a predetermined decoding scheme. The output of the decoder 1014 is coupled to the chip select in the peripheral device 1012. When the processor 102 is communicating with the peripheral device 1012 it executes either an input or output instruction. The address bus 1010 has eight lines for input/output operations. That allows up to 256 devices to communicate with the processor 102. The processor 102 executes either a input or output instruction. There is an argument associated with that instruction, from 0 to 256 (FF hex) to indicate which device the processor 102 is communicating with. All of the data movement is handled under the accumulator in the 8085 102. To perform an output with a particular device 1012 the accumulator of 8085 102 is loaded and then an output instruction is generated. The data that is in the accumulator is transferred across the data bus 106 to the peripheral device 1012.

An I/O memory signal is generated by the 8085 102. It is applied to the address decoder 1014 and used to differentiate between access to memory 104 and access to peripheral devices 1012. Read and write signals, not shown, are also decoded to indicate whether the operation is a read or a write.

GENERAL PURPOSE PROCESSOR SCHEMATIC CIRCUIT DIAGRAM OPERATION

Figure 11:
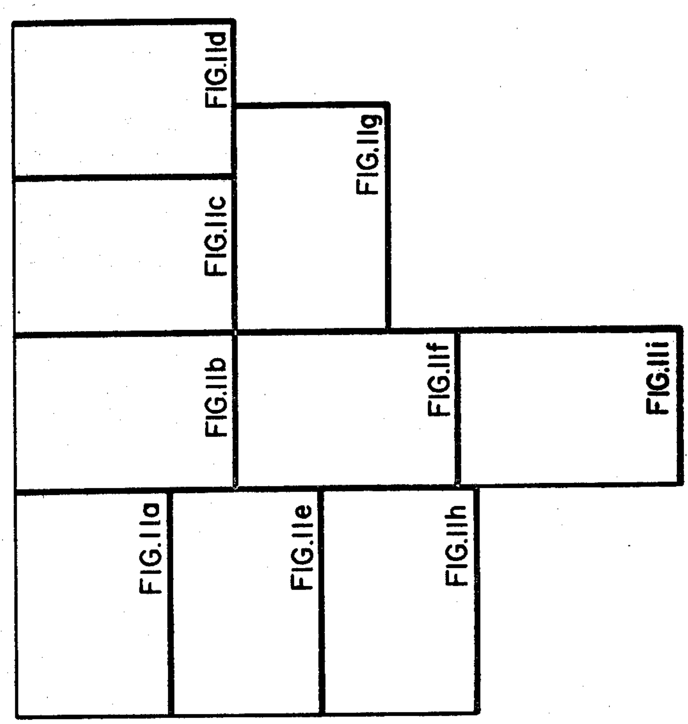
FIGS. 11 and 12, which are interconnection diagrams of FIGS. 11*a* through 11*i* and 12*a* through 12*j*, respectively, which when taken together are a general purpose processor schematic circuit diagram.
Figure 11A:
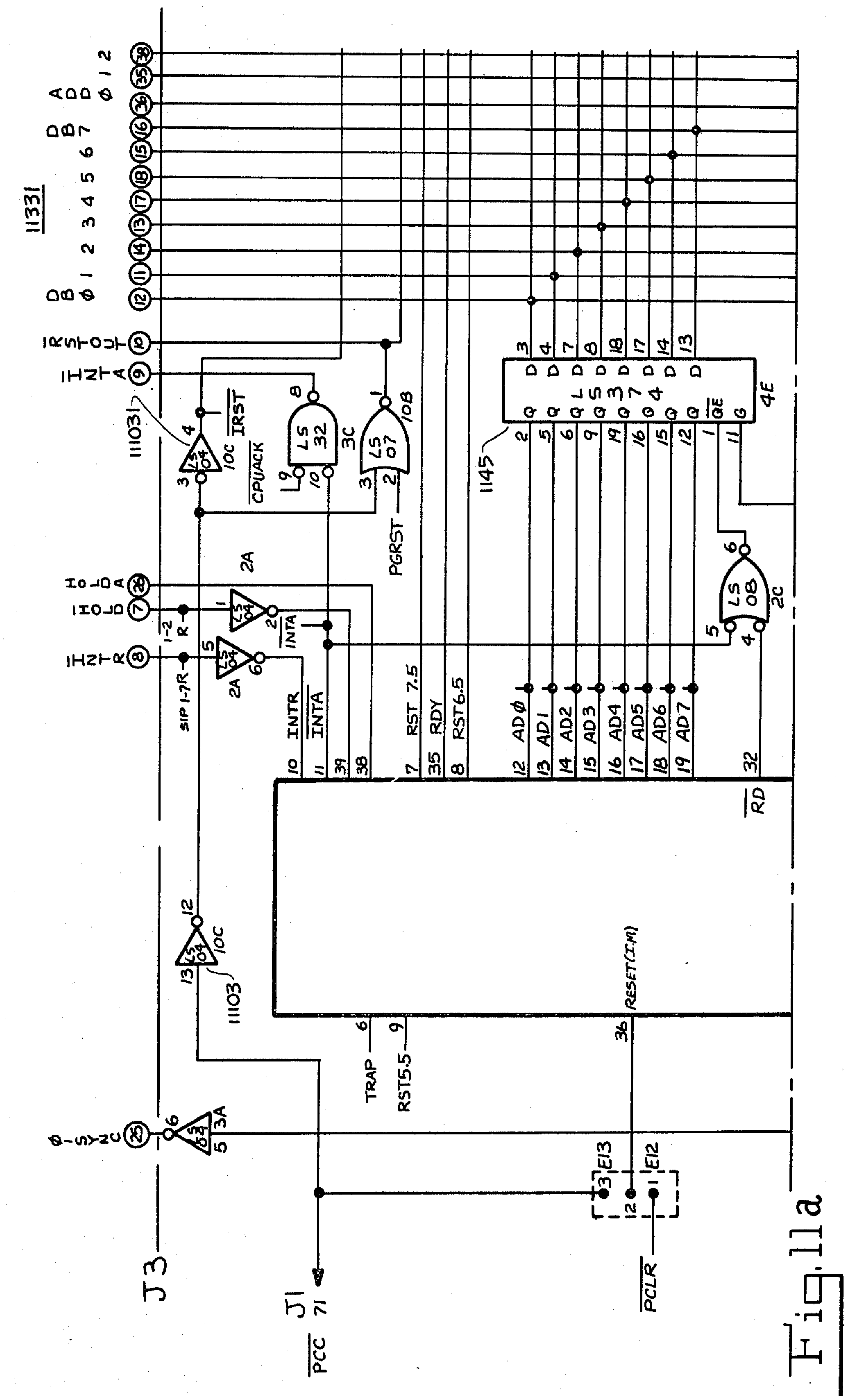
Figure 11B:
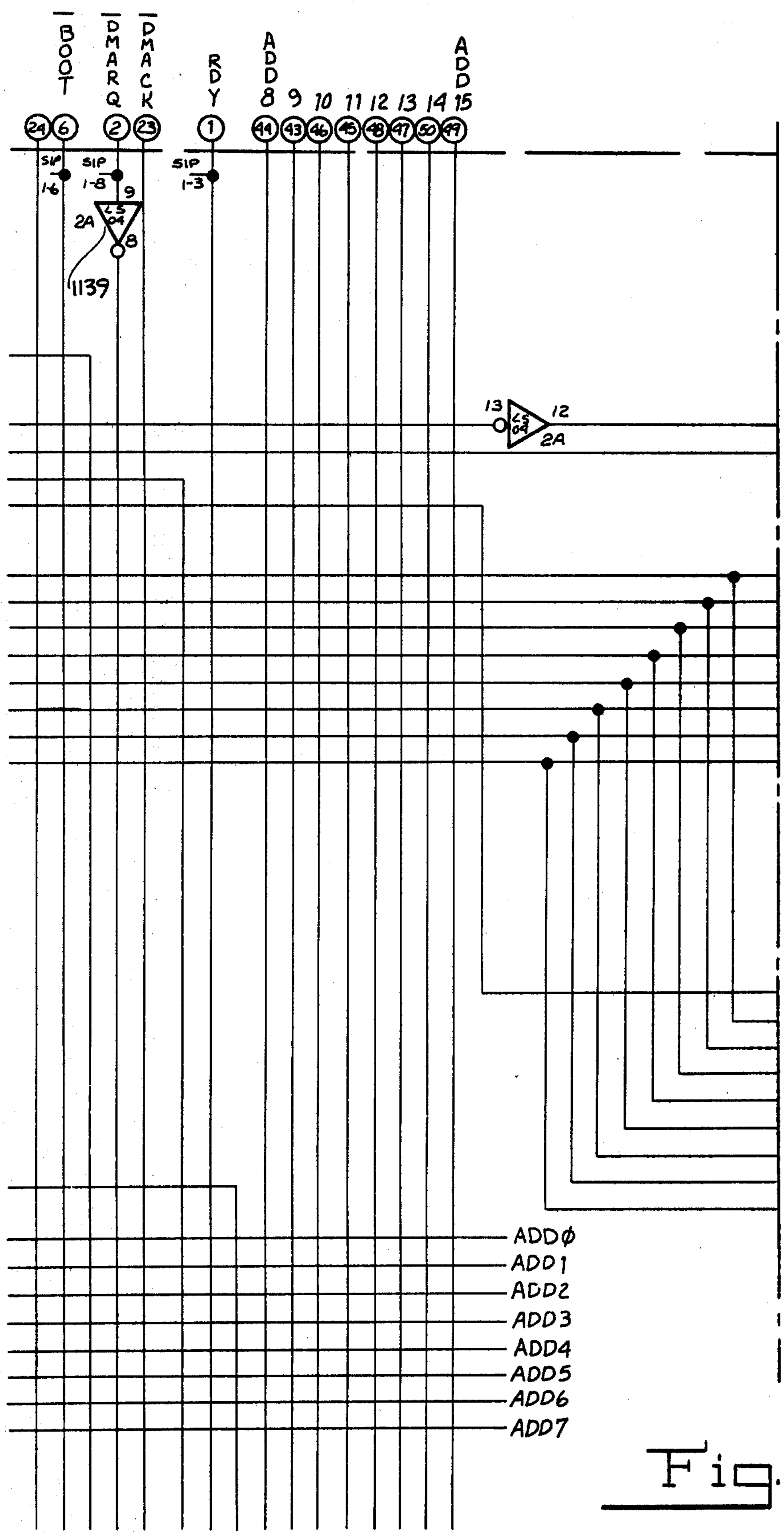
Figure 11C:
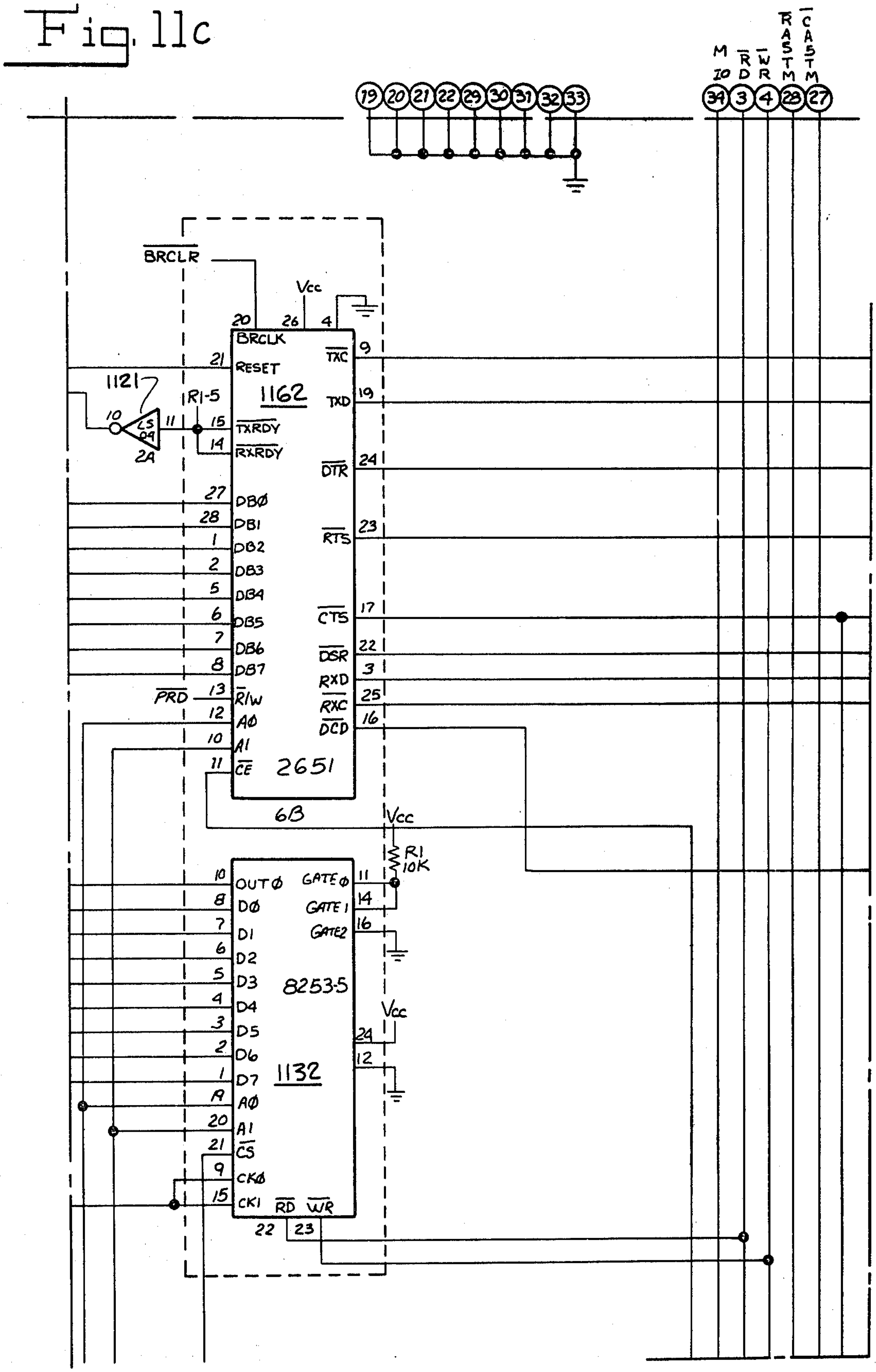
Figure 11D:
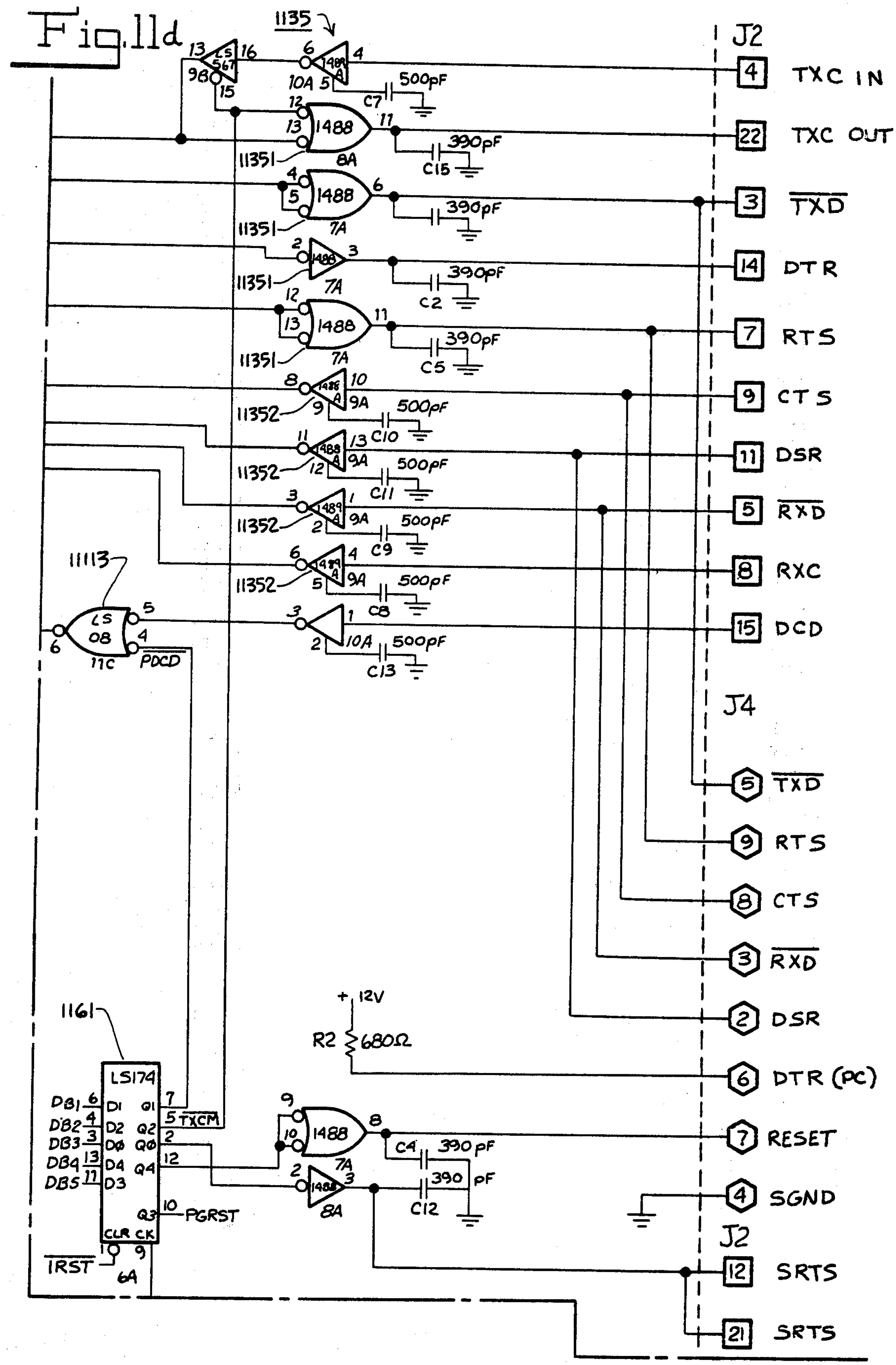
Figure 11E:
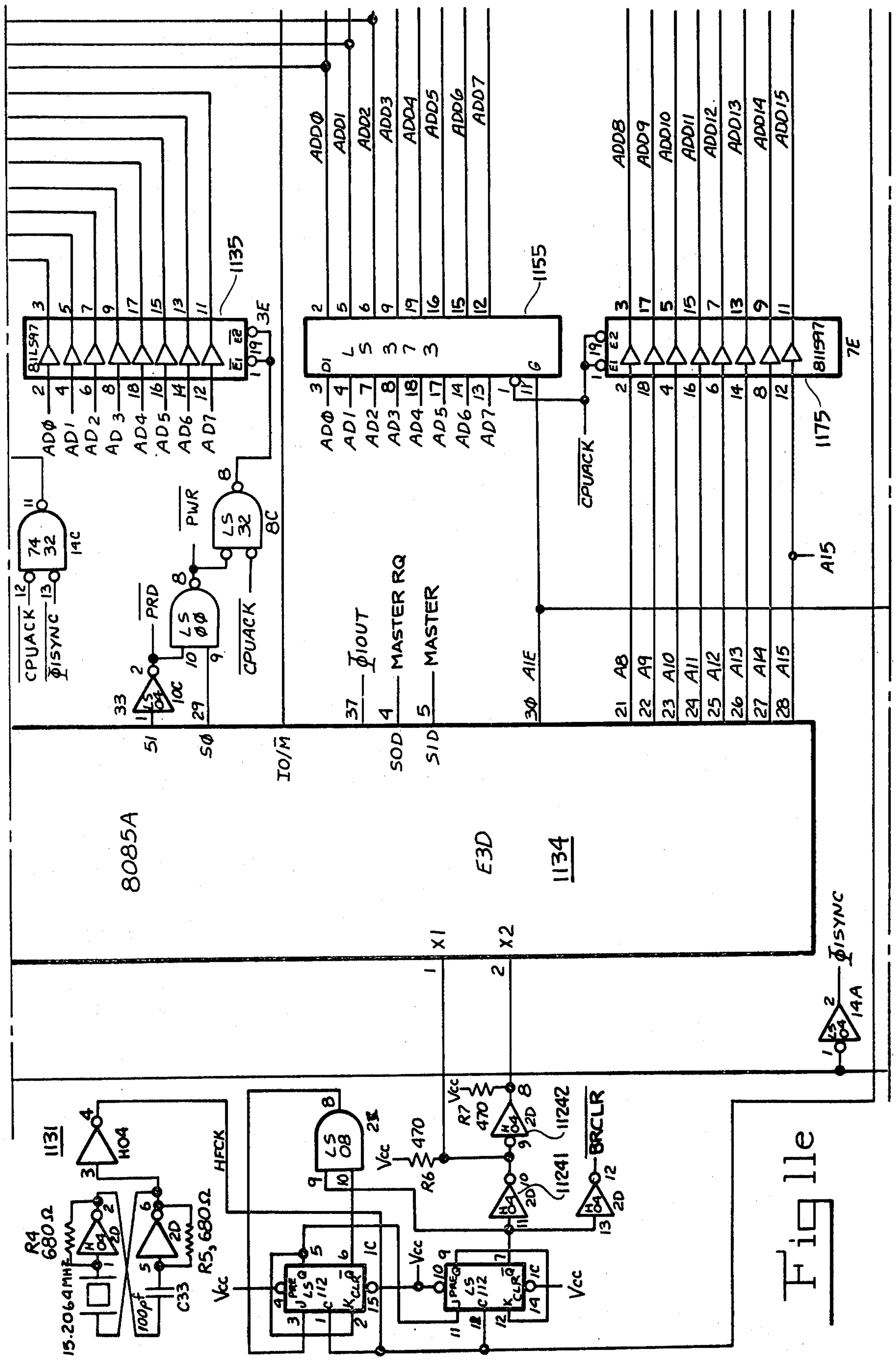
Figure 11F:
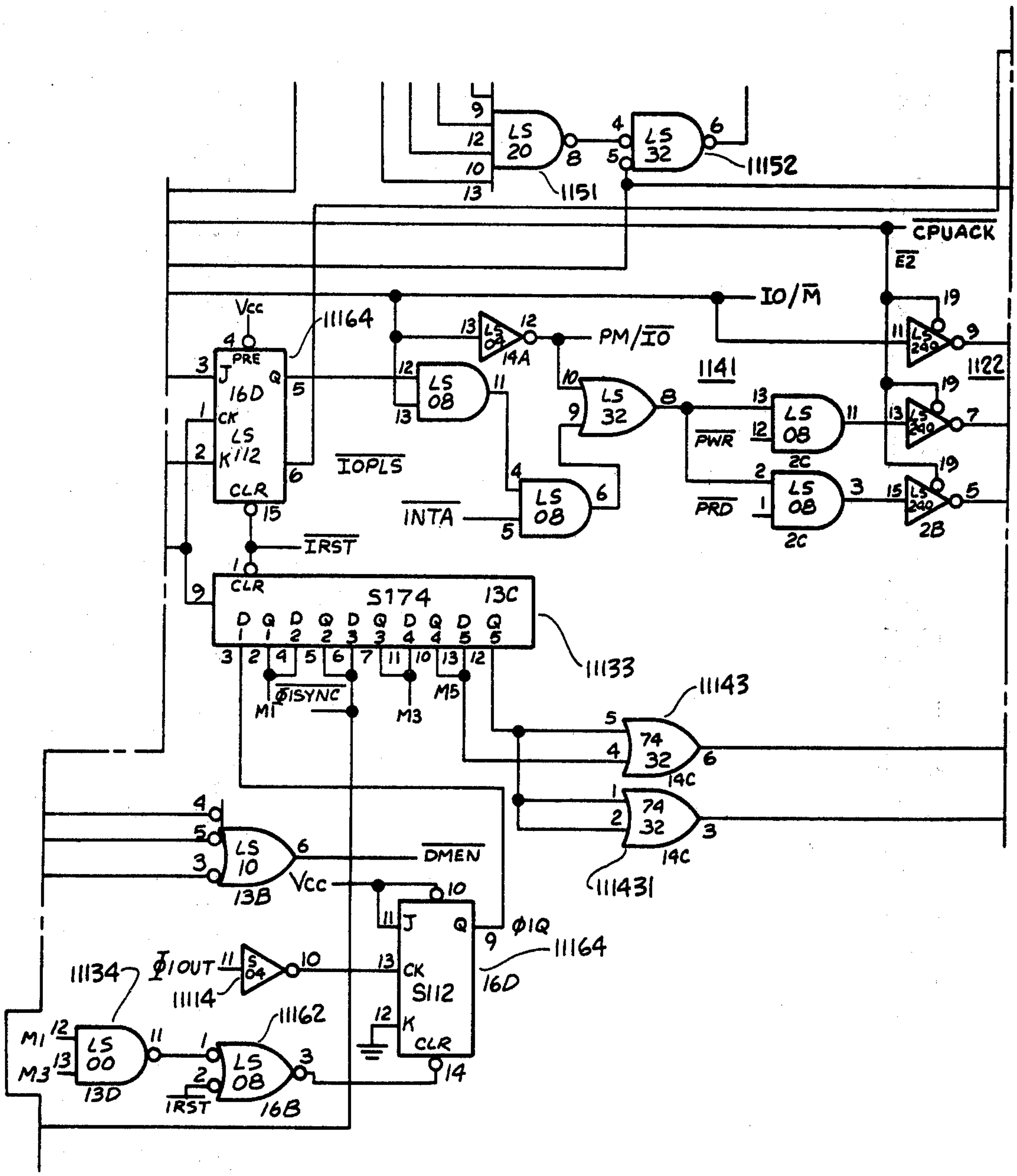
Figure 11G:
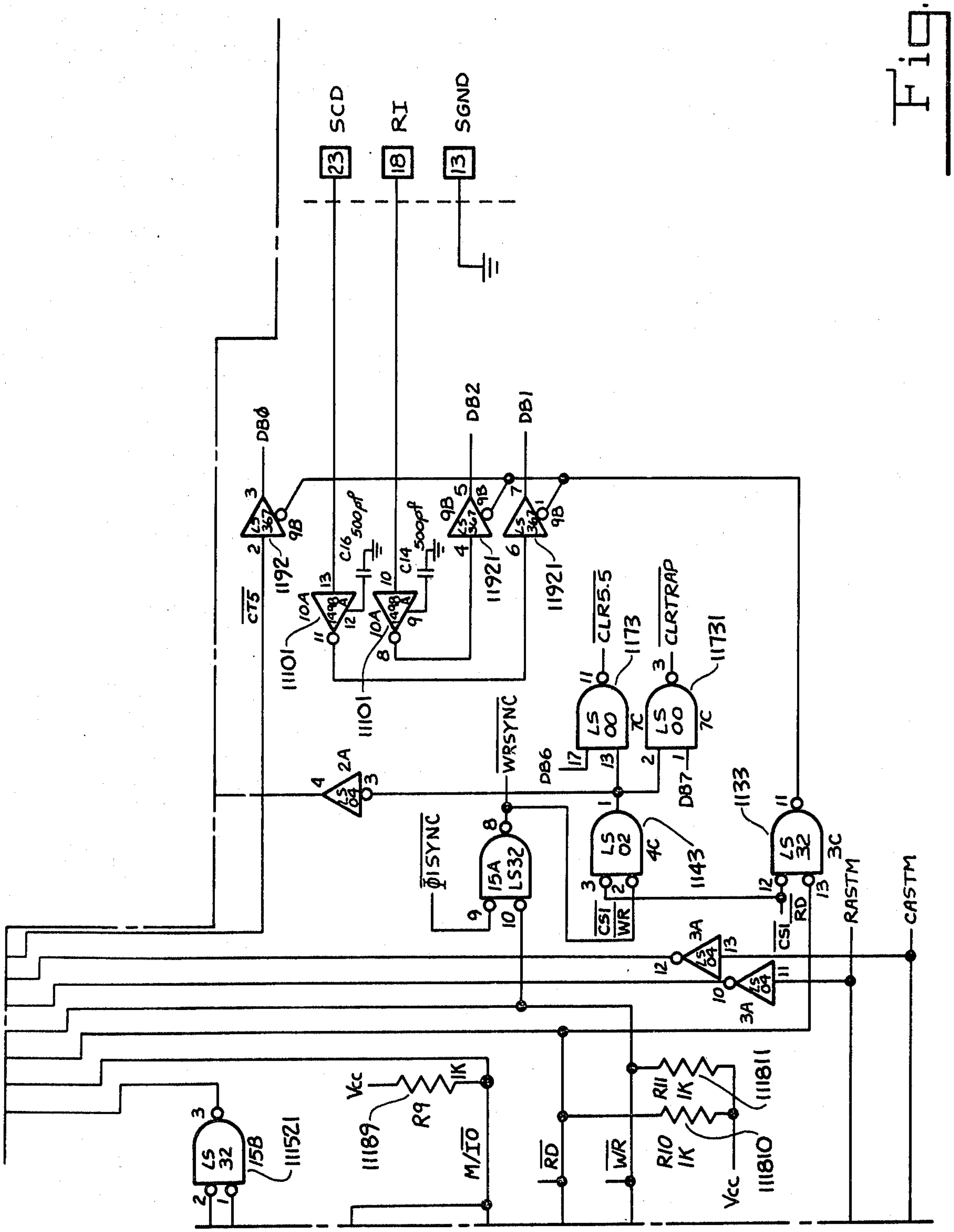
Figure 11H:
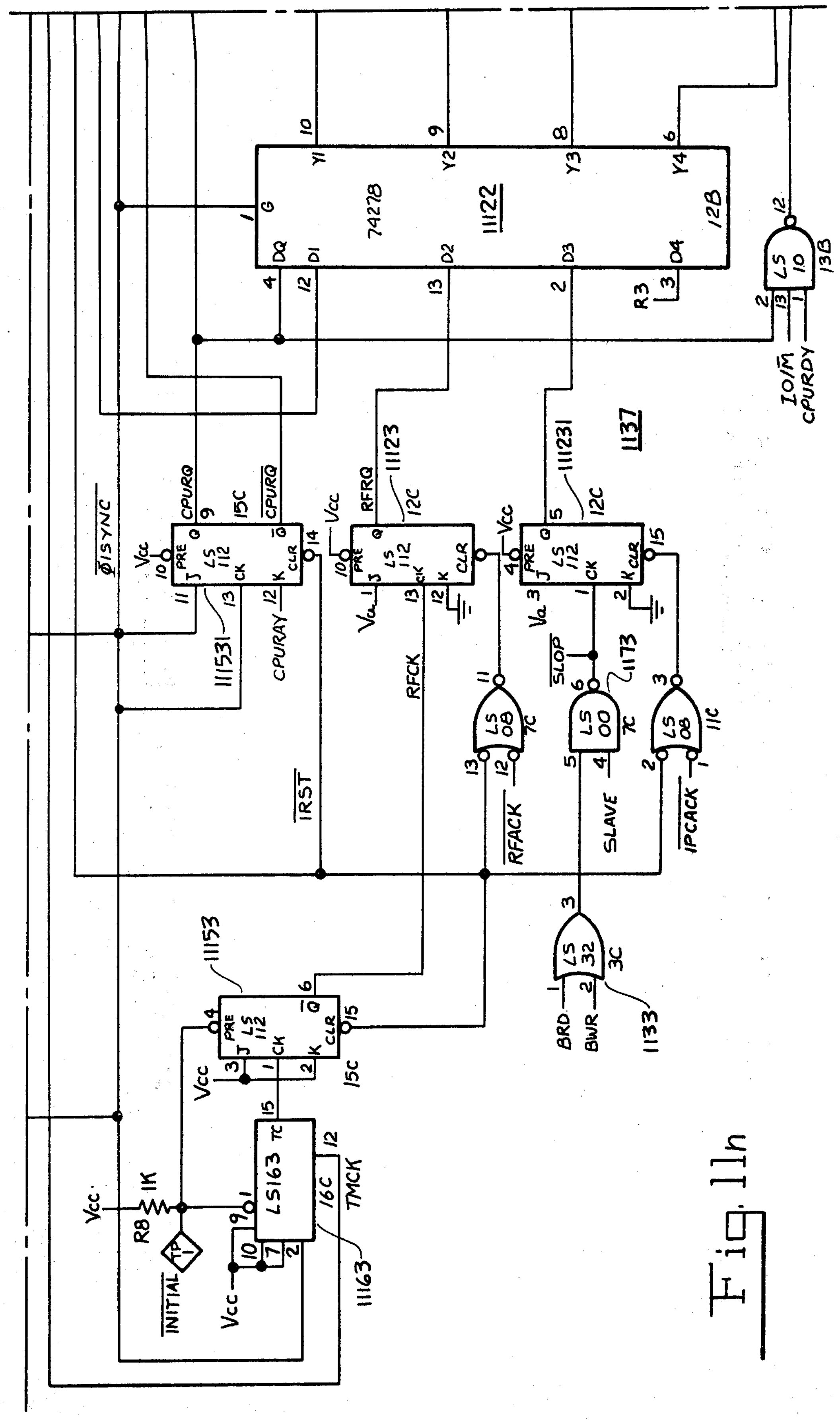
Figure 11I:
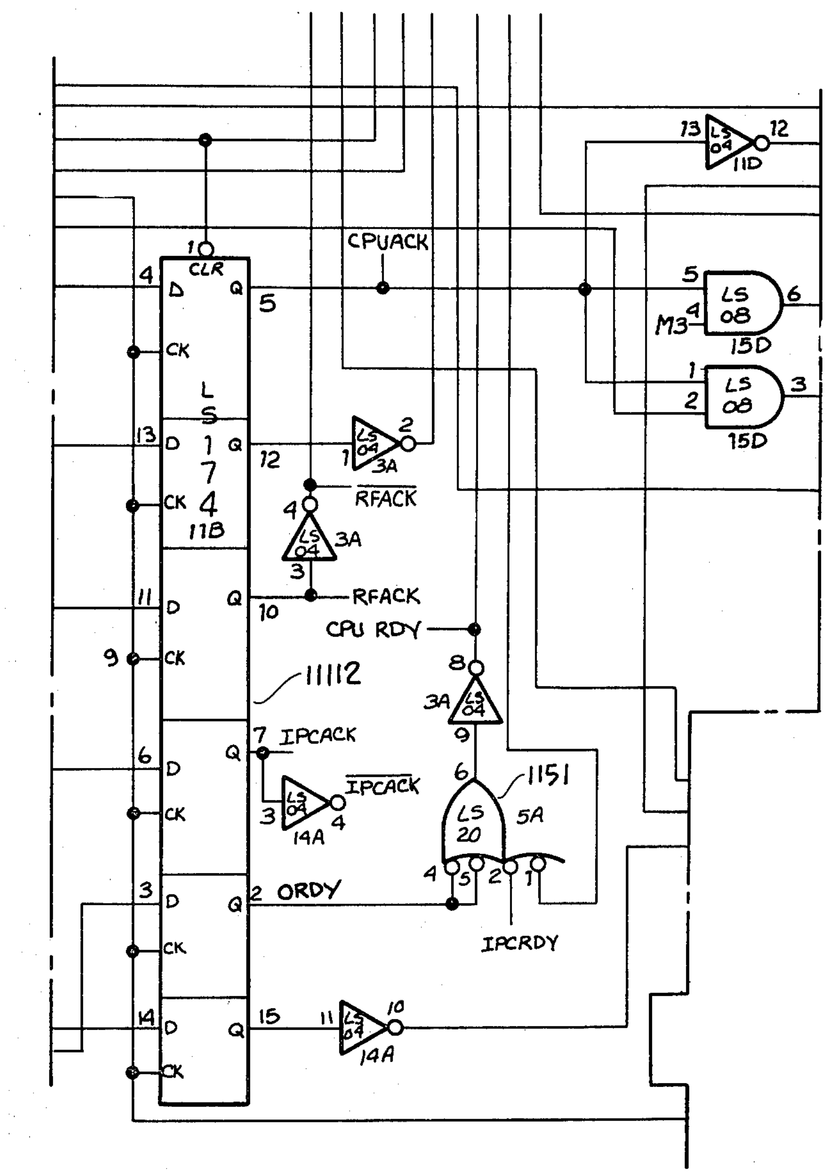

Referring to FIG. 11, the general purpose processor includes a crystal oscillator 1131. It operates at 15.2064 megahertz. The circuit below it, including a flip flop 1133, is configured as a divide by three circuit. The output signal from the oscillator 1131 is called high frequency clock, HFCLK. The output of the divide by three circuit runs through buffers 11241 and 11242 and is used to drive the X1 and X2 inputs of the processor 1134. The oscillator 1131 operates at 15.2064 MHz to generate the 5.0688 MHz baud rate clock sent to the USART 1162. The USART 1162 has internal counter circuitry for achieving a particular transmission rate, e.g., 9600 baud or 4800 baud.

An output signal called ΦOUT is developed at pin 37 of the processor 1134. That is the synchronizing signal for all operations in the 8085 1134. The AD bus is coupled to the processor 1134 on pins 12 through 19. Those pins AD0 through AD7 are coupled to a number of devices. One of the devices to which they are coupled is an octal latch 1155, applied to the D input thereof 1155. The lower seven bits of the address bus, are attached by the latch 1155. An address latch enable (ALE) signal at pin 30 is applied to the gate input on the latch 1155.

The octal latch 1155 also has a tri-state output, which provides a means for removing the latch from the output address bus. The GATE input for this latch 155 is coupled to a signal called CPU acknowledge (CPUACK). CPU acknowledge indicates that the processor 8085 1134 is on the address bus. Whenever CPU acknowledge is active, both sets of drivers, the 1155 and the 1175, become active.

The general purpose processor board is provided with a 50-pin device controller interface 11331. The internal address bus is sent directly off the board without being buffered. The data bus above the AD bus is connected to device 1145. This part 1145 latches data from the data bus. The latch output is applied to the AD pins on the processor 1134 only when necessary, since a conflict with the time multiplexed address lines on the processor may occur unless the data transfer is synchronized.

The AD bus on the processor 1134 is also connected to a set of drivers 1135. When the processor 1135 attempts a write operation or an output operation, it turns on the set of drivers 1135 and the data on the AD bus is passed through the drivers 1135 to the data bus. The data bus AD0 through AD7 is also coupled to the top of the board.

Using four devices, 1145, 1135, 1155 and 1175, the processor 1134 is interfaced to the rest of the logic on the GPP circuit board. These devices 1145, 1135, 1155 and 1175 serve to isolate the processor 1134 from the remaining circuitry.

A 28-pin USART 1162 is provided to allow the processor 1134 to communicate through two serial ports, J2 and J4. Port J2 is an RS232 interface. Besides having the essential signals—transmit data, receive data, clear to send, request to send—it also provides modem control signals, such as carrier detect DCD, data set ready DSR, transmit clock both in and out TXC IN, TXC OUT, and receive clock RXC. These signals are used for synchronous operations in the synchronous mode. In that case the modem provides clocks to the USART 1162 and serial data is shifted out of or in synchronism with the clocks.

Connector J4 is a partial RS232 interface to connect the GPP to a keyboard or to a printer. Connector J4 has 10 pins: transmit data, receive data, request to send, clear to send, data set ready, terminal ready, reset line coupled to a controller such as a typewriter controller or a printer controller, and signal ground.

Also provided is a line called PC, connector J4, pin 6, which is a power control. It is coupled to a +12 volt supply through a 680 ohm resistor. It turns on an external controller, whether the typewriter controller, the printer controller or any other like peripheral controllers. That signal turns on the state switch associated with each one of those devices.

A counter 1132 includes three 16-bit counters that can be made to function in many modes. It is used here as a time out device. When the processor 1134 handles communications protocol, for example, there is often a requirement to be able to expect a response from a transmitting unit within a certain time. If that response does not occur, something may not be operating properly. The timer 1132 is used to time out and give an indication that the system is hung in a particular operation.

Only a portion of this timer is used. The output O (pin 10 of 1132) is connected to the processor 1134 and is connected directly to pin 8, restart 6.5. Most of the time when the processor 1134 is processing, restart 6.5 is disabled internally. Otherwise it would be giving a series of continuous interrupts.

Both the USART 1162 and the timer 1132 are connected in parallel to the data bus. That is the method by which the processor 1134 writes into or reads from the internal registers on the USART 1162 and the timer 1132.

On the USART 1162, two signals are provided from pins 15 and 14: transmit ready (TXRDY) and receive ready (RXRDY), respectively. Pins 14 and 15 are connected to each other. USART 1162 is an MOS device, and it is possible to connect pins together to obtain an OR function. They are ORed together and the resultant signal is applied to an inverter 1121 from which the signal is applied to the restart 7.5 input pin 7 on the processor 1134. Restart 6.5 pin 8 is dedicated to the counter 1132; restart 7.5 pin 7 is dedicated to the USART 1162.

RS232 drivers and receivers are referred to generally by reference numeral 1135. The 11351 devices are drivers and the 11352 devices are receivers. They translate the TTL levels from the USART 1162 into RS232 levels. The TTL levels, for example, range from 0 to 5 volts. The RS232 levels are both positive and negative. In this case, the drivers 11351 are tied to plus and minus 12 volts. Consequently the outputs of the drivers 11351 range between plus and minus 12, at one extreme of the other.

Connector J2 has further pins for handling signals used with a range of modem types. The secondary request to send (SRTS) and secondary carrier detect (SCD) signals are of the type employed in a Model 202 type modem which transmits two carriers simultaneously. One carrier is a very low transmission rate carrier used to signal line turn-around. The ring indicator (RI) signal on connector J2, pin 18 is provided for a ring indicator signal. This signal is active every time the line rings. It allows the processor 1134 to establish conditions so that the modem is enabled to answer. Some of these signals, for example clear to send (CTS), are applied through RS232 receivers 11352 to the USART 1162 and also to a driver 1192 which drives data bus line zero (DB0). Similarly secondary carrier detect (SCD) and ring indicator (RI) signals are both applied through RS232 receivers 11101 and into tri-state drivers 11921, driving data bus lines DB1 and DB2. The processor 1134 can interrogate the state of the three RS232 lines CTS pin 9, SCD pin 23 and RI pin 18.

Referring now to the operation of serial communications, USART 1162 converts parallel data from the processor 1134 to a serial bit stream, to pass over the serial communications line. The data is transmitted on transmit data (TXD) pin 3 and data returns over the receiving line (RXD) pin 5. The data is converted from serial to parallel format for the data bus. Several control signals are used to facilate this operation. One pair is request to send (RTS) pin 7 and clear to send (CTS) pin 9. When a transmitter is ready to make a transmission, the processor 1134 raises the request to send (RTS) signal pin 7. If connected to a modem, the modem signals when it is ready on CTS pin 9 and allows the processor 1134 to transmit. The data carrier detect (DCD) signal pin 15 is applied to an RS232 receiver 11352 and is then applied to the USART 1162. That signal is used for the request side. Unless that signal is active, the USART 1162 can not receive data.

A power on clear (POC) signal connector J1 pin 71 comes from the back plane through a receiver 11103 and is applied to an inverter 111031, providing a reset (IRST) signal. This signal initializes all logic on the printed circuit board, including a latch 1161. Application of the IRST signal during a reset operation forces the Q1 output of latch 1161 (pin 7) to go false. The effect is as if a carrier were present. The Q1 output pin 7 is connected to device 11113. If the input is false, the output is also false and the carrier detect on the USART 1162 (pin 16) is active. To use data carrier detect DCD to load the latch 1161, an input instruction must be executed to the latch 1161.

Figure 12:
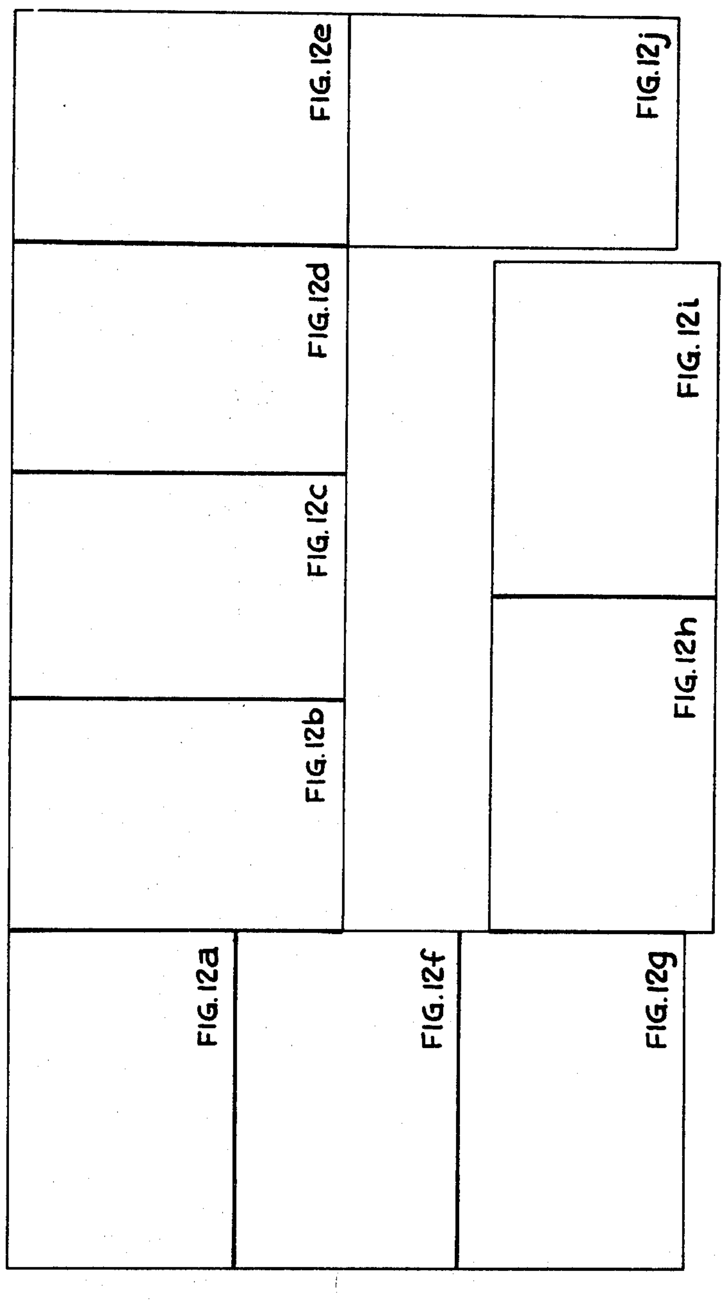
Figure 12A:
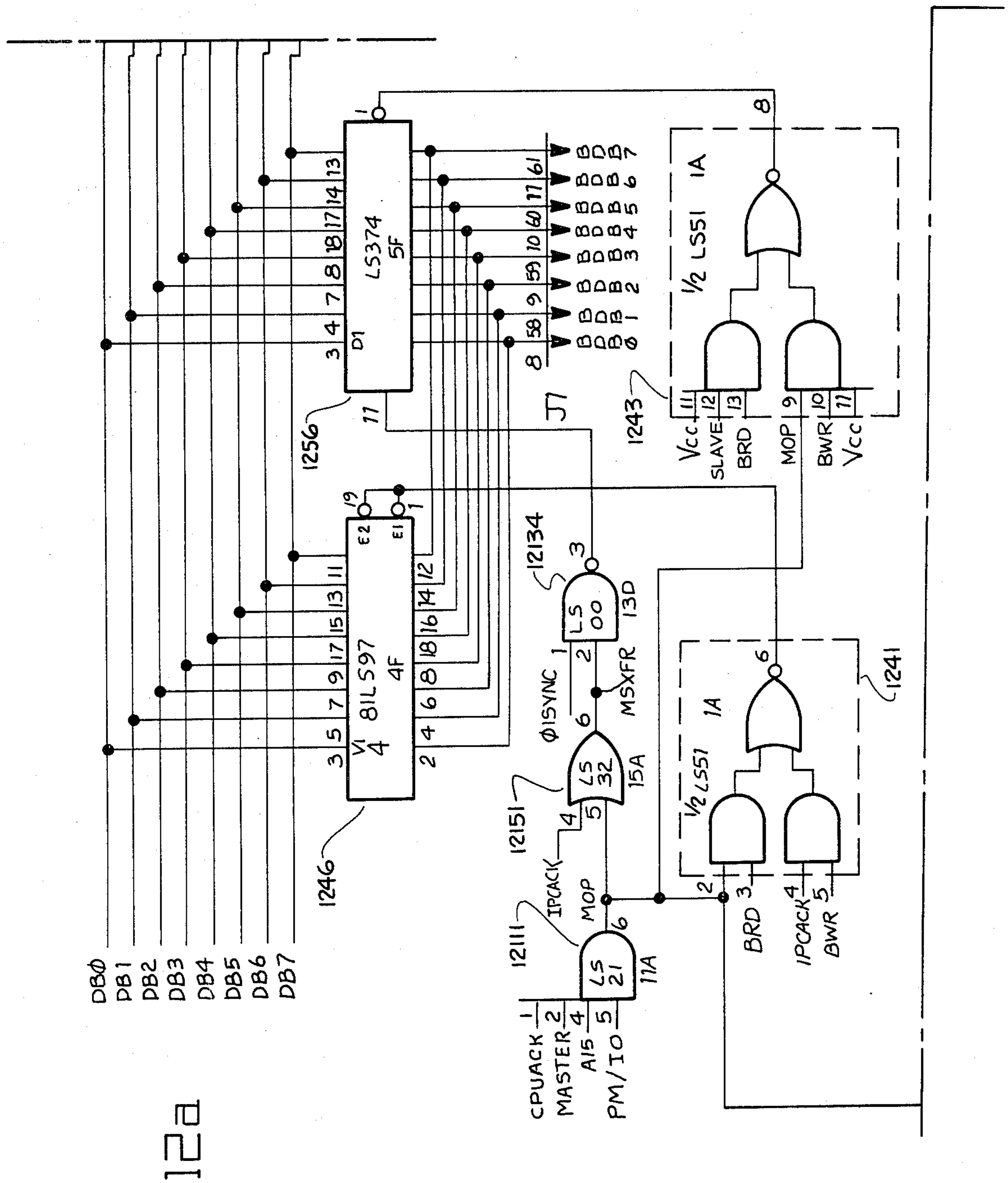
Figure 12B:
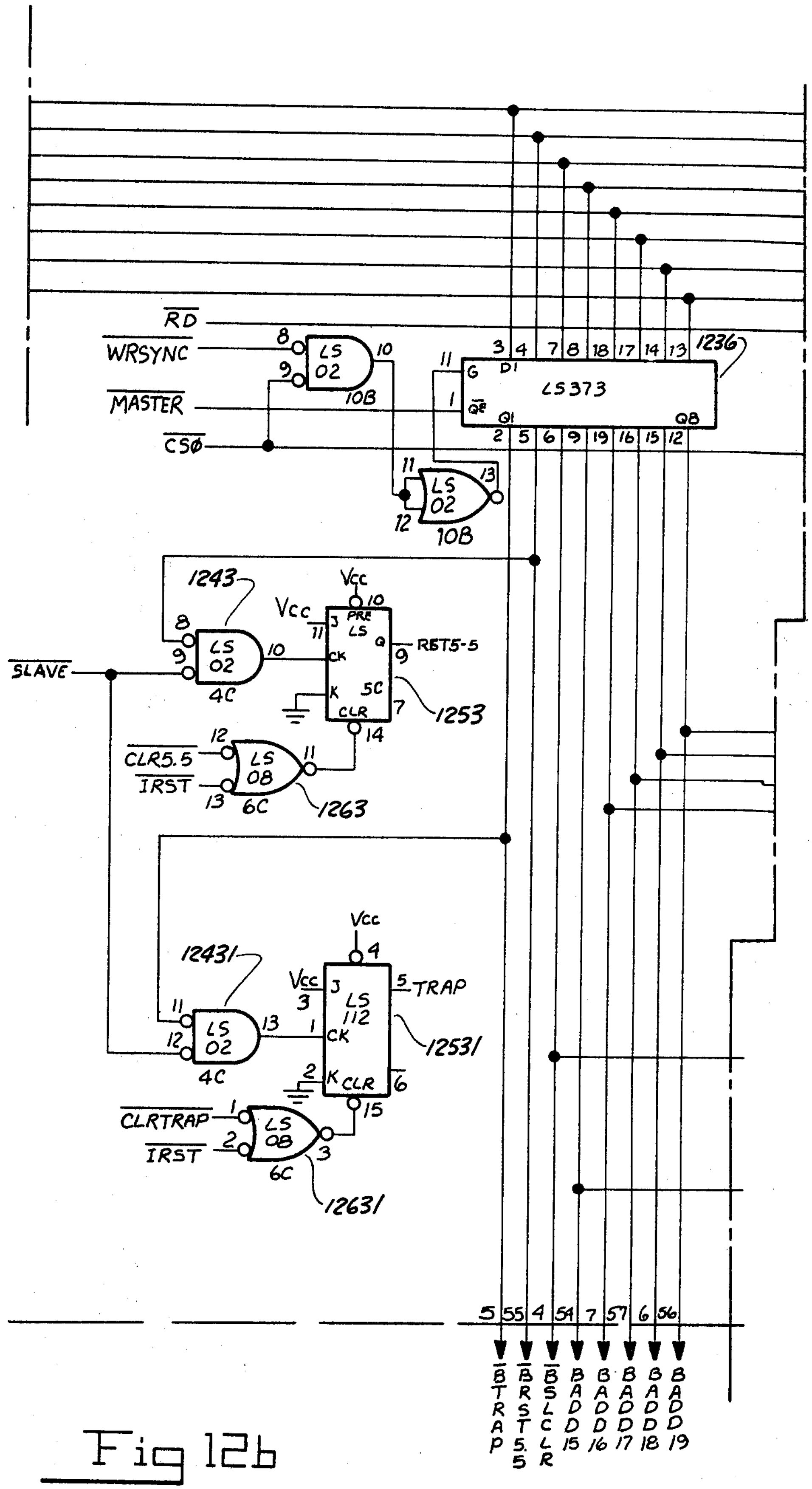
Figure 12C:
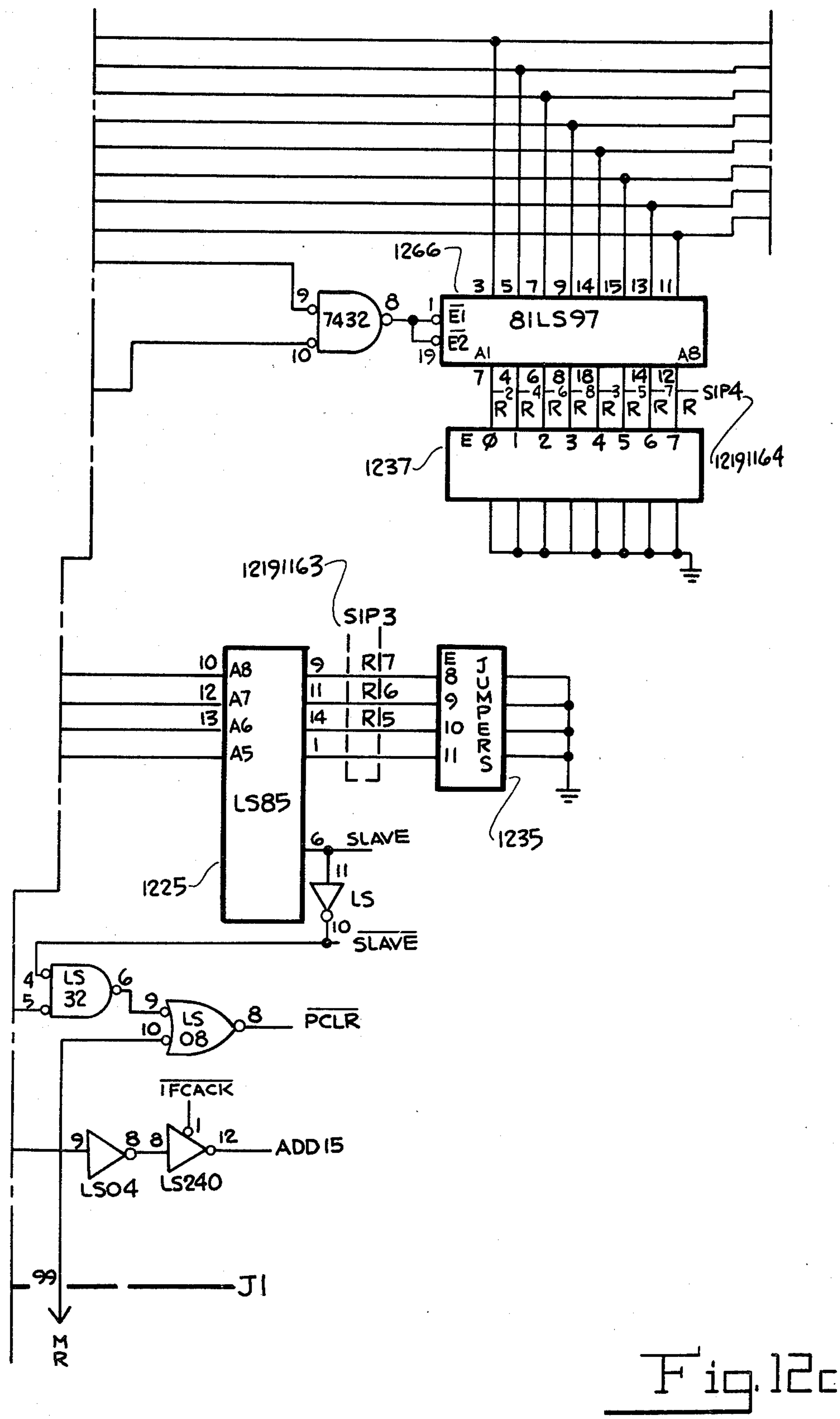
Figure 12D:
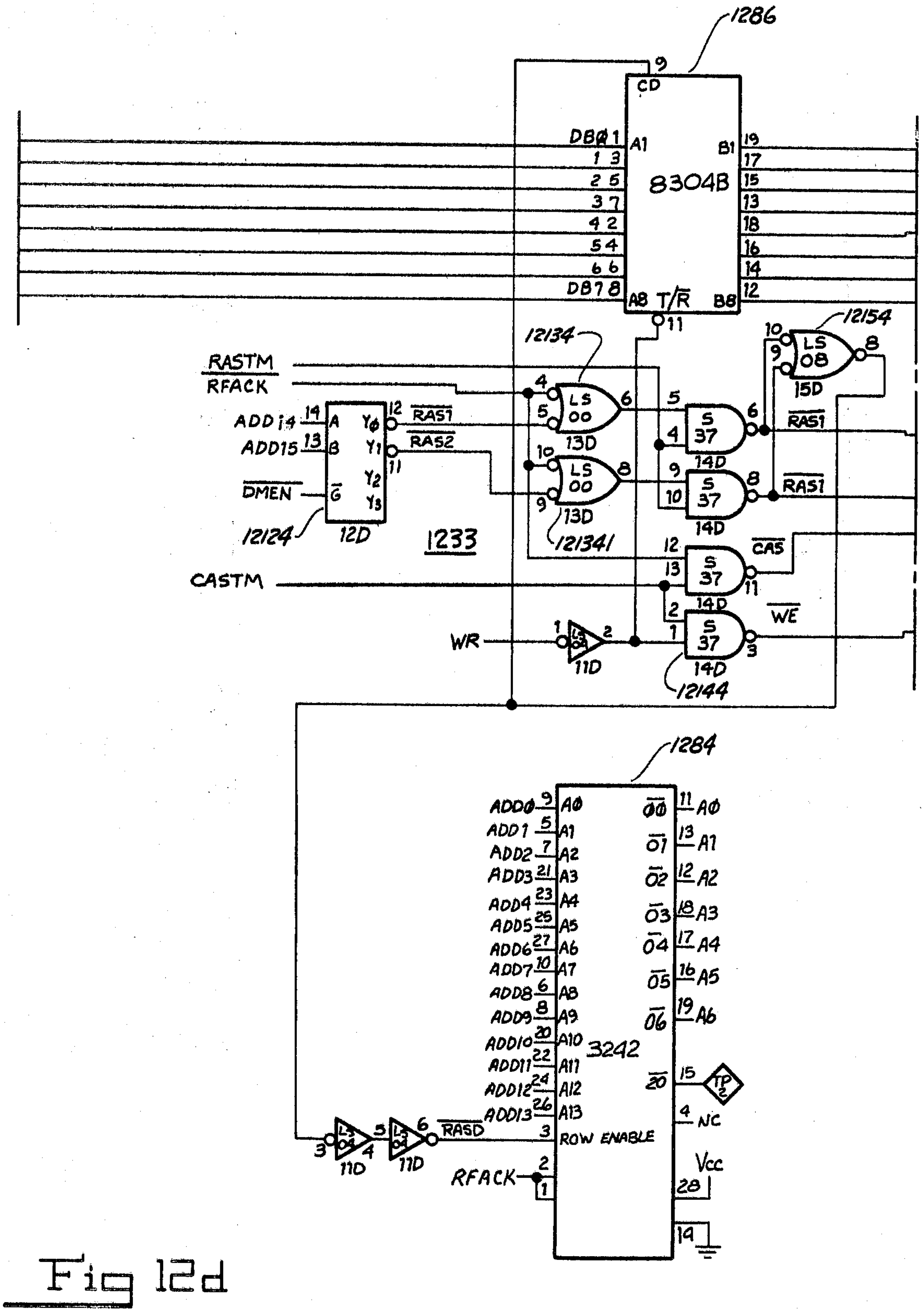
Figure 12E:
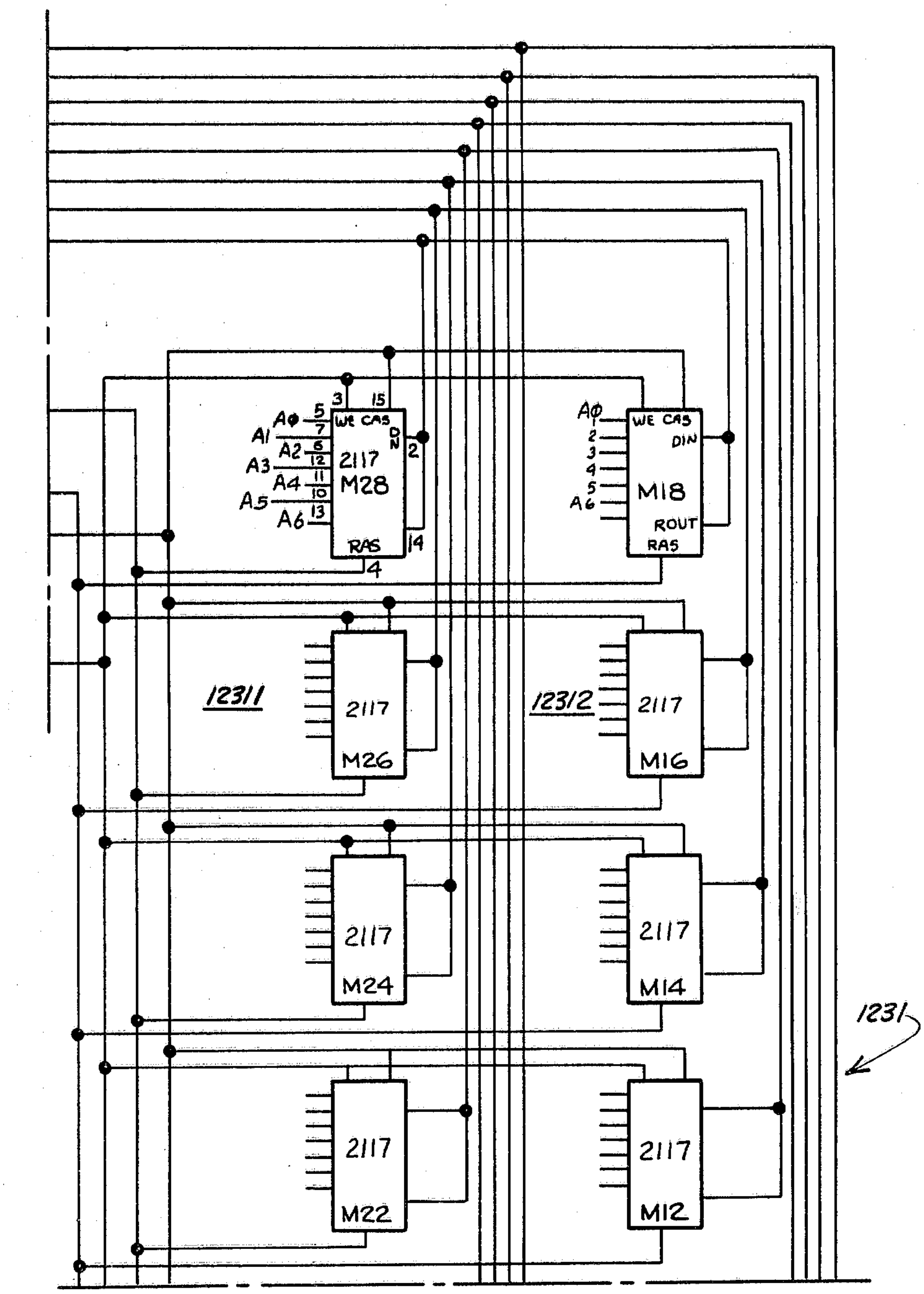
Figure 12F:
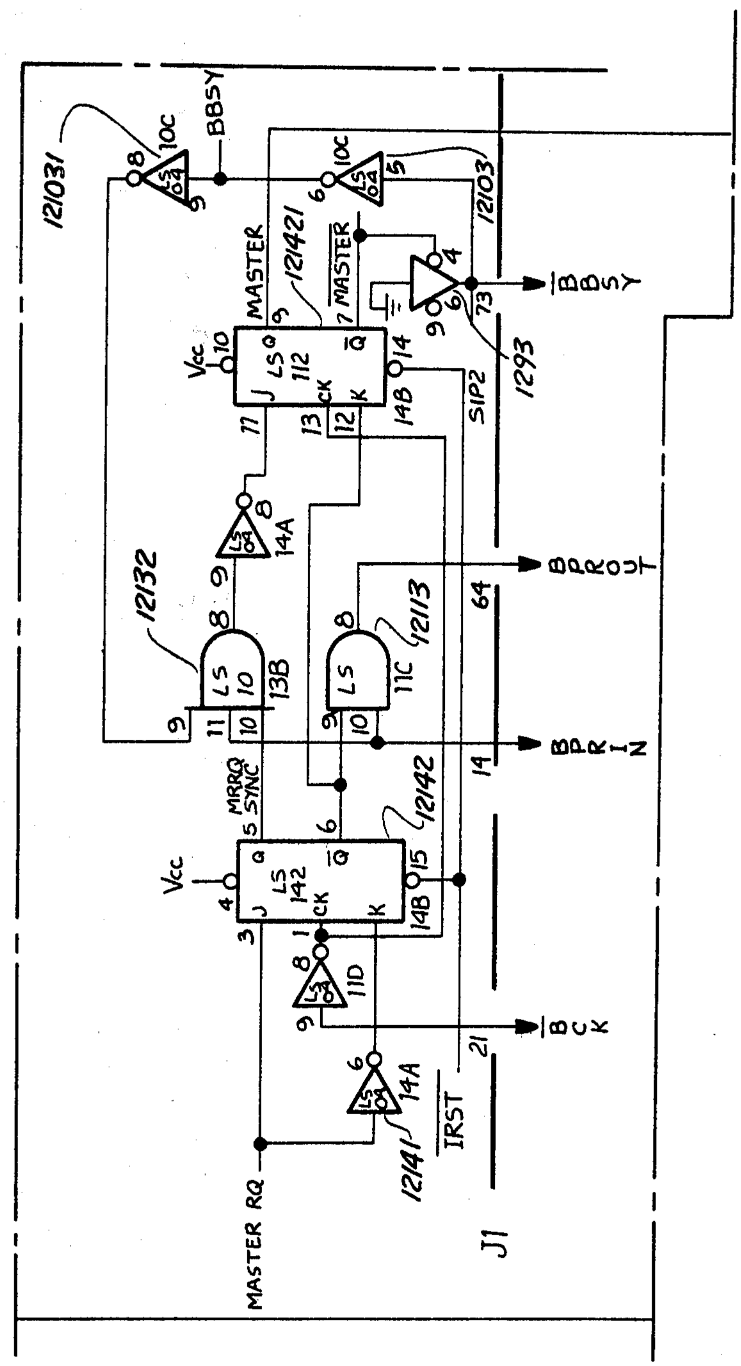
Figure 129:
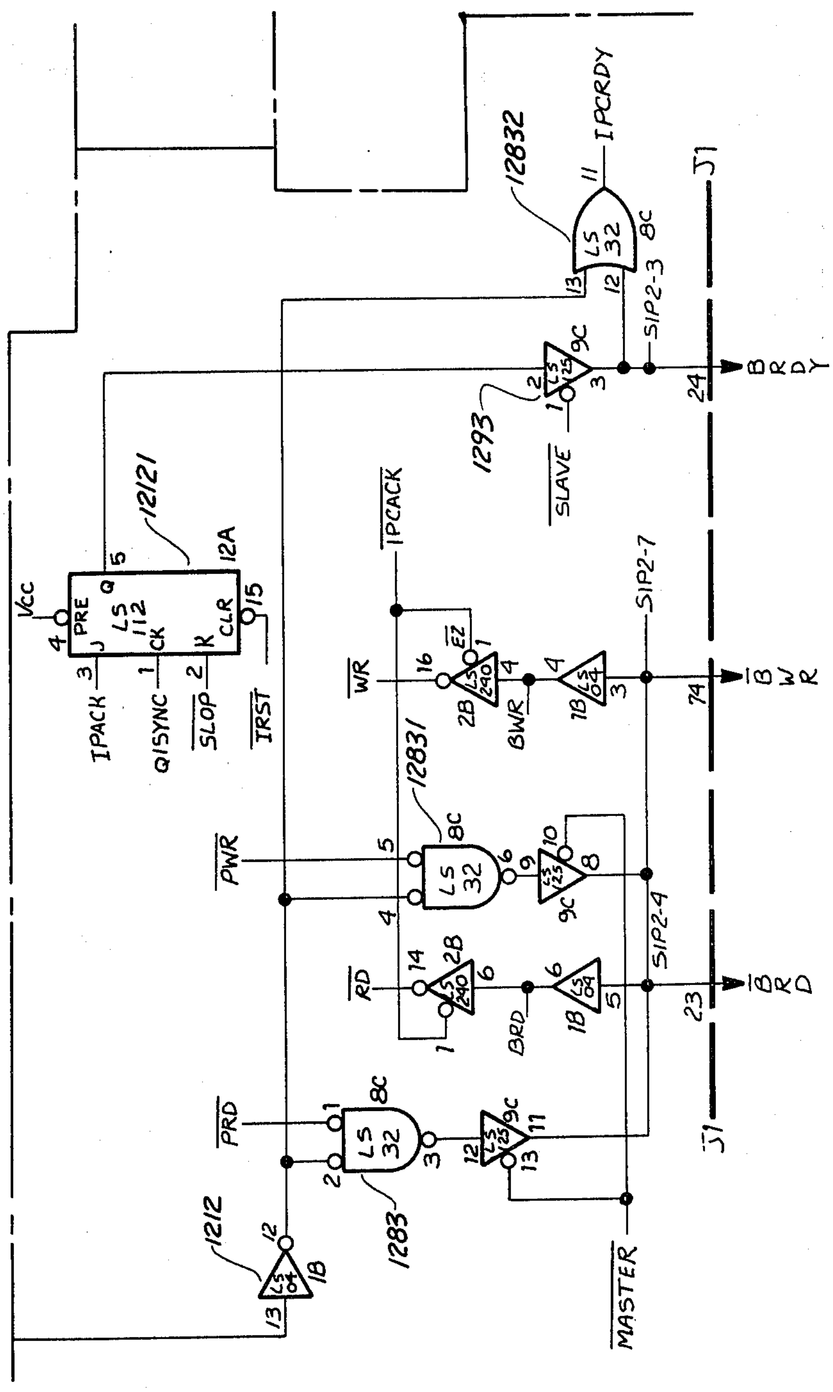
Figure 12H:
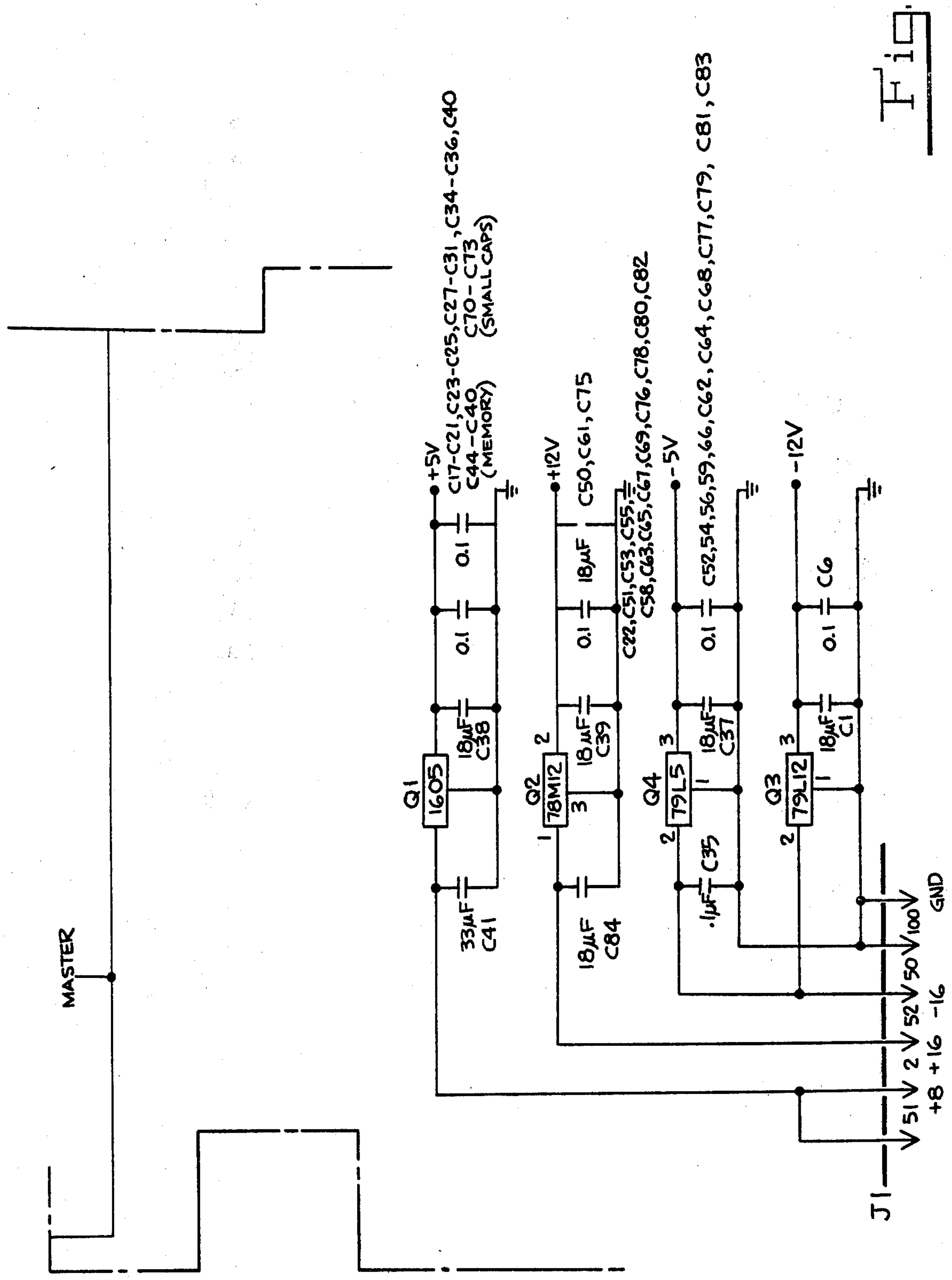
Figure 12I:
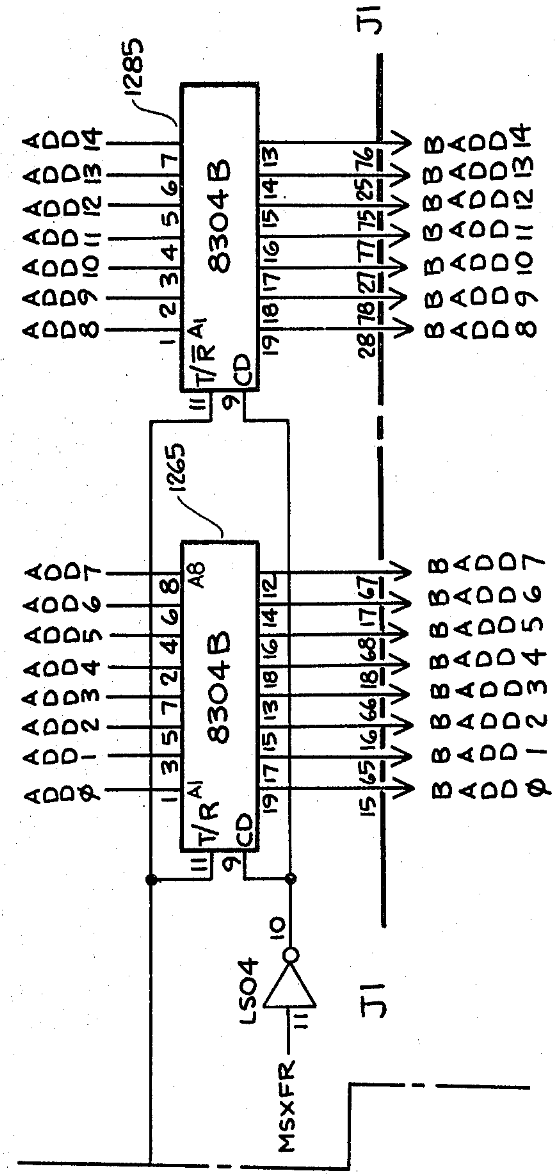

Referring now to FIG. 12, signals DB0 through DB7 represent the internal data bus. These signals are applied to an octal bi-directional transceiver 1286. The transceiver includes a set of drivers 1286 that operate one way or the other to provide isolation for the 16 memory devices generally referred to as reference numeral 1231. These memory devices 1231 are 16K byte dynamic memories, built in a 16K by 1 shape. One bank of them 12311 is used to generate one 16K by 8 segment of the memory and the other bank 12312 is used to generate a second 16K by 8 segment.

The data bus is applied to the transceiver 1286 into the memory 1231 allowing data to pass in either direction through the transceiver 1286.

Referring again to FIG. 11, a 4-bit synchronous counter 11163 and flip flop 11153 are provided. These parts 11163 and 11153 are part of a refresh counter to the circuit board. The input to the refresh counter is coupled to the output of the synchronizer 11133. Signal Φ1SYNC operates at the same rate as signal Φ1OUT on pin 37 of the processor 1134. The Φ1SYNC signal is applied to the counter 11163 and divides it by 16. The ripple carry output from the counter 11163 is applied to the clock input of the flip flop 11153 which divides it by two again. As a result, the signal is divided by 32. Then the output of the flip flop 11153 is applied to flip flop 11123. The designation for the refresh clock signal is RFCK. When the refresh clock signal becomes active, it makes a bid for memory access. That is, the refresh counter 11163 and 11153 counts and periodically—32 times less frequently than the clock rate—generates a signal initiating a request for a refresh cycle. When the memory 1231 becomes available, the refresh cycle occurs. The refresh circuit must be active in order to keep the memory alive.

Referring now to contention resolving circuitry shown generally at reference numeral 1137, the memory 1231 is interleaved. That is, memory cycles are shared by four devices: the device controller, the refresh circuitry, the 8085 microprocessor 1134, and the interprocessor communications which is described in detail hereafter. All of those devices contend for the memory 1231. The configuration is such that utilization of the memory bandwidth is maximized. Since the processor 1134 operates at 2.5 megahertz, Φ1OUT at pin 37, that is also the effective bandwidth of the memory. One memory cycle (one processor clock—Φ1OUT), can be performed every 400 nanoseconds. The effective bandwidth of memory is therefore 1/400 nanoseconds or 2.5 MHz.

If the processor is connected directly to the memory, however, it is inefficiently utilized. Logic circuitry for use in contention resolving 1137 allows other devices to access the memory 1231 when the processor 1134 does not require access to it. It operates in a manner which is transparent to the processor 1134.

A set of flops 111531, 11123 and 111231 is provided. A CPU request flip flop is designated 111531. The refresh request flip flop is designated 11123. The IPC request flip flop is designated 111231.

The outputs of the flip flops 11123, 111531 and 111231 are connected to a priority encoder or priority resolver 11122. The input, D0, D1, D2, D3 or D4, to the priority resolver 11122 with the highest priority is selected. In this case, D0 has the highest priority. If that signal is active, the output Y0, not shown, becomes active. D1 is coupled to the device controller interface, connector J3, energized by a signal called DMA request (DMARQ) at pin 2 of connector J3. It is applied to a receiver 1139 directly into the D1 input of the priority resolver 11122. If that is true and D0 is false, that is, if the device controller connected to J3 requests a memory cycle and the processor 1134 does not, then the device controller gains priority and has access to the memory 1231. If D0 and D1 are false, the refresh circuitry connected to pin 13 (D2) gains access to the memory 1231. If the three inputs (D0, D1 and D2) are false, the IPC D3 gains control of the memory 1231. If none of these four input signals (D0 through D3) is active, signal Y4 becomes active. Signal Y4 performs a memory disable operation.

The output of the priority resolver 11122 is applied to a flip flop 11112. Flip flop 11112 is a device having six D flip flops connected internally, all with a common clock. The signals from the priority resolver 11122 are latched into the flip flop 11112 to determine which device has access to the memory 1231 for the next memory cycle. The memory cycle is defined by the active edge of the Φ1SYNC clock signal. The Φ1SYNC signal is applied to 11112.

In operation, a particular device makes a request through the set of request flip flops 111531, 11123 and 111231. In the case of the device controller connector J3, the controller runs directly into terminal D1, pin 12, as there is a flip flop on the device controller. Then the outputs of those flip flops 111531, 11123 and 111231, as well as the device controller drive the priority resolver 11122. The priority resolver 11122 determines which device has the highest priority of those making the request for the next cycle. That information is latched into the flip flop 11112, which determines which one device gains access to the memory 1231.

The signals from the flip flop 11112 are the memory acknowledge signals. The uppermost signal is called CPU acknowledge (CPUACK) pin 5. The next signal pin 12 of flip flop 11112 is connected to pin 23 connector J3 and is called DMA acknowledge (DMAACK). It has second priority. The third signal is called refresh acknowledge (RFACK) pin 10 and has third priority. The fourth (lowermost) signal is called IPC acknowledge (IPCACK), pin 7, having lowest priority.

The CPUACK signal energizes the address bus drivers 1175, 1155 and 1135 on the output of the processor 1134. When the processor 1134 requests the bus, CPUACK enables these drivers 1175, 1155 and 1135 and the processor 1134 drives the memory 1231, or the I/O device. A signal called address latch enable (ALE) pin 30 of 1134 latches the lower eight bits of the address bus. It also drives the CPU request flip flop 111531. By the time the processor 1134 gains access to the bus (that is, when a CPUACK signal is received by pin 5 of flip flop 1112), the processor 1134 expects to be on the bus. This is all done in synchronism with the Φ1SYNC signal.

The CPU request flip flop 111531 is reset when the CPU Ready (CPURDY) signal tied to the K input pin 12 of flip flop 111531 is active. CPURDY is connected to the ready (RDY) line pin 35 on the processor 1134. The ready line, when deactivated, places the processor 1134 in a wait state. CPURDY is derived from a number of different sources. It is connected to device 1151 used as an OR gate with inverted inputs from three different sources. One of the sources is the ready line pin 1 on connector J3 coupled to the device controller. The second source is a signal called IPC ready (IPCRDY) discussed hereafter. The third signal, I/O ready (IORDY), is coupled to pin 2 of flip flop 11112; it is not associated with priority resolution. If any of the signals IORDY, IPCRDY or RDY from the device controller becomes active, it can place the processor 1134 in the wait state. It is only when all of them are inactive that the CPURDY signal occurs. If the processor 1134 executes an I/O instruction or if an IPC transfer is pending (that is, the processor 1134 is the master and is attempting to communicate with the slave), then IPCRDY is false until the transfer has taken place. That lowers the RDY signal and freezes the processor 1134.

The device controller may be operated to suspend the processor 1134 for some reason. For example, the disk controller may have a very slow I/O device coupled to it. Whenever the processor 1134 tries to execute an input or output instruction to such a device controller, it lowers the ready line at pin 1 of connector J3.

The RDY signal is propagated through device 1151 and is applied to pin 35 of the processor 1134. The CPURDY signal is not generated and the CPURQ signal from flip flop 111531 remains active until such device controller is ready to communicate with the processor 1134.

The DMA device has a higher priority than refresh because the processor card is designed for use with the CRT controller. Since the CRT controller has a very wide bandwidth, the DMA device also requires a wide memory bandwidth. To display many characters on the screen require a great deal of accesses to the processor's memory 1231. CRT controllers require enough bandwidth to preclude their being relegated to a lower priority than refresh. The CRT controller is configured so as to not monopolize its memory bandwidth. The CRT's controller's DMA request line is active for alternate memory cycles to allow other devices access to the memory. Otherwise, refresh would be compromised.

A six-stage shift register 11133, used in conjunction with device 11164 and associated driving logic, forms synchronizing circuitry. It performs the function of synchronizing the processor clock output Φ1OUT at pin 37 of processor 1134 with HF clock (HFCLK), a 15 megahertz clock. One of the output signals from the synchronizer 11133 is Φ1SYNC. That signal is used to drive the rest of the logic on the board. All data transfers are synchronized to Φ1SYNC. The synchronizer 11133 generates waveforms necessary for the refresh logic. The dynamic memory units 1231 require row address select memory (RASTM) and column address select memory (CASTM) signals in order to allow them to multiplex the address input to each memory unit.

Each memory cycle is divided into six parts by the six-stage shift register synchronizer 11133. With respect to synchronizer 11133, the Q1 output is tied to the D2 input; the Q2 output is tied to the D3 input; the Q3 output is tied to the D4 input; and the Q4 output is tied to the D5 input. A signal is thus propagated through the synchronizer 11133. The synchronizer circuitry may be tapped in six different places.

The signal ΦOUT of the processor 1134 is applied to an inverter 11114. The signal is then applied to the clock input pin 13 of device 11164 and it clocks that device 11164. Then the output of device 11164 is applied to the first stage of the synchronizer 11133. That signal is propogated through the six stages of the synchronizer 11133. It is then angled to M3, pin 11 of the synchronizer 11133. The M3 signal is fed back to the clear input pin 14 on device 11164 via devices 11134 and 11162. Accordingly, the signal from the synchronizer 11133 is a square wave. It is fundamentally important that a square wave is generated here. The 8085 microprocessor 1134 does not generate a square wave of this type with the clock out signal. Its wave form may have a variable duty cycle.

Several of the stages 11143 and 111431 of the synchronizer 11133 are ORed together to generate rast time (RASTM) and cast time (CASTM) signals. These are synchronizing signals to strobe into memory 1231 row address and column address. Logic circuitry shown generally as reference numeral 1141 consists of gates and flip flops that generate a signal called memory I/O (M/IO, IO/M) bar, read (RD) and write (WR). These three signals are used as control signals to peripheral devices such as 1132 and 1162 and to peripheral devices coupled to the device controller via connector J3, to the memory 1231, and to any other peripheral device on the GPP board. These three signals are synchronized to Φ1SYNC and with respect to the processor ready (PRD) and processor write (PWR) signals. These signals are used to gate data to or from the data bus during a read or write operation.

The IOPLS signal from pin 6 of device 11164 is used to synchronize the I/O operations with the processor 1134. It is routed through an address decoder 11124 to the USART 1162 and performs a synchronizing operation.

The drivers for memory I/O, read and write, generally referred to as reference numeral 1122, are tri-state drivers. These tri-state drivers 1122 are gated by a CPU acknowledge (CPUACK) signal. Accordingly, these tri-state drivers are on the bus only when the CPU 1134 is on the bus. There are other devices that can access memory 1231. The tri-state control bus is connected to drivers 1122. If the device controller, for example a floppy disk controller coupled to connector J3, attempts to access memory 1231, it does so by utilizing its DMA controller without using the intervention of the processor 1134. It controls the read, write and memory I/O lines, connector J3 to pins 3, 4 and 34, as they are applied to the memory 1231.

Similarly, the IPC interface can also drive these lines. Another processor has access to the read, write, and memory I/O signals so that it can access the memory 1231 as well. The tri-state bus has several different sources. Three 1K pull-up resistors 121810, 121811 and 12189 are connected to the tri-state bus to prevent drift when the bus is not being used.

Devices 1151, 11152 and half of 11124 are provided. The device at 11124 is a 2-to-4 demultiplexer or decoder. These devices, in conjunction with gate 111521, perform a decoding function. They decode I/O addresses for the I/O devices on the board. For example, the output of device 1151 is active only when its four inputs (ADD12, ADD13, ADD14 and ADD15) are active. Those are the four most significant bits of the address. The next two significant bits of the address ADD10 and ADD11 are routed through the 2-to-4 demultiplexer 11124. If the A and B inputs on the demultiplexer 11124 are zeroes, the input to gate 11152 is zero. The output Y0 pin 4 of the demultiplexer 11124 becomes active. Y0 generates a chip select zero (CS0) signal. This circuitry provides a means of selecting output devices coupled thereto via signals CS0 through CS3.

Referring again to FIG. 12, the memory is shown at reference numeral 1231. A refresh controller 1284 is coupled to the memory 1231. It has a dual function: it multiplexes the address lines to the memory 1231, and it performs a refresh to the memory 1231 which is volatile and must be refreshed periodically to prevent loss of data.

The refresh controller 1284 has a counter therein. Every time a refresh request is made via the refresh acknowledge (RFACK) signal, the source for which resides on the other GPP circuit board, the refresh controller 1284 gates the output of its seven bit counter on the address lines. It performs the refresh cycle with that particular address. At the end of the refresh cycle it increments the counter in the refresh controller 1284. Accordingly, if a refresh request signal is input to the refresh controller 1284, its counter is stepped through its range. Accesses to the memory through the range of the counter are performed. The other function that the refresh controller 1284 performs is to multiplex the address lines to accommodate the number of memory input lines. The memory devices 1231 are 16K by 1. In order to address one bit of 16,384 possible bits, 14 lines are required.

The left side of the refresh controller 1284 is tied to the address bus, ADD0 through ADD13. The right side of the refresh controller 1284 has seven output address lines, A0 through A6. When a memory access is initiated, an address is input from the left of the refresh controller 1284. At the beginning of the memory cycle, half of that address is available to the memory 1231. In the middle of the cycle, a row address strobe (RASD) signal pin 3 of the refresh controller 1284 becomes active and changes state. It applies the other half of the address to the memory 1231. Timing is such that the first half of the address is strobed into the refresh controller 1284 by the RASD signal. The other half of the address is then available to be applied to the memory 1231.

A set of decoding logic is shown generally at reference numeral 1233. The CASTM and RASTM signals, derived from the synchronizer 11133 (FIG. 11) are input to this decoding logic 1233. These two synchronism clocks strobe address information into the memory 1231. Address lines ADD14 and ADD15 are applied to a 2-to-4 decoder 12124. When the gate input in the decoder 12124 is active, a memory enable (DMEM) signal on pin 15 of the decoder 12124 is generated. When DMEM is active it indicates that a device is attempting to access the memory 1231. The address corresponding to ADD14 and ADD15 determines whether RAS1 or RAS2 from the decoder 12124 becomes active. Those signals RAS1 and RAS2 are used to drive either one 16K byte bank 12311 of the memory 1231 or the other bank 12312.

The RAS1 and RAS2 signals are combined with a refresh acknowledge (RFACK) signal through a set of OR gates 12134 and 121341. The RAS signals are used to refresh both banks 12311 and 12312 of memory 1231 simultaneously as no data is being transferred.

For a memory transfer, logic shown at reference numeral 1233 determines whether the transfer is to the lower 16K bytes of memory 1231 or the upper 16K bytes of memory 1231. It is gated to develop RAS1 and RAS2 signals. The RAS1 and RAS2 signals are ORed at gate 12154, the output of which is used to perform a multiplexing operation with the refresh controller 1284. The active signals into the memory 1231 are RAS1 and RAS2, column address strobe (CAS), and write enable (WE). Write enable (WE) is derived from the tri-state control bus on the GPP board. These four signals are required to drive the memory. AND gates shown generally at 12144 drive all four of these lines RAS1, RAS2, CAS and WE.

One of the first events that occurs during interprocessor communications is that the processor drives an octal D flip flop or latch register 1236 to decide which slave processor can communicate with the system. A device address must be loaded into the latch register 1236 before the bus is acquired. The latch register 1236 has a tri-state output.

The latch register 1236 is coupled to the data bus DB0 through DB6 and to connector J1. The latch register 1236 is part of the interface to the back plane. To the left of the latch register 1236 is a gate input on pin 11 and an output or input on pin 1. The gate signal is derived from a write sync (WRSYNC) signal and a chip select zero (CS0) signal. WRSYNC becomes active when the processor 1134 executes either an output or a memory write instruction.

To load information into the latch register 1236, an output instruction is executed with an address that corresponds to CS0. A signal from latch register 1236 is labeled bus address 15 (BADD15) through bus address 19 (BADD19). The fifth line is an expansion bit used for selecting either the upper or the lower 32K bytes of memory on a slave processor. Since a slave processor does not have 64K of memory, the last bit may be ignored.

The other three lines are bus trap (BTRAP), bus restart 5.5 (BRST 5.5), and bus slave clear (BSLCLR). These three control lines can be used either to reset the slave processor (BSLCLR) or to generate a trap (BTRAP) to a restart 5.5 (BRST 5.5) on the slave processor.

A slave address decoder (comparator) 1225 compares the input lines on the left A0 through A3 with the lines on the right B0 through B3. When these lines are identical, an A=B (SLAVE) signal on pin 6 of the decoder 1225 is generated.

The B signal lines pins 1, 14, 11 and 9 are pulled up to the set resistor pack 12191163 connected to jumpers 1235. The jumpers 1235 provide four bits to configure the circuit board to add a particular slave device address when connected to the system.

The input lines on the A side of the decoder 1225 are connected to bus address 16 through 19 (BADD16 through BADD19) signals. They are connected to connector J1.

A tri-state driver 1266 gates the inputs DB0 through DB7 via a resistor pack 12191164 which serves as pull up resistors, to jumper 1237. Device 1237 is a cluster of eight connectors. This set of jumpers 1237 is used for configuration information on the processor 1134. There are times when the software must detect the hardware configuration. If a special configuration is established in this system, this is one way for the software to be aware of it.

Jumpers 1235 are the slave address jumpers, consisting of four jumpers (connectors), providing a possibility of 16 different addresses (processors) coupled to the system simultaneously. This set of jumpers 1237 is accessed through driver 1266. When the processor executes an input instruction to chip select zero address, driver 1266 is activated and information contained in the jumper configuration 1237 is transferred to the data bus DB0 through DB7. If the processor performs an output to address F0, it loads the latch register 1236; if it performs an input to address F0 it reads the configuration of jumpers 1237 by driver 1266.

A pair of flip flops at locations 1253 and 12531 is provided to generate the restart 5.5 and trap signals to the processor 1134. The input to one flip flop 1253 is coupled to the bus restart 5.5 line and is applied through an AND gate 1243. This input signal is ANDed with the SLAVE signal, which drives the clock input on pin 13 of the flip flop 1253. If a device has been established as a slave and an active edge is present on the bus restart 5.5 pin 55 connector J1, then that condition is latched into the flip flop 1253, and is applied to the restart 5.5 line on the 8085 microprocessor 1134. That indicates to the processor 1134 that another unit is attempting to communicate. A similar circuit 12531 is used for the trap interrupt. It is driven directly by the bus trap signal pin 5, connector J1. It also uses the SLAVE signal via AND gate 12431. It derives a signal called TRAP that is applied to the 8085 processor 1134.

Two conditions can clear the interrupt. One is an I reset (IRST) signal applied to flip flop 1253 via OR gate 1263, and to flip flop 12531 via OR gate 12631. If that becomes active, both flip flops 1253 and 12531 are reset. When the processor 1134 is initialized, the flip flops 1253 and 12531 must not be in a set state. This is due to the fact that when the processor 1134 begins to execute a program, if a trap condition exists, the processor 1134 immediately accesses the interrupt vector. The other two signals that clear either of the flip flops 1253 and 12531 are CLEAR 5.5 1253 and CLEAR TRAP 12531. They are coupled to the outputs of a pair of gates 1173 and 11731 that are driven by data bus 6 (DB6), and data bus 7 (DB7), and a write to chip select one (CS1), 1143 and 1133. If an output instruction is sent to the register corresponding to chip select one via devices 1143 and 1133 and if the appropriate bits were set on the data bus, either of the two flip flops 1253 and 12531 is cleared.

In operation, an external device establishes this processor 1134 as a slave, and then executes a bus trap by activating the bus trap line pin 5 in connector J1. The external device then deactivates it. That sets trap flip flop 12531, the output of which is tied to the trap input of the processor 1134. The processor 1134 executes an interrupt vector and then a service routine program. In the service routine, the processor 1134 generates an output instruction, clear trap (CLRTRAP), which is applied to the clear input, pin 15 of trap flip flop 12531 via device 12631. That signal (CLRTRAP) resets the trap flip flop 12531.

The processor 1134 becomes the bus master as the first step in interprocessor communications. This is accomplished by setting the SOD output pin 4 on the processor 1134. The SOD output is a signal called master request (MASTER RQ). The processor 1134 makes a bid for the bus by generating this signal. When the bus is acquired, a master (MASTER) signal is generated and is applied to the processor 1134 over the SID input line pin 5 of the processor 1134. This indicates that the processor 1134 has acquired the bus.

The master request (MASTER RQ) signal is applied to the J input of flip flop 12142. An inverted MASTER RQ signal is applied to the flip flop 12142 via an inverter 12141. Accordingly, the master request signal is latched into the flip flop 12142. The flip flop 12142 is clocked by a signal called bus clock (BCK) connected to pin 21 of connector J1. The bus clock signal is derived on the disk controller, and is applied to the back plane so all of the devices in the system attempting to access the bus are synchronized with that clock. The Q output of the flip flop 12142 is called master request synchronize (MRRQ SYNC). It is applied to an AND gate 12132. This is accomplished with a signal called bus priority in (BPRIN) on the back plane, connector J1.

One signal does not run the length of the back plane connector J1. The bus priority in (BPRIN) signal is daisy chained and passed from one pin of the GPP to another GPP connected to the back plane. This is a priority chain. The priority signal is applied from bus priority in (BPRIN) pin 14 of connector J1 and is output on bus priority out (BPROUT) pin 64 of connector J1. The source for the priority signal is the disk controller. Consequently, the disk controller must be at one end of the back plane positioned for highest priority. It need not be located in the first board slot, but it must be the first circuit board in a series of boards.

The bus priority in (BPRIN) signal is ANDed in gate 12132 with a master request sync (MRRQ SYNC) signal and a bus busy (BBSY) signal. Bus busy (BBSY) is applied from edge connector J1 pin 73, through a pair of inverters 12103 and 121031. When three conditions are met—bus priority, the bus is not busy, and master request, then the output of gate 12132 becomes active and the signal drives the J input of flip flop 121421.

The clock input on flip flop 121421 is the same as the clock input for the first flip flop 12142. They are both synchronized with respect to bus clock (BCK). The request is transferred to the second flip flop 121421 only when the bus is not busy and when the GPP has priority. If no bus request is pending, the bus priority in (BPRIN) signal is propogated as a bus priority out (BPROUT) signal via device 12113. If this GPP 1134 is not presently attempting to become a master, the bus priority in (BPRIN) signal is applied to the next GPP connected to the back plane. If it is trying to become a master, the bus priority in (BPRIN) signal is not applied to device 12113. This priority scheme is used to prevent contention for bus acquisition.

It is remotely possible that in some particular bus clock period two processors will attempt to access the bus simultaneously. The aforementioned priority scheme prevents them from doing that. The boards that are closer to the disk controller are higher on the priority chain. The one closest to the disk controller is the one that gains access to the bus.

The second flip flop 121421 is the master flip flop. When it is set, it indicates that the processor 1134 is now a master. The master (MASTER) signal is applied to the SID input of processor 1134. The processor 1134 now knows that it has been granted access to the bus. The output signal of the master flip flop 121421 is used to activate a tri-state driver 1293 which activates the bus busy (BBSY) line. Once this processor 1134 becomes a master, it activates the bus busy (BBSY) line and no other processor in the system can have access to the bus. The master device does not relinquish control of the bus until the master request (MRRQ) line becomes inactive (that is, the SOD output from pin 4 of the processor 1134 is deactivated). In this way, one and only one processor captures the bus and does not relinquish it until it has completed its series of transfers.

The master (MASTER) signal is applied to the transmit receive input of transceivers 1265 and 1285. These transceivers 1265 and 1285 either drive or receive information between the internal address bus (ADD) on the processor 1134 and the address bus (BADD) on the back plane. In the case where this processor 1134 has become a master, the master (MASTER) signal becomes active and the transceivers 1265 and 1285 drive the address bus on the back plane. The address on the address bus (ADD) is passed to the back plane (BADD).

Devices 1246 and 1256 are the interface between the internal data bus (DB) on the general purpose processor 1134 and the data bus on the back plane (BDB). In the case where the processor 1134 has become a master and reads data from a slave, the data is actually transferred across the data bus (BDB) on the back plane and is applied through device 1246, then on to the data bus (DB), and then into the processor 1134. In the case where the processor 1134 has become a master and writes data into the slave's memory, the information is generated by the processor 1134 along the internal data bus (DB) and is latched into device (latch) 1256. This information remains on the data bus (BDB) until it can be transferred to the slave's memory. This transfer may require some time because the slave's memory may be occupied with other operations at any given time. The aforementioned procedure is used to transfer data to and from the back plane.

A gate 12111 is provided to AND several signals: CPUACK, MASTER, address bus 15 (A15), and a processor memory I/O (PM/IO) bar. If the processor is performing a memory cycle, the PM/IO bar signal is active; if the processor is the master, MASTER is true; if the processor is in the process of performing a transfer, CPUACK is true; and if the processor is in the process of performing a transfer with the most significant address bit set (that is, to access address 8,000 hex or above), A15 is true. If all four of the above conditions prevail, a signal called master operation (MOP) is active. The MOP signal is inverted at inverter 1212, and gated with processor read (PRD) at gate 1283, or processor write (PWR) at gate 12831 to derive the bus read (BRD) and bus write (BWR) signals pin 23 and pin 74 on connector J1 respectively. If the processor 1134 is performing a read operation from slave memory, the bus read (BRD) signal becomes active; if the processor 1134 is performing a write operation to slave memory, the bus write (BWR) signal becomes active.

The MOP signal is ORed with IPCACK via OR gate 12151 and is then ANDed with Φ1SYNC at AND gate 12134 to provide a strobe to the gate input on device 1256. These are two reasons that this device 1256 is used. If the GPP 1134 is a master and a write operation to the slave memory is to be performed, the data is transferred into latch 1256 so that it can be transferred to the slave's memory. The other reason that device 1256 is used is if another master in the system selects this GPP 1134 as the slave and the other master is performing a read from this GPP's 1134 memory 1231.

The master GPP generates an IPC request, a bus read (BRD) or a bus write (BWR) signal. Referring again to FIG. 11, these signals are ORed at device 1133, so that if either one is active and this GPP 1134 is selected as a slave, an IPC request is generated in circuitry at reference numeral 1137. If the GPP 1134 is selected as a slave, and a bus read (BRD) or a bus write (BWR) signal is generated, a signal called slave operation (SLOP) 1173 is developed. The SLOP signal clocks a flip flop 111231. This generates an IPC request. An IPC acknowledge (IPACK) signal becomes active in the contention resolver when none of the other high-priority devices is attempting to access memory. Then the IPC acknowledge (IPCACK) signal is applied to OR gate 12151.

Device (driver) 1246 is activated via gating circuitry shown at reference numeral 1241. There are two reasons for activating the driver 1246. If this GPP 1134 is a master and is attempting to perform a read operation from the slave's memory (MOP and BRD are active), the signal on pin 6 of circuit 1241 that activates the set of drivers 1246 is generated. The other condition is if this GPP 1134 is a slave and another master is attempting to write into this GPP's 1134 memory 1231 (IPCACK and BWR are active). In that case, the set of drivers 1246 is activated and data from the master is applied via BDB 1246 and DB. The data then enters the memory 1231.

Data is transferred from the latch 1256 onto the data bus (BDB) in the following manner. The latch 1256 has a set of internal tri-state drivers. To activate these tri-state drivers, the output enable (OE) line on pin 1 of latch 1256 must be activated. That is activated when logic involving circuitry at reference numeral 1243 is satisfied. This circuitry 1243 is part of the same device as is circuit 1241. There are two conditions under which data is output from the latch 1256. If the GPP 1134 is a master and a master operation is being performed (MOP is active), a bus write (BWR) signal is generated. If the bus write (BWR) signal is active and the MOP signal is active, then the contents of latch 1256 is gated onto the bus. The other condition is if the GPP 1134 is a slave and the master processor is trying to read the memory 1231 from this GPP 1134. The slave (SLAVE) signal is active, and the bus read (BRD) signal from the back plane also becomes active. That also gates information from the latch 1256 onto the bus.

Hand-shaking is provided to indicate to the master processor that the slave has completed the transfer. When the master is ready to perform a transfer, it activates the MOP line coupled to device 1212. The slave processor may not be able to respond immediately. It may be engaged in other operations. It is therefore necessary to place the processor in a wait state for the slave to transfer data. The MOP signal is ORed in device 12832 with a bus ready (BRDY) signal at pin 24 of connector J1. The output of OR gate 12832 is a signal called IPC ready (IPCRDY). When IPC ready (IPCRDY) becomes false, it lowers the processor's ready line (CPURDY). That places the processor 1134 in the wait state in which it remains until the bus ready (BRDY) signal returns from the slave. Bus ready (BRDY) then goes true, activating IPC ready (IPCRDY). The ready input (CPURDY) on the processor 1134 goes true to allow the processor 1134 to begin processing again.

For any particular transfer, the master establishes the proper mode by activating MOP. It accesses the upper 8,000 hex bytes of memory, sets bus ready (BRD) or bus write (BWR), depending upon whether a read or a write operation is being performed, and then enters the wait state and waits for the bus ready (BRDY) signal to return from the slave, indicating that the transfer is complete. When the bus ready (BRDY) signal returns, the processor 1134 begins processing again.

A flip flop 12121 is used to drive the bus ready (BRDY) line when the GPP 1134 is a slave. A driver 1293 on the bus ready (BRDY) line is activated by the slave (SLAVE) signal. The input of that driver 1293 is attached to the flip flop 12121. The flip flop 12121 is set when IPC acknowledge (IPCACK) is applied to pin 3 of flip flop 12121.

If another master is on the system and this processor 1134 is a slave, the master makes an IPC request, and when the IPC has priority, it generates an IPC acknowledge (IPCACK) signal, which sets flip flop 12121 and generates the bus ready (BRDY) signal at pin 24 of connector J1. This signal propogates to the master and releases the master so it can process. The K input pin 2 on flip flop 12121 is coupled to the SLOP signal. The bus ready (BRDY) signal is normally true; when the master begins an operation, it activates bus read (BRD) or bus write (BWR). That generates the SLOP signal, which causes the bus ready (BRDY) signal to go false. It stays false until the IPC acknowledge (IPCACK) signal returns (that is, until the transfer actually occurs).

Referring to FIG. 11, the power on clear (PWRONCLR) line into the processor 1134 is attached to a set of jumpers. When the GPP 1134 is a disk processor, the source of the power on signal is the disk controller, tied through the device controller interface. When the GPP 1134 is a non-disk processor, this jumper is established such that the source for the signal is the power on clear (PWRONCLR) signal on the back plane. This line then holds the processor 1134 in a reset condition until the initialization sequence is accomplished.

DISK CONTROLLER

Figure 13:
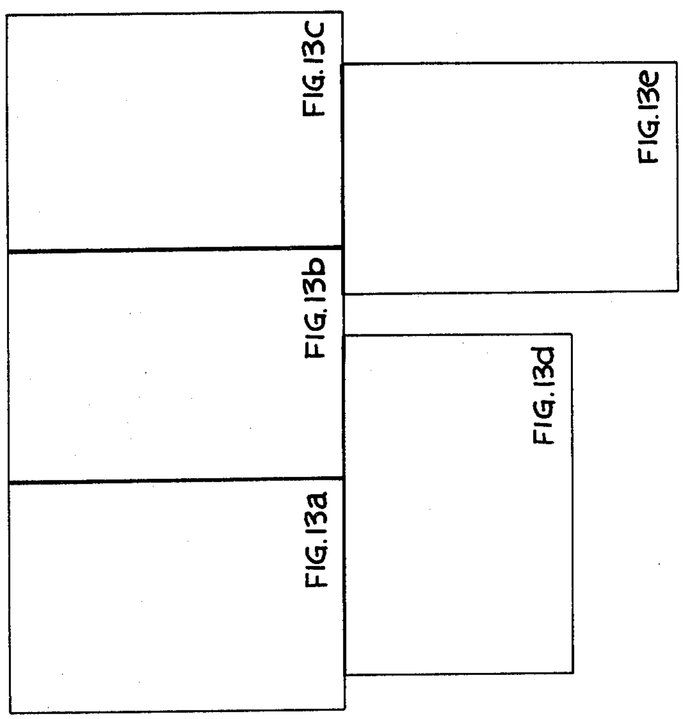
FIGS. 13, 14, 15, 16, and 17, which are interconnection diagrams of FIGS. 13*a* through 13*e*, 14*a* through 14*h* and 17*a* through 17*h* and block diagrams which when taken together are a schematic circuit diagram of a disk controller and a block diagram of a floppy disk DMA controller.
Figure 13A:
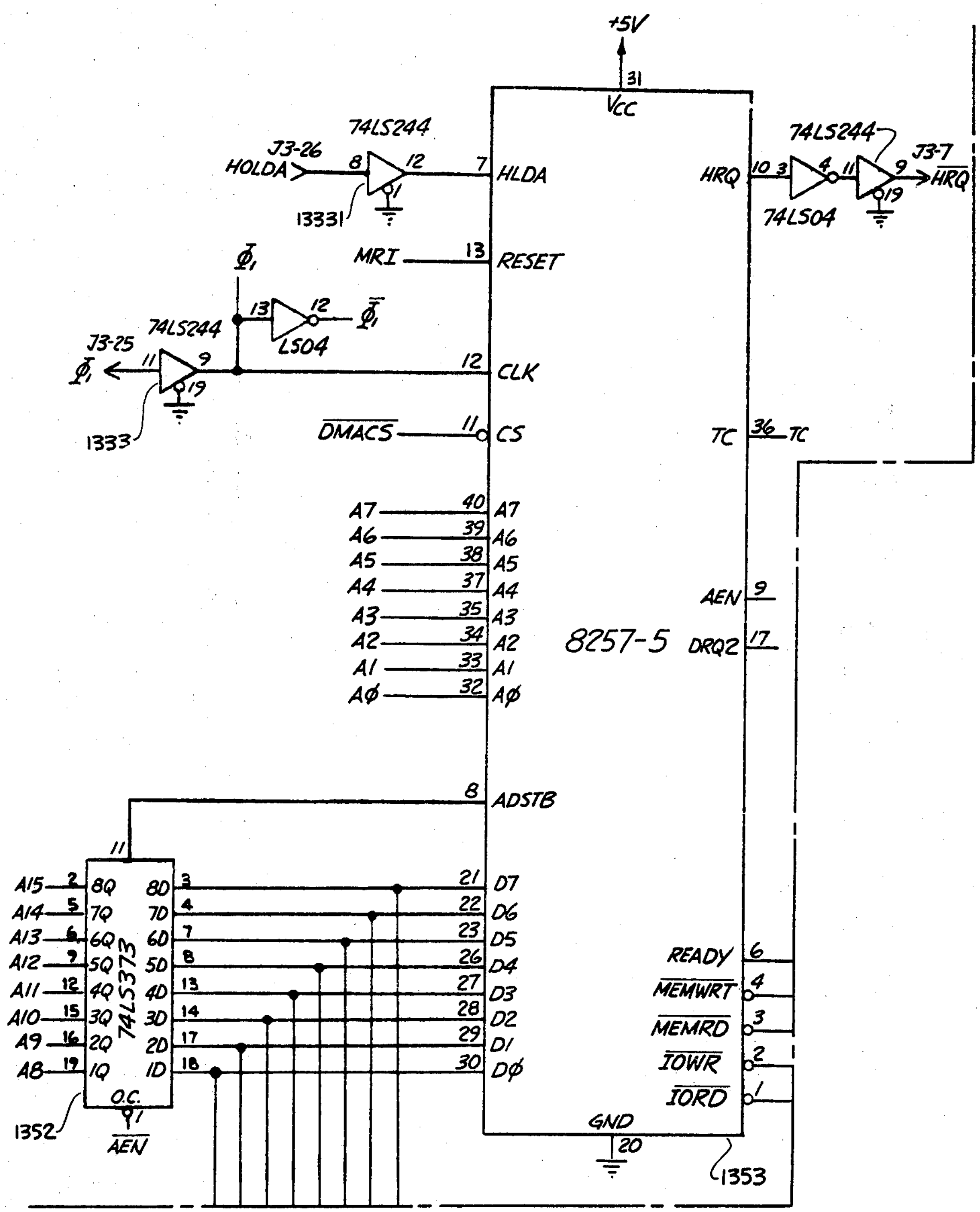
Figure 13B:
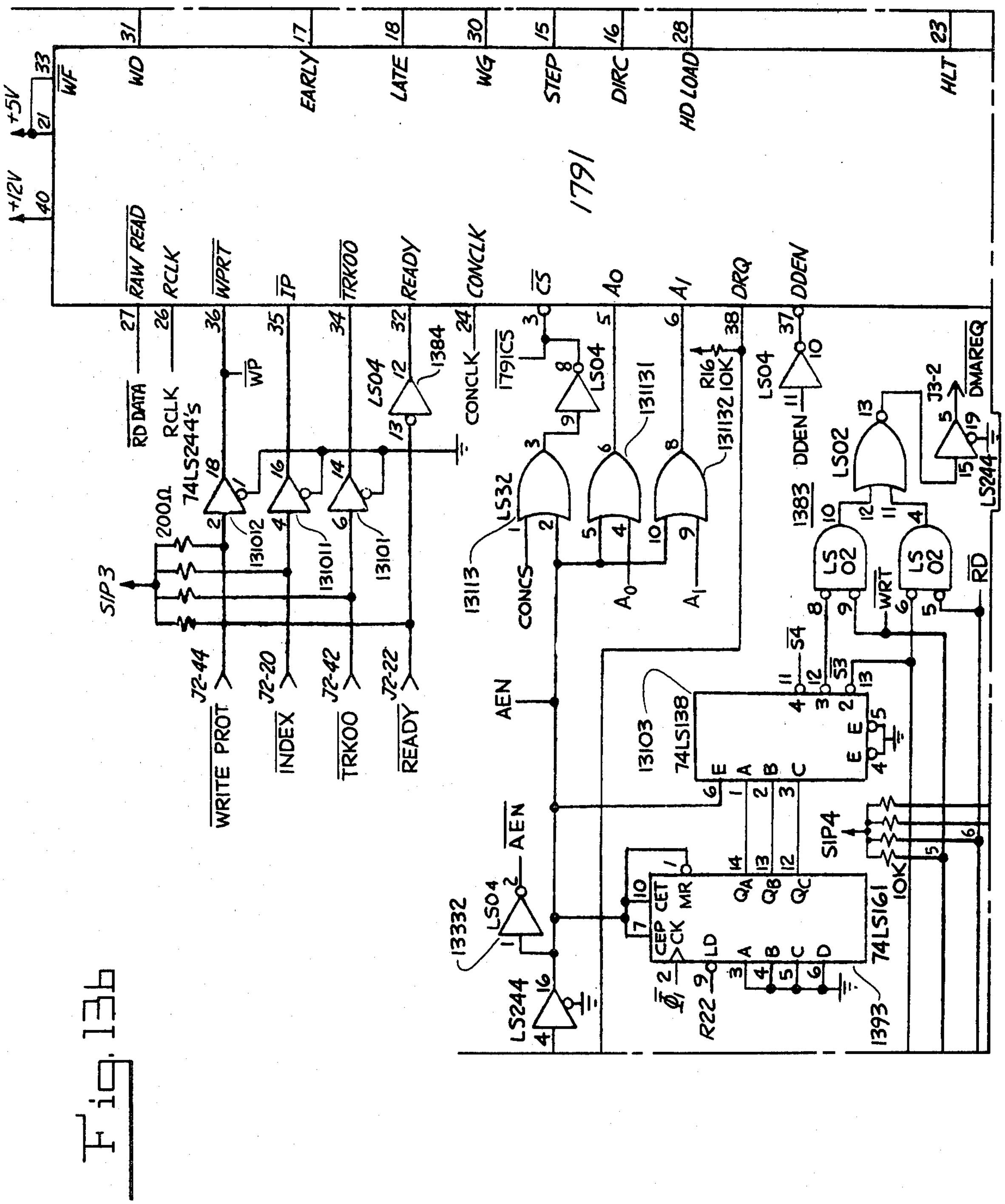
Figure 13C:
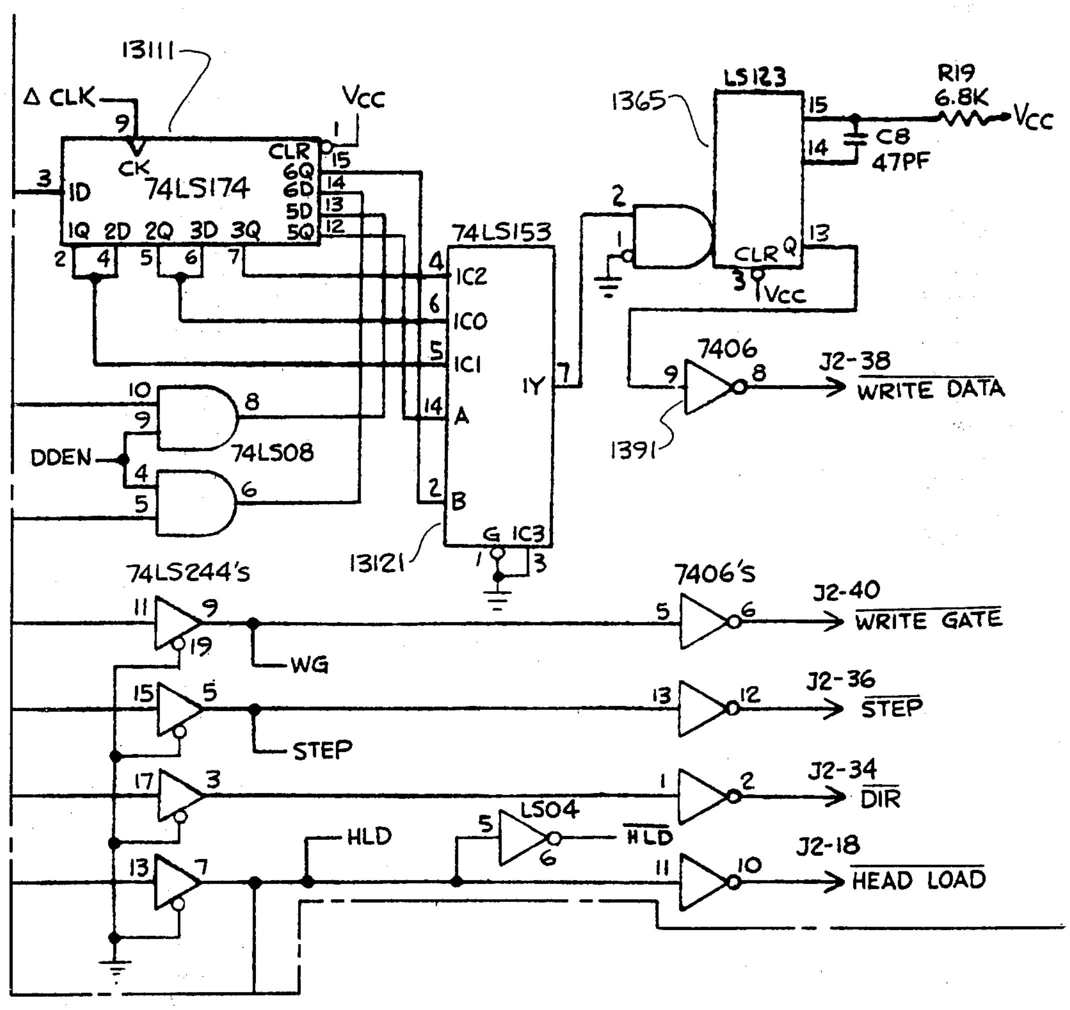
Figure 13D:
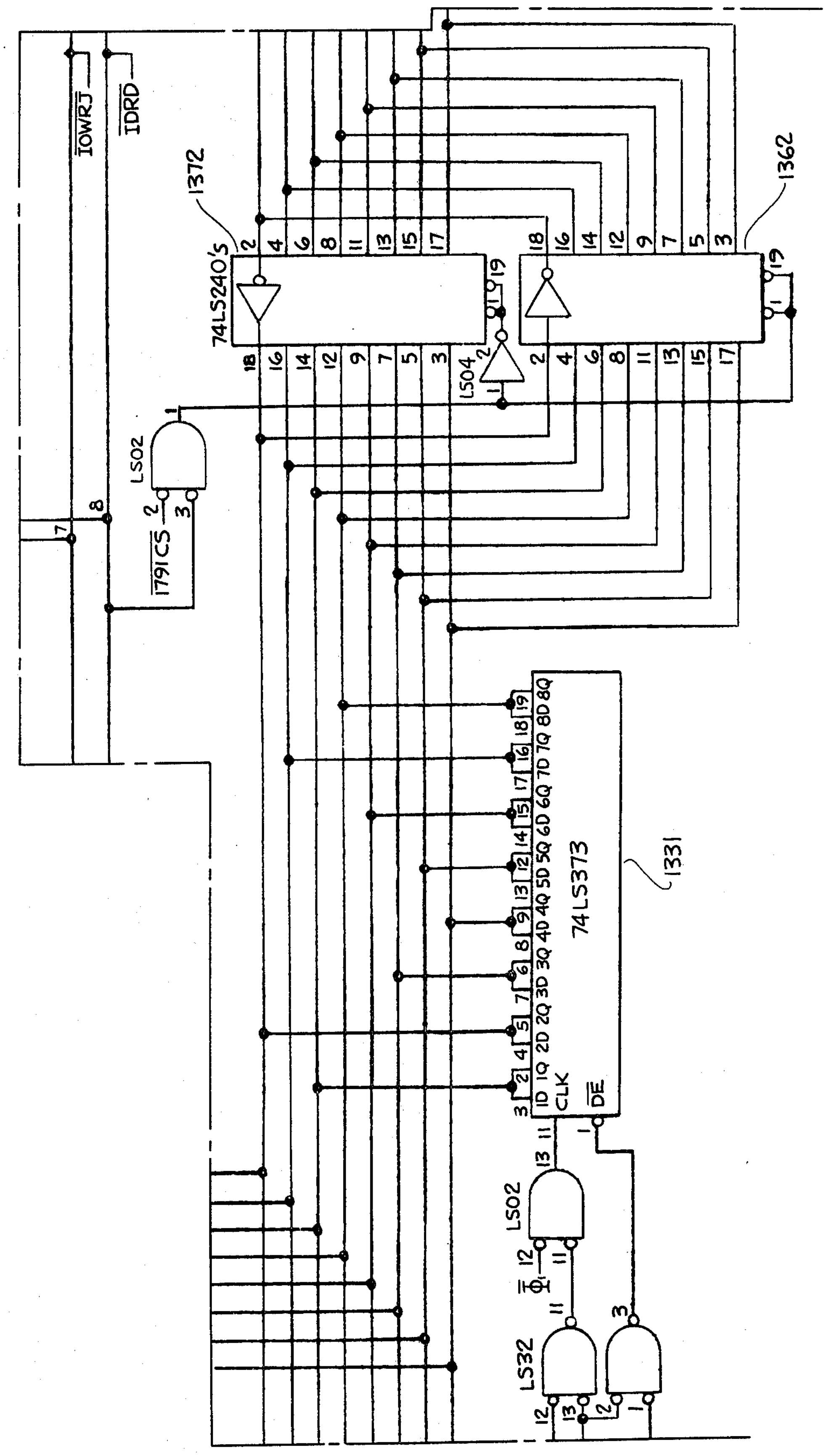
Figure 13E:
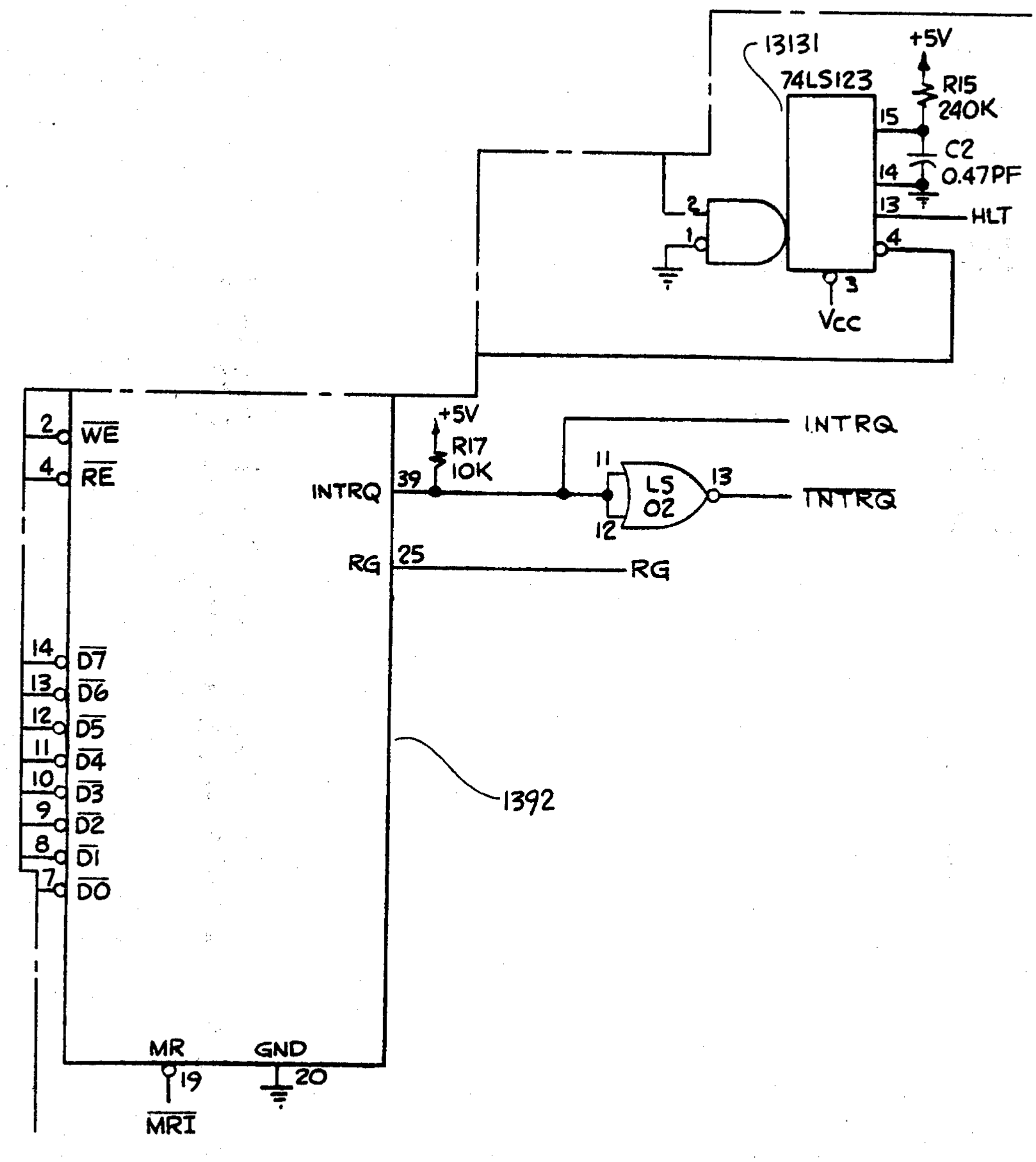
Figure 14:
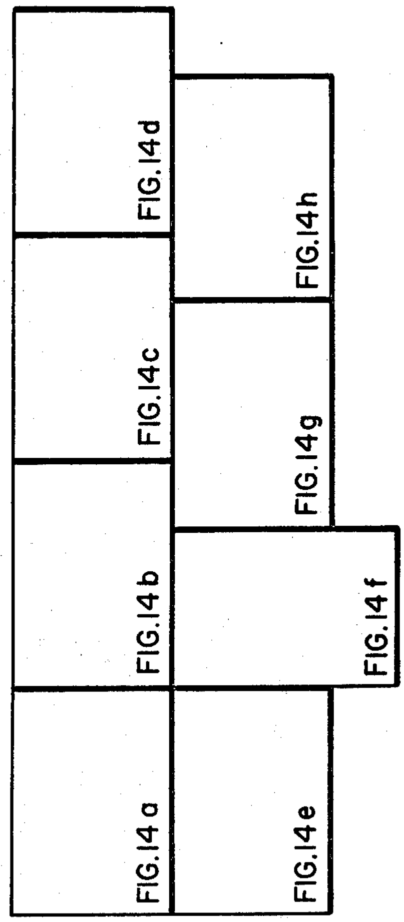
Figure 14A:
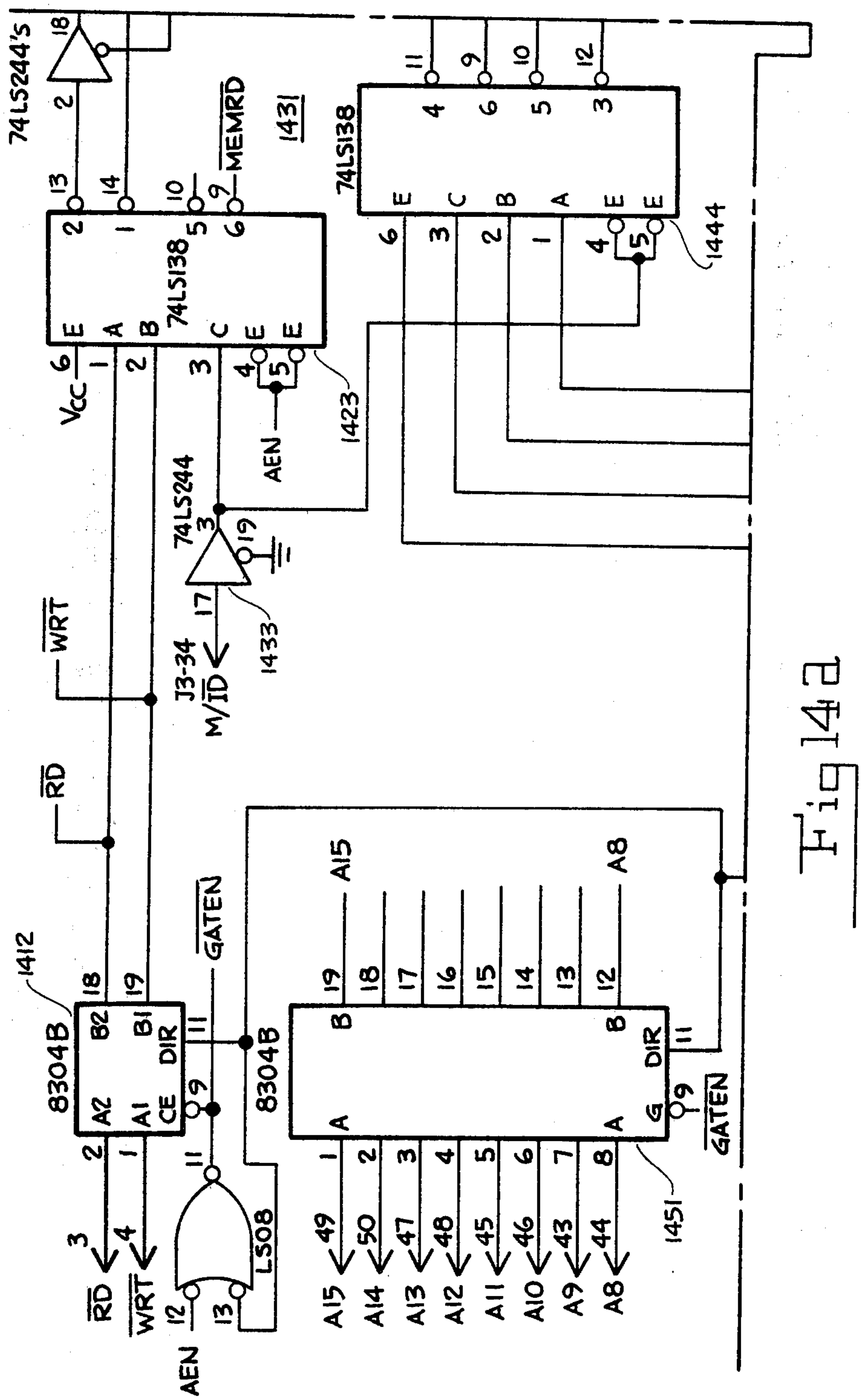
Figure 14B:
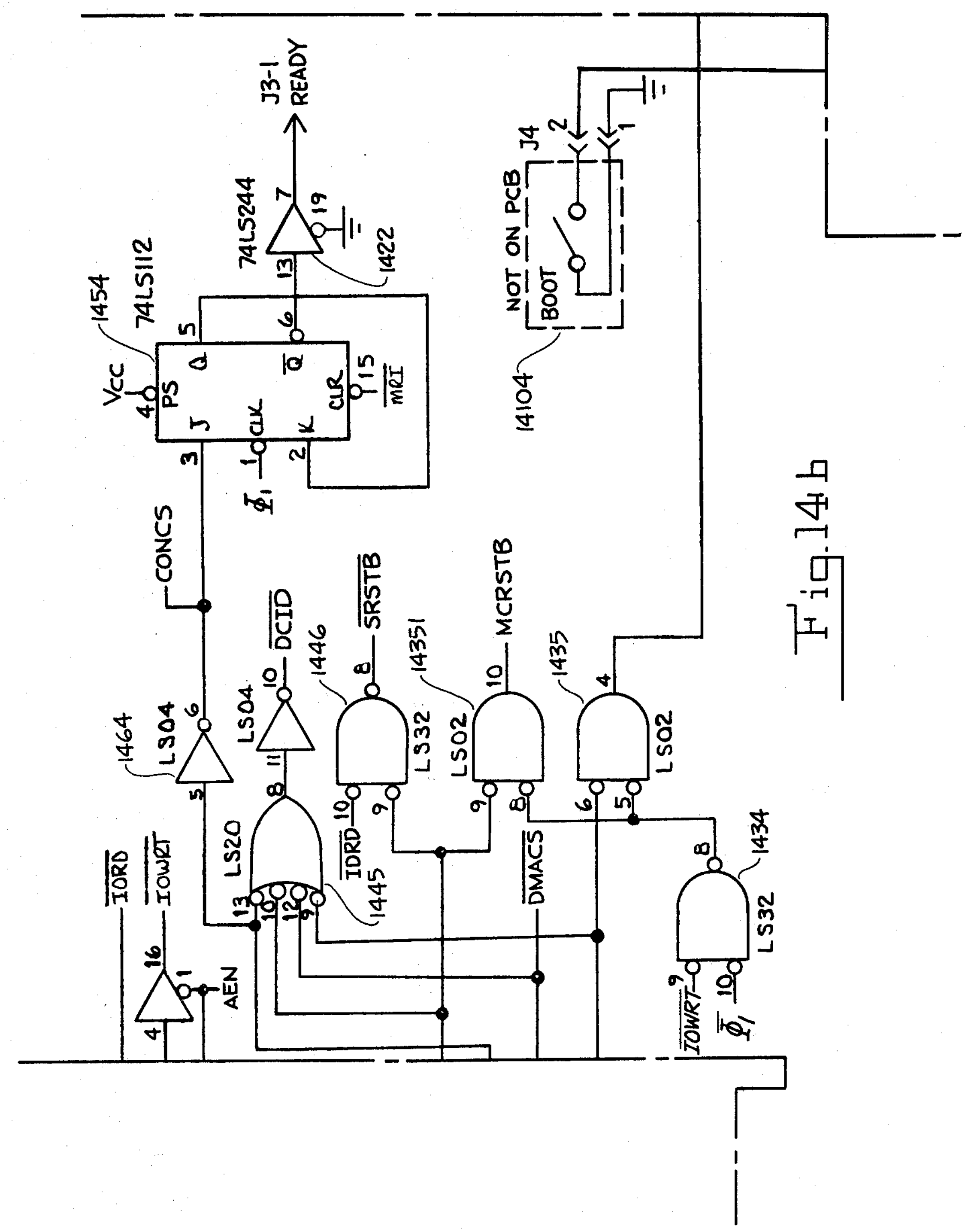
Figure 14C:
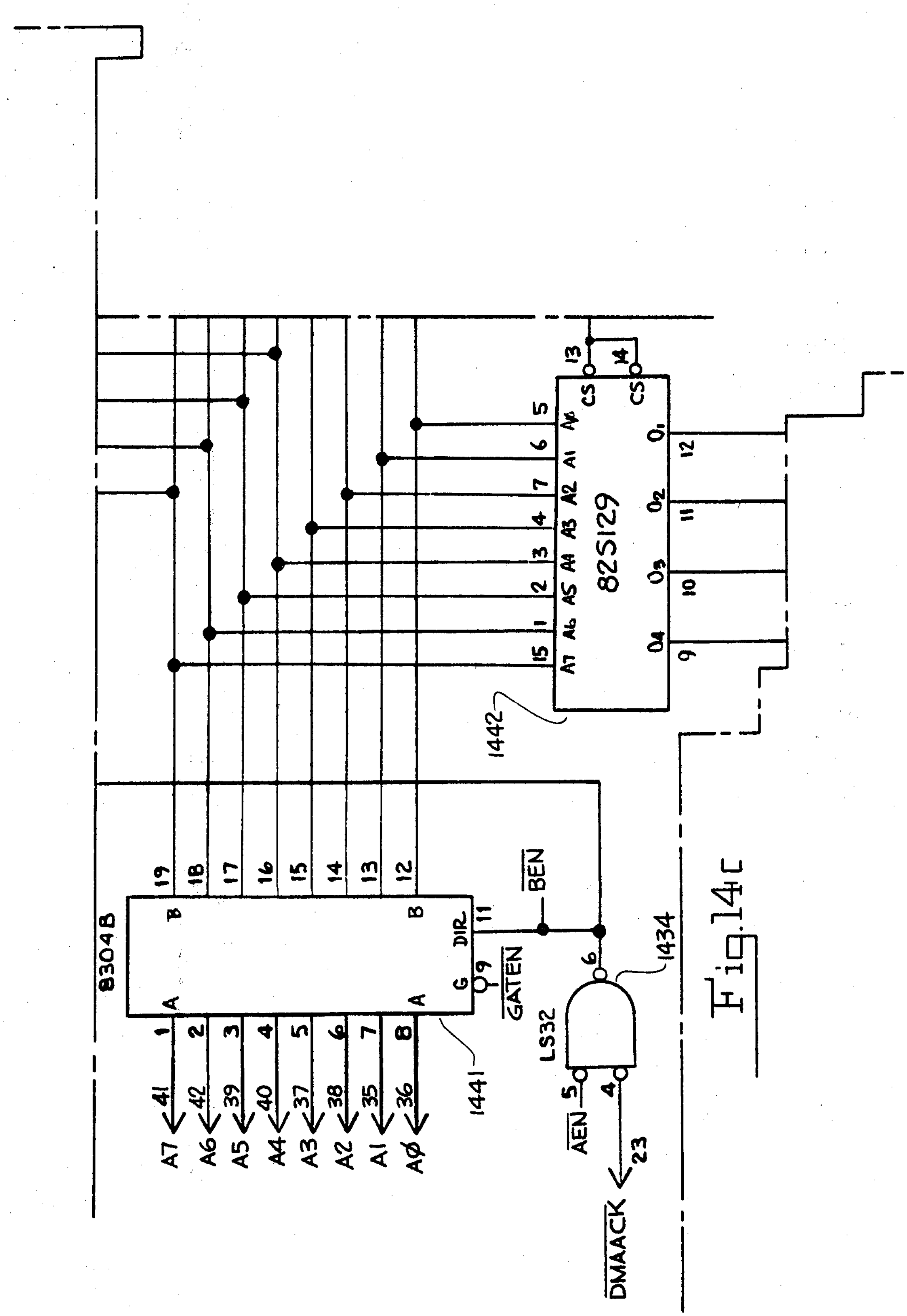
Figure 14D:
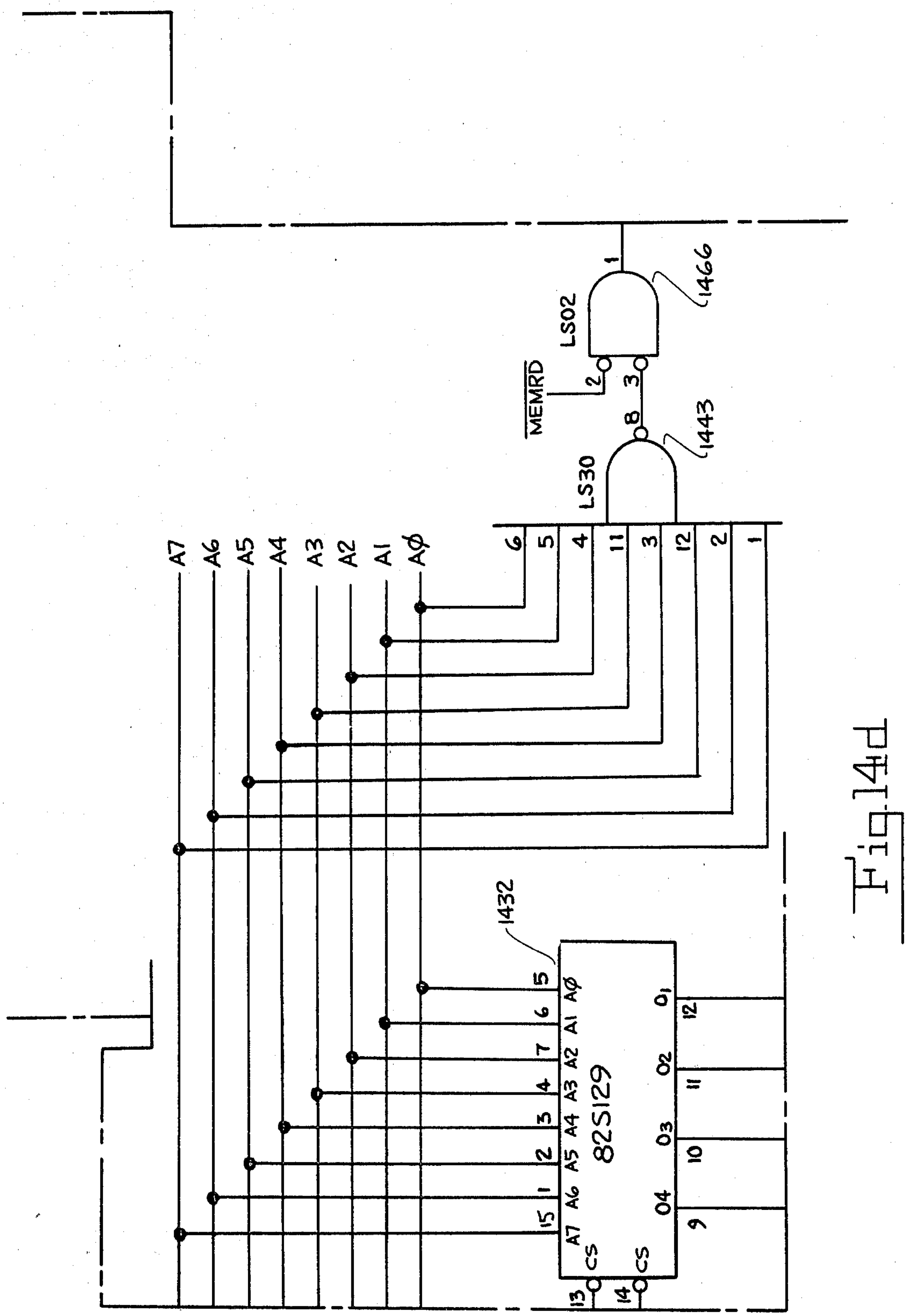
Figure 14E:
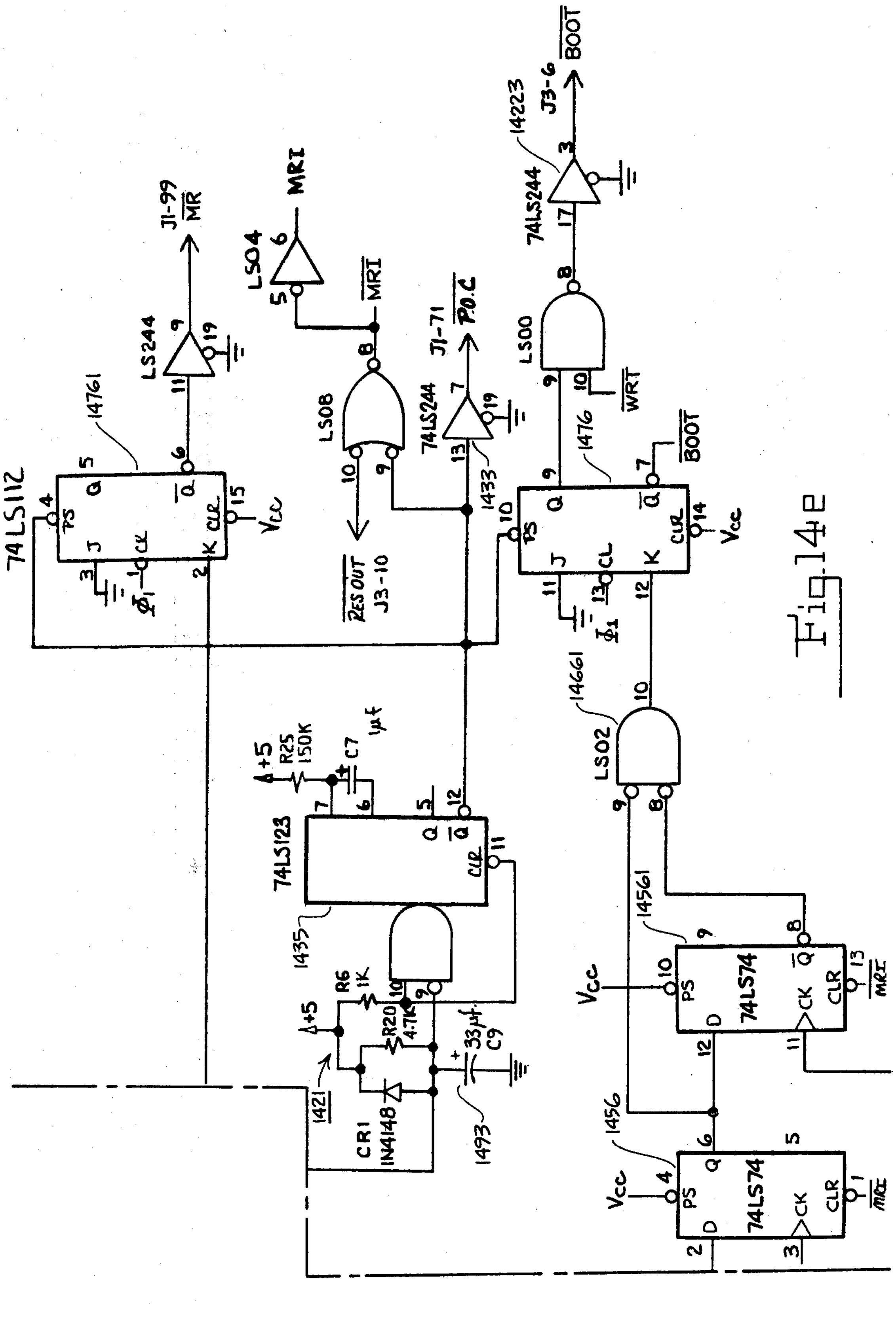
Figure 14F:
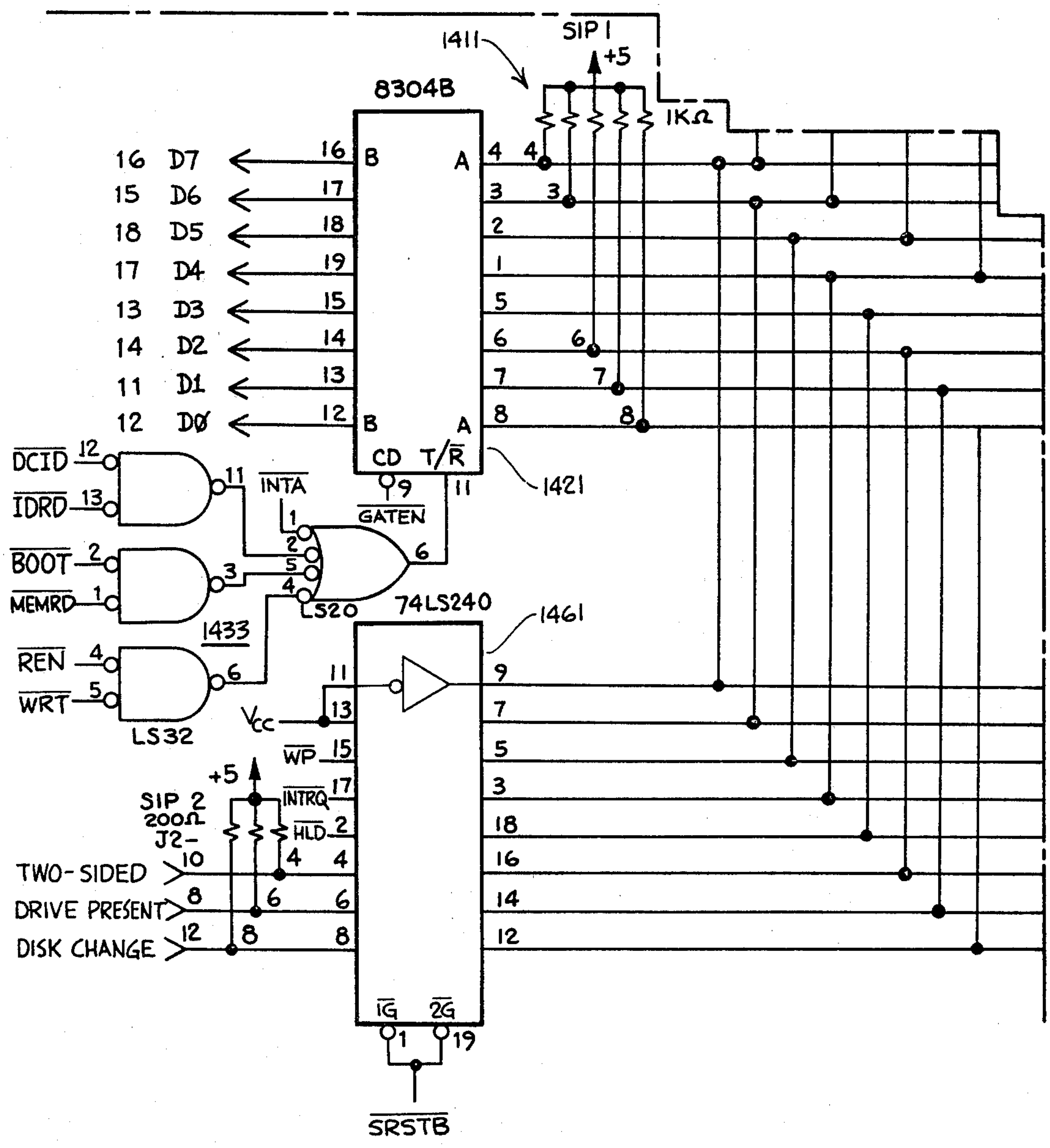
Figure 14G:
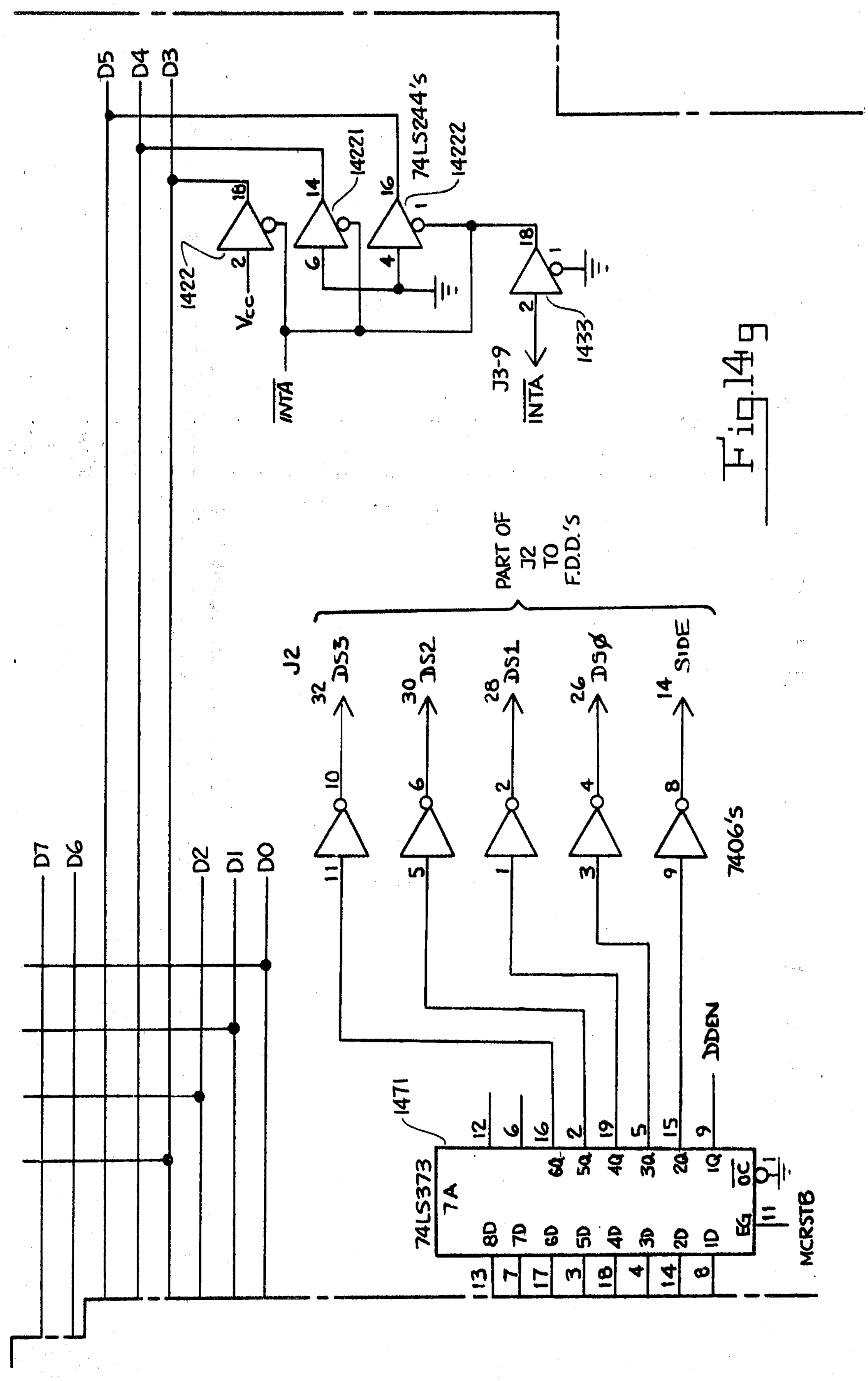
Figure 14H:
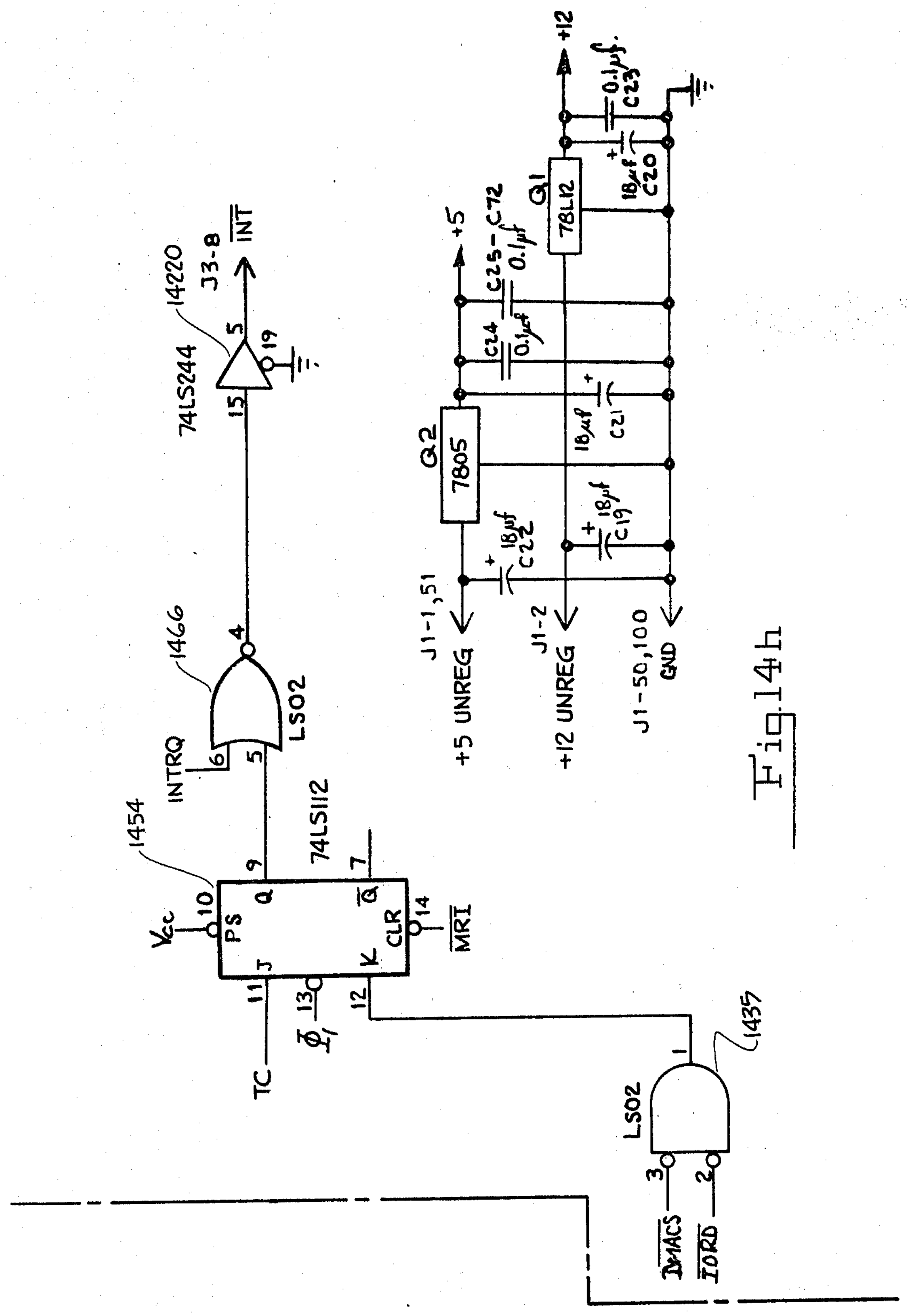

Referring now to FIGS. 13, 14, 15, 16 and 17 and more particularly FIG. 14, a processor interface is shown, including address line A0 through A15 and data lines D0 through D7 as part of connector J3, coupled to a GPP. All of these lines are connected to transceivers. Lines A0 through A7 are coupled to transceiver 1441; lines A8 through A15 are coupled to transceiver 1451; and lines D0 through D7 are coupled to transceiver 1421. These transceivers 1421, 1441 and 1451 are used to communicate with the GPP.

Read (RD) and write (WRT) control signals can be driven by the tri-state control bus (FIG. 11), which the processor or the DMA device can drive.

Memory I/O is the third control line at device 1432. The read and write are bi-directional. They are also coupled to device 1412. Sometimes the processor performs read and write operations to the registers on this controller. Sometimes the DMA controller on this circuit manipulates the read and write lines and performs the transfers into GPP memory.

An interrupt output signal from device 14220 is used to drive the processor's interrupt signal. Device controllers manipulate the interrupt line to generate an interrupt. When the processor is prepared to process the interrupt, an interrput acknowledge (INTA) line is activated by the processor and applied to device 1433. At this point, the data on a set of drivers 1422, 14221 and 14222 is transferred to the data bus D3, D4 and D5. The other lines on the data bus D0, D1, D2, D6 and D7 are pulled up with resistors shown generally at reference numeral 1411. That corresponds to a restart instruction. During an interrupt acknowledge (INTA), a restart one instruction is applied to the data bus D3, D4 and D5.

Another signal derived on the disk controller is a signal called BOOT at 14223. The boot line has the effect of disabling the random access memory (RAM) on the processor. When the BOOT signal is active, the boot PROM on the disk controller is active. The processor begins executing instructions from the boot PROM in the disk controller. When the boot operation is finished, the BOOT signal goes inactive and the PROM on the disk controller vanishes from the system.

The lower eight bits of the address bus are applied directly into the address pins on the boot PROMs 1442 and 1432. The output of the PROMs 1442 and 1432 is applied to the data bus D0 through D7. The chip selects on 1442 and 1432 are tied to signals called BOOT and memory read (MEMRD). Both signals must be active in order for the PROMs to be accessed. A boot operation, while the processor is performing a memory read operation, results in output information from the PROMs 1442 and 1432. In the absence of these signals, the PROMs 1442 and 1432 are decoupled from the data bus. The PROMs contain instructions therein for the boot operation. When the procesor fetches instructions during the boot operation, it reads the instructions from these PROMs, 1442 and 1432.

An eight input NAND gate 1443 decodes the address lines A0 through A7. When the lower eight bits of the address bus are all set at one, the output of that gate 1443 becomes active. That corresponds to address FF hex. The output of gate 1443 is ANDed in gate 1466 with a memory read (MEMRD) signal and drives the D input to a flip flop 1456. In conjunction with flip flop 14561 and AND gate 14661, the output of 1456 is used to produce a pulse which is one Φ period wide. Φ1 is the clock for flip flops 1456 and 14561. The output of the AND gate 14661 drives the K input on the boot flip flop 1476. It performs the function of resetting the boot flip flop 1176. When a memory read to location FF instruction is executed, the boot flip flop 1476 is reset.

In the boot PROM program, the last step is a jump to location FD. Location FD has a jump instruction to location 0. The jump instruction requires three bytes: jump at FD, the destination address, FE and FF. When the processor executes the instruction fetch at address FF, the boot flip flop 1476 is reset, which operates without intervention of the boot PROM. It then executes that jump instruction. It goes down to location 0, but now finds that location 0 is not the vanished PROM, but the RAM on its associated GPP. The boot flip flop 1476 is initialized by one of two conditions: a power on condition, or depression of the reset switch 14104.

A one-shot 1465 output is used to drive the boot flip flop 1476. When the system is quiescent, without power, a capacitor 1493 discharges. It has 0 voltage across it. As power is applied, the voltage builds and the one-shot 1465 fires. Gradually the capacitor 1493 charges through a resistor network shown generally at reference numeral 1421. As a result, one trigger pulse from pin 12 of 1465 is generated by the one-shot 1465 setting the boot flip flop 1476. This signal from pin 12 of the one-shot 1465 also sets a master reset flip flop 14761. It also drives a signal called power on clear (POC) via device 1433 to the processor through connector J1.

An I/O decoder shown generally at reference numeral 1431 decodes addresses for the different peripheral devices and registers that are part of this controller.

Device 1444 is a three-line to eight-line decoder. A, B and C inputs are applied and the decoder 1444 activates one of its eight outputs, depending upon the code applied to the A, B and C inputs. To activate device 1444, all three enable inputs are required. Two of them are inverting pins 4 and 5 of decoder 1444, and one of them is non-inverting pin 6 of decoder 1444. The outputs of the decoder 1444 are labeled 3, 4, 5 and 6. The three outputs, for example, correspond to a 011 on the C, B and A inputs respectively. B and A must be true and C must be false to activate the three outputs. Also, all of the enables must be active.

The two inverting enables are coupled via buffer 1433 to the memory I/O (M/IO) bar signal in the processor. When the processor is executing an I/O instruction, the M/IO bar signal at buffer 1433 goes false. Device 1433 is a non-inverting buffer. Accordingly, the enable inputs on the decoder 1444 go false when the processor executes an I/O instruction. The other enable input is connected to address line A7 (the most significant bit of the least significant half of the address bus). Seven bits of the address bus must be utilized to decode I/O instructions because there are 256 possible I/O addresses. When the enable bit is set and when C is 0, B is 1 and A is 1, and the processor is executing an I/O instruction, the number three output is active. That goes false.

The output from decoder 1444 is input to an AND gate 1435 and is ANDed via device 1434 with an IOWRT and a Φ1 signal. The output of AND gate 1435 is applied to the K input of the master reset flip flop 14761. If the processor executes an output instruction, to address B0, the master reset flip flop 14761 is reset. The master reset output is applied via the back plane to all of the processor boards. The disk controller processor board ignores this signal, but all the rest of the processor boards use it to activate their reset lines. Accordingly, if the disk controller processor performs an output operation with any device on the data bus, the master reset flip flop 14761 is reset, and all the processors are started. This occurs at the end of a boot operation. After all of the processors are loaded with useful code, an output instruction is executed to enable the system processors.

The other outputs of the decoder 1444 are connected as follows. The four output pin 11, which corresponds to register address CX (where X equals not applicable, N/A) is connected to two AND gates 14351 and 1446. They perform an AND function. AND gate 14351 is used to drive the strobe for the mode control register (MCRSTB) 1471 on the controller. When an output to register C0 occurs, the contents of the accumulator is transferred to the mode control register 1471. The gate input pin 11 of the mode control register 1471 is the mode control register strobe. The D inputs on the octal D latch are connected to the data bus D0 through D7.

The signal at AND gate 1446 is ANDed with the I/O read (IORD) signal. An I/O read to address C0 generates a status register strobe (SRSTB) signal. The SRSTB signal is applied to the status register 1461. The inputs to this status register 1461 are tied to different points on the drive and points internal to the controller card: write protect (WP), interrupt request (INTRQ), head load (HLD), and three signals that come back from the drive: TWO-SIDED, DRIVE PRESENT and DISK CHANGE.

The TWO-SIDED signal is used to determine whether a single sided or a double sided drive is being used. The DRIVE PRESENT signal indicates that a drive is connected with a particular drive address. The DISK CHANGE indicates that the disk drive door has been opened and closed, thereby indicating that another disk may have been inserted. This information is used to alert the operator.

An I/O write instruction to address C0 results in data being transferred from the processor to the mode control register 1471. This is accomplished by decoding an I/O instruction to address C0 as above and then ANDing the result with the IOWRT and Φ1 signals in devices 1434 and 14351.

Referring again to the output of the mode control register 1471, the least significant bit is marked double density (DDEN) at pin 9 of mode control register 1471. The bit determines whether the system is writing single density or double density. The next line pin 14 of connector J2 is marked SIDE. It is used for double sided drives. One head or the other can be selected with that signal. The next four lines, pins 26, 28, 30, 32 of connector J2 are also coupled to the drive. They are the drive select lines, DS0 through DS3. Only one of those lines is active at one time. The lines DS0 through DS3 select one of four drives connected to the system.

Another decoder 1423 has read (RD) and write (WRT) inputs from the processor 1134. The C input of decoder 1423 is tied to the memory I/O (M/IO) line. There are three enable inputs on decoder 1423, each designated E on decoder 1423. One enable input at pin 6 is energized and is always active. The other two are tied to a signal called AEN, which is derived on the DMA controller, discussed hereafter. The system differentiates the drivers of the read (RD) and write (WRT) lines. The decoder 1423 is enabled only when the processor 1134 is providing the signals, not when the DMA controller is providing them. When the DMA controller is active, it assumes the function of the processor, driving the memory read and write lines. When the processor 1134 is driving the RD and WRT lines, the AEN signal is false and the decoder 1423 is enabled.

The output of the decoder 1423 includes three signals: memory read (MEMRD), I/O write (IOWRT), and I/O read (IORD). The IOWRT and IORD signals are used when the processor 1134 is performing input or output type operations.

Output 6 (pin 9) of device 1444 is applied to an inverter 1464 and drives a signal called controller chip select (CONCS). This output becomes active whenever the processor executes an I/O instruction to location EX hex, where X equals not applicable, N/A. The CONCS signal is applied to the disk controller 1392 and is used to indicate that the processor 1134 is performing a read or write operation to the disk controller. The controller chip select (CONCS) line drives the J input on flip flop 1454. The Q output of flip flop 1454 is coupled to the K input. As a result, an output signal from pin 6, which is one clock pulse Φ1 wide, is generated. The output of this flip flop 1454 is coupled via amplifier 14223 to the ready (READY) line of the processor 1134. Since the disk controller 1392 is a relatively slow device for I/O, the processor is operated by using the READY signal to delay its operation while waiting for information from the disk controller 1392.

Another output, output 5, from the decoder 1444 at pin 10 provides the signal called DMA chip select (DMACS) that directly drives the chip select on the DMA controller 1353. This signal is active when the processor executes an I/O instruction to address DX hex, where X equals not applicable, N/A.

The OR gate at location 1445 receives all of the output signals from the decoder 1444. It performs a logical OR function on the output signals and generates a signal called disk controller I/O (DCIO), used to enable the data bus driver transceiver 1421 in the processor interface under certain circumstances. In the case where the processor 1134 is performing an I/O read operation, this transceiver 1421 drives data back into the processor 1134. The DCIO signal is an indication to the control circuitry shown generally at reference numeral 1433 for this transceiver 1421 that the processor 1134 is executing that I/O instruction. The transceiver 1421 drives the processor 1134 in accordance with a signal from logic circuitry 1433. If an interrupt acknowledge (INTA) signal occurs or if the processor 1134 is performing an I/O read (IORD) operation or if the boot flip flop 1476 (BOOT) is active and the processor 1134 is performing a memory read (MEMRD) operation or if a write into memory (WRT) is occurring and this is a DMA access (AEN), then the transceiver 1421 is operated to drive the processor 1134.

There are two conditions under which the disk controller 1392 interrupts the processor 1134: one is to indicate that the controller has completed an operation (that is, after a read, write or abort operation); the other condition for interrupting the processor 1134 is when the byte counter in the DMA controller has exhausted itself. That is, if the disk controller is conditioned such that it has additional functions to perform, the processor 1134 can be apprized that the operation is terminated. The terminal account (TC) input to flip flop 1454 comes from the DMA controller. It indicates that the byte count is exhausted. The flip flop 1454 is set when TC goes active and is reset when the processor 1134 performs an I/O read operation to the DMA controller. Two signals, I/O read (IORD) and DMA chip select (DMACS), are applied to the K input of flip flop 1454 via AND gate 1435. The output of the flip flop 1454 is ORed in device 1466 with a signal called interupt request (INTRQ). The INTRQ signal is generated by the floppy disk controller device 1392.

Figure 15:
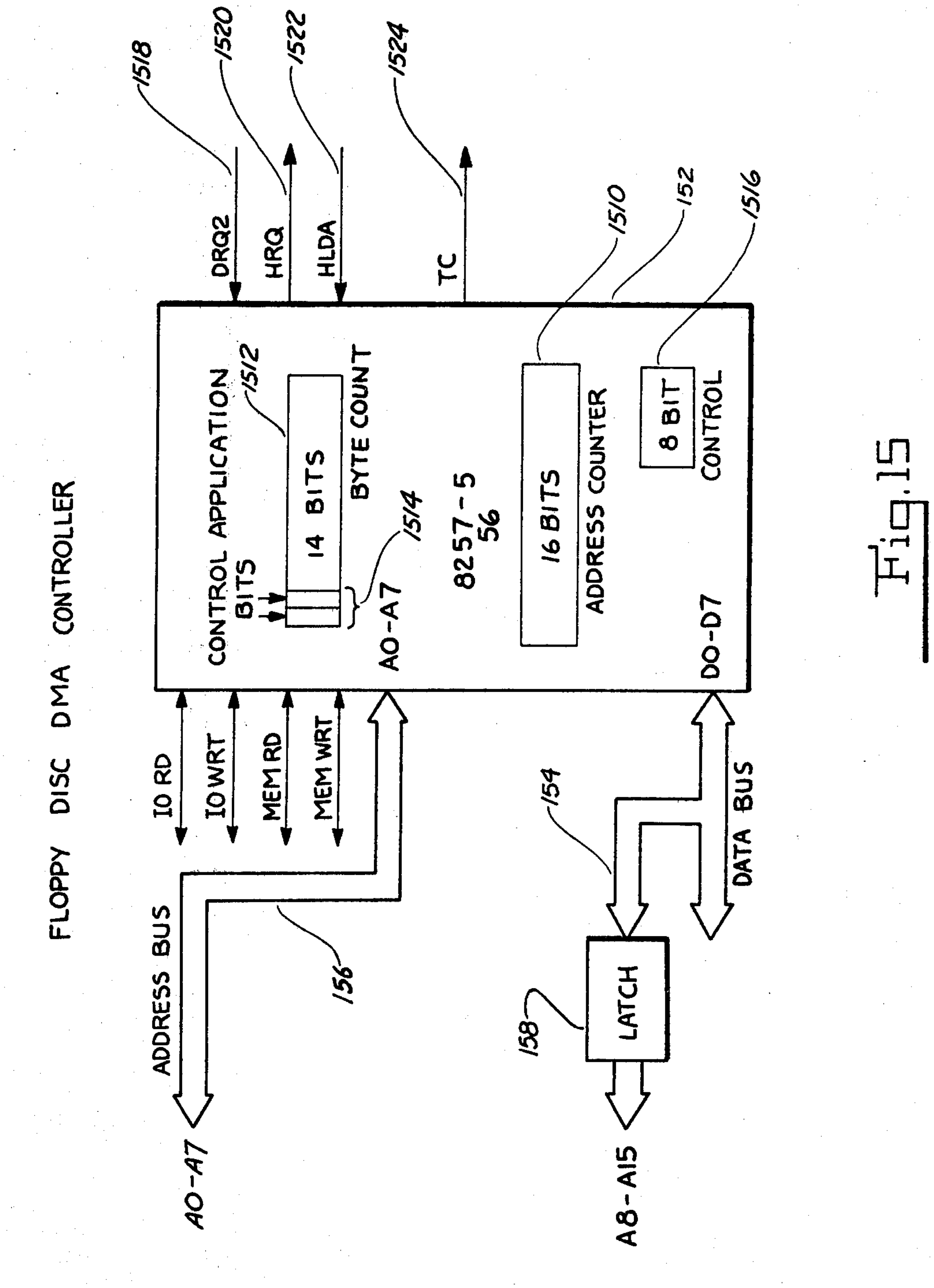

Referring now to FIG. 15, the DMA controller 152 is used to transfer information from the disk controller 1392 to the processor's memory without processor intervention. The disk processor can perform other operations while these transfers are taking place. It is not occupied with taking a byte from the disk controller 1392 and transferring it into memory, because if it were, that is all it would have time to do. The DMA controller 152 resides on the disk controller 1392 to handle these transfers for the processor.

The floppy disk DMA controller 152 has a bidirectional data bus 154 D0 through D7 connected to the data bus on the processor 1134 through a set of transceivers shown in greater detail on FIG. 14. It also has a bidirectional address bus 156 A0 through A7. That address bus is connected to a latch 158.

When the DMA controller 152 performs a memory access operation, it follows a multiplexing scheme, similar to the processor's. It loads an address on its bus which is latched. Then the least significant byte of the address is loaded directly on the bidirectional bus. There are bidirectional control lines, I/O read (IORD) and I/O write (IOWRT), memory read (MEMRD) and memory write (MEMWRT). These correspond to the control lines that are derived from the processor.

These four control signals must be distinguished. When the DMA controller 152 performs a transfer operation from the floppy disk controller into memory, it performs an I/O read and then a memory write operation. The two operations must overlap, since the data is to be transferred in a single memory cycle. For data transfers from memory to the disk controller 1392, data is temporarily stored in latch 1331. The DMA controller 152 performs a memory read operation to retrieve information from the memory and overlaps that with an I/O write operation to the disk controller 1392.

In order to monitor the status of the DMA operation, there is provided a 16-bit address counter 1510. The counter 1510 points to the next location in memory. There is also provided a 14-bit byte counter 1512. This counter 1512 allows the transfer of up to 16K bytes of data. The upper two bits 1514 of the counter 1512 are used for control applications to determine whether a memory read or a memory write operation is being performed or whether a verification operation is being performed during which no transfers take place. The two bits 1514 differentiate between a write and a read operation.

The DMA controller 152 has four sets of registers and can handle four channels simultaneously, although only a single channel is used to the disk controller.

A data request (DRQ) signal 1518 is applied to indicate that the disk controller is attempting to transfer a byte of data to memory. There is also provided a control register 1516. The processor 1134 accesses any of these registers by executing an output or an input instruction to the DMA controller 152. Those signals, IORD, IOWRT, MEMRD, and MEMWRT, share the same pins that the DMA controller 152 uses to control the I/O operations. Accordingly, these signal lines are bidirectional. When the processor 1134 attempts to write into one of these registers, it activates the I/O write (IOWRT) line, and it loads an address on the lower byte of the address bus 156. That points to one of the registers on the DMA controller 152 and data is input from the bus 154.

The two registers 1510 and 1512 are 16 bits wide. Consequently, two output instructions are required to load them for a read operation. Control register 1516 is an input control register, used to enable any one of the four channels. Device 1512 is operated on channel two. Accordingly, the signal on line 1518 is designated DRQ2, representing channel two in the DMA controller 152. The DMA controller 152 has an auto chain feature to allow the processor 1134 to move onto the next operation. A series of DMA operations can be performed; the processor 1134 need not be apprized of the termination of each one.

If the DMA controller 152 detects an appropriate data request and if one of the four channels has been enabled by a bit being set in the control register 1516, then the controller 152 moves in accordance with the following sequence. The DMA controller 152 sends a signal to the processor 1134 on a line called hold request (HRQ) 1520. The hold request line 1520 goes active. That makes the processor 1134 become transparent to the system busses. It stops it from processing only for the period of the transfer taking place, which is on the order of 2 to 2.5 microseconds. These transfers take place at the disk rate which is 32 microseconds between transfers for single density or 16 microseconds between transfers for double density recording format disks. Every 16 or 32 microseconds, the porocessor enters the hold state and remains in that state for 2 to 2.5 microseconds.

The DMA controller 152 has T-states (processor memory cycles) associated with it. Four or five T-states are required to make the transfers. When the controller 152 is prepared to perform the transfer, a signal from the processor 1134 called hold acknowledge (HLDA) on line 1522 indicates that the processor 1134 is in the hold state now and the transfer can be performed. The transfer takes place on the IORD and IOWRT signals. The memory signals MEMRD and MEMWRT are activated at the proper time. The transfer is completed. The DRQ signal on line 1518 is disabled. The controller 152 drops the hold request (HRQ) line 1520 and then the processor 1134 starts processing again. The byte counter 1512 is decremented. The address counter 1510 is incremented. Consequently, consecutive locations in memory are utilized.

The byte counter 1512 operates until it reaches zero, at which point a terminal counter (TC) signal on line 1524 is generated to indicate completion of the write operation.

Figure 16:
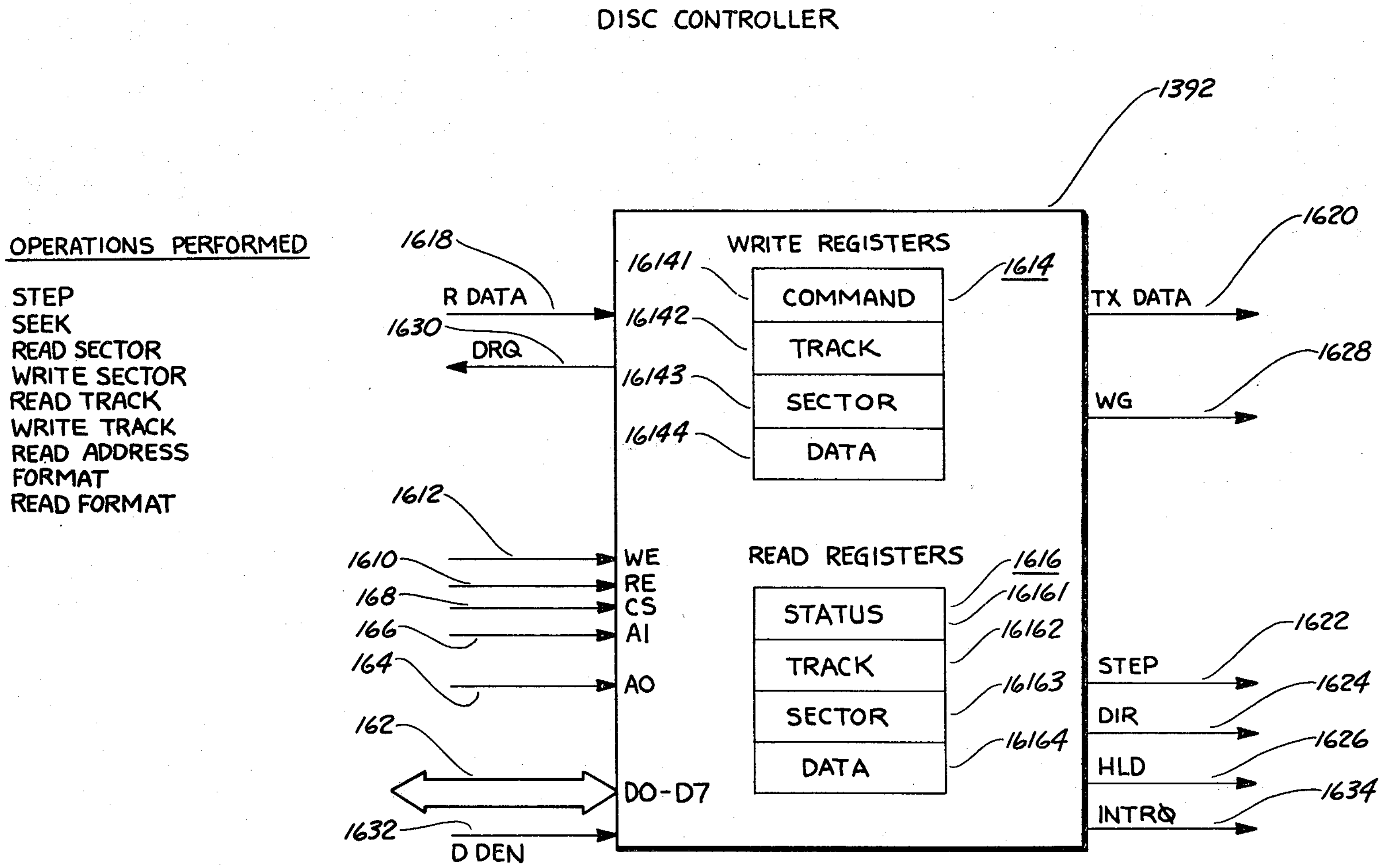

Referring now to FIG. 16, there is shown a disk controller 1392. A bi-directional data bus D0 through D7 is shown at reference numeral 162. Address lines A0 at reference numeral 164 and A1 at reference numeral 166 are used to address internal registers on the disk controller 1392. A chip select (CS) line 168 indicates selection of the disk controller 1392 chip. Read enable (RE) 1610 and write enable (WE) 1612 signals indicate whether the operation to the disk controller 1392 is a read or write operation respectively.

The disk controller 1392 is provided with four write registers 1614 and four read registers 1616. The write registers 1614 include a command register 16141, a track register 16142, a sector register 16143, and a data register 16144. The read registers 1616 include a status register 16161, a track register 16162, a sector register 16163, and a data register 16164.

Disk controller 1392 provides an interface to the disk drives. Data is serialized and deserialized from the drive. The eight bit data transmitted over data bus 162 is serialized for transmission to the disk. The disk controller 1392 also operates in the reverse manner, converting a serial data stream from the disk for transmission on the data bus 162 into a parallel format. A read data (RDATA) line 1618 carries a serial data stream from the drives, which is converted to parallel format and sent via data bus 162 to the associated GPP. Data from data bus 162 is serialized and output over a write data (WD) line 1620 to the disk.

The disk controller 1392 does not merely transfer data to and from the disk in raw form, but controls the timing for recording on the proper position of the disk. The read data (RDATA) line 1618 is continually monitored by the disk controller 1392 to determine where the read/write head is positioned relative to the rotating disk.

In normal operation, the track 16142 and sector 16143 registers of the write registers 1614 are loaded with the destination location of the position on the disk to which data is to be written. The data transfer is then accomplished. To appropriately position the read/write head on the disk, the disk controller is provided with output control lines, step (STEP) 1622 and direction (DIR) 1624. These signals, STEP and DIR, are used to control the movement of the head. Once the specified track is located and the head is appropriately positioned, a head load (HLD) signal 1626 is output from the disk controller 1392.

A write gate (WG) signal 1628 is output from the disk controller 1392 to indicate when the data on the write data line 1620 is to be written onto the disk. This prevents overwriting of the format and other information residing on the disk.

A data request (DRQ) signal 1630 is generated by the disk controller 1392 to indicate to the DMA controller that data is to be transferred thereto. Operations that can be performed by the disk controller 1392 include the following: STEP, SEEK, READ SECTOR, WRITE SECTOR, READ TRACK, WRITE TRACK, READ ADDRESS, FORMAT, and READ FORMAT.

The STEP operation is a discrete operation, moving the head incrementally in or out.

The SEEK operation occurs when the head is over a particular track on the disk, but must be moved to another track. To initialize this operation, the data register 16144 is loaded with the address of the destination track on the disk. The track register 16142 contains information as to the current track location above which the head is located. A SEEK command steps the head over the appropriate number of tracks until both the track and data registers 16142 and 16144 contain identical information.

A double density (DDEN) signal 1632 indicates to the disk controller 1392 whether the disk is formatted in single density or double density recording format. To initiate a READ SECTOR operation, the disk controller 1392 considers the information loaded in the sector register 16143 to determine whether the destination sector matches the sector specified in the next identification (ID) header. Once the sector has been found, the disk controller 1392 begins to transfer information through the data register 16144. If the appropriate sector cannot be found after 15 rotations, the status register 16161 in the disk controller 1392 is set with a flag. An interrupt request (INTRQ) signal 1634 is generated by the disk controller 1392 to the processor.

A READ TRACK operation instructs the disk controller 1392 to read all sectors on a given track, such as the one loaded in the track register 16142. A similar operation occurs when the disk controller 1392 is instructed to perform a WRITE TRACK operation.

A READ ADDRESS operation occurs when the head is positioned above the disk at an indeterminable location. The head is instructed to read data from the disk until it reaches an identification (ID) header on the disk. The track and sector information obtained from the ID header is loaded in the track and sector read registers 16162 and 16163 of the disk controller 1392.

The FORMAT operation allows the disk controller 1392 to reformat a disk by writing an image from memory continuously onto the disk.

The READ FORMAT operation allows the disk controller 1392 to read every bit of information on the disk for the current track.

Referring now also to FIG. 13, the DMA controller is shown at 1353. The disk controller is shown at 1392. To perform a DMA transfer, the DMA controller 1353 must output the most significant half of the address on the data bus D0 through D7 which is latched into device 1352.

The address strobe (ADSTB) signal at pin 8 of the DMA controller 1353 is applied to the enable gate (EG) pin 11 of latch 1352. A ΦISYNC signal is applied from the processor via driver 1333 to clock input (CLK) pin 12 of the DMA controller 1353. All of the operations are synchronized with respect to the ΦSYNC signal.

The reset input (RESET) pin 13 is used to initialize the DMA controller 1353. The hold request (HRQ) output at pin 10 of the DMA controller 1353 is used to initiate a DMA transfer. The hold acknowledge (HOLDA) signal at pin 7, applied via driver 13331, acknowledges that the processor has entered the hold condition. The lower half of the address bus A0 through A7 is a bi-directional bus. Four bi-directional control signal lines IORD, IOWRT, MEMRD and MEMWRT are provided. The same function is performed on the DMA controller 1353 that is performed on the processor.

The READY signal is provided at pin 6 of the DMA controller 1353 to introduce wait states in the transfer. When the DMA controller 1353 is communicating with a slower memory, for example, it is slowed until the READY line is asserted. In this configuration, one wait state is introduced for each data transfer.

The data request (DRQ2) signal at pin 17 of the DMA controller 1353 is coupled to disk controller 1392. When disk controller 1392 is ready to transfer data, it activates the DRQ2 signal to inform the DMA controller 1353. The AEN signal at pin 9 of the DMA controller 1353 indicates that the transfer is in the process of taking place.

The AEN output signal is coupled to a buffer 13332 to an OR gate 13113, to the chip select (CS) on the disk controller 1392. When AEN is active, a transfer is taking place to or from the disk controller 1392. This indicates to the disk controller 1392, by means of the CS input, that communication between it and the DMA controller 1353 is occurring, and establishes appropriate conditions in 1392. The AEN signal is also applied to another pair of OR gates 131131 and 131132 that drive inputs on the disk controller 1392. If both of those inputs A0 and A1 are activated and chip select (CS) is also activated, the input or output register three in the disk controller 1392 is addressed. When AEN goes active, the data registers of the disk controller 1392 are activated.

A state counter 1393 monitors DMA cycles. The DMA controller 1353 goes through four to six states to effect a DMA transfer. The counter 1393 monitors the current state. Drivers and receivers are activated depending upon the state of the DMA controller 1353. Logic shown generally at reference numeral 1383 generates a signal called DMA request (DMAREQ). This DMAREQ signal is applied to the general purpose processor 1134 to indicate that a request is being initiated. Because the processor 1134 is in the hold state, it is not on the bus. The next highest priority device is the disk controller 1392. A DMA achnowledge (DMAACK) signal is returned from the processor 1134 on the next clock cycle once the DMA request (DMAREQ) signal is activated.

The combination of signals that drive the DMAREQ signal are the signal from output 3 (pin 12) of the state decoder 13103 that corresponds to the wait state and a write (WRT) signal, or state 3 from output 2 (pin 13) of the state decoder 13103 and a memory read (RD) signal. The DMA request (DMAREQ) signal is activated depending upon whether the operation is a read from or a write to memory.

A data bus D0 through D7 is coupled to the floppy disk controller 1392 via parallel connected inverting buffers 1362 and 1372. These inverting buffers 1362 and 1372 interface the disk controller 1392 to the data bus D0 through D7.

An octal latch 1331 is coupled to the data bus D0 through D7. When a data transfer occurs from memory to the disk controller 1392, the information must be stored first in the octal latch 1331 due to timing of the various components. Data is taken from memory and is stored in the latch 1331. It is then transferred to the disk controller 1392. Inputs A0 and A1 to the disk controller 1392 are connected to OR gates 131131 and 131132. Inputs A0 and A1 allow addressing of different registers in the disk controller 1392.

Four signals are input by the disk controller 1392 from the disk drive: ready (READY), track zero (TRK 00), index (INDEX), and write protect (WRITE PROT). Each of these signals is applied to the disk controller 1392 via buffers 1382, 13101, 131011 and 131012. Those are status signals that are generated by the drive. The READY signal indicates that the drive is ready to perform an operation—power is applied, a disk is loaded, and the disk drive door is closed. Track zero (TRK 00) indicates that the read/write head is positioned over track zero. The index (INDEX) signal indicates that the physical hole in the disk is aligned with the physical hole in the envelope encasing the disk. The write protect (WRITE PROT) signal indicates that the disk is write protected.

Raw read (RAW READ) and read clock (RCLK) are applied to the disk controller 1392.

A signal called read gate (RD) from the disk controller 1392 pin 25 indicates that the read head is properly positioned with respect to the disk to perform a read operation. The interrupt request (INTRQ) output, pin 39 of disk controller 1392, indicates that the disk controller 1392 requires attention from the processor.

A signal called head load (HD LOAD) is output from pin 28 on disk controller 1392 to the disk. This HD LOAD signal drives a one-shot 13131, the output of which is input to the disk controller 1392 on the head load timing (HLT) terminal at pin 23. The one-shot 13131 provides settling time for the head. The one-shot 13131 operates for approximately 50 milliseconds every time the head is loaded. The one-shot 13131 then provides a signal back to the head load timing (HLT) input of 13391 to indicate that the head has been loaded.

A direction (DIRC) output pin 16 indicates the direction the head is to move. A step (STEP) signal pin 15 provides information regarding the number of steps to move the head. The write gate (WG) signal pin 30 turns the write current on only in certain places on the disk to prevent these transitions from disturbing the disk format.

Three signals, write data (WD) pin 31, early (EARLY) pin 17 and late (LATE) pin 18, are used to generate the write data (WRITE DATA) signal to the disk. In single density applications, the EARLY and LATE signals have no significance, but for double density they provide a way of pre-compensating the data for bit shift before it is loaded on the disk. They move data by shifting the bits to help make certain data combinations easier to decode.

Data is output from pin 31 (WD) of the disk controller 1392 and is shifted through a shift register 13111. A multiplexer 13121 applies one of the shift register outputs to its Y output (1Y), pin 7. A shifted or unshifted version of the data is applied to a one-shot 1365. The one-shot 1365 provides a pulse via a buffer 1391 to generate the WRITE DATA signal.

Figure 17:
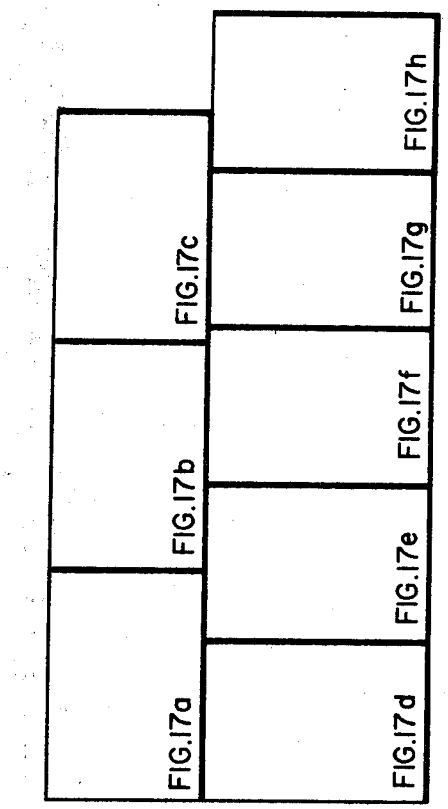
Figure 17A:
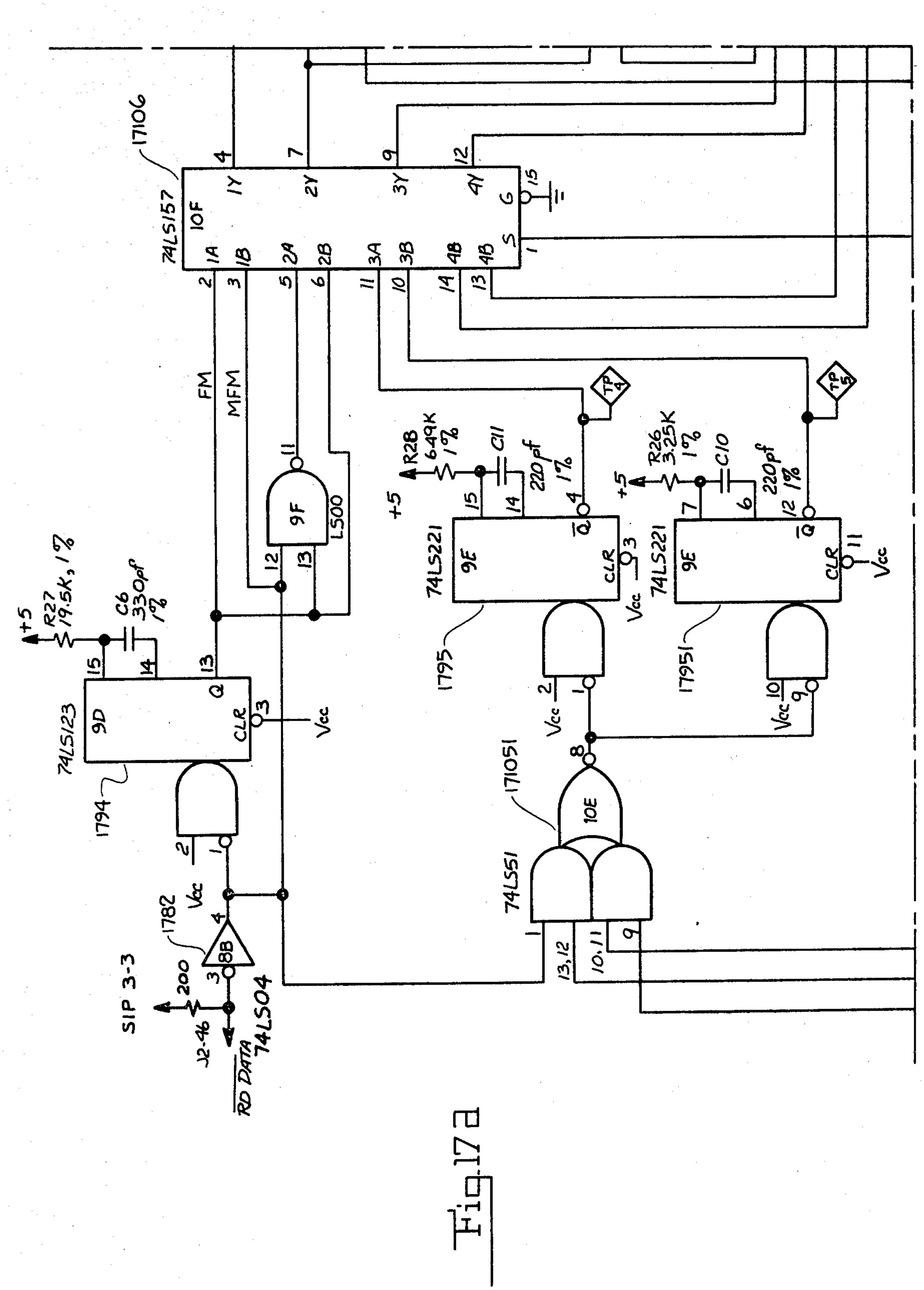
Figure 17B:
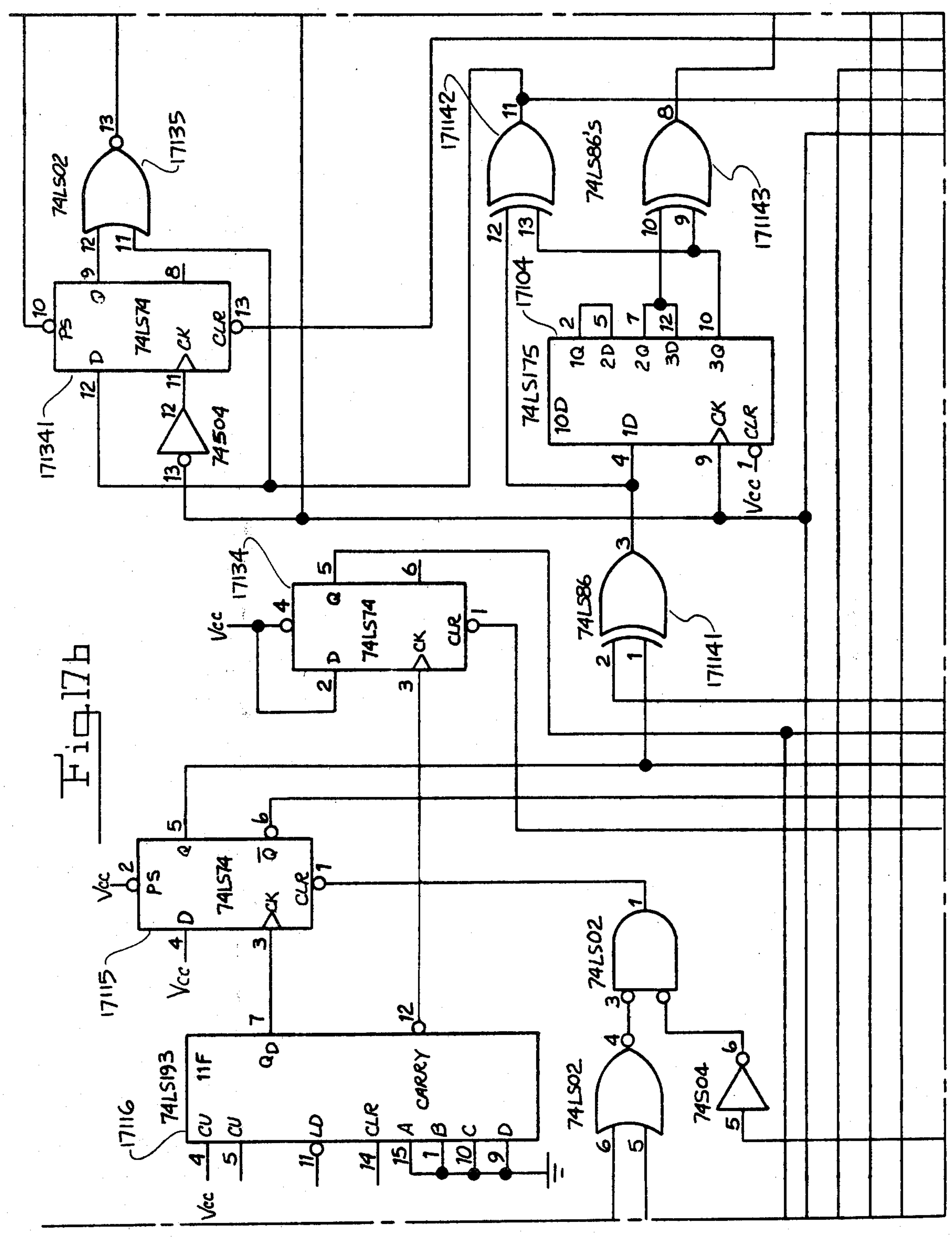
Figure 17C:
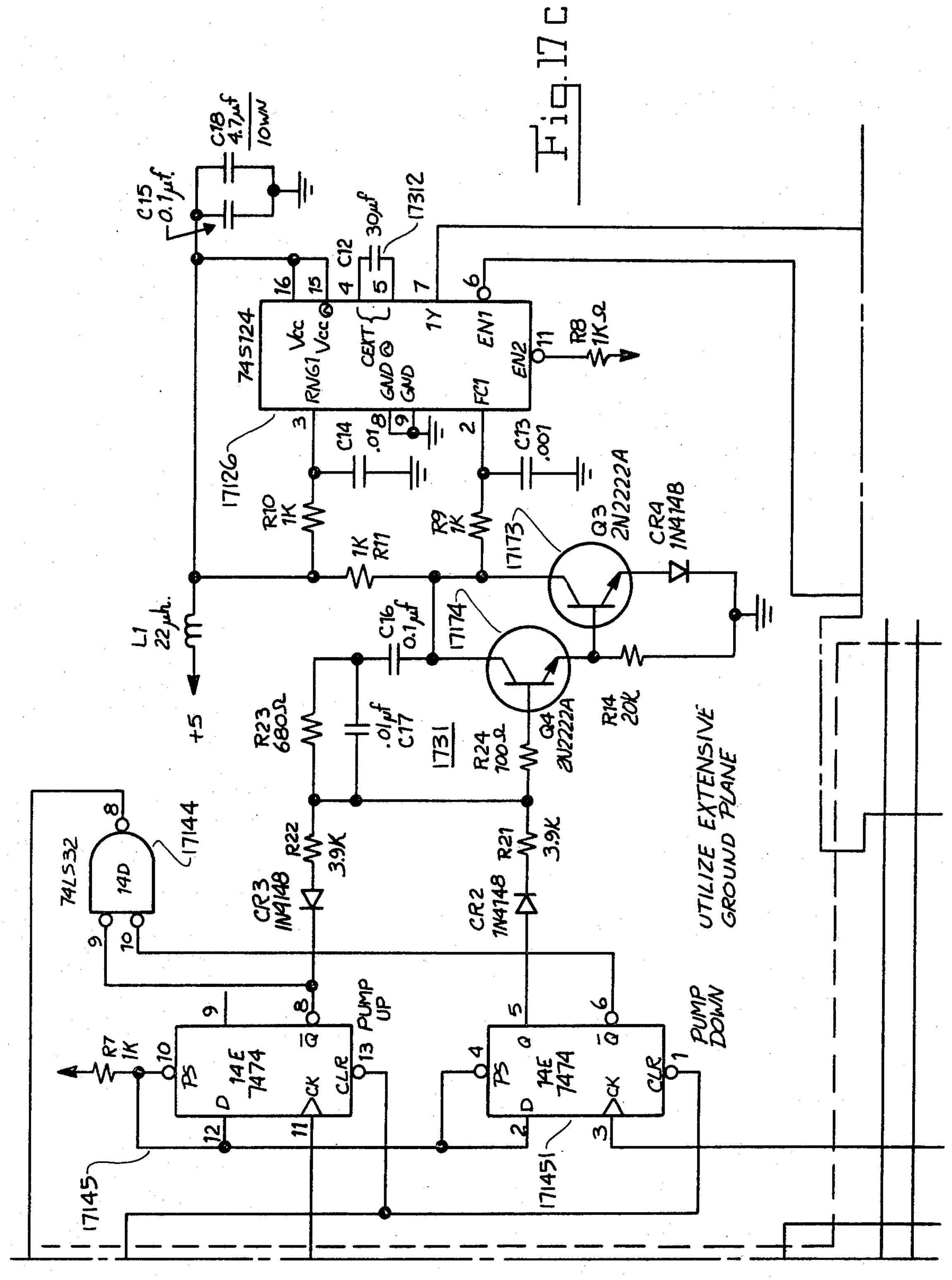
Figure 17D:
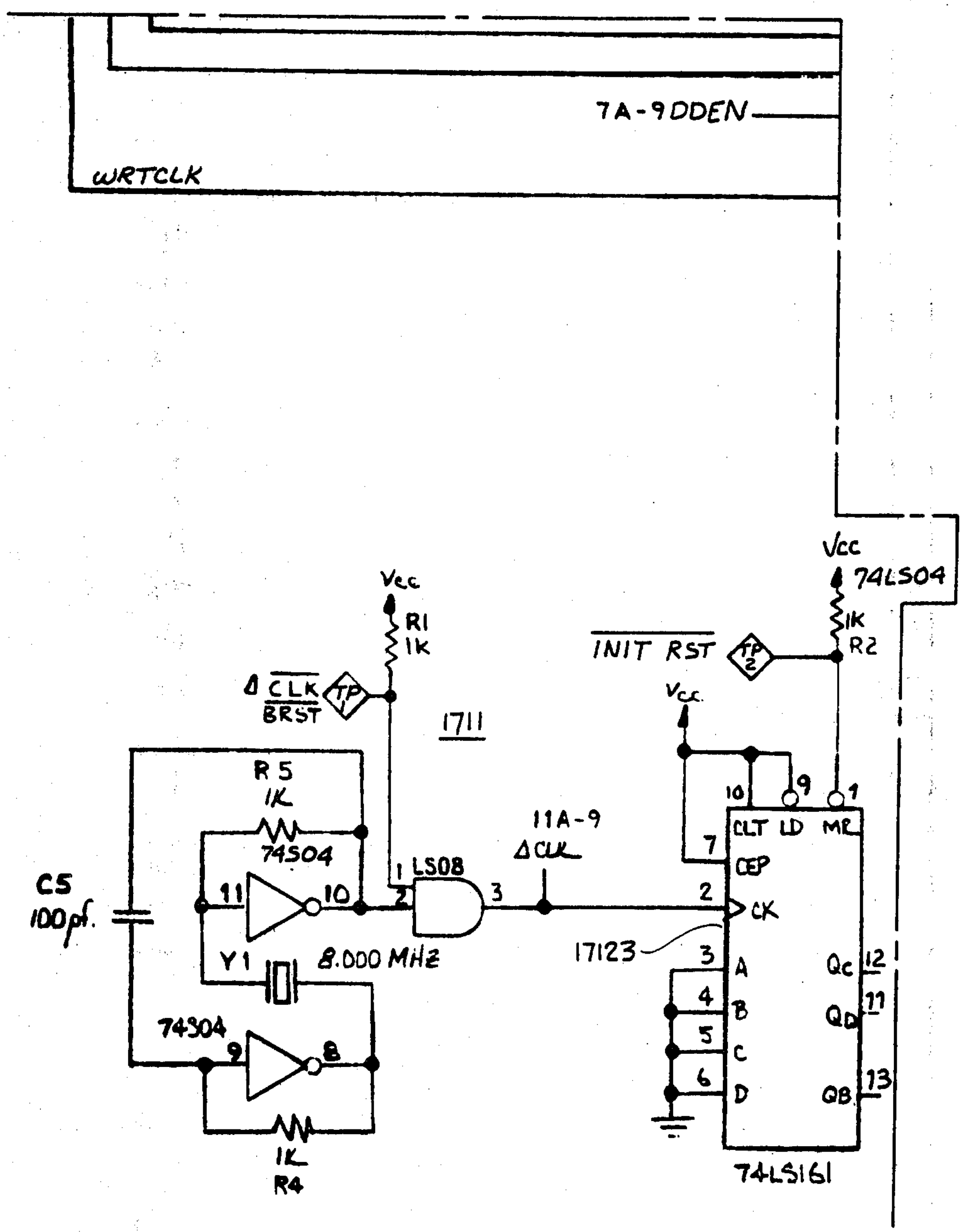
Figure 17E:
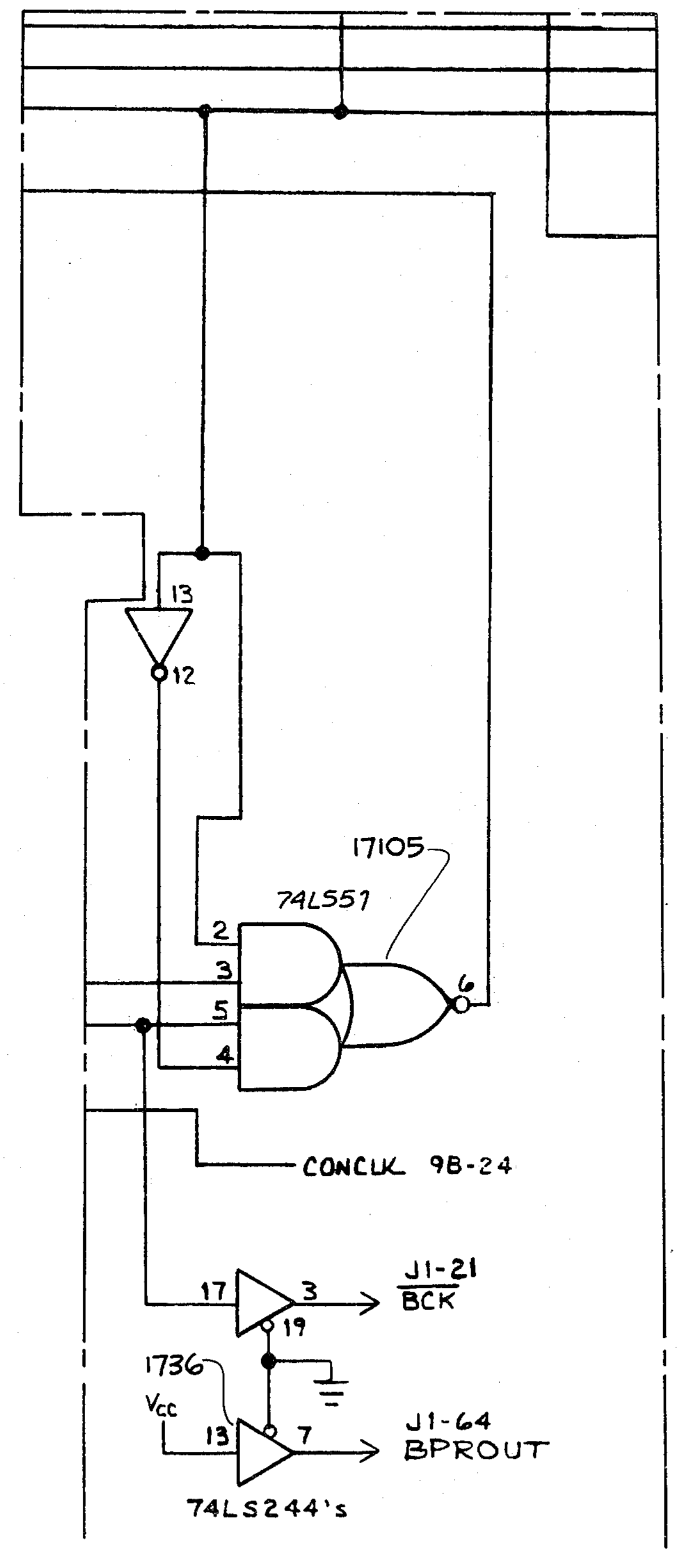
Figure 17F:
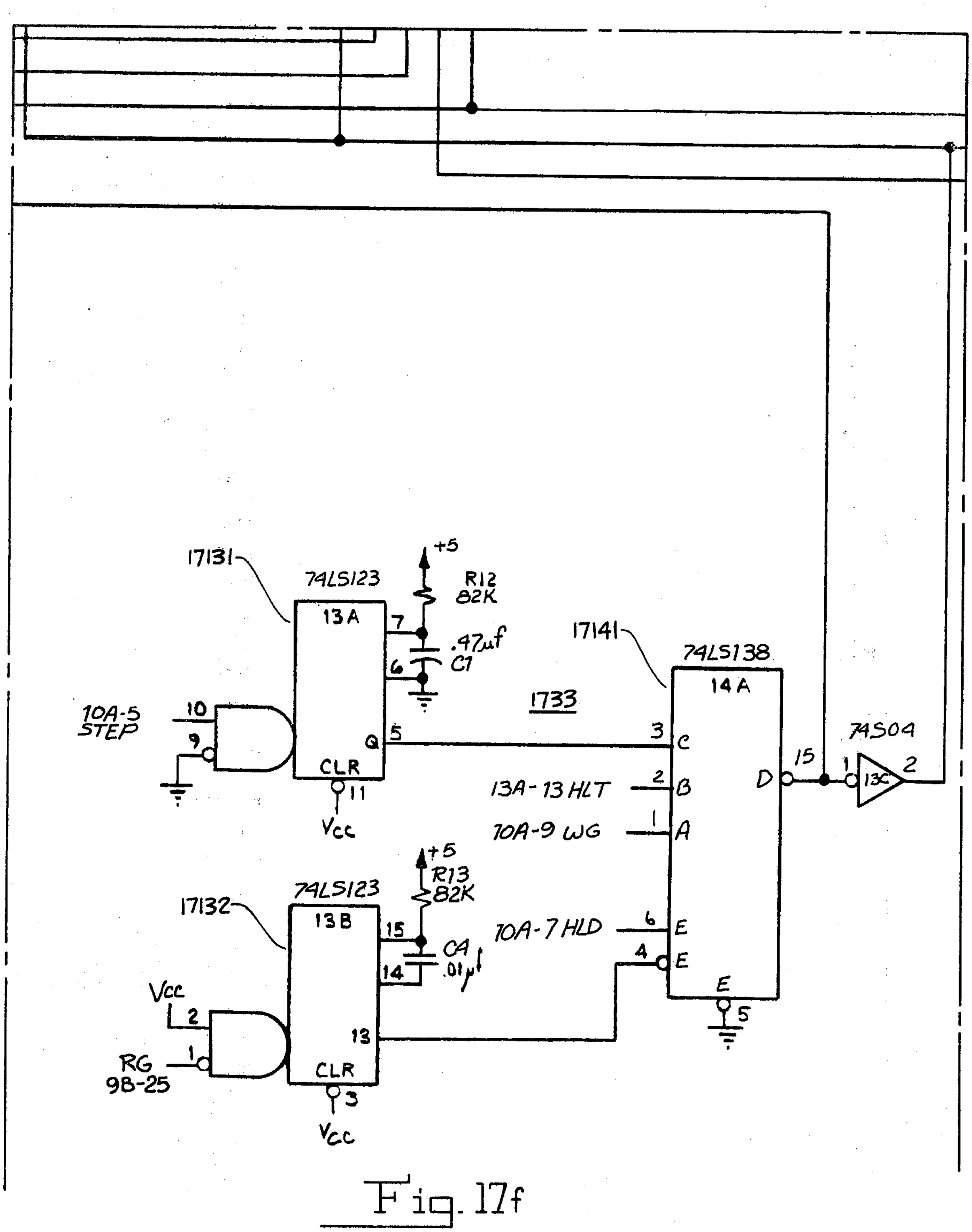
Figure 17G:
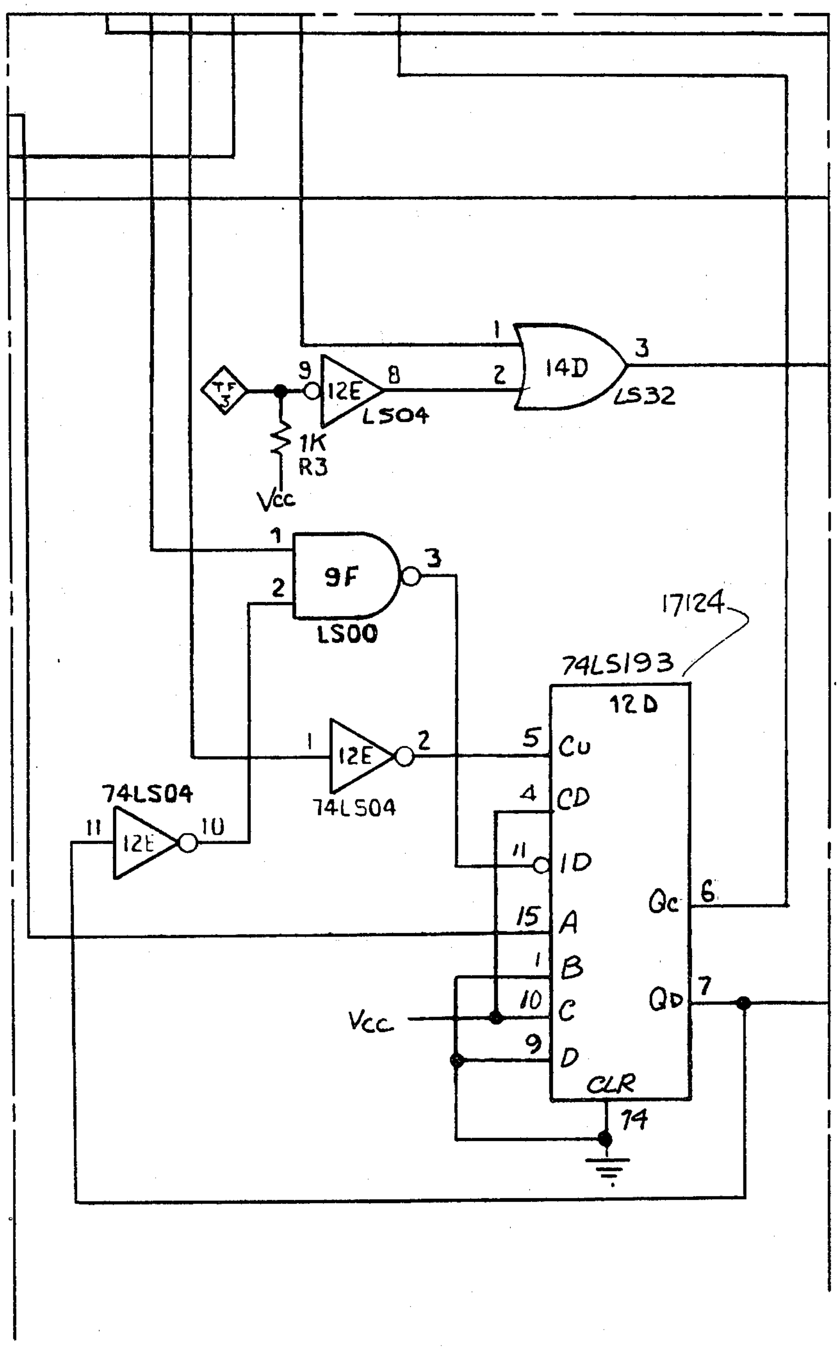
Figure 17H:
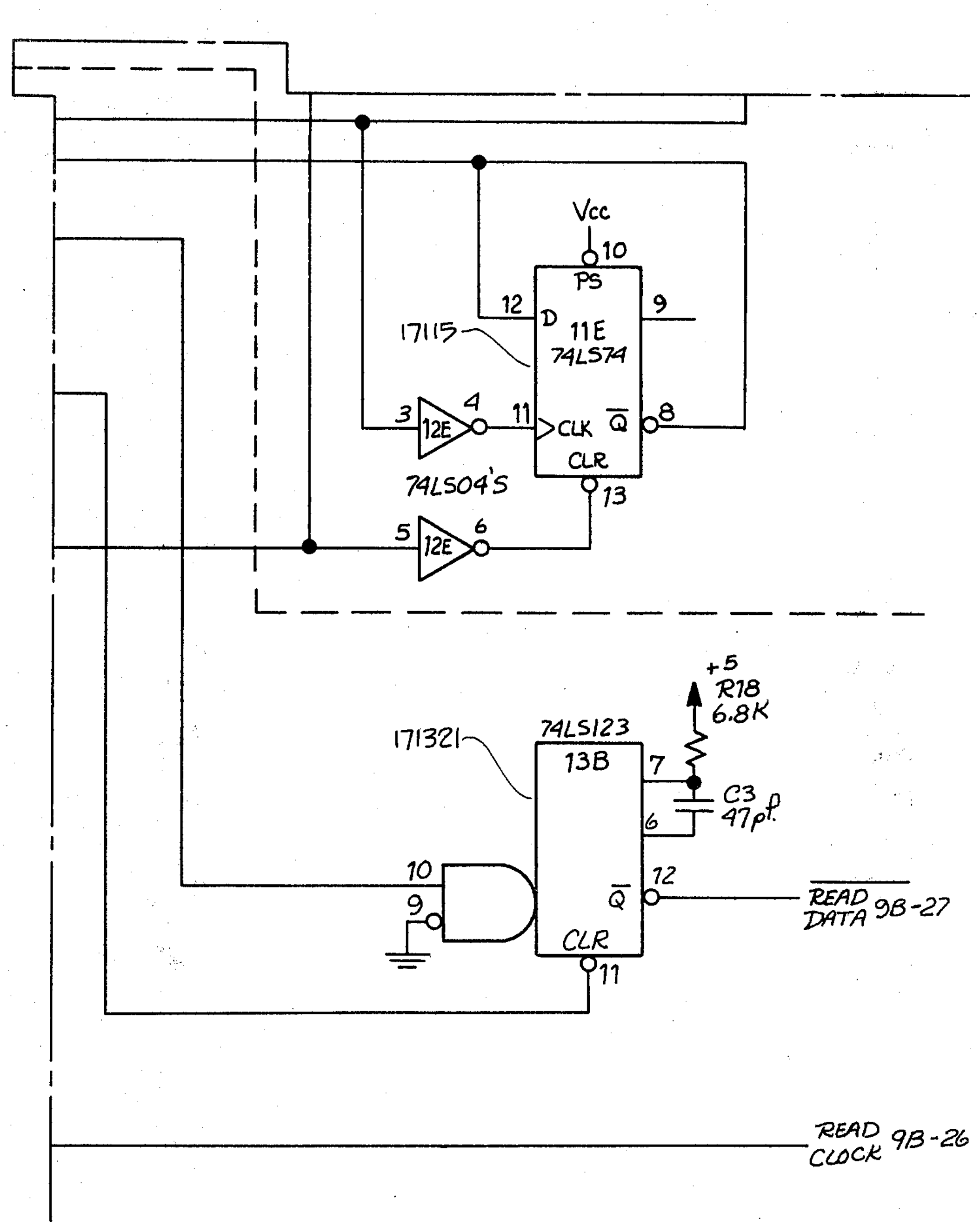

Referring now to FIG. 17, data separator circuitry is provided to synchronize input data. This circuit processes input data (RDDATA) and generates a clock signal (READ CLOCK) which is timed to a read data (READ DATA) signal out. The read clock (READ CLOCK) output signal windows the read data (READ DATA) signal. The READ DATA signal is a pulse approximately 250 nanoseconds wide.

There are two clocks. An oscillator, shown generally at reference numeral 1711 operates at 8 MHz. The oscillator 1711 drives a counter 17123. The counter 17123 divides the 8 MHz frequency into something usable for the different devices. Delta clock (ΔCLK) is tied to the shift register 13111 write data (WD) output. The counter 17123 is a 4-bit synchronous counter. One output of the counter 17123 operates at half the clock frequency; QB operates at 2 MHz; the controller clock (CON CLK) is coupled to the disk controller 1392; QC operates at 1 MHz; and QD operates at 500 KHz. The QD output at 500 KHz drives a signal on the back plane called bus clock (BCK) which is used on the processor to synchronize all the bus requests. A driver 1736 has its input pulled up. It is always active, and drives a signal called bus priority out (BPROUT), which is the source for the priority chain system.

A multiplexer 17105 performs an AND/NOR function. One of the AND input signals on pin 4 is the inverted version of the AND input on pin 2. Either signal, QC or QD of counter 17123, is passed to the output pin 6 of multiplexer 17105, depending upon the state of the double density (DDEN) control signal. The DDEN control signal provides a clock, pin 6 on the multiplexer 17105 which operates at either 1 MHz or 500 KHz, depending upon whether a single density or double density recorded format disk is employed, respectively. The output of multiplexer 17105 is applied as one of the inputs to the multiplexer 171051. The output of multiplexer 17105 is a WRTCLK signal. This is the clock source for disk writing operations.

A voltage controlled oscillator (VCO) 17126 operates at 8 MHz. The read data (RDDATA) input is applied to an inverter 1782, and the oscillator 17126 is synchronized with that data. The read data (RDDATA) signal is applied to a count enable one-shot 1794 which enables a counter 17116. The output of the one-shot 1794 is a signal called FM, applied via multiplexer 17106 to the counter 17116. The one-shot 1794 has a period of approximately three micro seconds.

Input pulses are applied via a buffer 1782 and one-shot 1794, which converts it to three microsecond (FM) pulses to the quad two input multiplexer 17106. Depending upon the state of the select (S) line at pin 1, energized by signal DDEN, either the A or the B inputs are connected to their respective Y outputs.

Counter 17116 detects a string of consecutive zeroes in the data stream. If consecutive zeroes on the disk are not detected, the counter 17116 is reset. Zeroes are detected in order to enable a phase lock loop to be employed to synchronize the counter 17116 when data is not present. Examples of no data are gaps and places in the format of the disk where no information is stored.

The output of the counter 17116 activates a count eight flip flop 17115 when eight consecutive zeroes are counted in the data stream. A count 16 flip flop 17134 driven by counter 17116 is set when 16 consecutive zeroes in the data stream are counted. Information is input in series. As a result, eight consecutive zeroes constitute one byte of data. The outputs of the count eight flip flop 17115 is part of a feedback loop and is applied to a multiplexer 171051. Accordingly, the output of the multiplexer 171051 is either a write clock (WRTCLK) signal or a read data (RD DATA) signal. The output of the multiplexer 171051 at pin 8 is determined by the state of the count eight flip flop 17115. If the count eight flip flop 17115 is set, the output signal of 17105 is the read data (RD DATA) signal. If the count eight flip flop 17115 is reset, the write clock (WRTCLK) signal is output on pin 8 of multiplexer 17105. The synchronizer is thereby enabled to operate close to the anticipated frequency. The anticipated frequency is the write clock (WRTCLK) frequency, since that clock is used to write data. When the synchronizer is not performing a read operation, it stays on or near frequency by applying the write clock for synchronization. When the head is unloaded, this system prevents the VCO 17126 from wildly varying from the proper frequency. When the head is loaded and valid data is read, the count eight flip flop 17115 is set when eight consecutive zeroes are detected. Remaining circuitry is now driven by the read data signal when a valid read operation occurs.

Device 17104 and three exclusive OR gates 171141, 171142 and 171143 comprise starting logic circuitry which synchronizes the VCO 17126 with the data. When a data acquisition operation is initiated, the starting logic circuitry provides control signals to the VCO 17126 forcing the VCO 17126 to start in phase. The output from pin 8 of the OR gate 171143 is the signal that disables the VCO 17126. The VCO 17126 is disabled whenever the input at pin 1 of OR gate 171141 becomes active. Pin 2 of OR gate 171141 is energized by the signal called double density (DDEN). The other input pin 1 of OR gate 171141 is connected to the count eight flip flop 17115.

There are two conditions under which the VCO 17126 must be restarted: when the operation switches from single density to double density; and when a new data acquisition is initiated.

A pump up flip flop 17145 and a pump down flip flop 171451 increase or decrease the frequency of the VCO 17126 respectively. The time difference between the setting of these flip flops 17146 and 171461 determines the difference in phase between the generated output clock and the input data. Flip flops 17145 and 171451 perform a set of phase acquisitions with the data. When the VCO 17126 is in synchronism with the data, the pulse widths of the pump up and pump down flip flops 17145 and 171451, are identical. If the VCO 17126 drifts from its synchronous frequency, the pulse outputs from 17145 and 171451 are no longer identical.

The output of the flip flops 17145 and 171451 are applied to a filter network shown generally at reference numeral 1731. The network includes transistors 17173 and 17174. The filter 1731 is coupled to VCO 17126 input terminal FC1 at pin 2 to increase or decrease the VCO 17126 frequency. The nominal frequency of the VCO 17126 is determined by an external 30 pf capacitor 17123 coupled to the VCO 17126 input terminal pins 4 and 5.

Output signal 1Y at pin 7 from the VCO 17126 is applied to the multiplexer 17106. The signal is also applied to a divide-by-two flip flop 17115. The flip flop 17115 output at pin 8 is coupled to the D input terminal at pin 12. The output from pin 8 of flip flop 17115 is also coupled to the multiplexer 17106. Therefore, the output from the multiplexer 17106 is either the VCO output frequency (8 MHz) or one half the VCO output frequency (4 MHz) nominally. The signal chosen depends upon the condition of the select line of the multiplexer 17106 (double density, DDEN). The output signal from pin 12 of the multiplexer 17106 is coupled to an up/-down counter 17124 and divided by 16. The output from counter 17124 at pin 7 is the read clock (READ CLK) signal, which straddles the read data (READ DATA) output signal.

Data can be acquired if the count eight flip flop 17115 has been set. The RD DATA signal at pin 8 of multiplexer 171051 is applied through a pair of precision one-shots 1795 and 17951. These one-shots 1795 and 17951 are of the type which are stable with temperature and have a 1% tolerance on output. This pair of one-shots 1795 and 17951 has a critical time value associated with it. The output of the one-shots 1795 and 17951 is applied to the multiplexer 17106. The one-shots 1795 and 17951 operate at ¼ bit cell time depending upon whether a single density or double density recording format is used. At double density a bit cell time is two microseconds. Accordingly, the double density one-shot 17951 operates at 500 nanoseconds. The single density one shot 1795 operates at 1 microsecond.

The 3Y output at pin 9 of multiplexer 17106 is applied to the pump up flip flop 17145 at pin 11. The source for the pump down flip flop 171451 is the output signal from a clock 17124. The QC output at pin 6 of the clock 17124 operates at twice the frequency of the QD output at pin 7 of the clock 17124. The Q output on the pump down flip flop 171451 and the Q bar output on the pump up flip flop 17145 are connected to the filter 1731. The Q bar outputs of both flip flops 17145 and 171451 are coupled through an AND gate 17144 to a clear flip flop 171341. When both flip flops 17145 and 171451 are set, the output signal from AND gate 17144 causes the flip flop 171341 to output a signal at pin 9, Q1. This signal is coupled via OR gate 17135 to the clear input on both pump up and pump down flip flops 17145 and 171451 to clear them.

Phase detection circuitry detects data and compares it with the clock 17124. If the clock 17124 begins to operate too quickly, the pump down output of flip flop 171451 becomes wide and it slows the VCO 17126. The opposite effect occurs if the clock 17124 operates too slowly.

There are certain circumstances under which the phase lock loop desirably should be disabled to keep it from acquiring data. One example is when the head is not loaded. Data can be applied to the circuit (RD DATA) spuriously when the head is lifted from the disk due to ambient magnetic flux. Under those circumstances, the phase lock loop should not be attempting to acquire the read data (RD DATA) signal. Similarly, during a head load operation, write operation, or a step operation, the phase lock loop should be deactivated.

To deactivate the phase lock loop, circuitry shown generally at reference numeral 1733 is used. A decoder 17141 generates a zero output signal at pin 15 to disable the phase lock loop, such that the VCO 17126 is caused to run in synchronism with the write clock (WRT CLK) signal. The zero signal of the demultiplexer 17141 at pin 15 becomes active only when the A, B and C inputs to the demultiplexer 17141 are all zero. Write gate (WG) at terminal A is zero; head load timing (HLT) at terminal B is zero; and the output of the step one-shot 17131 at terminal C is zero (indicating that the disk drive is not currently stepping the read/write head and the setting time period has expired).

The enable inputs at pin 6 of the demultiplexer 17141 are energized by a head load (HLD) signal. The inverted enable input pin 4 is driven by a one-shot output signal from a one-shot 17132 which is triggered by a read gate (RG) signal from the disk controller 1392. A low (false) signal from the one-shot 17132 causes the demultiplexer 17141 to be enabled. If the phase lock loop begins to acquire data in a gap on the disk, it generates read data (READ DATA) and read clock (READ CLOCK) signals to the disk controller 1392. If these signals are not required by the disk controller 1392, a read data one-shot 171321 is held reset to prevent the phase lock loop from acquiring data until an appropriate gap is encountered. This provides a mechanism for the disk controller 1392 to disable acquistion and to require a new data acquisition when the disable is removed.

The read data one-shot 171321 is triggered by a signal from the ¼ cell bit output terminal 3Y at pin 9 of multiplexer 17106 to provide a 250 nanosecond pulse to the disk controller 1392. The clear input on the one-shot 171321 is driven by the count 16 flip flop 17134. Accordingly, two consecutive bytes of zeroes enables the one-shot 171321 and data is transferred via the READ DATA signal to the disk controller 1392.

REMOTE KEYBOARD/DISPLAY UNIT MODULE

Reference should be made generally to FIG. 2. The keyboard/display unit is a remote module that contains the keyboard, plasma display, controller and power supply with solid-state relay. This module is cable-connected via one serial interface cable to the electronic system module. Power is supplied to this unit via one 8-foot AC power cord.

The keyboard is used to enter two types of information: text and commands. The text may be letters, numbers, or any special characters available on the keyboard. Commands are instructions to the system for processing the text.

Each of the dual function keys serves two purposes, as indicated by its two-color engraving. For the top (black name) function, the key is normally activated by depressing it. For the bottom (blue name) function, a blue key is depressed concurrently with the function key.

The one-line plasma display allows the operator to see what is being entered from the keyboard. It has a 37 character capacity. The dual display uses the one-line display for three types of communication: prompts, responses, and text.

The keyboard/display controller is mounted in the base of the module and is the interface between the keyboard/display and the electronic system floor module. Upon initialization of the system, two bootstrap PROMs on the controller load a program into 4K bytes of memory, as hereafter described.

All DC voltages required for operation of the keyboard, display, and controller are supplied by a power supply mounted in the base of the module.

The remote keyboard power supply provides all necessary DC vlotages for the keyboard/display controller printed circuit board and keyboard. The power supply consists of four sections: AC power control; integral AC line filter, fuse holder and voltage selector; regulated +5 volts; and regulated ±15 volts. This power supply is a switching type utilized to minimize thermal dissipation within the keyboard enclosure.

The system is modular with operator input modules remote from the electronic module. Each remote module has its own AC line cord that connects to a wall outlet. AC power for the remote module is turned on and off by a solid-state relay. Anytime power is supplied to the electronic module, a signal is sent to activate the solid state relay, which applies AC power to the supply.

The power supply combines several functions. It filters noise from the AC line, provides AC input protection, and allows selection of AC input voltage.

Voltage selection is accomplished with a small printed circuit board that can be inserted in the fuse holder four different ways. The number that can be read with the printed circuit board inserted is the voltage that is selected.

The keyboard/display controller provides the functional link which supports communication between the floor module and the keyboard/display module. Data transmission between the two modules is passed through the controller via an asynchronous communication link.

The keyboard/display controller includes a dedicated 8085 microprocessor which services the keyboard, refreshes the one-line display, and supervises the data passed on the communications link. The controller contains a memory of 256 bytes of PROM and 4K bytes of static RAM. The controller program is soft-loaded from the floor module during system initialization.

The controller includes a serial communications interface to support data exchange between the keyboard-/display module and the floor module. The communications channel is asynchronous, full duplex. The transmission rate and data format are set by the program and established during initialization.

The controller's processor refreshes the display 70 to 80 times per second. This is implemented by utilizing an interval timer sourced from the processor clock to generate a process or interrupt every 354 microseconds. The processor responds to this interrupt by performing a check for the end of the display line. If the refresh scan has not exceeded the displayable line length, the processor then performs a memory write operation to the six display registers with the bit pattern for the next displayable character. The interrupt occurs during the display time for the sixth character column. The processor then has 59 microseconds to respond by loading the first column of the subsequent character before it is displayed. If the scan has reached the end of the display line, the controller processor performs a memory write operation to the display reset register. This returns the display refresh scan to the beginning of the display line.

The controller includes two 8-bit write registers to illuminate keyboard lamps, one write register to pulse the beeper, and one 8-bit input register to receive data from the keyboard. When an operator depresses a key, the keyboard routes the associated code to the controller's input register and activates the data strobe line. This generates an interrupt to the controller processor. When the controller responds to this interrupt by reading the data byte, the acknowledge line to the keyboard is activated and the interrupt line is reset. Repeat key selection and timing is handled under software control.

The keyboard utilizes a scanning technique that allows each keyswitch to be sampled individually. The output of the keyswitch array under scanning is the output of a single switch being interrogated. If the switch is not depressed, there is no electrical output. If the keyswitch is depressed, the electrical output of the switch is buffered to TTL levels by an integrated transistor array device. The output of this buffer is processed by logic devices, resulting in the proper keyboard response.

The keyboard incorporates an LSI device called a "key array logic system." This device is TTL compatible, static discharge resistant, and operates from +5 volts DC and −15 volts DC power supplies. This LSI device provides scanning logic, interlock generation, keyswitch hysteresis, one-character buffer storage, strobe signals, and keyswitch coding assignments.

Coding requirements of the keyboard are accommodated by two single-mask overlays on the LSI part. The keyboard features include N-key rollover, which emulates the mechanical interlock of a selectric typewriter and causes the keyswitch code to be transmitted upon depression of the keyswitch, regardless of the other key stations on the keyboard.

The display used in the dual display is a full-matrix, self-scanning array consisting of 223 columns 7 dots high, for a total 1561 addressable glow cavities (dots). One column is used for panel reset and is not visible to the operator. The display is 7 glow cavities high (1 column) by 222 columns long. This area is sufficient to display 37 characters in a 5-dot wide by a 7-dot high matrix with one blank column for inter-character spacing. The 5-by-7 matrix allows full alphanumeric capability.

FIGS. 18, 19, 20 and 21 taken together are a schematic circuit diagram of multiple remote keyboard display typewriter controller units. This circuit board provides the interface between the floor module, the one line display, the keyboard, an optional printer, and an optional sheet feeder.

There is provided an 8085 processor 1821. In devices 1823 and 1824 there are 256 bytes of PROM.

Static random access memory (RAM) 1834, 1844, 1854, 1864, 1833, 1843, 1853 and 1863 are arranged to provide 4K by 8 bits. Each device is 1K by 4 bits. The RAM is generaly referred to hereafter as reference numeral 18231. These static memories do not require refreshing; data is maintained in the memory as long as power is supplied.

The address data bus AD0 through AD7 is connected from the processor 1821 to the PROMS, 1824 and 1823 and to the RAM 18231. The bus AD0 through AD7 is also connected to a latch 1813 to latch in the upper eight bits of the address. The ALE latch signal from pin 30 on the processor 1821 is applied to latch 1813. The output of latch lines 1813 are connected to the address lines of PROMs 1824 and 1823 and RAM 18231. Additionally, the upper half of the address line bus A8 through A15 is coupled to a driver 1835.

A crystal 1825 connected to the processor 1821 operates at approximately five megahertz. For example, a crystal having a resonant frequency of 5.0688 megahertz may be employed. The same crystal clock is used to drive the USART. Accordingly, the processor 1821 operates at half the resonant frequency.

The ready line of processor 1821 is connected to a +5 volt supply. Thus, processor 1821 operates without wait states. Reset input signal from the associated GPP is applied to receiver 1841 and coupled through device 1856 to the reset input pin 36 of processor 1821. The reset line is used to restart the boot operation. If the controller fails to operate properly, the associated GPP causes a reset signal to be applied to initialize the processor 1821, restarting the boot operation. The reset command passes through the RS232 receiver 1841. The signal is inverted by device 1856 and thereafter energizes a power on clear network 1827, coupled to the processor 1821. The purpose of the power on clear network 1827 is to reset the processor 1821 when power is applied.

There are four special 8085 interrupts in the processor 1821: The trap input at pin 6 is driven by a display service request (DSPSR) signal; the restart 7.5 input at pin 7 is driven by a communication service request (COMSR) signal; the restart 6.5 input at pin 8 is driven by a keyboard service request (KBSR) signal; and the restart 5.5 input at pin 9 is driven by a printer service request (PRSR) signal via an inverter 1836. The interrupt line pin 10, the hold line pin 39, and the ground line pin 20 are all connected to ground.

A clock output (CLK) signal is provided at pin 37 of processor 1821. The reset output at pin 3 of processor 1821 provides a signal called MASTER RESET (MR). This MR output signal is related to the reset input signal applied to the processor 1821.

Write and read signals, pins 31 and 32, and PS1 signal, pin 33, are provided by the processor 1821 to time processor write and read operations. Four address decoders are provided at locations 1845, 1855, 1865 and 1876.

On the GPP when the processor attempted to communicate with a peripheral device, it generated an input or output instruction. In contrast, however, rather than having to decode input/output instructions, a memory mapped I/O technique is employed here. As a result, the various registers, whether they are in components or are separate components themselves, are handled as if they were particular memory locations by the processor 1821.

Memory mapped I/O facilitates decoding on the board. Another benefit is that the processor 1821 can execute a wider range of instructions to move data in and out of memory, than are required to move data in and out of I/O devices. To perform I/O operations, the processor 1821 has the input/output instructions, data must be moved into and out of the accumulator in the processor 1821. With memory mapped I/O, however, a whole range of instructions can be used. Data can be moved into or out of any of the registers within the processor 1821. This technique is effective when limited memory is required. Address space need not be reserved.

The decoder 1845 handles the memory on the circuit board. The decoder 1845 has three gate inputs. The two negative active gate inputs pins 4 and 5 are connected to the most significant address line pin 9 of decoder 1835. Line A15 must be zero in order to enable the decoder 1845. The other gate line at pin 6 of decoder 1845 is connected to pin 6 of an OR gate 1875. One of the OR gate 1875 inputs is driven by the read (RD) signal at pin 32 of processor 1821 via a buffer 1874. The other input to the OR gate 1875 is driven by the write (WR) signal at pin 31 of the processor 1821 via a buffer 18741. The output of this OR gate 1875 is active when the processor 1821 is performing a read or a write operation.

The A, B and C inputs of the decoder 1845 are coupled to bus lines A12, A10 and A8 respectively via decoder 1835. The zero output of the decoder 1845 is coupled to the CS1 terminals of PROMs 1823 and 1824. The PROM is activated when a zero is applied to the A, B and C inputs of decoder 1845. When the processor 1821 starts processing, it executes the bootstrap, starting at location 0. The program is located at the beginning of memory.

The 1 output of the decoder 1845 is tied to the chip enable input terminals of the RAMs 1833 and 1834. Correspondingly, the 2, 3, and 4 outputs of the decoder 1845 are coupled to the respective RAM, 1843, 1844, 1853, 1854, 1863 and 1864. There are 4,096 (equivalent to 1,000 hex) bytes of RAM. In hexadecimal the RAM occupies locations 400 through 1400; the PROM is located below that.

Figure 18:
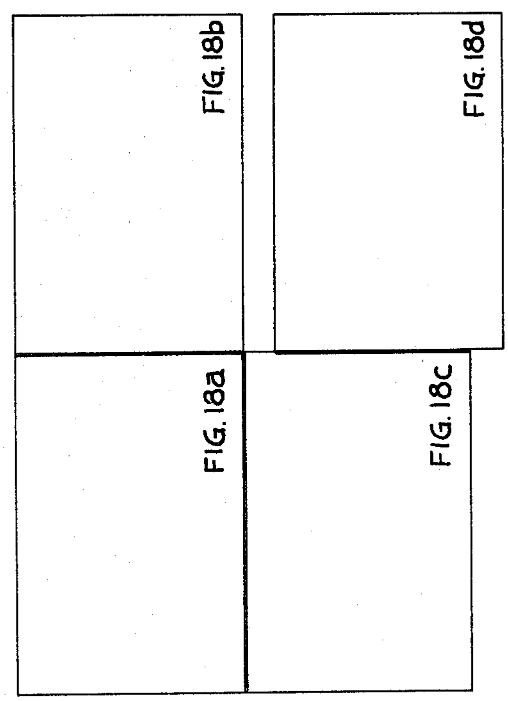
FIGS. 18, 19, 20, and 21, which are interconnection diagrams of FIGS. 18*a* through 18*d*, 20*a* through 20*d* and 21*a* through 21*c* and a diagramatic representation which when taken together are a typewriter remote keyboard display unit controller schematic circuit diagram and a diagramatic representation of a one-line display for use with the typewriter remote keyboard display unit controller.
Figure 18A:
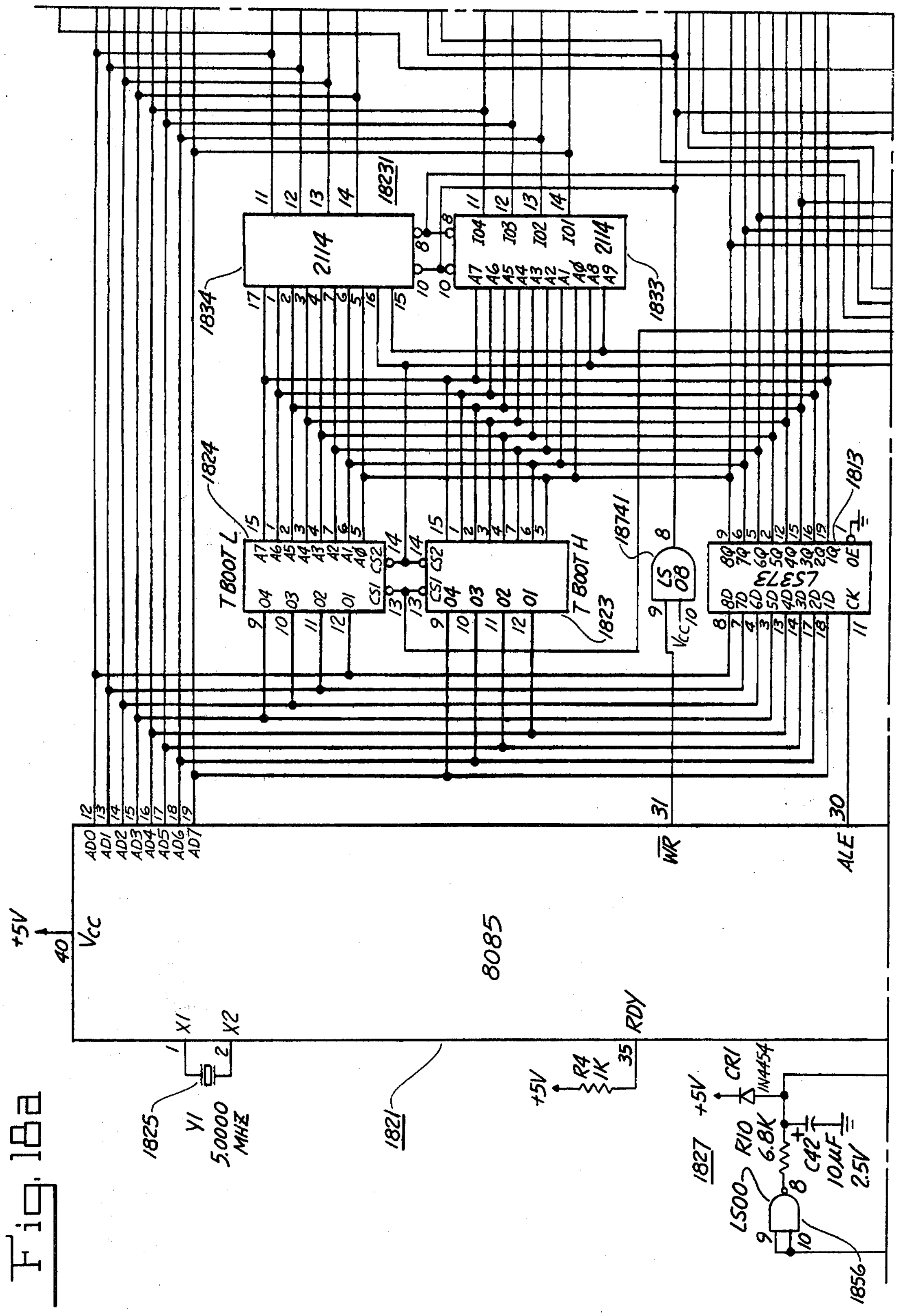
Figure 18B:
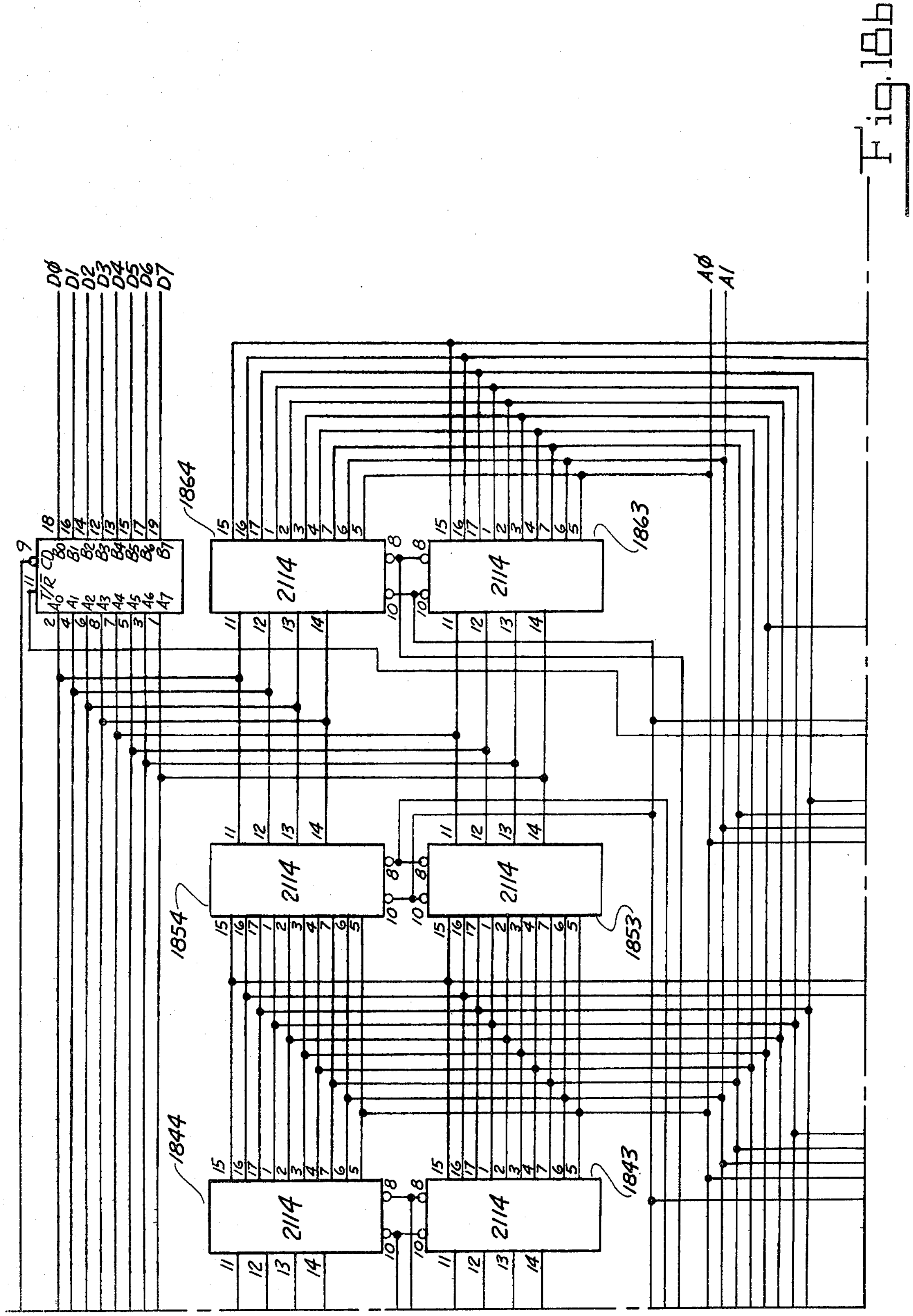
Figure 18C:
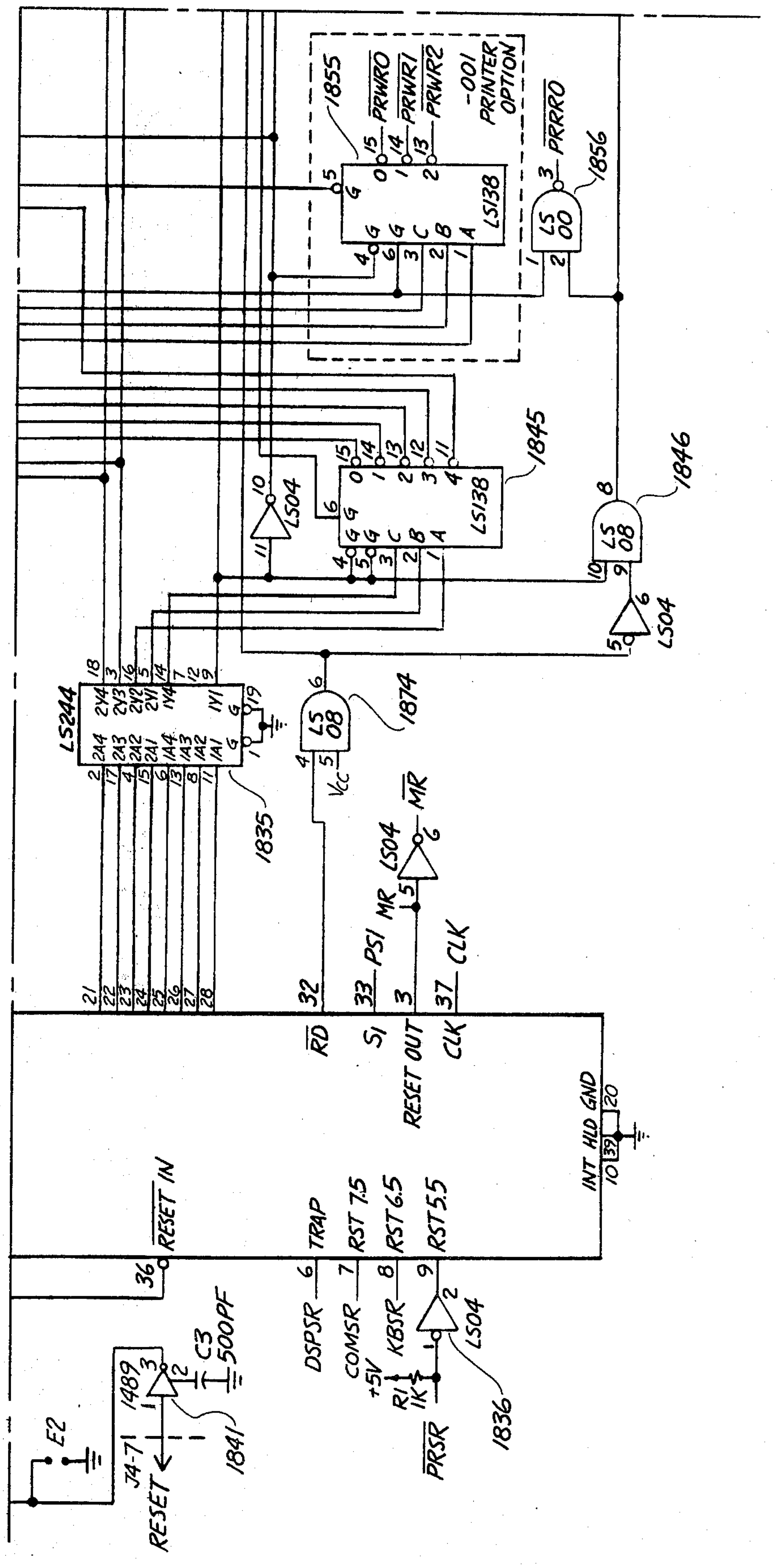
Figure 18D:
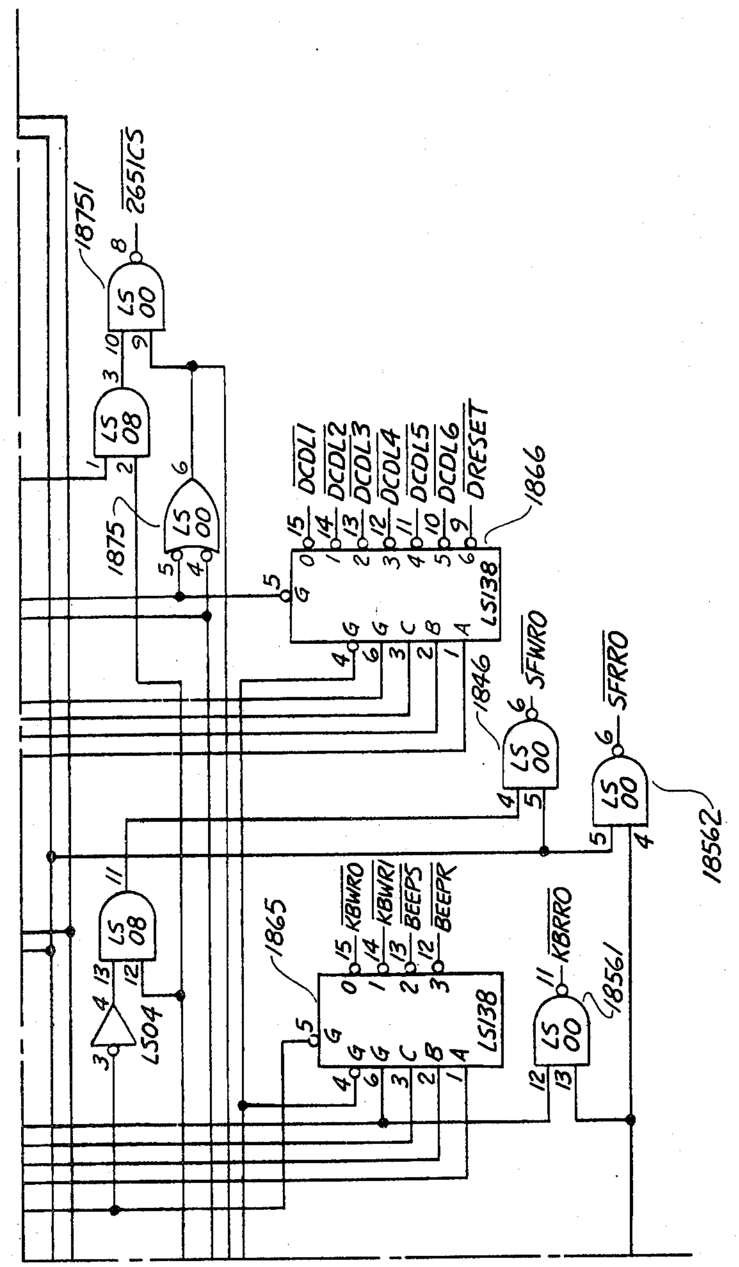

A decoder 1855, enclosed in dashed lines of FIG. 18, is an optional part. If no printer is provided on the system, the decoder 1855 is not required. The decoder 1855 decodes the addresses used by the printer. The 0, 1 and 2 outputs of 1855, associated respectively with write register zero (PRWR0), printer write register one (PRWR1), and printer write register two (PRWR2), correspond to addresses 8020, 8021 and 8022 hex. They are enabled when the most significant address bit is set. All of the I/O registers on the board are located in the address space above 8,000 hex, in the upper 32K of the memory. The output of an AND function 1856 is printer read register zero (PRRR0), corresponding to address 8020 hex. If the processor 1821 performs a write operation to address 8020 through 8022, it writes into printer write registers 0 through 2; a read from 8020 reads from printer read register zero.

Decoder 1865 communicates with the keyboard. Two outputs of the decoder 1865 are keyboard write register zero (KBWR0) and keyboard write register one (KBWR1). These registers hold the information that controls the keyboard lights. Two lines from decoder 1865, marked beep set (BEEPS) and beep reset (BEEPR), turn the oscillator associated with the keyboard, not shown, on and off to drive the beeper, not shown. Keyboard write register zero and keyboard write register one corresponds to address 8040 and 8041 hex. The beep set line corresponds to address 8042 and the beep reset line corresponds to address 8043. The output of an AND gate 18561 is a signal called keyboard read register zero (KBRR0), corresponding to address 8040 hex. This address is the data register. When a key of the keyboard is depressed, the processor 1821 reads address 8040 hex to determine the data.

A decoder 1866 allows the system to write to the registers used to hold the column information for the display. Output lines from the decoder 1866 are designated display column one through six (DCOL1 through DCOL6). The lowest output is marked display reset (DRESET). Those outputs (DCOL1 through DCOL6, DRESET) correspond to addresses 8080 through 8086. This is a decode to write into those registers only.

An output of AND gate 1846 is designated sheet feeder write register zero (SFWR0). It provides the strobe for the sheet feeder register. An AND gate 18562 provides a sheet feeder read register zero (SFRR0) signal. One of the inputs of AND gate 18562 is connected to an output terminal of decoder 1835 which is activated by address bus A8. The other input to AND gate 18562 is a combination of the read signal (RD) from pin 32 of the processor 1821 and an output of decoder 1835 energized by address line A15. These signals are combined in an AND gate 1846 and applied to AND gate 18562. Signal SFRR0 corresponds to location 8100 hex.

The output of NAND gate 18751 is a 2651 chip select (2651CS) signal. The chip select becomes active for addresses 8010 hex through 8012 hex, corresponding to the four read and four write registers in device 1842.

ONE-LINE DISPLAY

Figure 19:
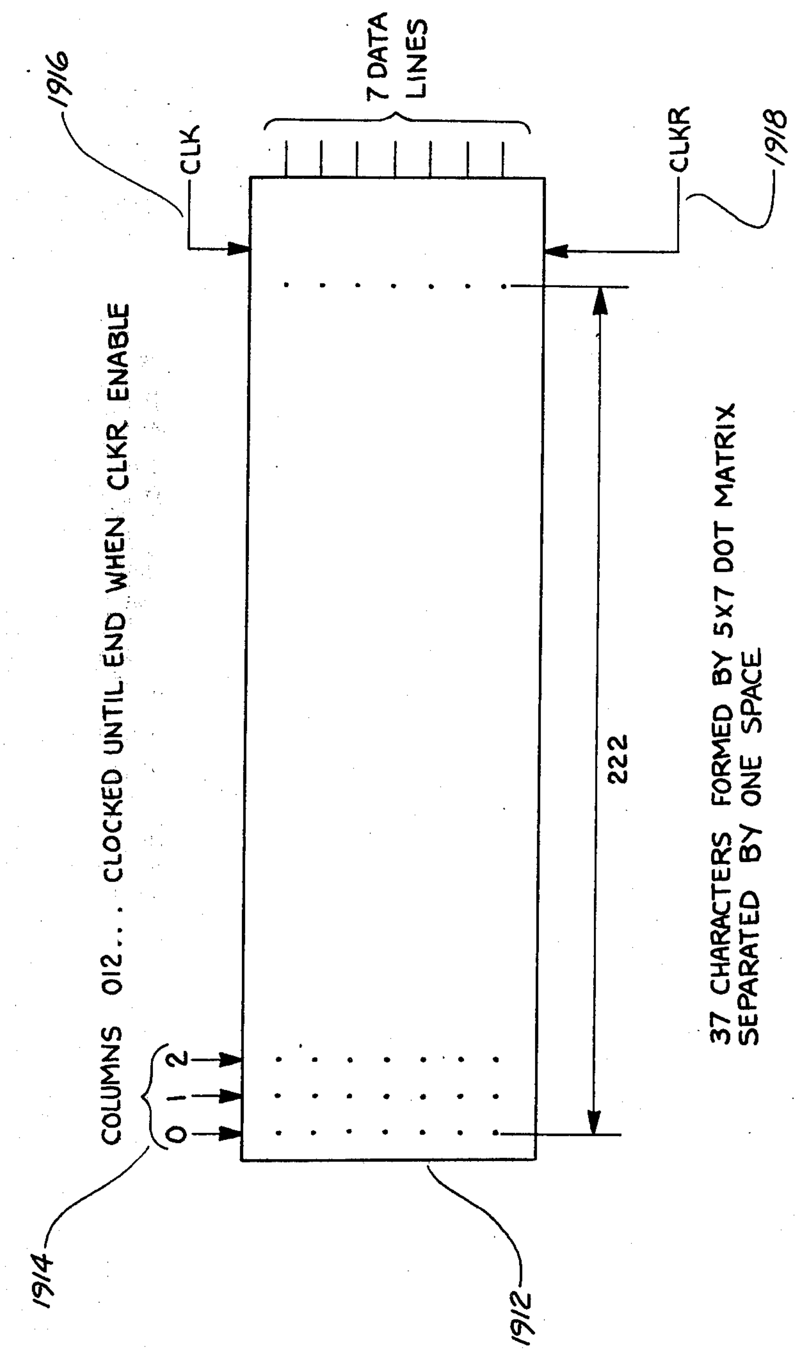

Referring now to FIG. 19, a one-line display 1912 such as a Burroughs plasma display, is composed of 222 columns 1914, each column having 7 dots or visual markings. The dots can be turned on and off.

Circuitry in the display 1912 performs a scanning operation. Seven lines of data information are fed to the display. A clock (CLK) signal and a clock CLKR reset signal 1918 are provided. The display starts at the left and turns on dots that correspond to the data provided on the data input lines. A clock transition is fed to the display. The pointer moves over to the next column. The data is changed and the dots in the next column are energized until the 222th column at the end of the display 1912 is reached. After that column is displayed the clock reset (CLKR) signal is applied to reset the display 1912 to the leftmost column 1914.

The 222 columns 1914 provide room for 37 5-by-7 characters with one column of space between the characters.

Figure 20:
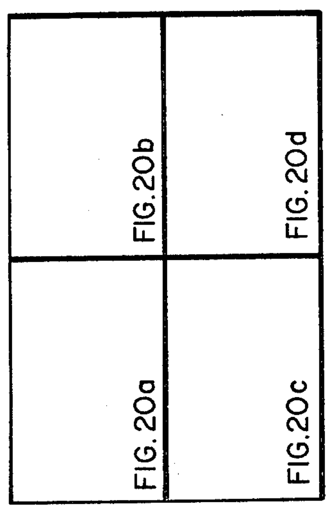
Figure 20A:
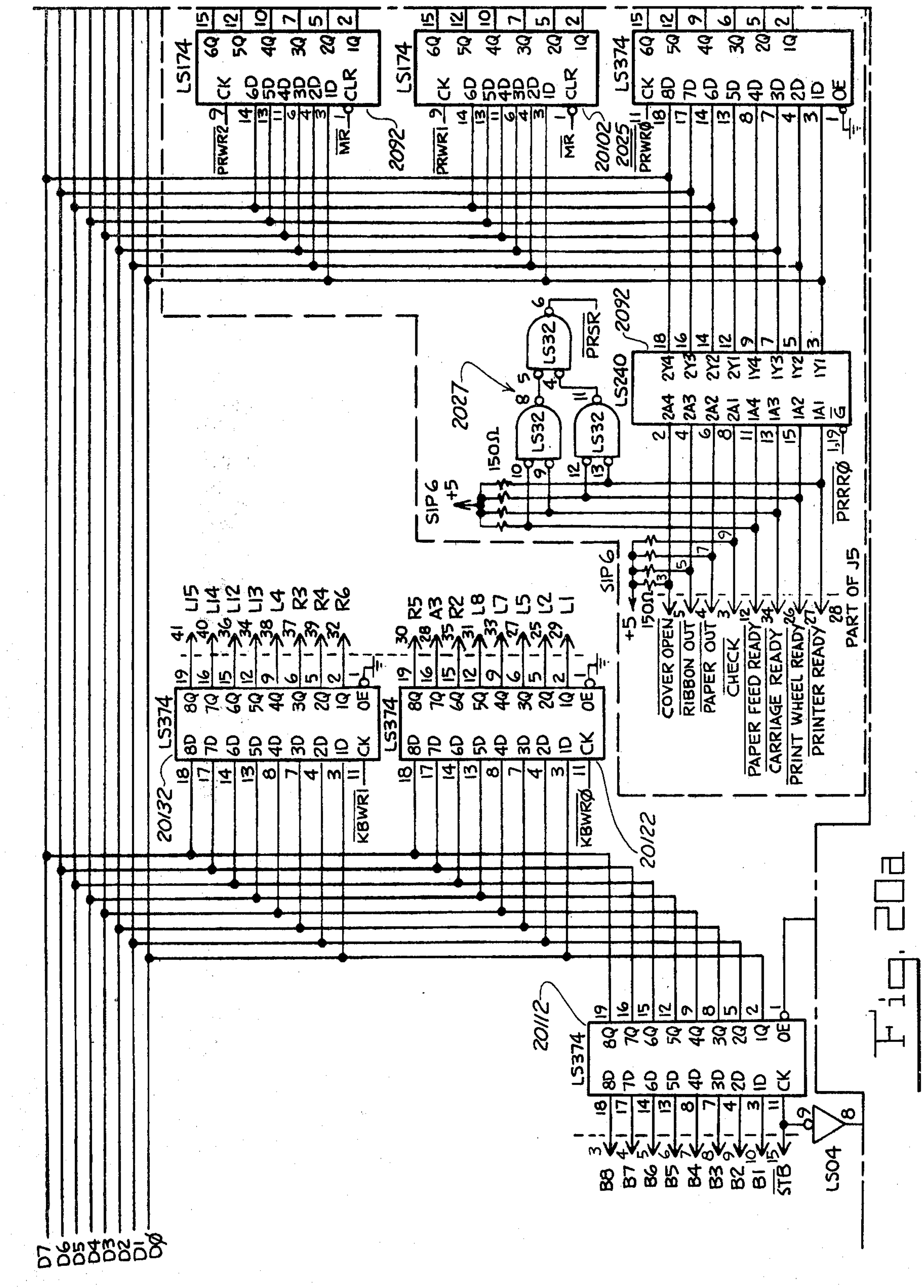
Figure 20B:
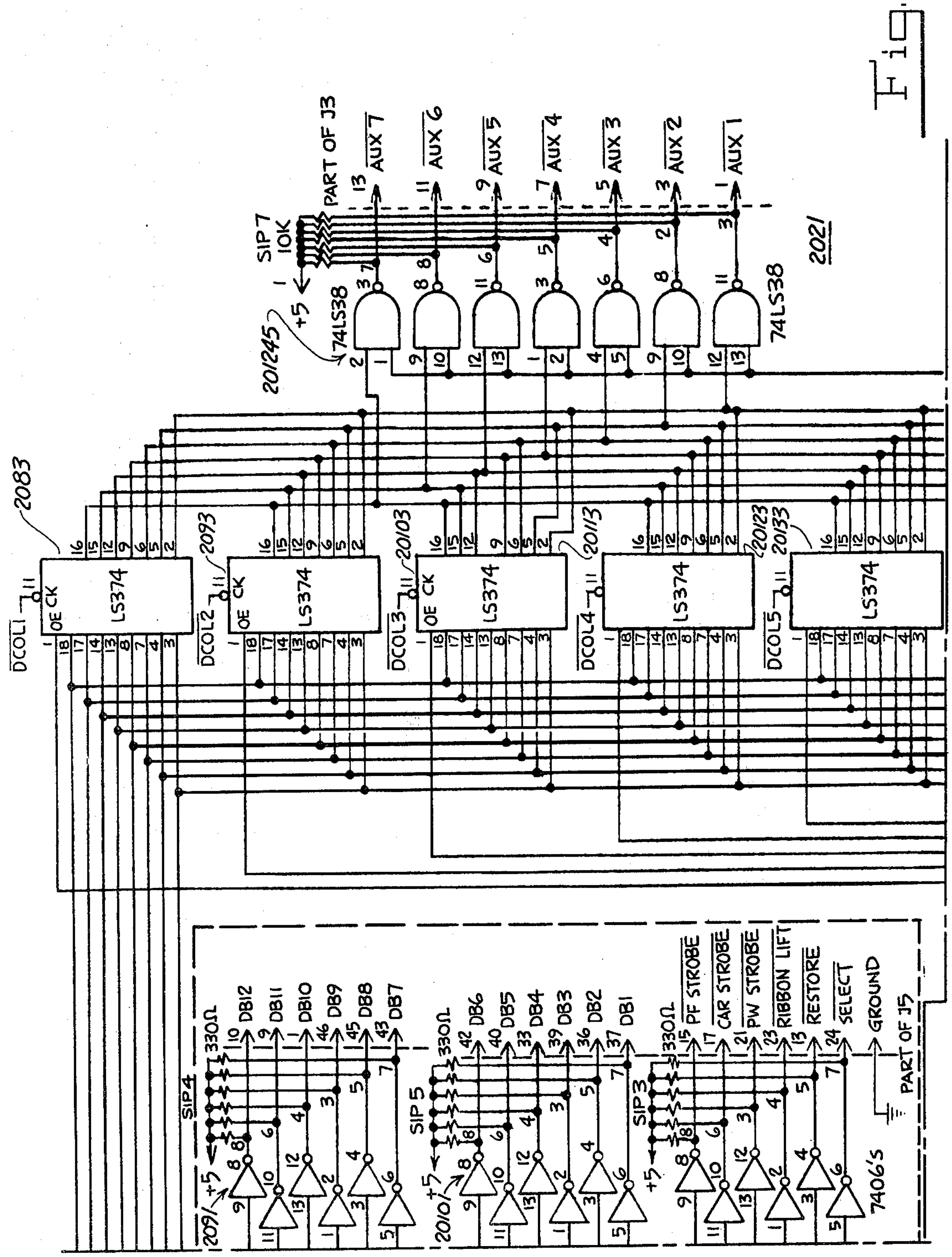
Figure 20C:
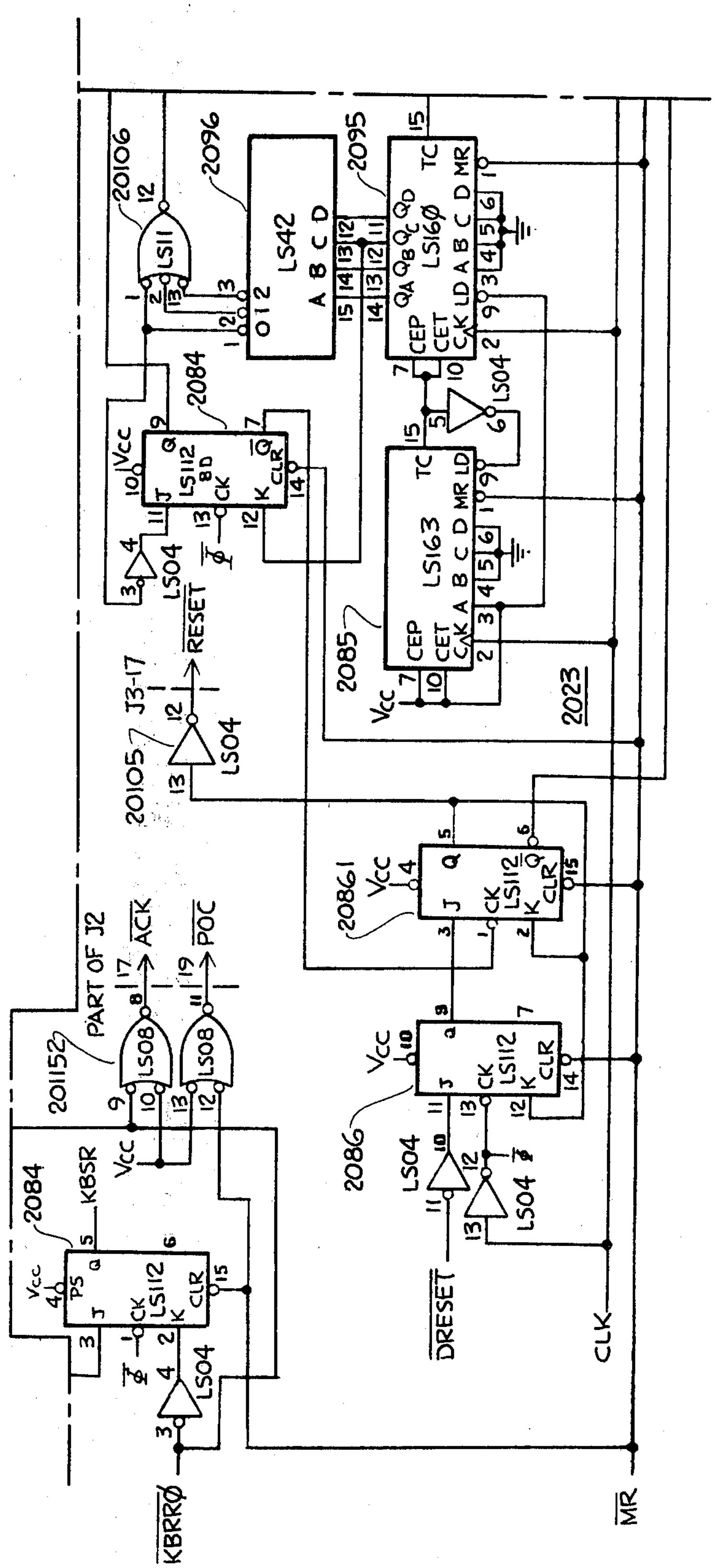
Figure 20D:
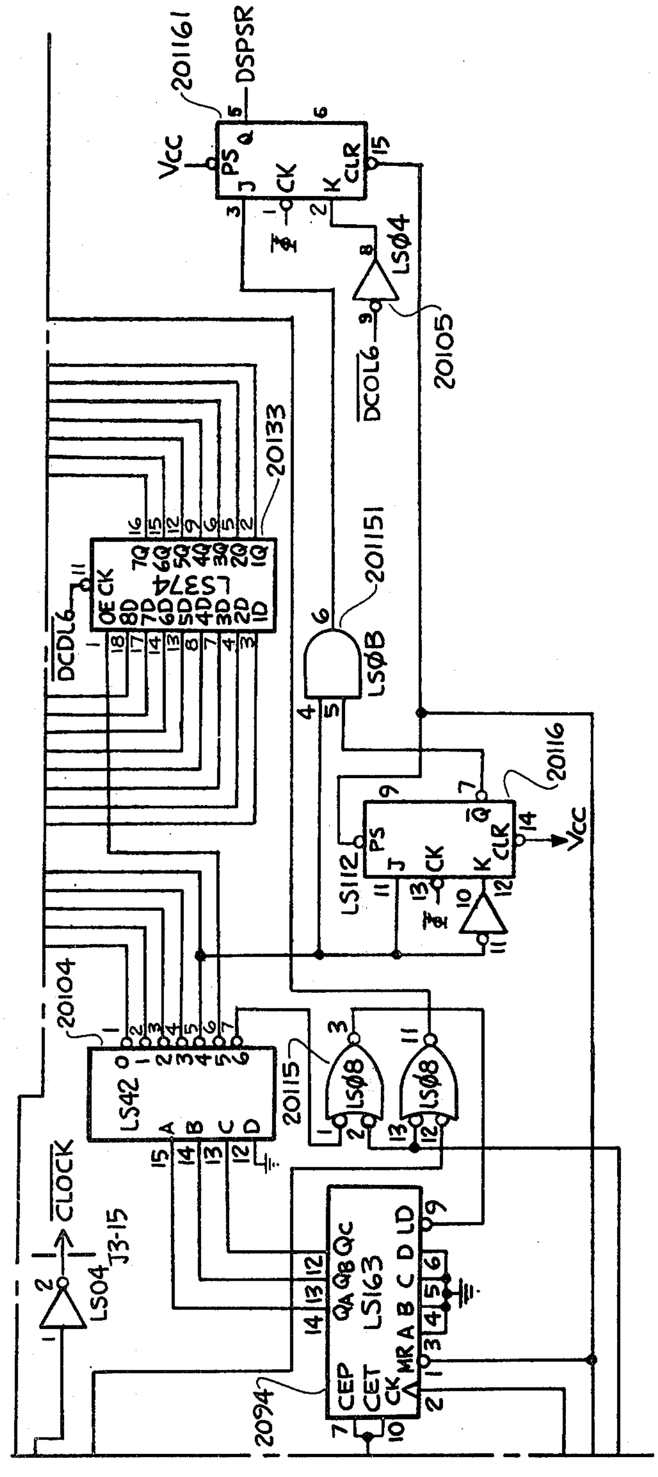

Referring also to FIG. 20, a display interface, shown generally at reference numeral 2021, is shown. Seven lines AUX1 through AUX7 drive the column of dots on the one-line display 1912. A series of six latches 2083, 2093, 20103, 20113, 20123 and 20123 is used to store column information for a particular character. Although character size is 5-by-7, there are six columns of data to allow for special features such as reverse video. The sixth column (space between characters) can therefore also be reversed.

Timing circuitry for the display 1912 is shown generally at reference numeral 2023. A clock is provided to refresh the display 1912 70 to 80 times per second for a Burroughs type display to avoid flicker.

New character information must be provided to the display approximately every 350 microseconds. The processor updates the six latches 2083 through 20133 every 350 microseconds. The processor supplies data for a full character (six columns of data). The six registers are accessed serially, column by column, and exhibited on the display 1912. The display 1912 is updated with the new column of information approximately every 60 microseconds.

Referring now to FIG. 20, a clock input (CLK) signal drives a series of three counters 2085, 2095, 2094 in succession. Counter 2085 is a divide by 16; counter 2095 is a divide by 10; and counter 2094 is a divide by 16.

The output of the divide by 10 counter 2095 is applied to a decoder 2096. The 0, 1 and 2 outputs of the decoder 2096 are applied to an OR gate 20106. The QC output on counter 2095 is applied to the K input of a flip flop 2084. This flip flop 2084 is used for wave shaping the clock (CLOCK) signal drived by the QC output at pin 9 of flip flop 2084. Flip flop 2084 is set by the 0 output of the decoder 2096 and is reset by the QC output of the counter 2095. The timing generates a clock signal suitable for driving the display 1912 in synchronism with the data applied to the display data lines.

The Q outputs of device 2094 are applied to a decoder 20104. The outputs of the decoder 20104 are applied to the output enable lines of the six registers or latches 2083 through 20133. Accordingly, as the counter 2094 steps from state to state, the six latches are successively enabled. Since the outputs of the six latches 2083 through 20133 are connected in parallel to form a bus, the sequential enabling of the latches 2083 through 20133 serves to time multiplex the latch output bus. The output of that bus is applied through a set of high current drivers shown generally at reference numeral 201245 to the inputs of the display 1912.

A NOR gate 20115 has an input connected to the output of decoder 20104. This line is applied to column seven and through device 20115. The output of device 20115 drives the load input (LD) at pin 9 of counter 2094. The A, B, C and D terminals of counter 2094 are all grounded. These pins A, B, C, and D set the counter 2094 to a particular state. Accordingly, when the counter 2094 reaches column seven, which does not exist on the display, it is reset to state zero.

A flip flop 20116 develops a signal one Φ clock period wide. An associated gate 201151 drives the flip flop 201161 to derive the display service request (DSPSR) signal. The DSPSR signal is applied to the trap interrupt in the processor 1821 so that the processor 1821 services the registers 2083 through 20133 to provide new data. The J input on the service request flip flop 201161 is set whenever column five, pin 4 of counter 20104 is energized. Thus, every time the display 1912 is fed column five information, flip flop 201161 is set to indicate to the processor 1821 that another character must be transferred.

The service request flip flop 201161 is reset by a signal called display column six (DCOL6) applied to its K input via buffer 20105. DCOL6 is generated by device 1866, pin 10. When the processor 1821 loads column register six, which is the last column register, the service request flip flop 201151 is reset. Registers are sequentially loaded from zero to six, so that register six corresponds to display column six. When the last register is loaded, a new character is present.

A D-reset (DRESET) corresponds to a write to address 8086 and is applied to flip flop 2086 coupled to flip flop 20861 to generate the reset signal at pin 5 of 20861. The reset signal is applied to a buffer 20105 whose output is a two clock period reset signal.

The rest of the circuitry on this circuit board is used to interface the keyboard and the printer. Data bus D0 through D7 drives a pair of latches 20132 and 20122. The clock inputs on the latches 20132 and 20122 are keyboard write register zero (KBWR0) and keyboard write register one (KBWR1) signals.

Output enable the latches 20132 and 20122 are grounded and thus active. The outputs of these gates 20132 and 20122 drive the lamps on the keyboard. The data bus D0 through D7 is also connected to a latch 20112. The input signals from that latch 20112, B1 through B8, are the data lines from the keyboard.

The clock line (CK) at pin 11 of latch 20112 is energized by the keyboard (STB) signal. Accordingly, when a key is depressed, the strobe output goes active to generate a pulse on the strobe line. That data is transferred into the latch 20112.

The strobe line also sets a flip flop 2084. The output of flip flop 2084 is a signal called keyboard service request (KBSR), which is connected to the restart 6.5 line pin 8 of the processor 1821. When a key is depressed, a keyboard service request is generated and information is latched into the latch 20112.

When the processor 1821 is available to accept data, it reads keyboard read register zero (KBRR0), address 8040. The keyboard service request is then cleared at pin 5 of flip flop 2084. The output enable terminal is also on the latch 20112. Accordingly, the data in latch 20112 is passed to the data bus and back to the processor 1821. This operation is communicated to the keyboard encoder by an acknowledge (ACK) bar signal from OR gate 201152. The keyboard can transfer a new piece of data on the line if another key is depressed.

The printer interface referred to generally at reference numeral 2025, enclosed by dashed lines on FIG. 20, is optional depending on the system configuration. The printer requires 12 lines of data and six lines of control information. It provides eight lines of status information.

Two hex-D latches 20102 and 2092 are connected to data bus lines D0 through D5. The clocks on these two latches 20102 and 2092 are printer write register one (PRWR1) and printer write two (PRWR2), corresponding to addresses 8021 and 8022. The outputs of latch 2092 are coupled to the printer via inverting driver shown generally at reference numeral 2091. The outputs of latch 20102 are coupled to the printer via inverting drivers shown generally at reference numeral 20101.

The 12 bits represented by these output lines DB1 through DB12 are used to transfer carriage motion, printwheel motion and paper motion information. An octal-D control register flip flop 2082 is connected to the control lines on the printer. The control lines are marked SELECT, RESTORE, RIBBON LIFT, PRINTWHEEL (PW) STROBE, PAPER FEED (PF) STROBE and CARRIAGE STROBE.

The data registers 2092 and 20102 are loaded first. Then the appropriate stobe lines of flip flop 2082 are activated. The address for control register flip flop 2082 is 8020. The PRWR0 signal at pin 11 of flip flop 2082 is the clock for 2082. A printer status register 2072 is connected to printer read register zero (PRRR0) at address 8020. If the register 2072 is accessed by the processor 1821, the status of selected input signals is read. The input signals to register 2072 are: COVER OPEN, RIBBON OUT, PAPER OUT, CHECK, PAPER FEED READY, CARRIAGE READY, PRINTWHEEL READY, and PRINTER READY.

The CHECK signal denotes whether the printer is able to perform the operation requested. Those signals are transferred directly by register 2072 when the processor performs a read operation.

Gate circuitry shown generally at reference numeral 2027 is coupled to the PRINTER READY, CARRIAGE READY, PRINTWHEEL READY, and PAPER FEED READY lines. All four of those signals are input to a NAND gate. When all are active, a printer service request (PRSR) signal is generated to restart 5.5 pin 9 of the processor 1821. When the printer is ready to perform an operation (all of its lines are active), it generates a ready signal to the processor 1821.

Figure 21:
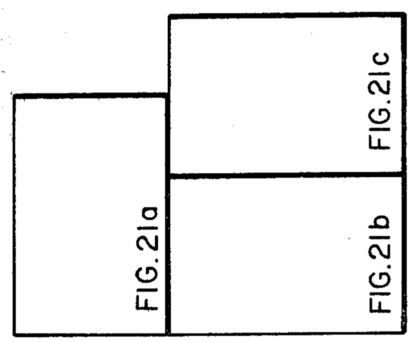
Figure 21A:
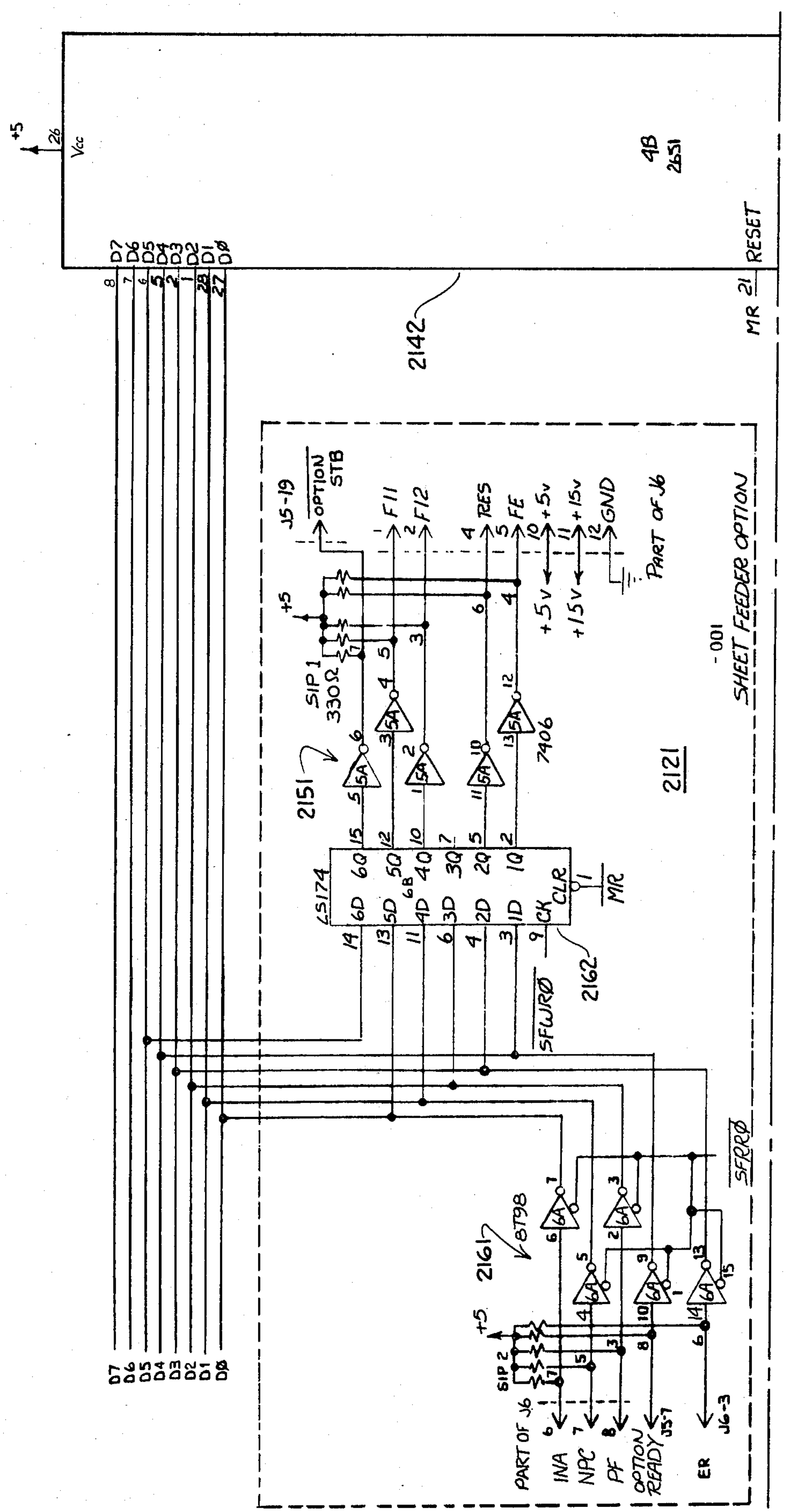
Figure 21B:
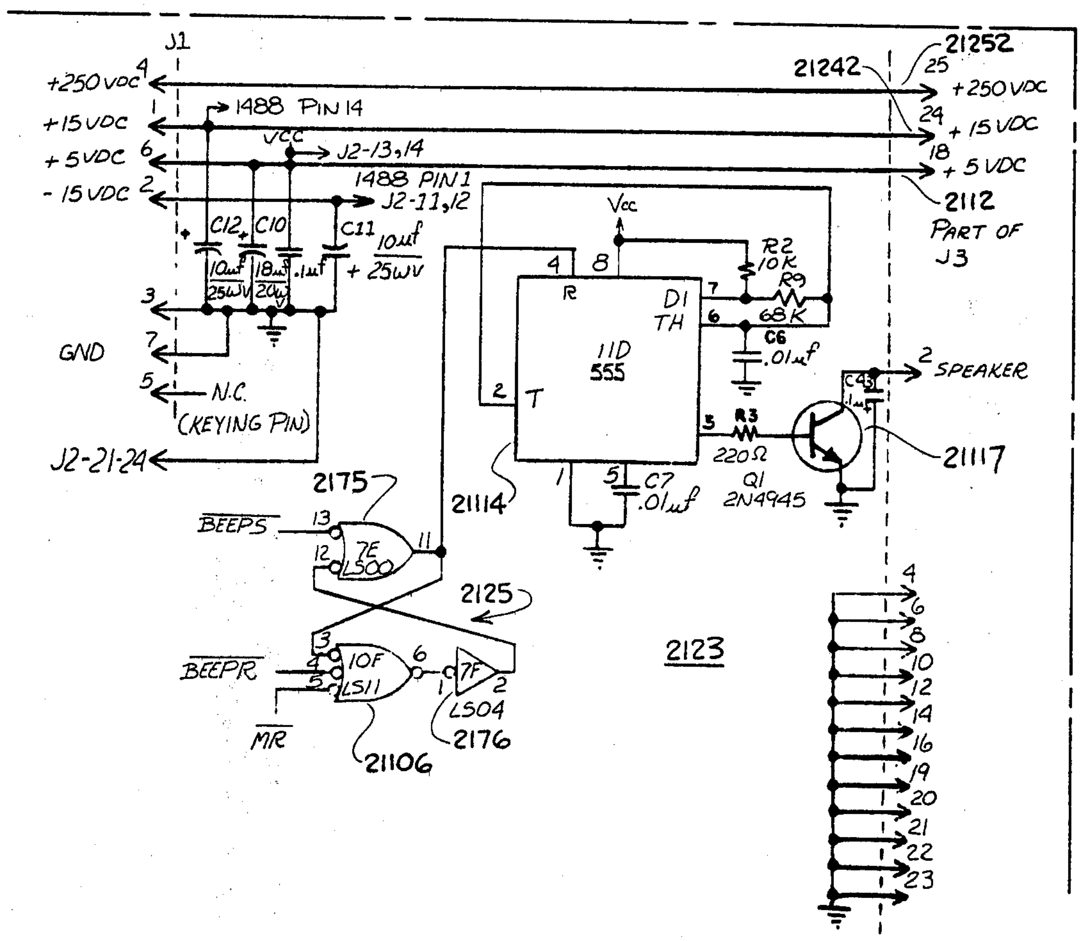
Figure 21C:
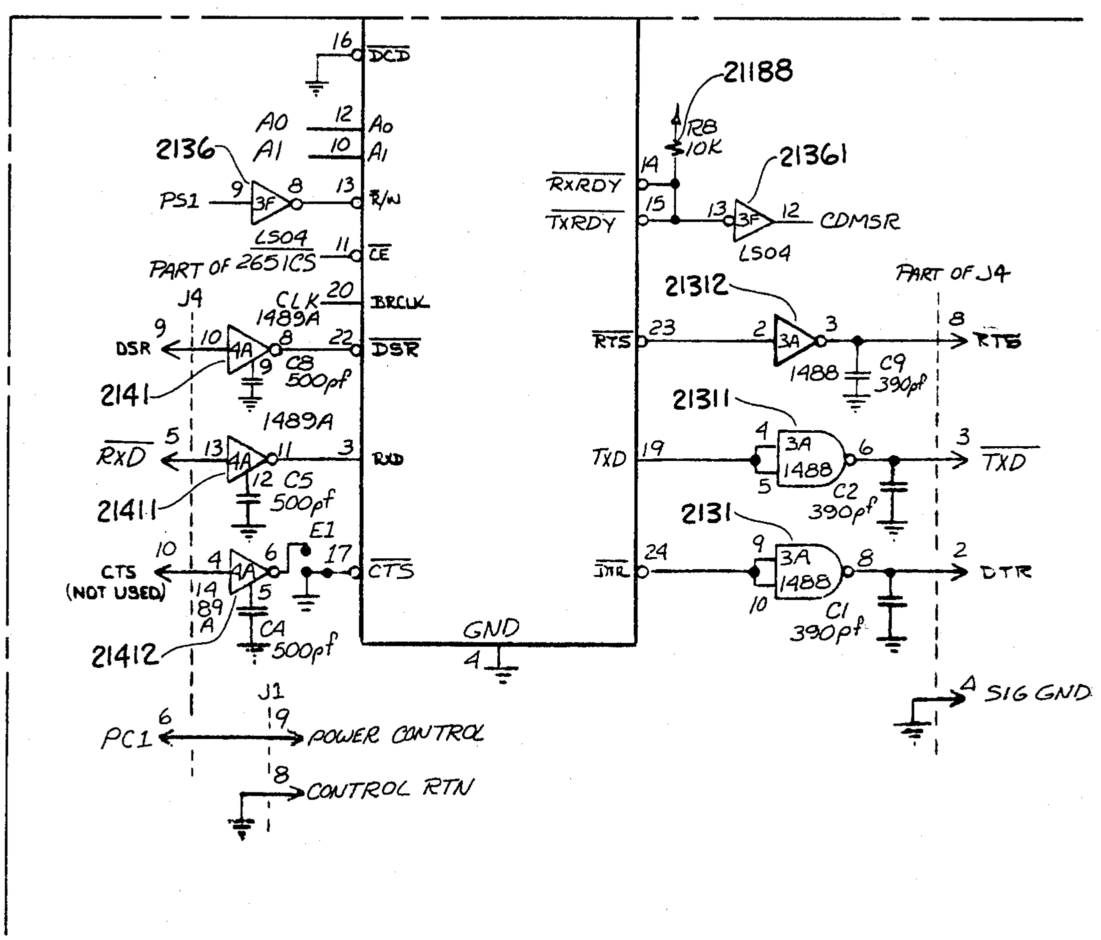

Referring now to FIG. 21, a USART serial communication device 2142 is provided to communicate with the floor module. The data bus DB0 through DB7 is connected to the USART 2142. The reset pin 21 is connected to the master reset (MR) signal. A carrier detect (DCD) line is tied to ground and is therefore active to enable the USART 2142 to receive data. A0 and A1 lines pins 12 and 10 are driven by the two least significant address lines of the processor 1821 to control the internal registers of the USART 2142 which are being utilized. The read/write (R/W) register is energized by the PS1 signal from the processor 1821 via buffer 2136. This PS1 signal is false for read operations and true for write operations. The chip enable (CE) terminal at pin 11 of USART 2142 is energized by 2651CS from decoder 1275. The baud rate clock (BRCLK) signal at pin 20 is energized by the CLK signal.

A 2651 type USART is normally operated with a five megahertz signal. USART 2142, however, is operated by a 2.5 megahertz clock signal. Accordingly, the output frequencies are shifted and if the USART 2142 is made to operate at what would normally be 9600 baud, it actually operates at 4800 baud.

Between the USARTs of the typewriter controller and the floor module, communications are attempted after power up at the maximum rate (9600 baud). If communication cannot be accomplished, both step down to 4800 baud; if not there, they step down to 2400 and so on until they reach the proper frequency, as low as 300 baud.

A data set ready (DSR) input signal is applied to pin 22 of USART 2142 via a buffer 2141. It provides a control line to the USART 2142 to indicate whether the transmission was successfully received. A receive data (RXD) signal is coupled to a buffer 21411.

A clear to send (CTS) terminal pin 17 of USART 2142 is connected to ground. The clear to send (CTS) control line allows data transmission. Terminals are configured so that the CTS terminal pin 17 can be energized by appropriate circuitry in the floor module via a buffer 21412. But for the common configuration, it is tied active at all the times.

A data terminal ready (DTR) signal at pin 24 is coupled through a driver 2131 to the floor module. A transmit data (TXD) signal at pin 19 is connected to a driver 2134. The request to send (RTS) control signal is coupled to a driver 21312. A transmitter ready (TXRDY) line and a receive ready (RXRDY) line are wired together with a 10 K ohm pull-up resistor 21188. They are inverted by inverter 21361 to generate a communication service request (COMSR) which drives the restart 7.5 line on pin 7 on the processor 1821.

A POWER CONTROL line and return (CONTROL RTN) is connected between connectors J4 and J1 to pass a signal from the floor module through the typewriter controller to the power supply, not shown. The power supply has a solid state relay, activated by the POWER CONTROL signal. Therefore, keyboards can be activated by the floor module. A sheet feeder option is shown enclosed by dashed lines on FIG. 21 at reference numeral 2121. A register 2162 is energized by a sheet feeder write register zero (SFWR0) signal at pin 9. The output of that register 2162 is applied to a cluster of drivers shown generally at reference numeral 2151. Tri-state drivers, shown generally at reference numeral 2161 are directly connected to the sheet feeder and gated by a sheet feeder read register zero (SFRR0) signal from the decode circuitry 181962 and are connected to both the register 2162 and the data bus D0 through D7.

A beeper 2123 is provided for the keyboard. A set of devices including 2175, 21106 and 2176 are interconnected to act as a set/reset flip flop circuit 2125. The flip flop circuit 2125 is energized by a beep set (BEEPS) signal from pin 15 of device 1865 and a beep reset (BEEPR) signal is generated by pin 12 of device 1865. The output of flip flop circuit 2125 is connected to an oscillator 21114 to turn the oscillator 21114 on and off. The output of the oscillator 21114 drives a transistor 21117, the collector electrode of which is tied to a speaker, now shown. The speaker is energized by +5 volts DC from lead 2111. Five volt, 15 volt and 250 volt power lines at leads 2112, 21242 and 21252 lines respectively drive the display 1912.

CRT CONTROLLER SYSTEM MODULE

The CRT system module is a desk-top unit containing a full page monitor, CRT receiver and power supply with solid state relay. This module is cable-connected via one 10-foot serial interface cable to the electronic system floor module. Power is supplied via one 8-foot AC power cord.

The CRT displays a full page of text (66 lines) exactly as it appears when printed. Text appears on the screen with the right margin justified when proportional spacing is specified. Non-printing characters, such as embedded commands, are not shown on the CRT.

The high-resolution CRT displays text as light green characters against a dark background. During editing, text is high lighted in bold with solid underscore of four scan lines. The zoom feature doubles the height of the characters of a portion of the page for better visibility.

The CRT module power supply provides two regulated outputs: +56.5 volts DC for the CRT and +5 volts DC for a line receiver printed circuit board. It is a switching supply with current limiting and over-voltage protection.

The AC input passes through an RFI filter and is rectified, doubled and filtered. This raw DC is supplied to switching transistors. AC is also stepped down, rectified and filtered to provide a bias supply for the regulating pulse width module integrated circuit and its transistors. For 230-volt operation, a strap is moved so that the voltage doubler is removed from the raw DC circuit, and the full transformer winding is used in the bias supply.

The heart of this supply is a pulse width modulator IC. It contains circuitry for controlling the switching transistors, output sensing and current limiting. The pulse width modulator IC is transformer-isolated from the rest of the supply. Switching frequency is inaudible.

Raw DC is switched on and off to the primary winding. The multi-tapped secondary outputs are rectified and filtered. The 56.5 volts is directly output. The voltage is further regulated by a 5 volt linear IC regulator. The 56.5 volt output is sensed by the pulse width modulator IC to control on/off transistor switching times to maintain regulation.

Current flowing in the primary winding is transformer-coupled to the pulse width modulator IC. If excessive current is sensed, the current limiting function is activated, and output current is held low until the short is removed, after which the supply recovers.

Over-voltage protection is accomplished with a zener diode gating a SCR to short the output. The supply goes into current limiting.

The CRT receiver printed circuit board contains a solid state relay for AC power control, two dual differential line receivers for AC noise immunity on the signal inputs and a dual line driver for low impedance output to the CRT monitor.

A connector J4 supplies two video signals a vertical sync, a horizontal sync and a power control (PC) input. Another connector J6 is the output connector to the monitor. The video signals, the vertical sync and the horizontal sync are applied through this connector. A power connector J5 supplies +5 volts DC and ground to the CRT receiver printed circuit board. Connector J5 also carries the AC hot line into the solid state relay and from the relay to the power supply.

The CRT controller is designed to allow a general purpose processor (GPP) board in the electronic system floor module to control a remotely located full page CRT display.

Character sets of 10 pitch, 12 pitch or true proportional, having character widths varying from six to 16 dots, are stored in random access memory (RAM) on the CRT controller. These character sets are changed whenever there is a change in pitch within a document format.

The controller also provides four video attributes which may be specified on a character basis. There are also two video functions specified on a line basis: spacing between lines of text on the display may be specified from single space to triple space in half line increments; and zoom may be set to double the size of the line of characters vertically. There are two video functions set on a page basis: zoom (same as for line, but for full-page); and reverse video (same as for character, but for full-page).

The CRT controller is housed on two printed circuit boards (CRT1 and CRT2) which mount next to the CRT GPP in the electronic system floor module. These boards are connected to the mother board, but derive only power from it. CRT1 is connected to the GPP via a 50-conductor ribbon cable. CRT2 is connected to CRT1 via a 50-conductor ribbon cable and to the distribution panel at the rear of the floor module via a 10-conductor serial cable.

To allow data block transfers to take place without processor intervention, the CRT controller boards include circuitry to support a direct memory access (DMA) channel between the controller and processor memory. The CRT controller reads text on the DMA channel from a refresh buffer in the processor's memory, starting at a programmable top-of-page address on a line-by-line basis.

The text in the refresh buffer consists of ASCII characters and four possible control (special character) codes: an attribute code which sets the state of the four character video attributes until the next attribute code is encountered; and end-of-line (EOL) code which fills the remainder of the display line with spaces and also sets the interline spacing and zoom status; and end-of-page (EOP) code which fills the remainder of the line and all remaining lines on the display with spaces; and a multiple space code which inserts a specified number of spaces into the present line.

The variable width spaces, used to ensure a right flush margin when proportional spacing is specified, are represented by ASCII characters and can be specified in even multiples of 1/120. Each line must end with an EOL code and begin with an attribute code. Attributes are reset at the end of each line.

The controller reads a line from the refresh memory and expands all control codes into space codes, creating a fully expanded form of the line in a 256-bit line buffer. The characters from the line buffer are then fed to the character generator and into the screen starting at the address specified by the programmable line start register. While one line buffer is displayed on the screen, a second is filled from refresh memory with the next line. The buffers alternate until 66 lines are displayed. The controller then returns to the top-of-page pointer and repeats the process. The actual display consists of two interlaced fields, each of which is refreshed at a rate of 30 times per second.

The CRT controller contains a character generator in RAM, with provision for 15 rows up to 16 dots wide for 128 possible seven-bit characters. It also contains a 128 by 4 bit memory which specifies the width of each character for proportional spacing.

The character generator RAM is organized as two 2K by 8-bit wide memories for loading the character sets, with the two 8-bit bytes interleaved on output to provide a full, 16-bit wide video output word. The odd bits of the full 16-bit word are contained in one 2K by 8-bit segment, with the first eight rows of the matrix in the lower 1K and the last eight rows of the matrix in the upper 1K. Row 16 must contain zeros. The even bits of the 16-bit word are contained in the other 2K by 8-bit segment and the character widths are contained in a separate 128×4 segment.

The CRT controller recognizes three output commands from the processor: load top-of-page register; load line start register; and load command register.

The load top-of-page register output command loads an 8-bit register in the CRT controller which stores the most significant byte of the address for the start of refresh memory for the current page to be displayed. The contents of the top-of-page register are loaded into the CRT controller DMA address counter at the start of the scan for every page.

The load line start register output command loads an 8-bit register on the CRT controller which specifies the character position in the total line. The line buffers in the CRT controller allow for a maximum total line length of 256 characters. The actual display line on the CRT is from 64 to 170 characters, depending on pitch. The display line may begin at any position in the total line from 0 to 255, as specified in the line start register. The contents of the line start register may be changed at any time. The load command register output command loads an 8-bit command register on the CRT controller which determines various display modes and special functions.

Scrolling of text is accomplished through the use of four cursor control keys and top and bottom keys on the keyboard/display module. Horizontal scroll is across 256 characters for all character sets. Vertical scroll is unlimited across page boundaries.

CRT CONTROLLER

Figure 22:
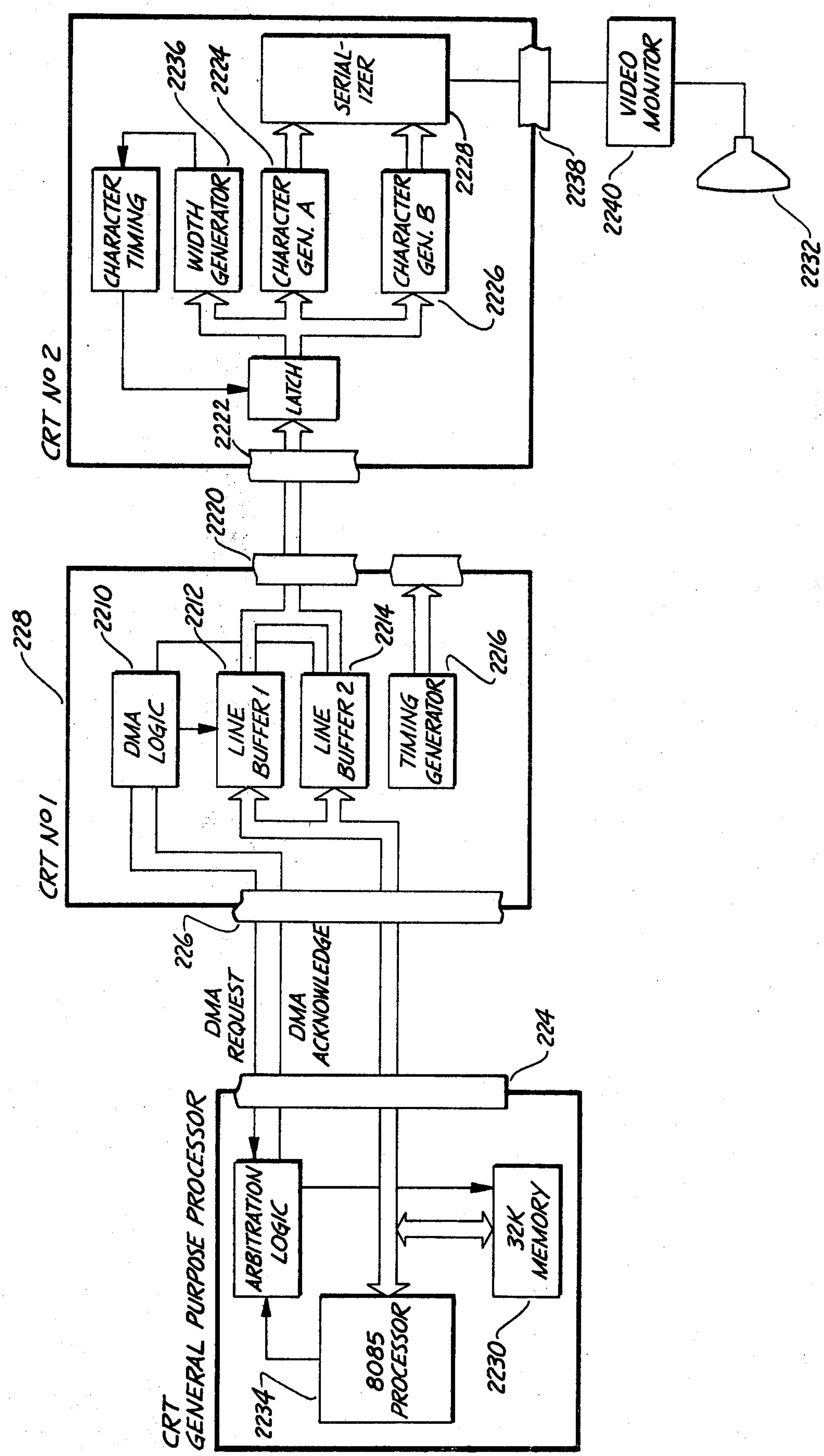
FIG. 22 is a block diagram of a CRT controller system with its associated general purpose processor.

Referring to FIG. 22, a CRT general purpose processor is dedicated to performing CRT functions. The GPP drives the CRT controller 228 from the 50 pin connector device controller ports 224 and 226. It carries address and data lines from the control lines to the CRT controller 228. It is tied to the first CRT controller circuit board CRT1.

CRT1 has DMA logic 2210 and a pair of line buffers 2212 and 2214 capable of storing one line of text on the screen. CRT1 also has a timing generator 2216 which produces the sync and blanking signals to the monitor.

CRT1 is connected to second CRT controller circuit board CRT2 by a pair of connectors 2220 and 2222. CRT2 has a pair of character generators 2224 and 2226. A serializer 2228 is coupled to the character generators 2224 and 2226.

The CRT controller 228 translates information from the general purpose processor's 32K memory 2230 into dots on the screen of a CRT 2232. The DMA logic 2210 provides addressing information to the 32K memory 2230. When data is transferred from the memory 2230 to the line buffers 2212 and 2214, the DMA logic 2210 functions to provide memory address. DMA transfers are transparent to the processor 2234 of the GPP. The DMA logic 2210 monitors the address in the general purpose processor's memory 2230 and it also monitors the address of the line buffers 2212 and 2214 to which data is to be transferred. Accordingly, there is a pair of address counters, not shown in FIG. 22, but described hereafter, associated with the DMA logic 2210.

In operation, a DMA request is activated and CRT1 makes a bid for the processor's memory 2230. When the 8085 processor 2234 in the CRT GPP is not accessing memory, on the next available cycle the CRT1 DMA logic 2210 has access to the memory 2230. The DMA logic 2210 corresponding to the specified address transfers the byte for this memory over the interface 224 and 226 to the line buffers 2212 and 2214 at the specified address of the line buffers 2212 and 2214. These line buffers 2212 and 2214 are 256 bits long, 12 bits wide, consisting of eight bits for data and four bits for attribute (cursor, bold, underscore and double underscore) information.

The two line buffers 2212 and 2214 are used in ping pong configuration. While one line buffer 2212 is being filled by the DMA logic 2210 on the GPP's memory 2230, the other line buffer 2214 is being read. Line buffer 2214 outputs data to CRT2 in a parallel form, eight bits of character and four bits of attribute information for each character, to character generators 2224 and 2226 in CRT2. The character generators 2224 and 2226 are a set of RAM soft loaded during the initialization sequence. Character sets may include, for example, proportional, pica and elite type styles. The character generators 2224 and 2226 provide a picture of how the characters are to appear on the screen.

ASCII type information signals are applied to character generators 2224 and 2226. The output signal from the character generators 2224 and 2226 can be up to 16 bits wide. A width generator 2236 is initialized during the power up sequence. The character information is also applied to the width generator 2236. The width generator 2236 provides information as to the width of each character. It establishes the font size for the character to be displayed.

Information is transferred from the character generators 2224 and 2226 to the serializer 2228 and is shifted one bit at a time over the interface 2238 from CRT2 into a monitor 2240.

The maximum size for a character is 16 dots wide by 15 lines high. By using a very large font, superscripts and subscripts can be displayed. For proportional spacing, the minimum width for a character is six dots. A width table is established in two dots increments, so a character can be six dots wide to 16 dots wide in two dot increments.

The number of displayable lines required to display 66 lines of 15 line high characters in text is 990. An interlace scheme is employed to display the characters on the CRT 2232 screen. Half of a picture is displayed in the first field and half of the picture is displayed in the second field. The 990 displayable lines do not include the lines needed to move from the bottom of the screen to the top again during vertical blanking intervals. Accordingly, the total number of lines required for the particular CRT employed is 1,029.

Due to the alternating of fields, the additional 39 lines of vertical retrace is handled in two parts: one part is 20 lines of vertical retrace and the other is 19 lines of vertical retrace between the fields. The monitor 2240 requires two synchronization signals: horizontal and vertical, for horizontal and vertical scan. Also required are two blanking signals: horizontal and vertical blanking. Two video signals are required because there are two controls for the video intensity. Two lines are provided for four TTL levels of intensity: off, normal, bold and dim.

Figure 23:
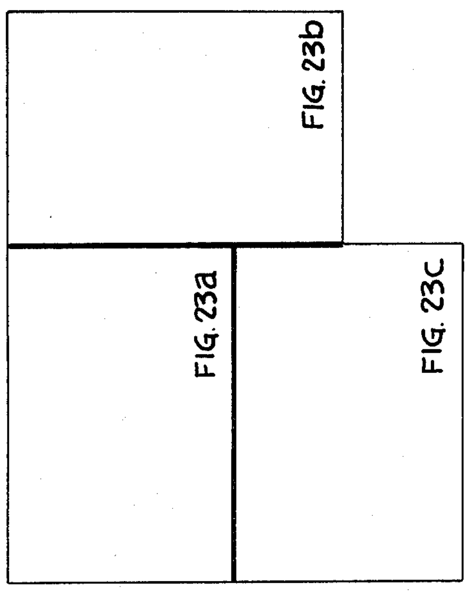
FIGS. 23, 24, 25, 26, 27, 28, 29 and 30, which are interconnection diagrams of FIGS. 23*a* through 23*c*, 24*a* through 24*c*, and 29*a* through 29*e* and block diagrams which when taken together are schematic circuit diagrams of the CRT1 controller shown in FIG. 22, and a block diagram of a portion of the CRT controller circuitry.
Figure 23A:
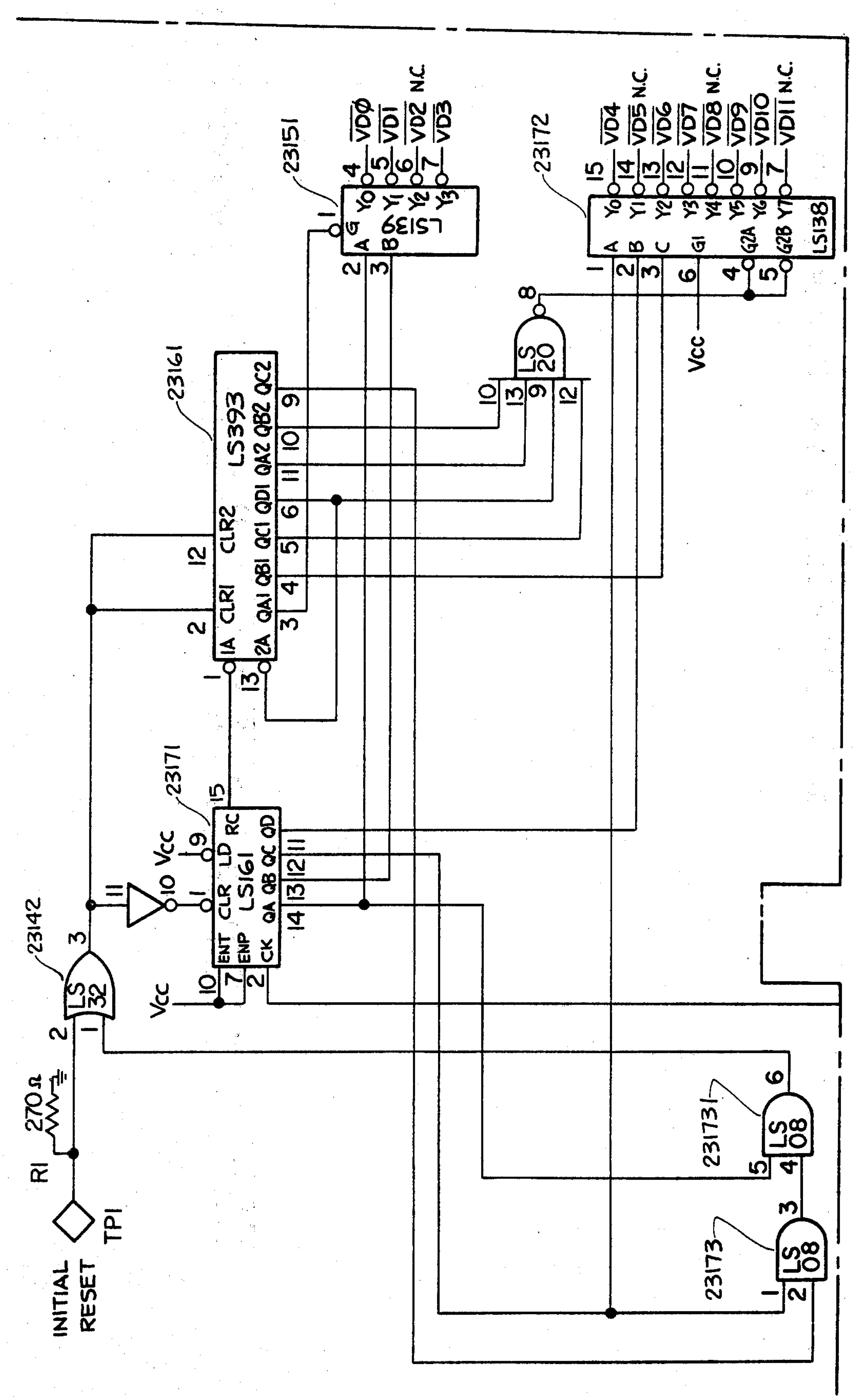
Figure 23B:
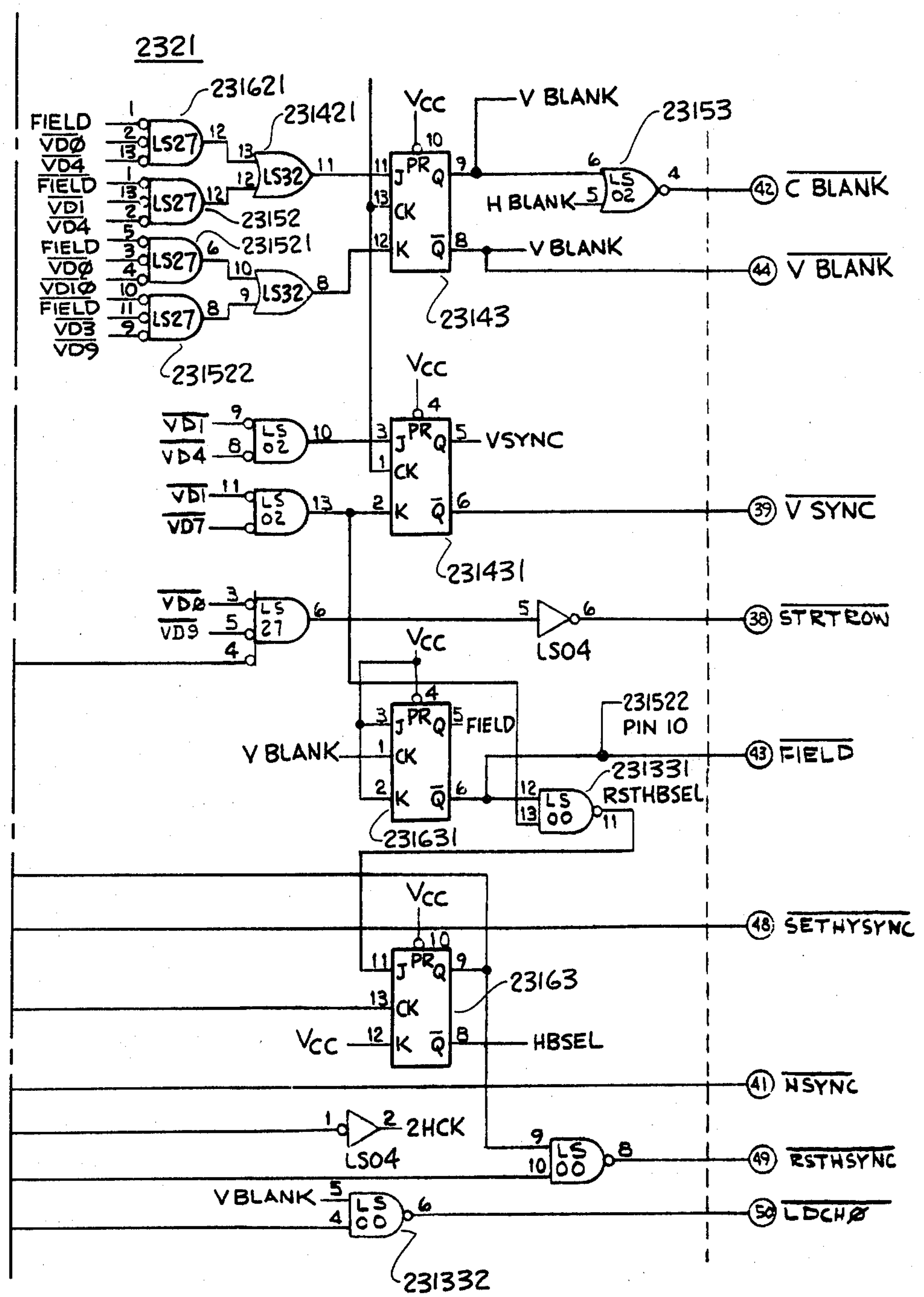
Figure 23C:
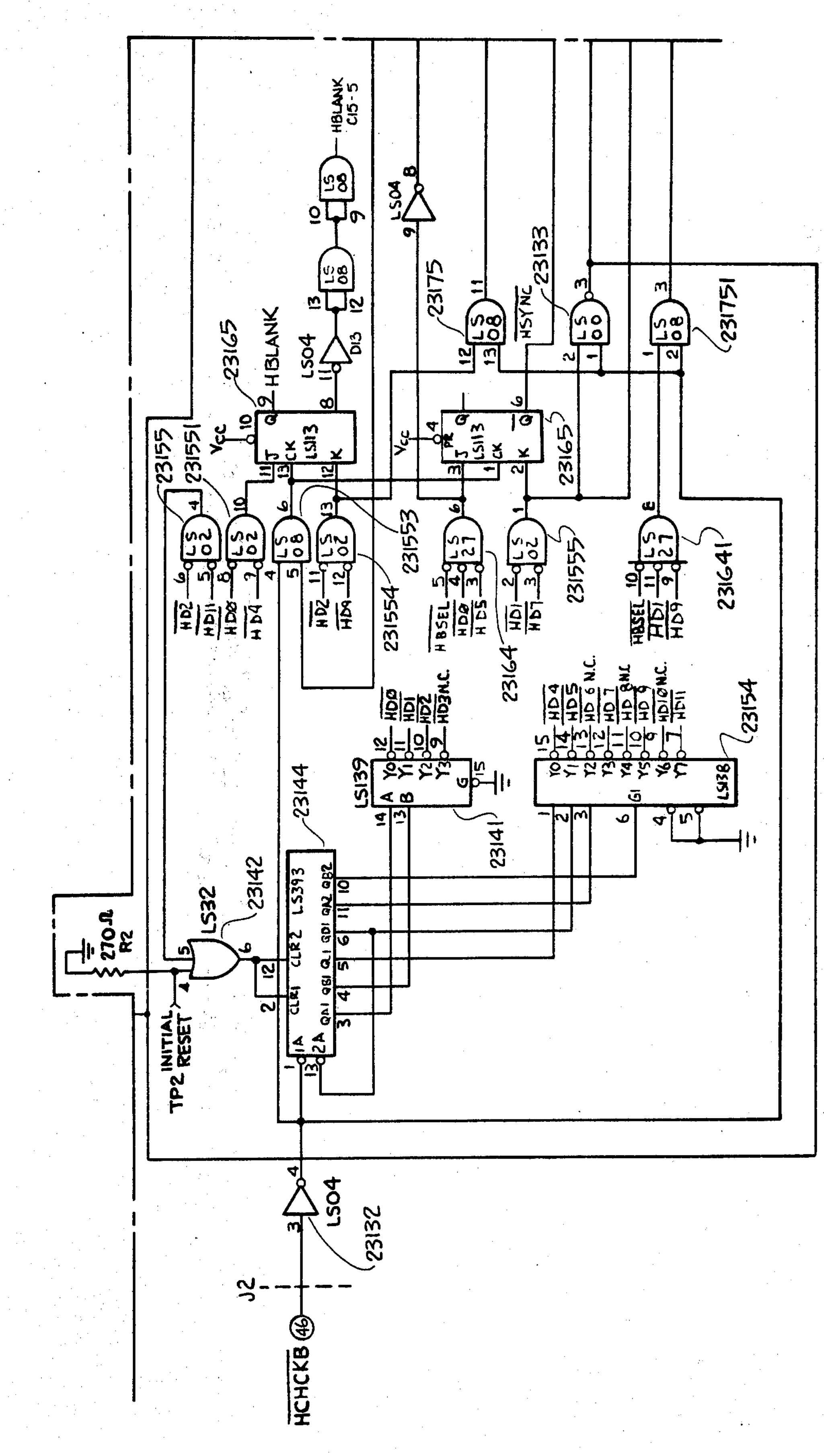

Referring now to FIG. 23, a horizontal character clock B (HCHCKB) signal is input to pin 46 of connector J2 and defines a character width on the scan. CRT2 has an oscillator operating at over 38 megahertz. That oscillator drives a counter that defines the character width. The HCHCKB signal has a period of 261.2 nanoseconds. The HCHCKB signal is applied to a buffer 23132 and thence to a dual four bit synchronous counter 23144. The output of the counter 23144 drives a pair of decoders 23141 and 23154. The output of the decoders 23141 and 23142 is horizontal decode 0 through 11 (HD0 through HD11).

The first counter 23144 divides the horizontal line to facilitate driving the horizontal blanking and horizontal sync signals. Signals HD2 and HD11 are applied to AND gate 23155. The output of AND gate 23155 is applied to the counter 23144 via OR gate 23142. The OR gate 23142 provides a way of initializing the counter 23144 for testng at test point two. The output of the OR gate 23142 is tied to the clear input pins 2 and 12 on the counter 23144.

The counter 23144 normally increments through a range of 256 counts. Signal HD11 is tied to the Y7 output of the decoder 23154. When the Y7 output goes active, HD11 goes false. Y7 goes to a low state when its A, B and C inputs are all one and the decoder enable inputs are active.

Also, the enable inputs at pins 4, 5 and 6 for the decoder 23154 must be active. G1 must be one; G2A and G2B must be zero. G2A and G2B are connected to ground. The G1 input is tied to the QB2 terminal on counter 23144. The output stages of counters of this type 23144 are sequentially energized, QA, QB, QC, QD. That is, QA is a divide by two of the source frequency; QB is a divide by four; QC is a divide by eight; and QD is a divide by 16. The QD1 output at pin 6 is tied to the 2A input on that counter 23144. The output of the first counter is tied in series to the input of the second counter 23144. The output of the second counter 23144 QA2 in the first stage is a divide by 32 and QB2 is a divide by 64.

The counter starts at count zero because the clear lines CLR1 and CLR2 at pins 2 and 12 are activated. For HD11 to be active, QA, QB and QC all must be set to ones. A is tied to QC1; B to QD1; and C to QA2. A is the least significant bit in that group. For Y7 to be active all inputs must be one. QB1 and QA1 are not used. Accordingly, HD11 is active regardless of the state of QA1 and QB1. The gate enable G1 signal for decoder 23154 at pin 6, tied to QB2, must be true in order for the HD11 output to be active. QA1 is 1; QB1 is 2; QC1 is 4; QC1 is 8; QA2 is 16; and QB2 is 32. The input signal corresponds to $32+16+8+4=60$. HD11 starts at count 60, and it operates regardless of the state of QB1 and QA1.

Signal HD11 is active at count 60. It increments to count 64 and then goes inactive. Input signal HD2 is tied to the Y2 output on device 23155. The A input for decoder 23141 is tied to QA1; and the B input is tied to QB1 of counter 23144. An HD2 signal is output when the B input is one and the A input is zero, corresponding to binary two. The decoder 23141 increments through a sequence for every four character clocks (HCHCKB). HD11 goes active at count 60 and stays active through count 64. HD2 is active at each count 2 out of a sequence of four. The output of device 23155 is active at count 62. This is an asynchronous clear in the counter 23144. The counter 23144 counts from zero to 61. When it reaches count 62 it is reset. Count values for each of the rest of the decodes 231551, 231552, 231553, 231554 and 231555 can be calculated in a similar manner.

The counter 23144 counts CRT half lines. It operates at twice the horizontal synchronism rate. A twice horizontal clock (2HCK) signal is driven by device 23133, which is a decode of HD1 and HD7 at decoder 231555. Device 23133 is also connected to be energized by the HCHCKB signal. An output signal from device 23133 is generated every time the divide by 62 counter 23144 increments through its cycle. The 2HCK signal is one character clock wide. Every time counter 23144 increments through a cycle, it operates through half a horizontal scan time. This signal is one character clock wide and occurs twice per scan line.

The 2HCK signal drives a set of vertical scan line counters 23171 and 23161. This set of counters 23161 and 23171 operates at twice the horizontal scan frequency. This sequence of counters 23161 and 23171 is re-initialized before it gets to its end count.

The arrangement is similar to that used with the counter 23144. In this case there are two decoders 23151 and 23172. One is a 2-to-4 line decoder 23151; the other is a 3-to-8 line decoder 23172. This set of decoders 23151 and 23172 generates vertical sync and vertical blanking signals.

A set of flip flops is used to generate horizontal sync and horizontal blanking. A horizontal blanking select flip flop 23163 generates an HBSEL signal. One side of an AND gate 23175 is driven by the horizontal character clock B (HCHCKB) signal. Accordingly, the output of this AND gate 23175 provides a signal one character clock wide. The other side of AND gate 23175 is tied to a decoder 231554 driven by signals HD2 and HD9.

The output of the AND gate 23165 drives the clock input terminal (CK) at pin 13 of flip flop 23163. The K input of the HBSEL flip flop 23163 is always true. It is tied to a voltage source. The J input of flip flop 23163 is tied to a gate 231331, the output of which is marked reset horizontal blanking select (RSTHBSEL). Normally, in the active portion of the display, the output of that gate 231331 is true. It is false only during a vertical retrace period. If the output of gate 231331 is true, the output signal from flip flop 23163 toggles whenever it receives a clock that drives it to the opposite state.

The clock for the HB select flip flop 23163 is generated every time the horizontal counter 23144 increments through its range. The HBSEL signal has one horizontal scan line period, active for the second half of the scan line. This circuit is used in deriving the horizontal blanking signal.

Since 32.4 microseconds are required to move from the beginning of one scan line to the beginning of the next one, including the horizontal blanking interval, the output of the HB select flip flop 23163 (HBSEL) is active for a period of 16.2 microseconds. The output of the horizontal blanking select flip flop 23163 is applied to a blanking (HBLANK) flip flop 23165 via AND gate 231553. The other input to the AND gate 231553 is the horizontal character clock B (HBHBKB) signal. HBLANK provides a series of clocks for the second half of the scan line that are active when HB select (HBSEL) is active.

The J and K inputs of flip flop 23165 are coupled respectively to AND gates 231551 and 231554, energized by output signals of the horizontal decoders 23141 and 23154. With respect to the input signals for AND gate 231551, HD0 and HD4, HD4 is active when the A, B and C inputs of device 23154 are all zero and when the gate enable (G1) input at pin 6 is one. G1 is tied to the QB2 output terminal of counter 23144, having a value of 32. The C input of device 23154 is tied to the QA2 output terminal of counter 23144 having a value of zero. The B input of deivce 23154 is tied to the QD1 output terminal of counter 23144. The A input of device 23154 is tied to the QC1 output terminal of counter 23144. The YO output pin 15 of counter 23144 is active when the three input signals are zero. Signal HD4 is active when QB2 is one. Accordingly, the input signals represent, respectively: 1, 0, 0, 0, N/A, N/A.

Signal HD4 is active at count 32. That is one side of AND gate 231551. The other input to AND gate 231551 is HDO, active when A and B of decoder 23141 are both zero. The J input of horizontal blanking flip flop 23165 is active at count 32 for one period. At count 32 (that is, during the second half of the line time) the horizontal blanking select flip flop 23163 is set and provides clock signals. The K input of horizontal blanking flip flop 23165 is reset 22 character times later. Accordingly, the period of the horizontal blanking (HBLANK) signal is 22 character times, which is 5.74 microseconds with a period of 32.4 microseconds.

During the time over which the horizontal blanking (HBLANK) signal is active, the beam of the CRT scans from the right half of the screen to the left half and is turned off.

A horizontal sync flip flop 23165 is supplied with the same clock (CK) pin 1 as is used for horizontal blanking. The flip flop 23165 provides an HSYNC signal pin 41 of connector J2 in the second half of the line. The J input of flip flop 23165 is coupled to HB select (HBSEL), HD0 and HD5. The K input of flip flop 23165 is energized via device 231555 by signals HD1 and HD7.

The HSYNC signal is active for nine character times, starting four character times after the start of the horizontal blanking (HBLANK) signal. Since the character clock is 261.2 nanoseconds and the horizontal sync (HSYNC) signal is active for nine character times, the horizontal sync (HSYNC) signal is active for 2.35 microseconds and is framed by the horizontal blanking (HBLANK) signal. The period of HSYNC is the same as HBLANK, 32.4 microseconds. Character time varies, but it is used here to display a nominal width character, 10 dots wide. The dot clock signal divided by 10 is the horizontal character clock B (HCHCKB) signal.

A divide by 62 in counter 23144 increments through its range two times for one scan line, reaching a count of 124 characters. Accordingly, one scan line is 124 nominal width characters wide. The horizontal blanking 23165 time is active for 22 character times. Therefore 102 characters (124 minus 22) of nominal width can be displayed in one line. In proportional spacing, the number of characters per line varies with the size of the characters.

The 2HCK signal from AND gate 23133 is applied to counter chain 23171 and 23161, which operates at twice the horizontal scan frequency. A set of AND gates 23173 and 231731 is coupled to the counter 23171. The output of that pair of AND gates 23173 and 231731 is applied to an OR gate 23142 into the clear inputs CLR1 and CLR2 of counter 23161. The OR gate 23142 is provided to initialize the counters for testing purposes. The pair of counters 23171 and 23161 increments from zero to 1,028 and is then reset.

The number 1,029 corresponds to the number of lines on the display per display frame. For one field of the display only half that number of lines is displayed. There are 514.5 lines per field. In one frame this counter increments over its full range of 1,029.

The output of the counters 23171 and 23161 is applied to a series of decoders 23151 and 23172 and drives vertical decode zero through 11 (VD0 through VD11) signals used to drive a vertical blanking flip flop 23143, a vertical sync flip flop 231431 and a third flip flop 231631 used to count even and odd fields.

The vertical blanking flip flop 23143 is driven by means of a cluster of gates referred to generally as reference numeral 2321. This logic is provided to process and sort 39 vertical retrace lines divided into two intervals: 20 lines for the transmission between two sets of frames, and 19 lines for transmission between the next two frames. The J input terminal of flip flop 23143 is energized by AND gates 231621 and 23152 via OR gate 231421. One of the inputs of AND gate 231621 is the field (FIELD) signal. AND gate 23152 is energized by the field (FIELD) bar signal. One of these AND gates 231621 or 23152 is active for even fields and one active for odd fields. The same is true for the K input of flip flop 23143.

One AND gate 231521 is energized by FIELD and another AND gate 231522 is energized by FIELD bar. The FIELD signal is set for even fields and reset for odd fields. The vertical blank flip flop 23143 is set for 19 lines for one field-to-field transition and is then reset. The next field transition is active for 20 lines. Accordingly, vertical blanking is active for 615 microseconds in one case and 648 microseconds in the other case.

The vertical blanking flip flop 23143 has a period of 16.66 milliseconds, which corresponds to a rate of 60 Hz.

Each frame consists of two fields with 495 (half of 990) displayable lines for each field. The vertical sync flip flop 231431 is set when VD1 and VD4 at the J terminal are active and reset when VD1 and VD7 at the K terminal are active. Accordingly, flip flop 231431 is set at a count of 961 and reset at a count of 973. Consequently the VSYNC signal is 12 counts wide which is 194 microseconds, with a period of 16.66 milliseconds.

The vertical sync (VSYNC) signal is framed by the vertical blanking (VBLANK) signal. A field flip flop 23163 has J and K inuts tied to a voltage source. Every time a vertical blanking interval occurs, the field flip flop 23163 toggles to generate even and odd field signals. A composite blanking (CBLANK) signal, generated by OR gate 23153, consists of the vertical blanking (VBLANK) signal and the horizontal blanking (HBLANK) signal.

Other signals are used on the CRT2 circuit board. Load character zero (LDCHO) signal at pin J2 allows the loading of the character latch on CRT2 at the beginning of a new field. LDCHO is generated from logic including gates 231332, 231751 and 231641. These gates are energized by signals VBLANK bar, HBSEL, HD1, HD9 and HCHCKB. LDCHO is generated at the beginning of each new displayable line, once per line, to start the transfer of data from the line buffers into the character latch on CRT2 to drive the character generators. The set horizontal sync (SETHYSYNC) signal and the start row (STRTROW) signal are used to drive logic on the CRT2 circuit board.

Figure 24:
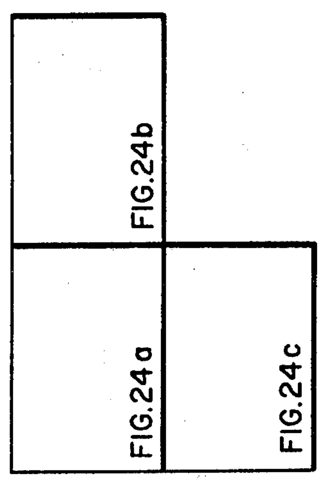
Figure 24A:
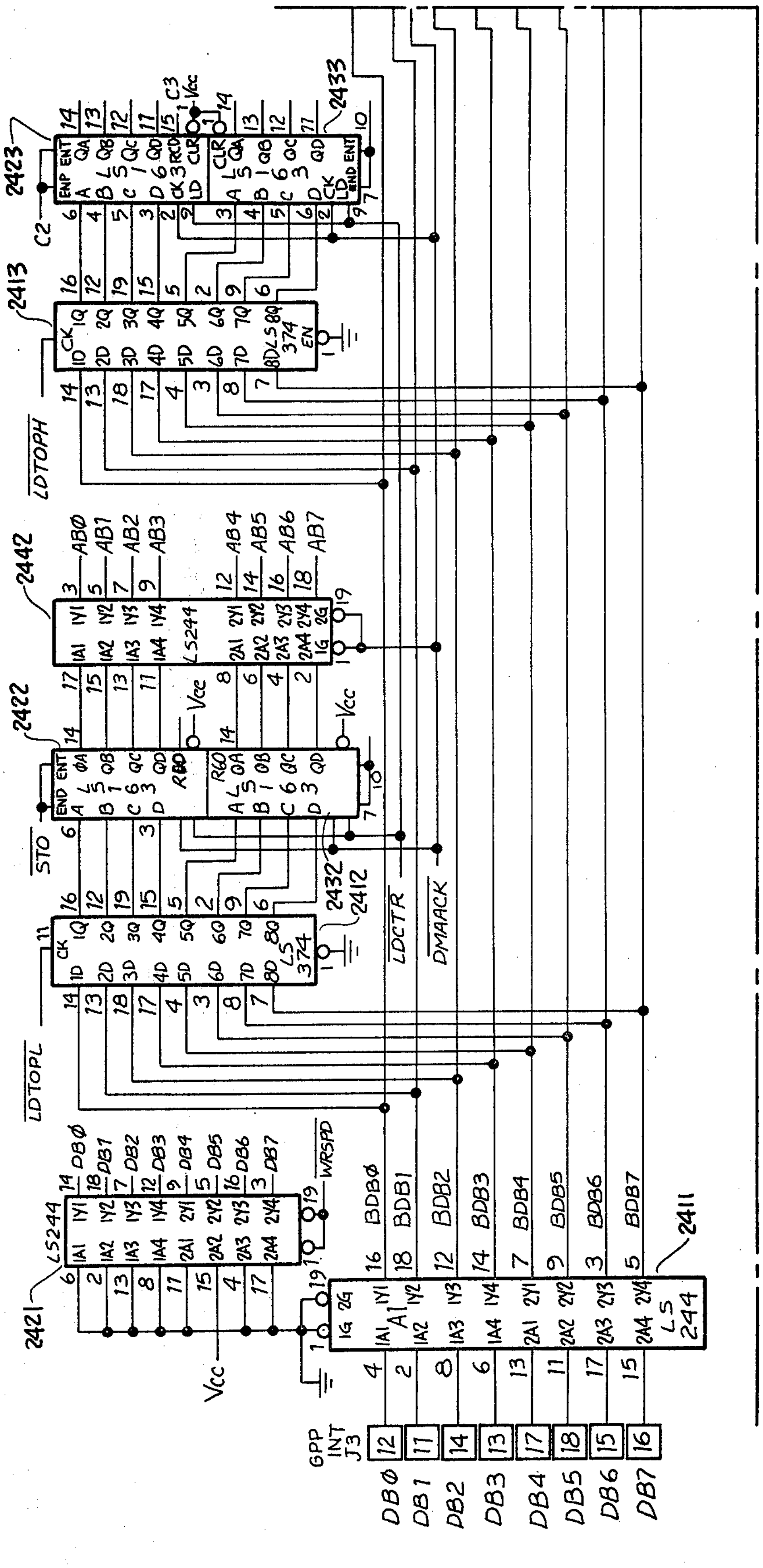
Figure 24B:
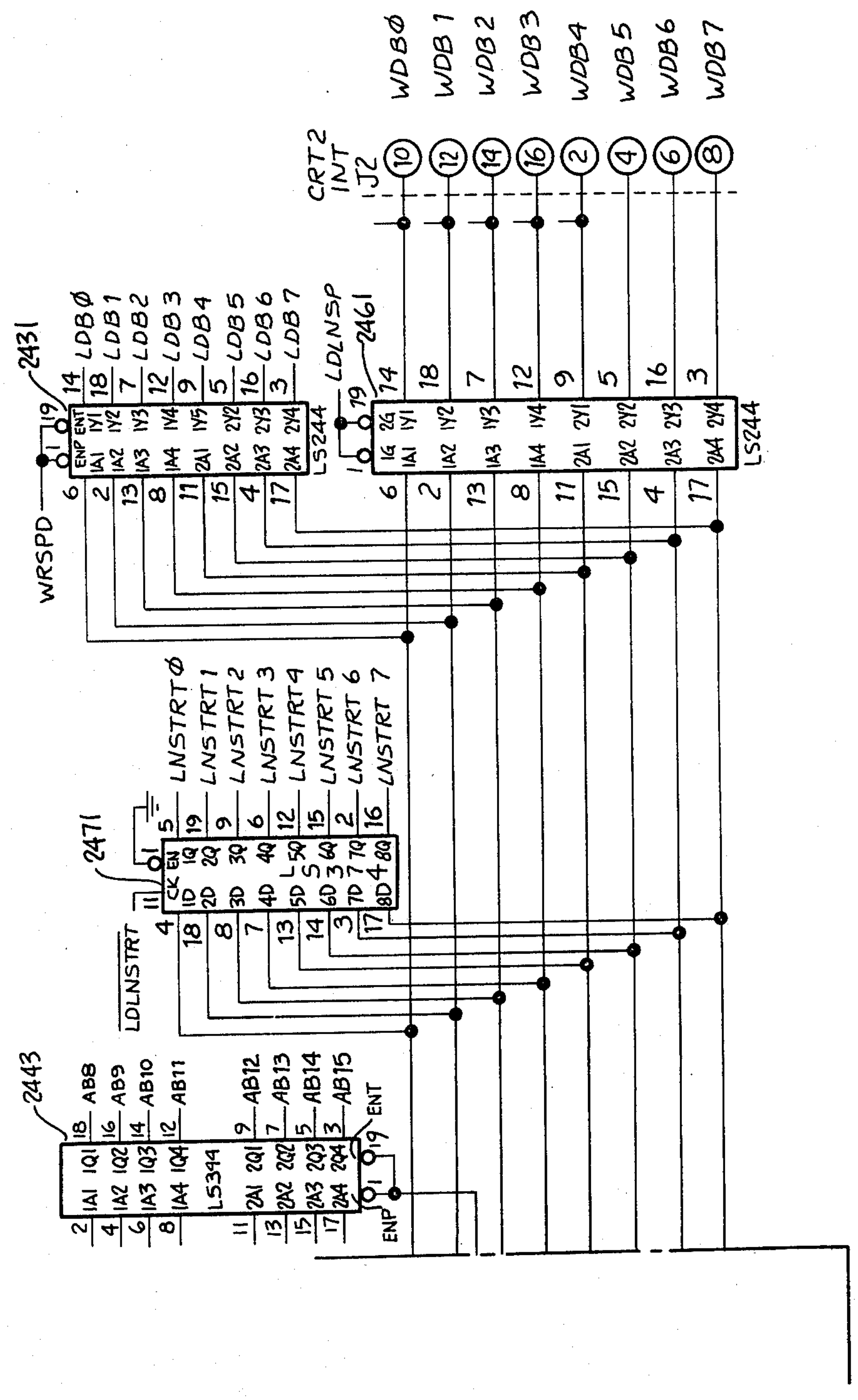
Figure 24C:
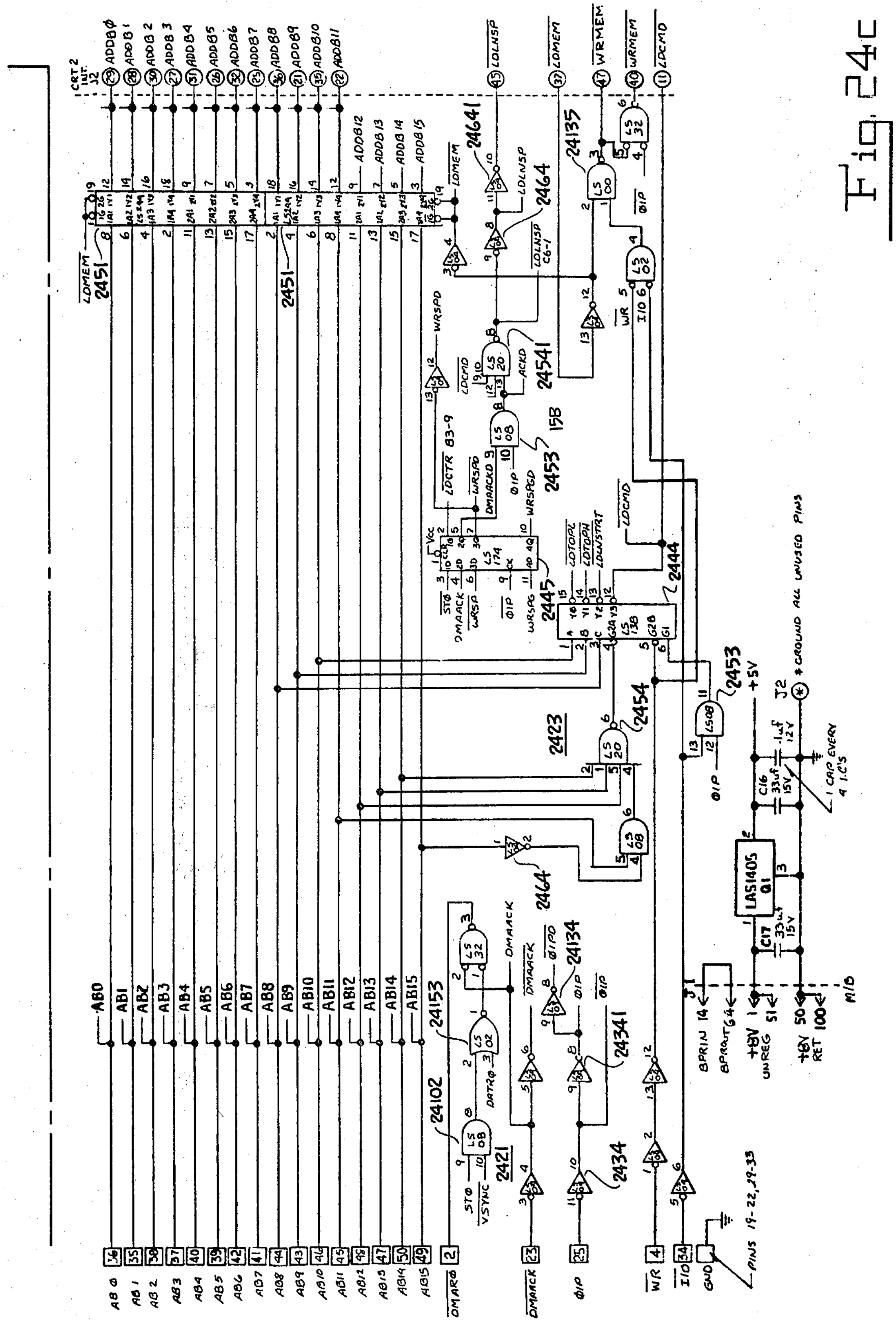

Referring to FIG. 24, DMA logic is used to access information from the GPP memory. Connector J3 is the GPP interface. The data bus has lines DB0 through DB7 and the address bus has lines AB0 through AB15. Data bus DBD0 through DBD7 is connected to bus DB0 through DB7 via device 2411.

An octal latch 2412 is connected to the data bus and is clocked by a load top low (LDTOPL) signal at pin 11. This signal indicates to the DMA circuitry which address in the GPP's memory to access. When the processor loads the top of page registers, it loads two registers. That specifies a 16 bit address in memory at which to begin starting the DMA operation. The first character (at the upper left corner of the screen) is at that specified address. The processor accesses and writes to that register by executing an output instruction described hereafter.

A similar octal latch device 2413 is clocked by a load top of page high (LDTOPH) signal, representing the most significant half of the address.

Synchronous 4-bit counters 2422 and 2432 form a portion of the DMA address counter chain. A similar pair of counters 2423 and 2433 is loaded when a new page is begun, after the vertical blanking interval. An octal driver 2422 is provided for the low half of the address. For the high half of the address, there is provided another octal driver 2443. Both drivers 2442 and 2443 are tri-state drivers, attached to the address bus AB0 through AB15. The LDTOPH and LDTOPL signals load the contents of top of page registers into counters 2422, 2432, 2423 and 2433. Then the first DMA access to the address loaded into the counters occurs and the counters are incremented for the next address.

A line start register 2471 is provided. The controller is capable of performing horizontal scrolling across the contents of the line buffers. The line buffers are 256 characters wide. For characters that are of a standard ten dot width, 102 characters can be displayed across the screen. Consequently, only a portion of the information in the line buffers can be displayed. By loading the line start register 2471 with a value other than zero, a herizontal scrolling operation across the contents of the line buffers can be performed. If an address zero is loaded in the line start register 2471 the first 102 standard width characters, from zero to 101, are displayed. By loading the register 2471 with a value other than zero, for example 32, standard width characters 32 through 133 in the line buffer are displayed. Accordingly, horizontal scrolling is achieved without moving data.

Three octal drivers 2441, 2451 and 2461 are connected to the CRT2 circuit board. Twelve bits of address information ADDB0 through ADDB11 and eight bits of data WDB0 through WDB7 are transferred to the CRT2 circuit board. Another tri-state octal driver 2431 is used to pass data to the line buffers. The output terminals of driver 2431 are marked LBD0 through LBD7, which is the line buffer data bus. Data is transferred from the general purpose processor via the data bus BDB0 through DBD7 via driver 2431 and into the line buffer.

Logic shown generally at reference numeral 2421 handles the DMA requests and DMA acknowledges from and to the processor. The DMA request (DMARQ) signal is generated if the DMA acknowledge (DMAACK) signal is false indicating a DMA acknowledge signal is not occuring. This arrangement is included to prevent the CRT DMA from exploiting all of the available memory cycles. In addition, for a DMA request to be generated, either the data request (DATRQ) signal must be active via OR gate 24153 or the state zero (ST0) signal must be active. The vertical sync (VSYNC) bar signal, indicating vertical sync is not occuring, are also applied to AND gate 24102. For most data transfers, DMA requests are initiated by the DATRQ signal, but in order to get the DMA cycle started, when starting a new field, a state counter (STO) signal is required. When state zero is active, a DMA transfer request is generated. This represents a dummy DMA transfer merely to initiate the DMA process.

When the processor is prepared to grant a memory cycle to the DMA device, it generates the DMAACK signal indicating that the memory cycle is actually a DMA cycle and that data is being moved.

A Φ1P signal from the processor is applied through a set of receivers 2434, 24411 and 24134 and is distributed across the board.

An I/O decoder circuit shown generally at 2423 determines the destination of the processor output instruction. In particular, I/O decoder 2423 decodes operator instructions for the top of page registers 2412 and 2413 and for the line start register 2471. I/O decoder 2423 also generates a load command (LDCMD) signal. Gate 1 of device 2444 must be true for decoding to take place. The input from AND gate 2453 is a combination of the Φ1P and I/O signals. Thus the processor must perform an I/O instruction. Gate 2B of device 2444 must be false. It is energized by the write (WR) bar signal. Thus the processor not only must be performing an I/O operation, but it must be performing an I/O write output. Gate 2A of device 2444 is energized via AND gate 2454 connected such that lines AB14, AB13, AB12, and AB11 must be active. Line AB15 must be false due to inverter 2464. The A, B and C inputs of device 2444 are connected to the address bus lines AB8, AB9 and AB10.

The command register on CRT2 is used, for example, to turn the display on and off, and to provide reverse video and zoom.

A latch 2445 is clocked by processor clock Φ1P. Input signals write space gate (WRSPG), write space (WRSP), DMA acknowledge (DMAACK), and state zero (ST0) are each delayed one Φ1P time by device 2445 to provide corresponding delayed output signals. The write space (WRSP) signal, for example, is converted to a write space delayed (WRSPD) signal.

The DMA acknowledge (DMAACK) signal is applied to latch 2445 to form DMAACKD and is gated with Φ1P in AND gate 2453 to provide an ACKD signal.

Referring now to FIGS. 25, 26, 27 and 28, data is normally moved from the GPP's memory and is displayed directly on the screen. When the GPP's memory contains a 41 hex 252 in memory as is shown generally at reference numeral 2521 it is displayed on the screen as an A 254. A 42 hex in the next location 256 is displayed as a B 258. Attributes have values of 80 through 8F. The least significant four bits of the data is interpreted as the attribute. As is shown generally at reference numeral 2523, a combination of attributes can be specified. The four attributes are: bold, underscore, double-underscore and cursor. These occupy four different bit positions in the least significant nibble.

For an attribute, the most significant bit must be set and the next three bits are zeros. Attributes are assigned as follows: if the least significant bit is set, an underscore is specified; the next most significant bit represents a double underscore; the next bit represents bold; and the next bit turns on the cursor. In this system the cursor can cover more than one character, up to the whole page. It marks the area of the screen affected on which a user is working.

The cursor does two things: it turns the affected character into a bold character; and it provides a heavy underline for it. Greater emphasis is added by both highlighting and underlining characters. This has importance particularly for slim characters (e.g., the letter "i") which are more difficult to discern on the screen. For example, an 84 hex in the data stream in GPP memory represents a bold attribute. A subsequent 41 hex in GPP memory causes a bold A to be displayed. A subsequent 43 hex in GPP memory displays a bold C. The bold attribute remains in effect until the next attribute is encountered.

Figure 26:
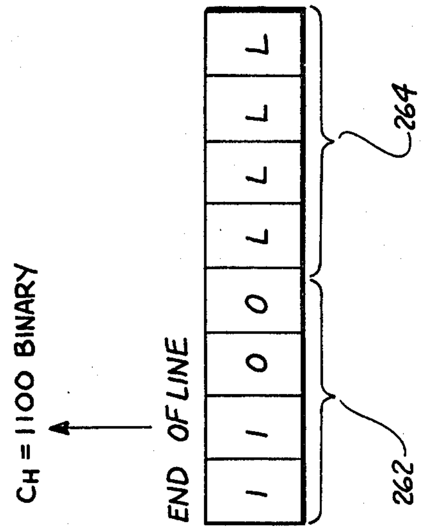
Figure 25:
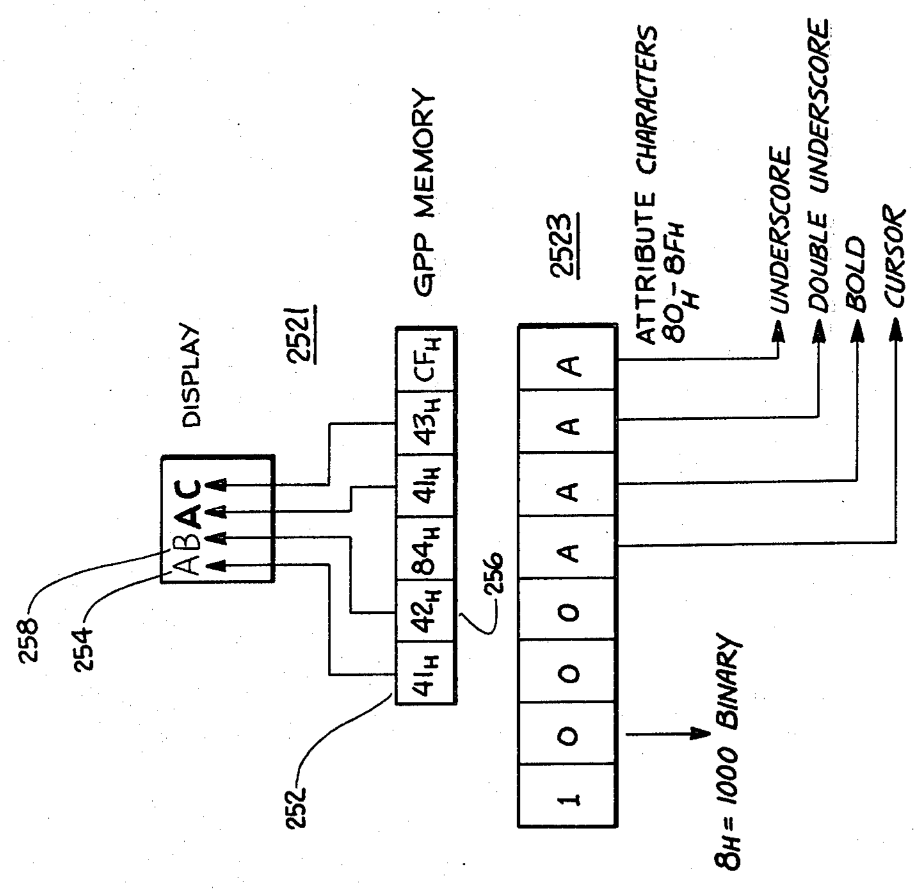

Referring also to FIG. 26, an end of line special character has the form shown in the figure. The most significant four bits, on the left, defines a C hex shown at 262. This character ends the line on the screen. Upon encountering such a signal in the data stream, the controller discontinues DMA accesses for that line. The rest of the line buffer is filled with spaces. The CF hex in GPP memory indicates that the rest of the line appears blank.

The least significant four bits of character 264 indicate to the controller how many lines must be skipped before starting the next row of characters. The end-of-line character can accordingly perform single spacing, spacing-and-a-half, or double spacing. These modes can be mixed on the page.

The fact that this character shuts off DMA for the rest of the line also helps save memory bandwidth due to the fact that no information is being conveyed for the rest of the line. Therefore, there is no need to burden the memory.

Figure 27:
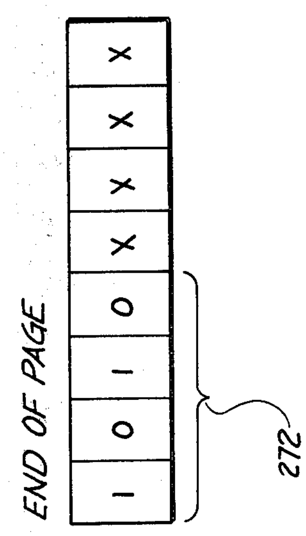

Referring to FIG. 27, an end-of-page special character is shown. The most significant bits 272 are 1010. Upon encountering such a signal in the data stream, the controller discontinues DMA accesses for the rest of the page, and fills the rest of the page with blanks. If an end-of-page character is the first character on the screen, a blank screen is displayed. Thus by inserting just one character, the screen is blanked. A portion of the display to the bottom of the screen can disappear by using the end-of-page character. The character can then be switched back to a normal video character to reactivate the display of the bottom portion of the screen. This character saves bandwidth, and eliminates large scale data transfers.

Figure 28:
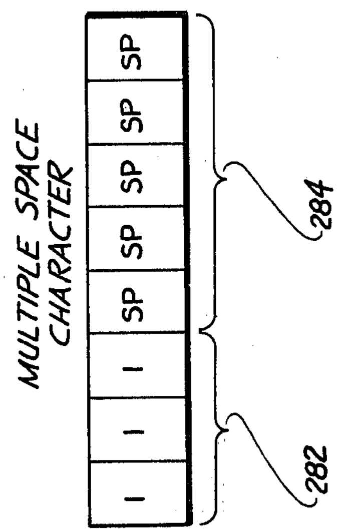

Referring to FIG. 28, a multiple space special character is shown. The upper three bits 282 must be set and the lower five bits 284 determine how many spaces to be inserted. This character allows multiple spaces to be inserted on a line without requiring DMA accesses. This feature is especially important in justifying text. Multiple space characters can be inserted in the text to move the text and line it up with a flush right margin. An FF represents a one space insertion; FE inserts two spaces; and so on to EO to insert 31 spaces.

Referring again to FIG. 24, the ACKD signal is applied to AND gate 24541. The other input signals to the AND gate 24541 are end-of-line (EOL) and load command (LDCMD) bar. If the last character is an end-of-line character and if the load command (LDCMD) signal is not active (that is, a command is not presently being performed), the output of AND gate 24541 provides a load line space (LDLNSP) bar signal. The LDLNSP signal is applied to a pair of inverters 2464 and 24641 which are applied to the line space counter on the CRT2 board.

Figure 29:
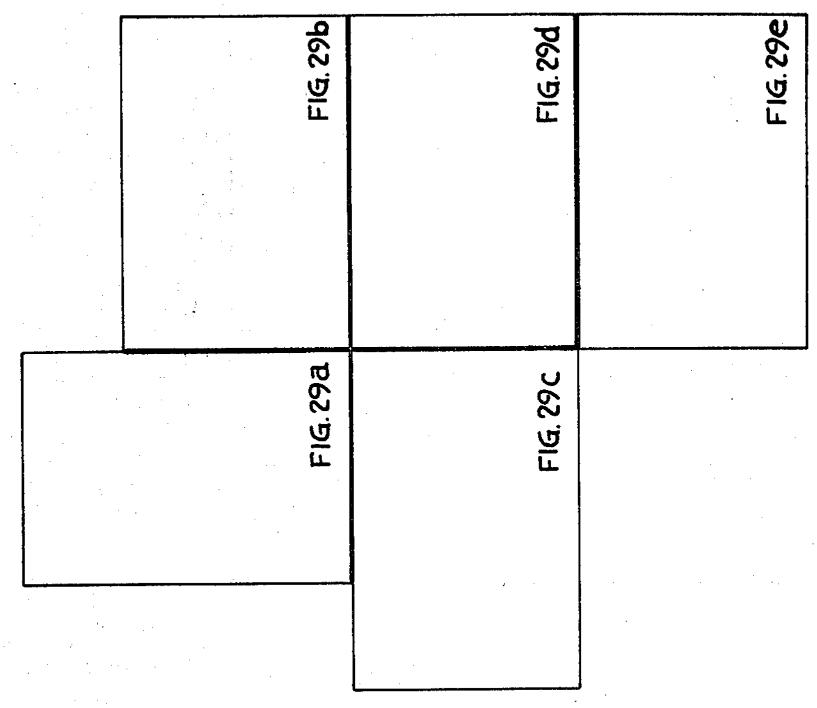
Figure 29A:
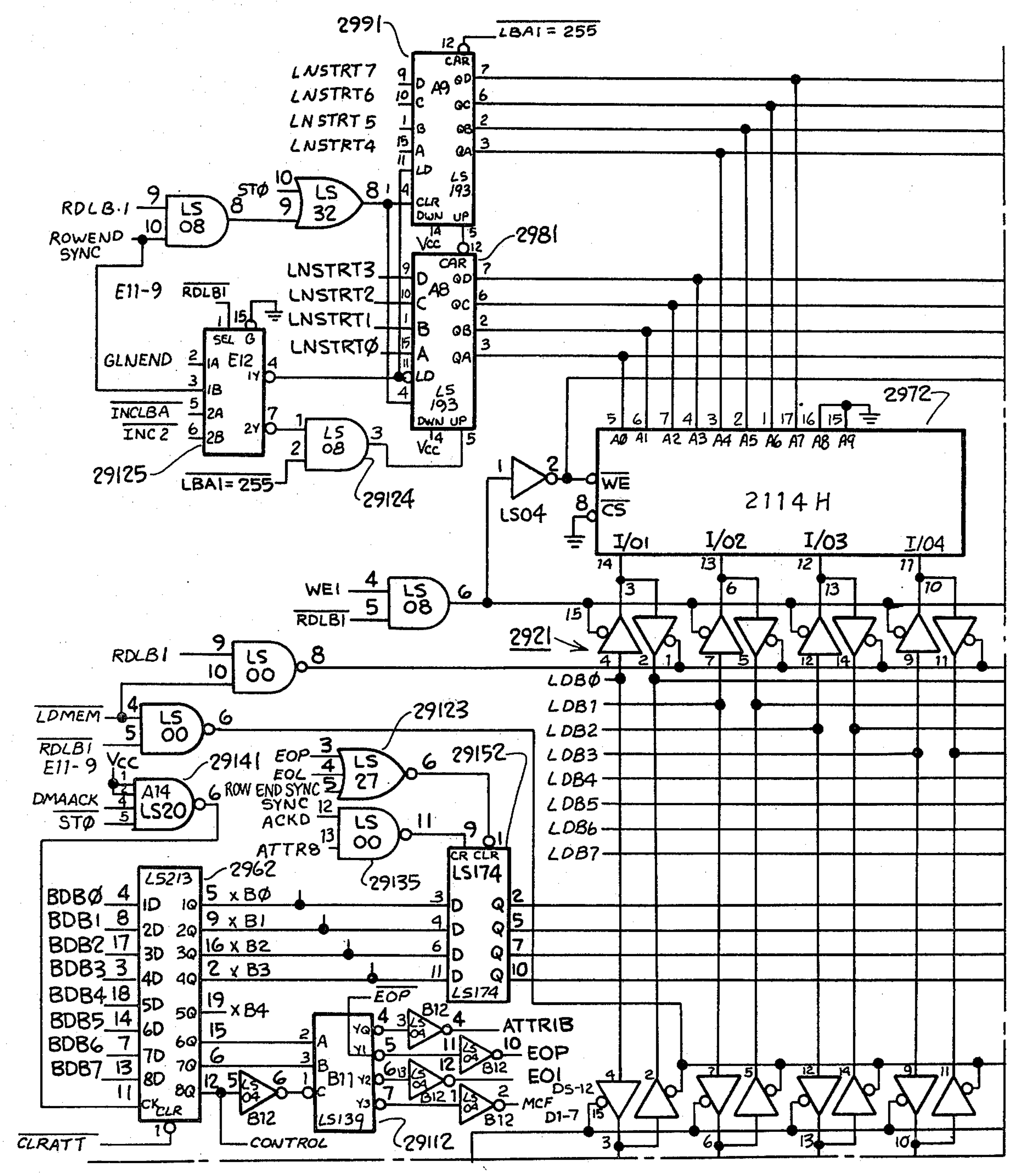
Figure 29B:
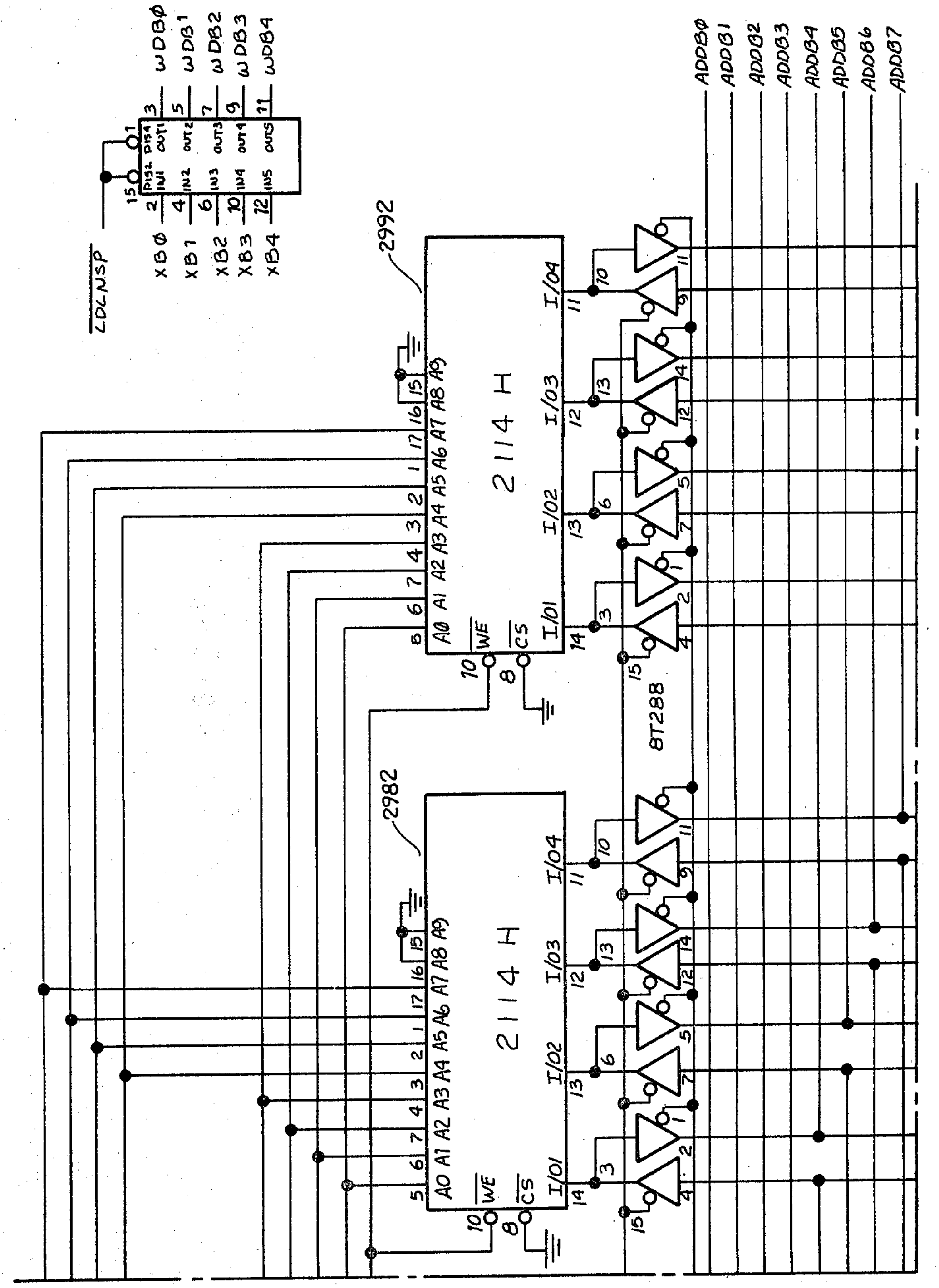
Figure 29C:
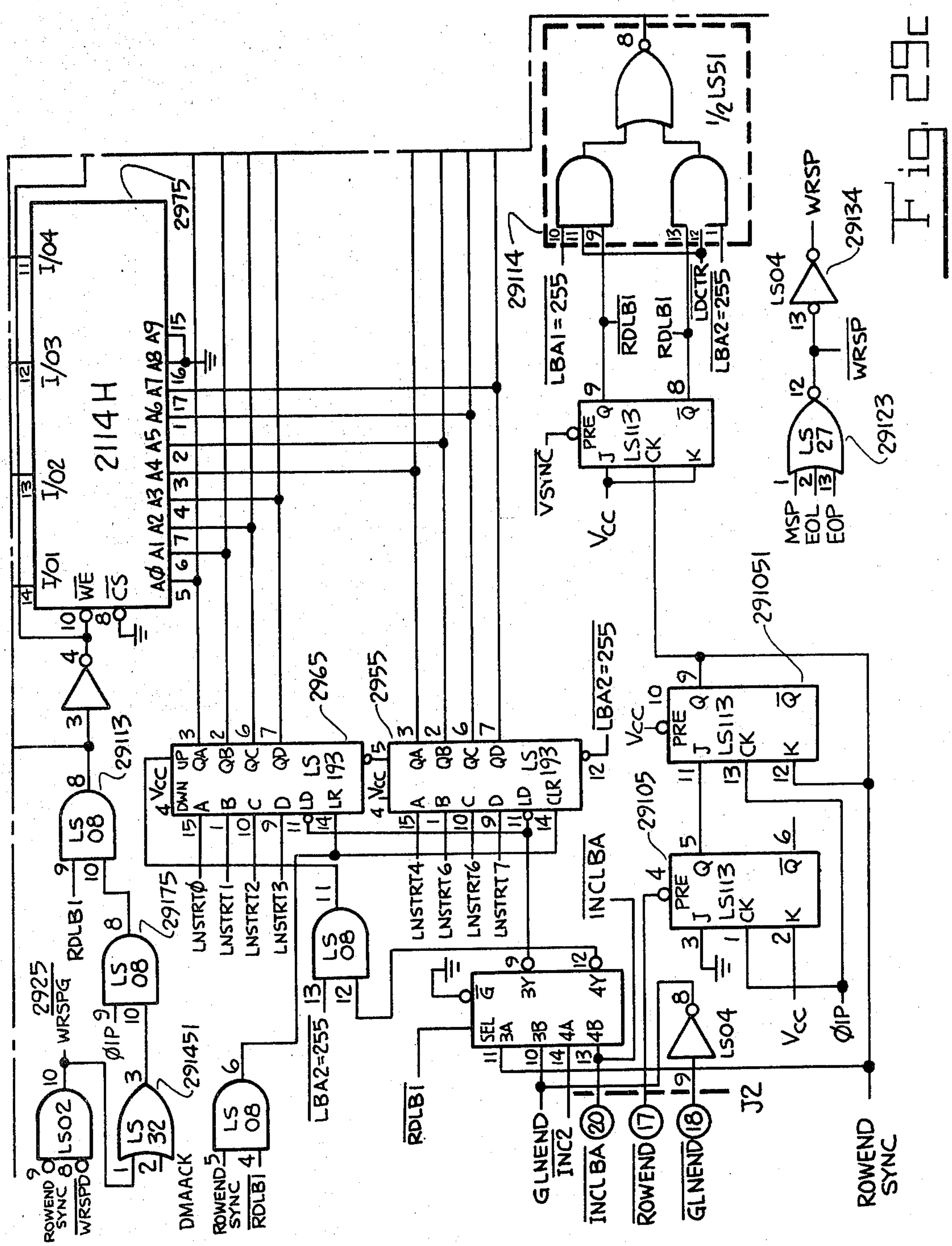
Figure 29D:
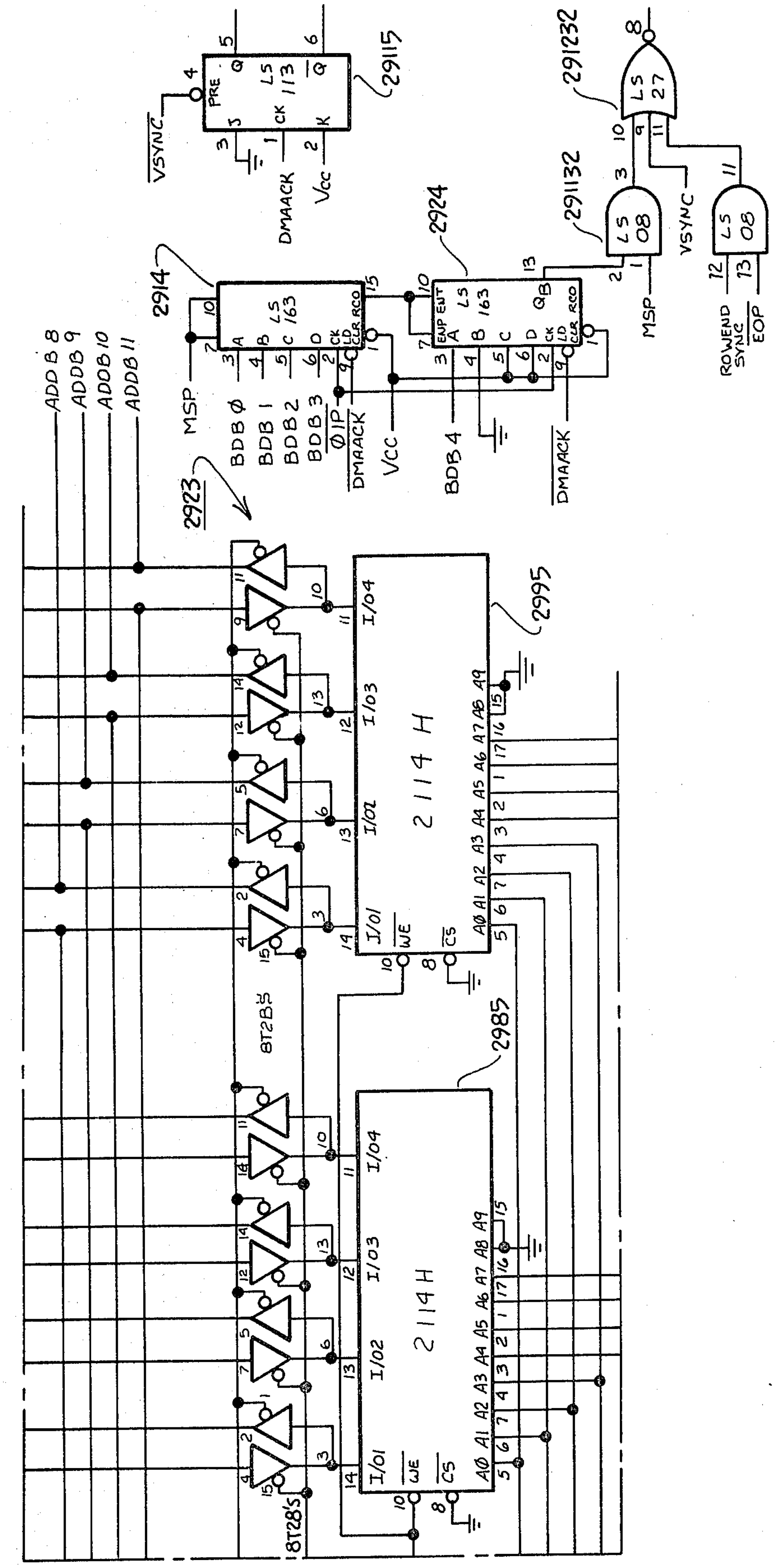
Figure 29E:
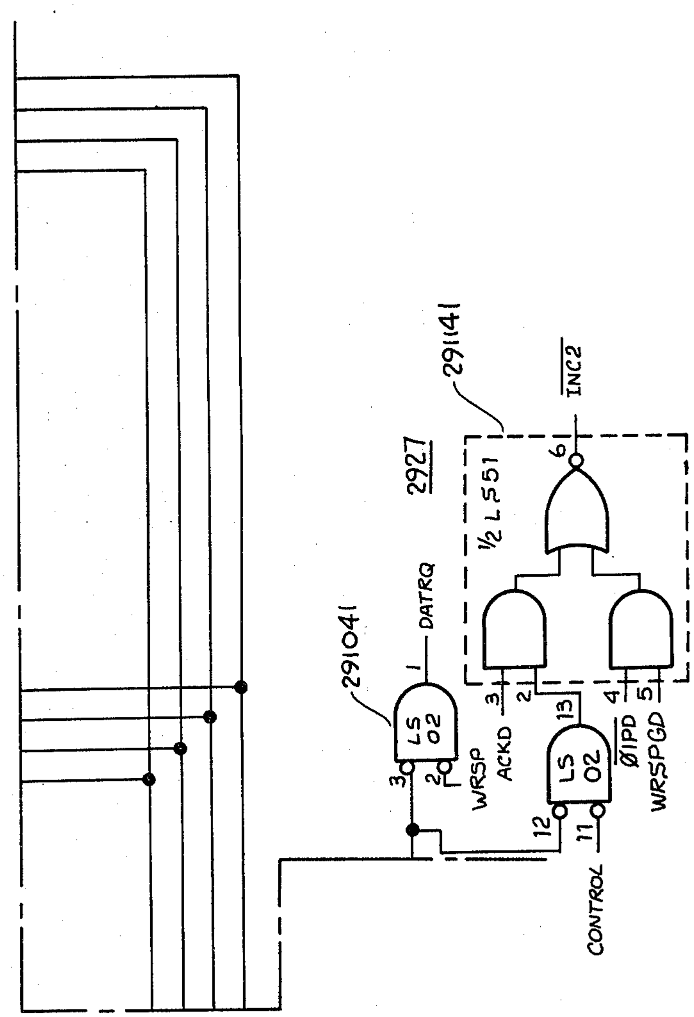

Referring now to FIG. 29, two line buffers are provided, each having three high speed 1K by 4 memory devices, 2972, 2982, 2992, and 2975, 2985, 2995, respectively. Accordingly, each buffer contains 1K by 12 memory. For the present application, only 256 words of the memory are utilized.

Data bus LDB0 through LDB7 carries the data for the memory and loads memories 2972 and 2982 or 2975 and 2985. Memory devices 2992 and 2995 are the attribute memories. A pair of tri-state drivers shown generally at reference numeral 2921 and 2923 separate three buses, namely: the load data bus LDB0 through LDB7; the bi-directional bus connected to pins 11, 12, 13 and 14 of each memory device; and the bus to CRT2 marked ADDB0 through ADDB11. Data is input to the RAM, and is output to CRT2 when appropriate.

A pair of up/down synchronous counters 2981 and 2991 is provided. This pair of counters 2981 and 2991 performs the second half of the DMA operation (that is, it points to the address of the line buffer memory). The input lines A, B, C, and D of counters 2981 and 2991 are connected to line start registers LMSTRT0 through LMSTRT7. The line start register is loaded with the first character to be displayed from the line buffer. This pair of registers is loaded when the display of a new line occurs.

The counters 2981 and 2991, 2955 and 2965, have two functions: they perform one function when the line buffer is being loaded from GPP memory and DMA is taking place; and they perform a second function when that buffer is being used to display characters on the screen. The two line buffers alternate between those two functions. When the top line buffer is being filled from the GPP's memory, the bottom line buffer outputs data to the screen simultaneously. When the end of a display line occurs (that is, a whole line is displayed and the system is about to move on to the next line), the function of the two line buffers is reversed. The buffer that was being loaded during the last line of text now displays, and the one that was displaying text now is loaded from the GPP memory associated with the CRT controller. A ping-pong effect occurs between the line buffers.

There is a mirror image of the circuitry used to drive the top line buffer for driving the bottom line buffer, including counters 2965 and 2955. These two distinct operations (DMA and character display) take place simultaneously at different rates. Accordingly, a two-line to one-line multiplexer 29125 is provided. The lower half of the multiplexer 29125 is used to gate a clock into counter 2981 and 2991. One clock or the other is used depending on whether a DMA transfer or a character display occurs. The two clocks are designated increment line buffer A (INCLBA) and increment two (INC2). The selected clock is dependent upon whether a DMA operation from GPP memory or a display of characters on the screen by the line buffer is occurring.

The other output of the multiplexer 29125 is used to drive the load input terminal LD at pin 11 on the counters 2981 and 2991. A row end sync (ROWEND SYNC) and a gate line end (GLEND) signal are applied to input terminals 2A and 1B of 29125 pins 3 and 2, respectively. The select (SEL) line on the multiplexer 29125 is energized by a read line buffer one (RDLB1) signal.

A DMA operation into memory is a sequential DMA, from line buffer address zero to address 255. An end-of-line code stops the DMA operation and spaces are inserted into the memory. When characters are transferred to the screen, since each character is 15 scan lines high, each character requires 15 memory cycles. In one case the counter increments from zero to 255; and in the other case the counter increments through a portion of its range 15 times per frame.

A row-end (ROWEND) signal from CRT2 is used to mark the end of a display row. ROWEND sets a flip flop 29105 which, together with flip flop 291051, provides a synchronous row end signal. The signal developed is called row-end sync (ROWEND SYNC), which is one Φ period wide.

ROWEND SYNC clocks a flip flop 29115. The J and K inputs on that flip flop 29115 are tied to a voltage potential and accordingly the flip flop 29115 toggles every time a row end occurs. A row end occurs at the end of each displayable line of characters, not on every scan line, but only once every display line per frame. The preset (PRE) input on flip flop 29115 is energized by a vertical sync (VSYNC) signal. Thus, at the beginning of a new field at the top of the page, the ping-pong flip flop 29115 is set to the same state. The outputs of flip flop 20115 are read line buffer one (RDLB1) and read line buffer one (RDLB1) bar signals. The read line buffer signal is connected to the multiplexer 29125, as previously described, to set the clock and load inputs on counters 2981 and 2991.

Lines BDB0 through BDB7, connected to the buffer data bus from the GPP, are coupled to an octal latch 2962. The clock signal for latch 2962 is gated by gate 29141. If the system is not in state zero (at the beginning of the page during the vertical blanking interval) and a DMA acknowledge occurs, device 29141 is energized by STO bar and DMAACK signals. When these signals occur, latch 2962 is loaded. The output of the latch 2962 is connected to a two-line to four-line decoder 29112. Since the gate input at pin 1 of the decoder 29112 is active low, the most significant bit of the octal latch 2962 must be set to enable the decoder 29112.

The decoder 29112 decodes end-of-line, end-of-page, multiple space, and attribute codes. The least significant four bits of the latch 2962, XB0 through XB3, are applied to a latch 29152. Latch 2952 is clocked by a gate 29135. The gate 29135 is active when an attribute (ATTRIB) and an acknowledge delayed (ACKD) signal occurs. The acknowledge delayed (ACKD) signal occurs one Φ period after a DMA acknowledge (DMAACK) signal, just after an attribute occurs. The least significant four bits are latched into latch 29152. The four bits of information are written into the upper four bits of the registers 2992 and 2995. The latch 2952 remains in the same state until either it is cleared or a new attribute is loaded. Accordingly, once an attribute is loaded, it remains active until the next attribute is encountered, or until latch 29152 is cleared.

The latch 2952 is cleared by a three-input NOR gate 29123. The inputs are row-end sync (ROWEND SYNC), end-of-line (EOL), and end-of-page (EOP) signals. An end-of-line or end-of-page character clears the latch 29152 and loads a null attribute into the remaining locations in attribute memory 2995 or 2992. Accordingly, the programmed attributes end on the line for which they are programmed; to carry those attributes to the next line requires another attribute command at the beginning of the next line.

A set of gates at reference numeral 2925 are used to enable the input of tri-state line drivers 2923 to load data into the line buffers. There are two conditions under which a write occurs into the line buffer: one is upon receipt of a DMA acknowledge (DMAACK) signal, and the other is when an end-of-line or end-of-page character is encountered and a write space (WRSPG) signal occurs. The output of an OR gate 291451 is gated with Φ1P. The output of AND gate 29175 is a signal called write enable one (WE1) and is used to perform a write operation. WE1 is applied to an AND gate 29113. If the upper line buffer is being read and displayed on the screen, the lower line buffer can be loaded simultaneously. WE1 is also used to activate the input drivers 2923 to transfer data from the data bus into the memory devices.

There are two input signals to gate 29124 which are used to drive the clock line: one is an output from multiplexer 29125; and the other is a signal called line buffer address one equals 255 (LBA1=255) bar. This signal is a line buffer address counter signal, from the carry (CAR) output terminal at pin 12 of counter 2991. When both counters 2981 and 2991 have inputs of all ones (that is, when count 255 occurs), the LBA1=255 signal goes low (active), deactivating the clock signal to the counter 2981 and 2991 from AND gate 29124. Accordingly, the counter 2981 and 2991 stops at number 255 to avoid wrap around.

The output of octal driver 2421 is connected to the input bus for the line buffer LBD0 through LBD7. All inputs to this driver 2421 are fixed at zero (grounded) except one at pin 15, connected to a voltage potential. The driver 2421 is enabled by a write space delayed (WRSPD) bar signal. A write space operation activates this driver 2421. The input of driver 2421 is tied to a 20 hex (ASCII "space"). Spaces are therefore inserted in the line buffers by this method.

A three-input NOR gate 29123 and an inverter 29134 are provided. The inputs to the three-input NOR gate 29123 are multiple space (MSP), end of line (EOL), and end of page (EOP). The NOR gate 29123 is active when any of these three signals occur to provide a write space (WRSP) bar signal. This circuit is used to initiate a write space operation. A multiple space, an end-of line, or an end-of-page writes spaces into the line buffer. The WRSP bar signal is inverted by device 29134 to provide a write space (WRSP) signal.

The side of a multiplexer 29114 that is active depends upon the state of the ping pong flip flop 29115 Q and Q bar output terminals. If the ping-pong flip flop 29115 is set, and a load counter operation is not occurring (LDCTR signal is active) and if none of the counters 2981 and 2991, and 2955 and 2965 has reached count 255, the 29114 provides an active output signal. The output of the multiplexer 29114 is ANDed with the complement of the write space (WRSP) signal in device 291041 to provide a data request (DATRQ) output signal to initiate a DMA request. The circuit operates such that when a write operation is being performed to one of the line buffers and the line buffer address has not reached 255, and a write space operation is not occurring, the data request signal is generated to initiate a request for a new DMA access.

Circuitry shown generally at reference numeral 2927 increments the counter 2981 and 2991 at the end of a DMA operation. At the end of a DMA transfer, the line buffer address is incremented by an increment two (INC2) bar signal from multiplexer 291141. Similarly, after writing a space into the line buffer (WRSPGD), the address is incremented. Once an end-of-line code is generated, the spaces are filled into the buffer at the Φ clock rate. This occurs more rapidly than DMA transfers. The input terminals to a multiple space counter 2914 and 2924 are tied to data bus BDB0 through BDB4.

The counter 2914 and 2924 is loaded when the DMA acknowledge (DMAACK) signal is active (that is, every time a DMA transfer occurs). They begin to count only when the multiple space (MSP) signal is applied to pins 7 and 10 of counter 2914. The multiple space MSP signal is tied to the count enables. The clock is driven by the ΦIP signal. For every processor clock, the multiple space counter 2914 and 2924 is incremented.

The QB output signal from counter 2924 is applied to a gating circuit shown generally at reference numeral 2929, and is ANDed with the MSP signal in gate 291132. The output of gate 291132 is applied to NOR gate 291232 generating a clear attribute (CLRATT) signal. CLRATT is used as the clear input to latch 2962 to clear any of the four special characters. After the required number of space fill signals are generated by the multiple space character circuitry, the clear attribute (CLRATT) signal is applied to the latch 2962. The next operation is initiated.

The other conditions under which the attributes are cleared are generation of a vertical sync (VSYNC) signal between fields or if an end-of-page function is not being performed and a row-end sync (ROWEND SYNC) signal is encountered at the end of a displayable character line.

A state zero flip flop 29115 is set by the VSYNC signal and is clocked by the DMAACK signal. Accordingly, for each vertical sync operation or for each new field, a dummy DMA transfer takes place. A state zero (ST0) signal is activated and remains active until a DMAACK signal is returned, which initiates a DMA cycle for a new field.

Figure 30:
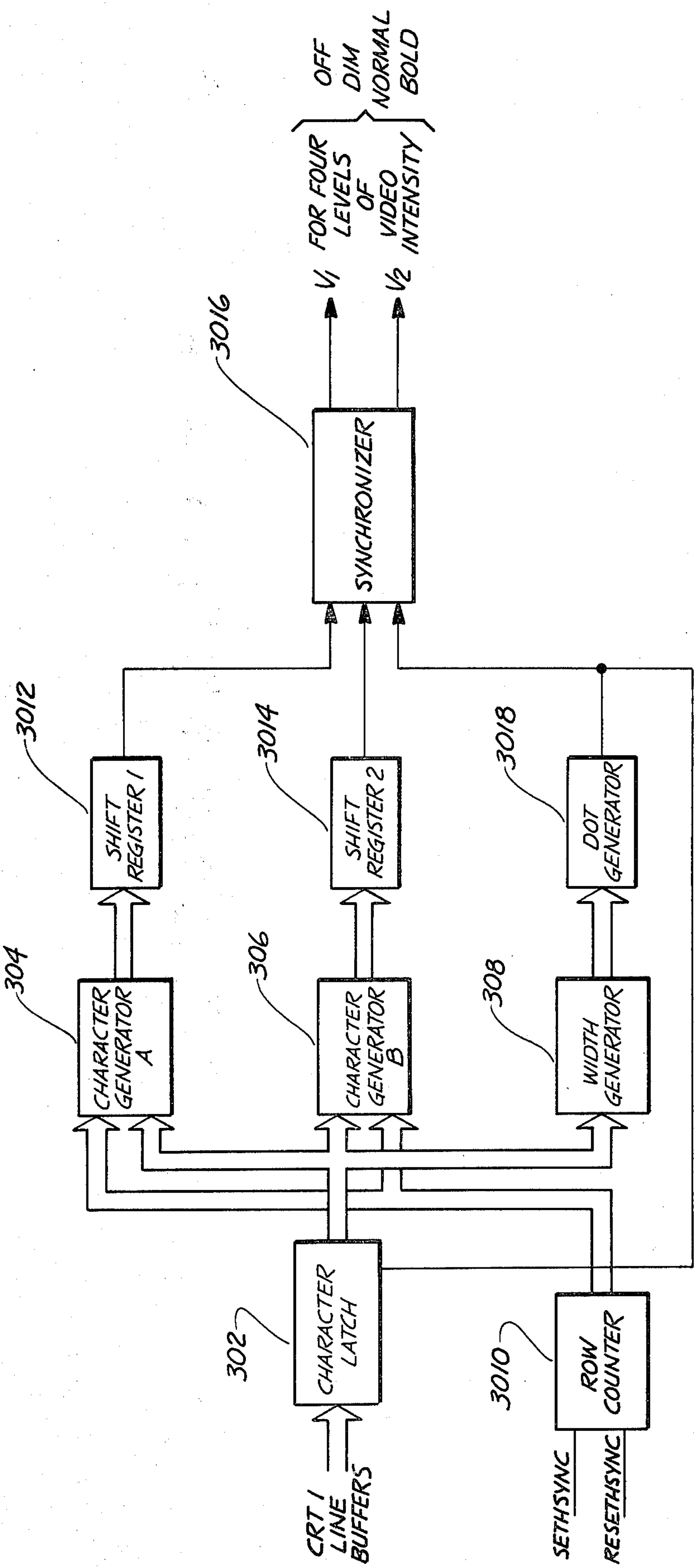

Referring now to FIG. 30, the CRT2 circuit board transfers information from the line buffers on the CRT1 board to a character latch 302. The character is applied simultaneously to two character generator RAMS 304 and 306 and to a width generator 308. Other address lines on the character generator RAMS 304 and 306 are connected to a row counter 3010. The row counter 3010 indicates which row of characters is presently scanned for each character. The outputs of the two character generators 304 and 306 are applied simultaneously to a pair of shift registers 3012 and 3014. Eight lines are coupled to each one of the character generators 304 and 306 and connected to a pair of shift registers 3012 and 3014. The data in the shift registers 3012 and 3014 is shifted out serially simultaneously to a synchronizer 3016. The synchronizer 3016 offsets the output of the two shift registers 3012 and 3014, interlacing them. Shift register one 3012 transfers the first dot; shift register two 3012 transfers the second dot; and shift register one 3012 transfers the third dot. Thus a 16 dot wide character is generated. However due to interlacing the registers 3012 and 3014, each register is operated at half the otherwise required speed.

The synchronizer 3016 generates a pair of separate video signals V1 and V2 used to determine the video level on the screen. Four levels of intensity (normal, dim, bold and off) can be specified.

The output of the width generator 308 loads a dot counter 3018 which is driven by a dot clock, not shown. The output of the dot counter 3018 is applied to the character latch 3012 to load the next character, allowing proportional spacing.

The screen has 1,029 interlaced lines. The row counter 3010 counts 15 rows (scan lines) for each character. The proper counting sequence for normal video and zoom is achieved by the specific circuitry shown in the schematic circuit diagrams of CRT2.

In the zoom mode, the counters are established to display all the lines of both fields. A dot on field one is displayed again on field two, and the characters appear twice the size.

Figure 31:
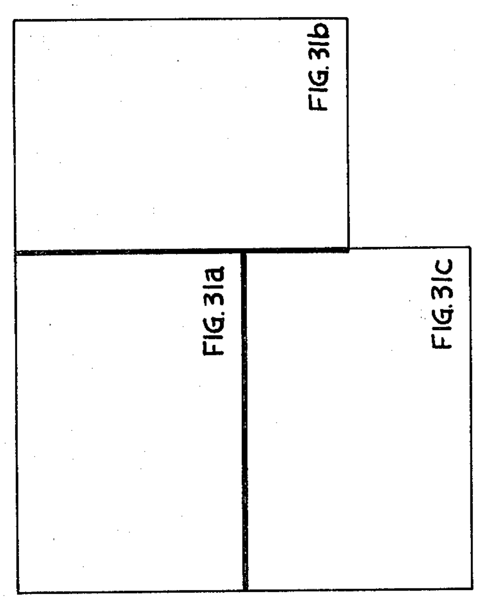
FIGS. 31, 32 and 33, which are interconnection diagrams of FIGS. 31*a* through 31*c* and 33*a* through 33*e* and a state diagram which when taken together are a schematic circuit diagram of the CRT2 controller shown in FIG. 22, and a diagram helpful in understanding the state sequence for the row counter on the CRT2 controller circuit.
Figure 31A:
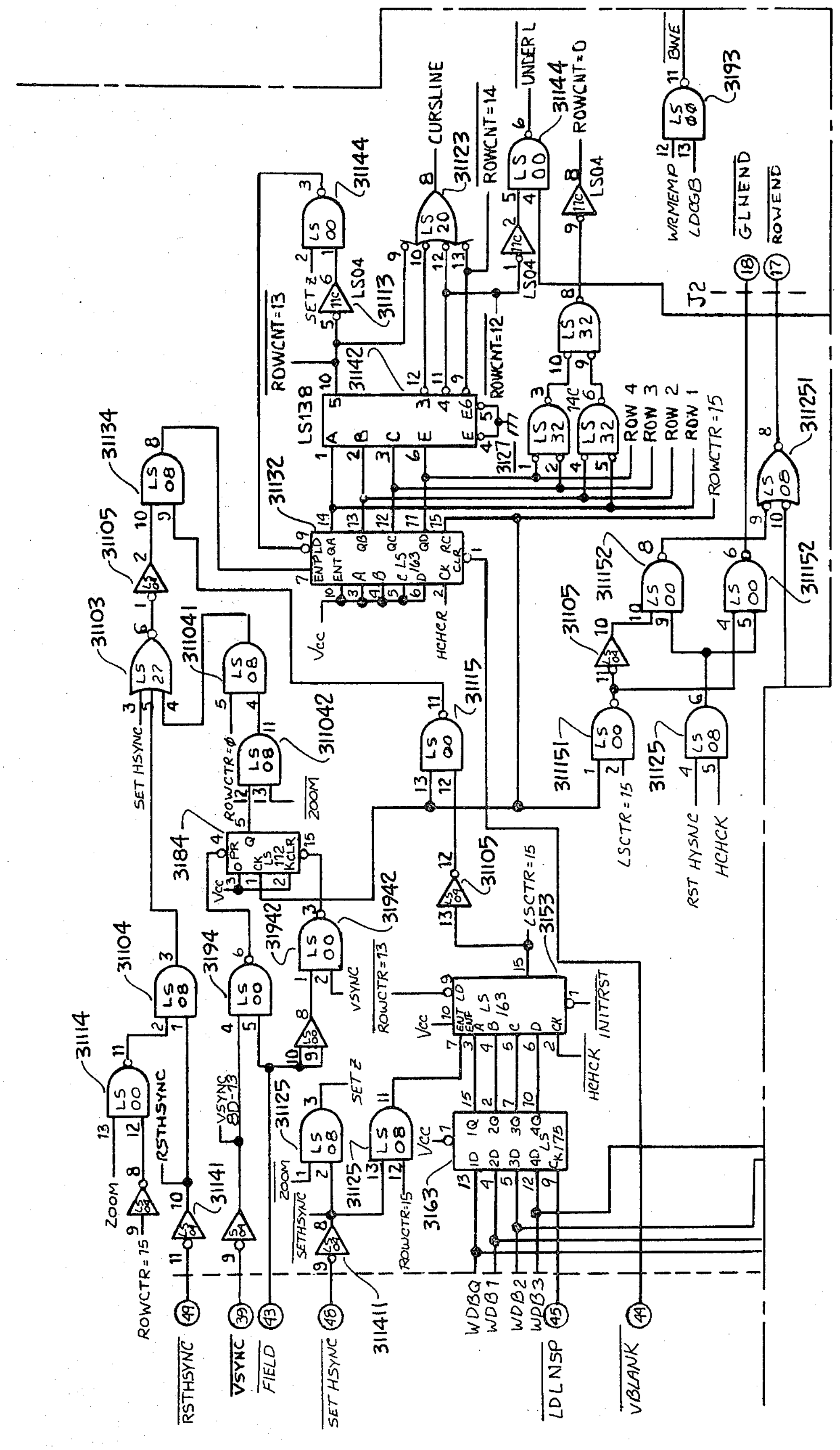
Figure 31B:
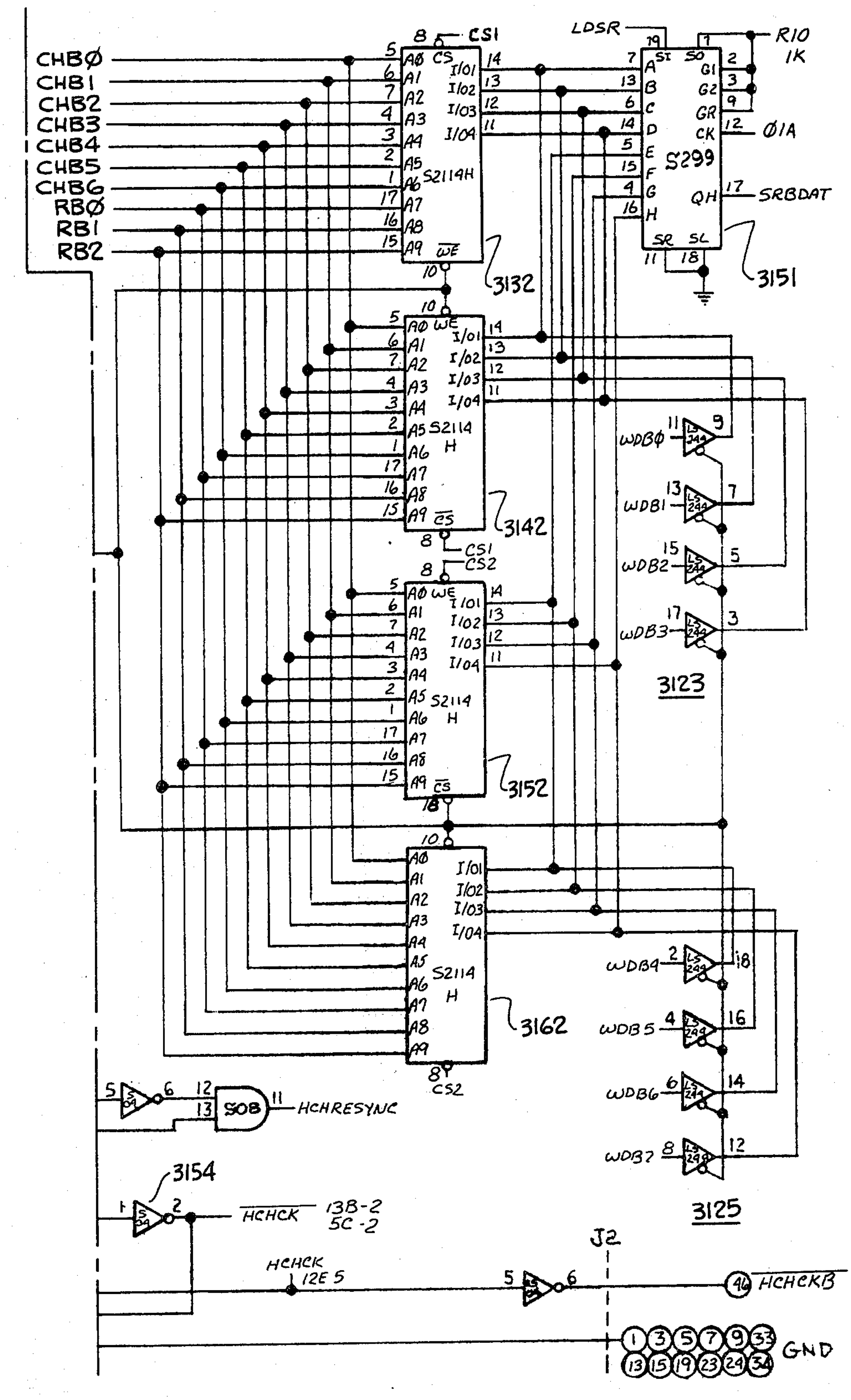
Figure 31C:
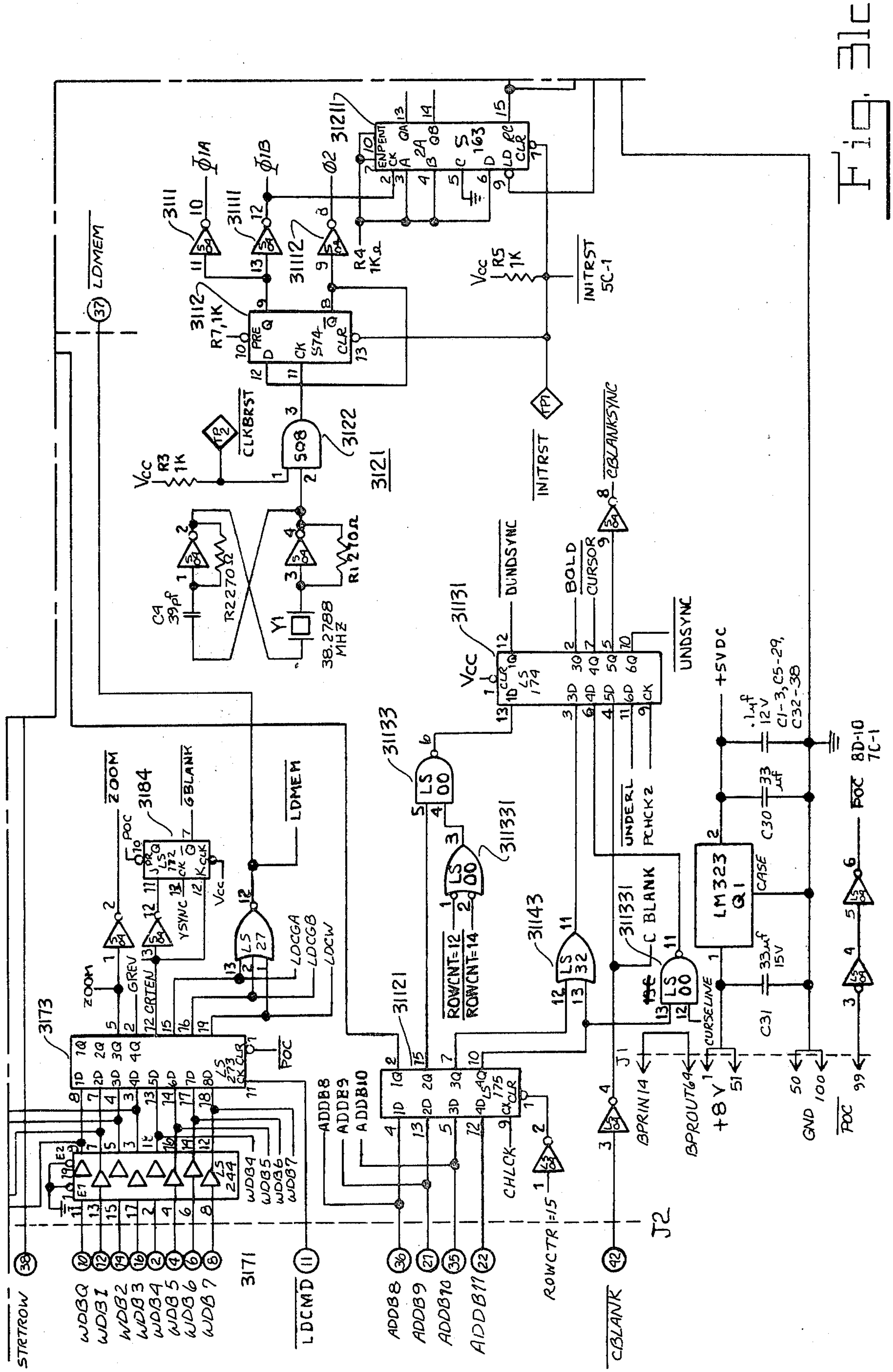

Referring now to FIG. 31, an oscillator or dot clock shown generally at reference numeral 3121 operates at 38.2788 megahertz. The output of the oscillator 3121 is applied to an AND gate 3122. The AND gate 3122 provides a way of disabling the clock for test purposes. The oscillator signal is then applied to a device 3112 which divides the clock frequency by two. The Q output of the divide by two device 3112 has two drivers 3111 and 31111 attached at pin 9. The output from drivers 3111 and 31111 are two phase signals, Φ1A and Φ1B, respectively. The Φ2 signal is generated by divide by two device of 3112 via driver 31112. Thus the signals Φ1 and Φ2 are out of phase, but operating at the same frequency. The Φ1B signal from driver 3111 clocks a synchronous counter 31211. When the counter 31211 reaches 15, pin 15 becomes active.

This signal is applied to an inverter 3154 to the load input (LD) pin 9 on the counter 31211. This loads the next state of the counter 31211 from the A, B, C and D input signals. The counter 31211 operates as a divide by five device incrementing through states 11 through 15. Counter 31211 generates a horizontal character clock B (HCHCKB) signal. It is the source for all timing on the CRT1 board. Thus the dot clock 3121 is halved by device 3112 and then divided by five by device 31211. As a whole, these devices provide a divide by ten function, representing the ten dots of one standard sized character time.

Counter 31211 also generates a horizontal character resync (HCHRESYNC) signal. This HCHRESYNC signal is generated slightly earlier than the ripple carry output pin 15 and before the horizontal character clock B signal. Φ1 and Φ2 are out of phase and used in the synchronizer to interleave the dots from the two serializers. A write data bus zero through seven (WDB0 through WDB7) bus is connected to the CRT1 board. Character set loads and width table loads utilize this data bus. Data is passed through a buffer 3171 which drives the signals WDB0 through WDB7 applied to a command latch 3173. The command latch 3173 is clocked by a load command (LDCMD) signal at pin 11.

When the processor outputs to a signal address 7E, it loads register 3173. The output from register 3173 includes a ZOOM signal at pin 5. The register 3173 also provides a global reverse GREV signal terminal 4Q at pin 2 and a CRT enable (CRTEN) signal pin 12 to activate the screen. CRTEN drives a flip flop 3184 clocked by the VSYNC signal pin 13. The screen cannot be turned on in the middle of the display, but only during the vertical blanking time. The output of flip flop 3184 is marked global blank (GBLANK). Flip flop 3184 is initialized by the power on clear (POC) signal. Thus when power is applied to the system, the screen is off.

The fifth, sixth, and seventh order bits LDCGA, LDCGB, and LDCW pin 15, 16, and 19 on a command register 3107 allow a load operation to the character generators and for the width table. The fifth order bit loads character generator A; the sixth order bit loads character generator B; the seventh order bit loads the character width table. Only one of these bits is set at a given time. During a load character generator operation, the memory for the character generator is mapped so that it appears as if it were processor memory. The memory begins on a 1K byte boundary.

Character generator A carries all of the even dots; character generator B carries all of the odd dots. Accordingly, all the dots are interlaced to cross the horizontal scan. Information comes from the bus (WDB0 through WDB7), enters the character generators through a set of tri-state drivers shown generally at reference numerals 3123 and 3125. The driver outputs are connected to the I/O terminals on memory 3142, 3162, 3132 and 3152. Each of the character generators 3132 through 3162 is a 2K by 8 memory. The write enable gates on memories 3132 through 3162 are energized by a B write enable (BWE) bar signal derived from a NAND gate 3193 the input to which is a write memory pulse (WRMEMP) signal. The other signal input to NAND gate 3193 is load character generator B (LDCBG) from the command register 3173.

A four bit row counter 31132 counts from zero to 14. Its output is applied to decoders, shown generally at reference numeral 3127. A clear input on the counter 31132 is energized by the VBLANK signal.

Thus, every time a vertical blanking operation is performed, the counter 31131 is set to the same state, state zero. The clock to the counter 31132 is the horizontal character clock (HCHCK) signal. It runs at the character rate. The counter 31132 operates only when the enable P (ENP) input pin 7 is active.

A four bit latch 3163 and a four bit counter 3153 are coupled to the ENP line via driver 31105, NAND gate 31115 and AND gate 31134. The counter 3153 is a line space counter which allows the controller to insert blank scan lines for double spacing, or one-and-a-half line spacing. The WD bus (WDB0 through WBD3) loads the four least significant bits of information into latch 3163 whenever an end of line code is encountered. Latch 3163 is clocked by the signal from CRT1 called load line space (LDLNSP) bar pin 9. The information from latch 3163 is transferred into the counter 3153 when the row counter reaches 13 and the row counter equals 13 (ROWCTR=13) bar signal is applied to pin 9 of counter 3153.

The last displayable line is number 14. Accordingly, immediately before the row counter 31132 terminates its operation, it loads the line space counter 3153. If a smaller value is loaded into counter 3153, it inserts the difference in lines between 15 and the value specified. If number four is specified, for example, it inserts 11 lines.

The line attached to the enable P input of row counter 31132 is coupled to an AND gate 31134. One input of 31134 is coupled to NAND gate 31115. The input signals to NAND gate 31135 are row counter equal 15 (ROWCTR=15) and line space counter equal 15 (LSCTR=15) bar signals. Line space counter 3153 is at 15 at all times except when a line space operation is occurring. If the line space counter starts at zero, however, the ROW COUNTER=15 signal is false.

Enable signals are provided to the row counter 31132 pin 7 when the row counter 31132 has not reached 15 and the line space counter 3153 is something other than 15. These enable signals are generated by a three input NOR gate 31103 via an inverter 31105. One input to the NOR gate 31103 is set horizontal sync (SETHSYNC). The SETHSYNC signal is generated by circuitry on the CRT1 board. The other two input signals are from AND gates 31104 and 311041. Every time a set horizontal sync signal occurs and the conditions of the AND gate 31134 pin 9 are met, the signal steps the counter 31132 through one more count.

A reset horizontal sync (RSTHSYNC) signal at pin 49 of connector J2 is applied to a driver 31141 and AND gate 31104. The RSTHSYNC signal is then applied to NOR gate 31103 pin 5. Accordingly, a pulse for set horizontal sync and a pulse for reset horizontal sync is provided to increment the counter 31132 by two. For example, starting with count zero, the first horizontal sync pulse would increment the counter 31132 to count one and to count two for reset horizontal sync. The next line would have a value of two.

Figure 32:
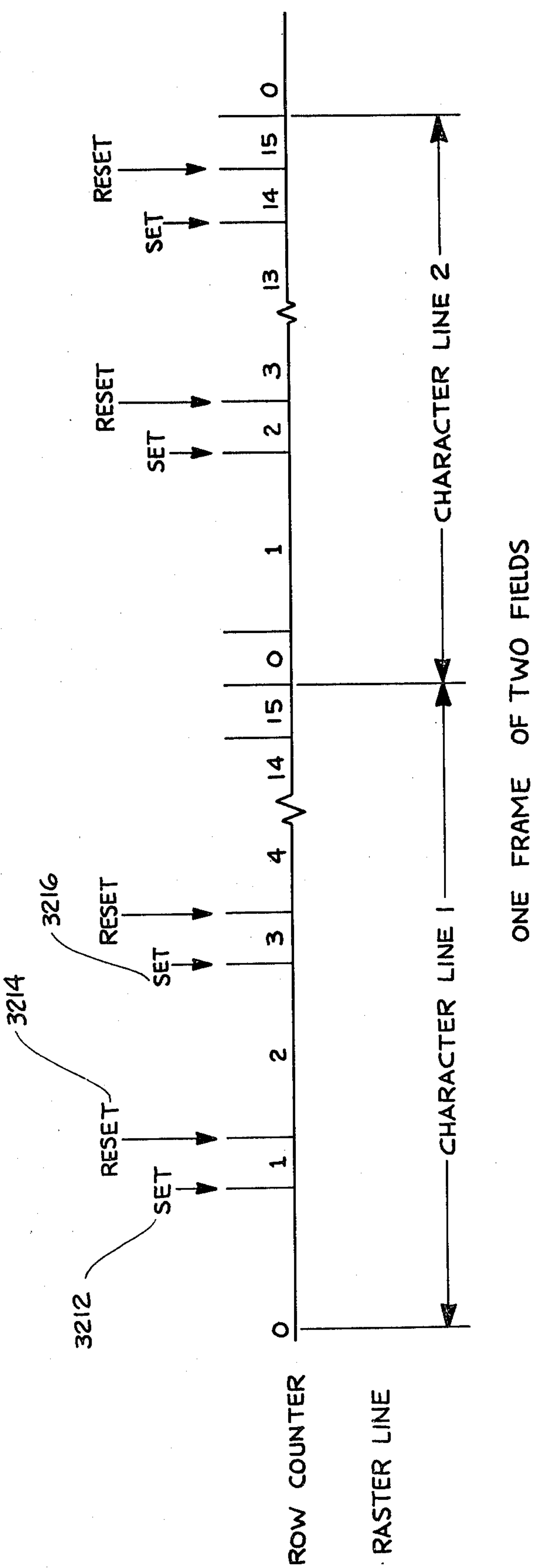

Referring now to FIG. 32, a state sequence for the row counter is shown. Assuming that this sequence begins at the top of the page, for character line one, the row counter for one of the fields starts at row zero. The first set horizontal sync signal is encountered at 3212. A reset horizontal sync signal occurs thereafter at 3214. The time interval between HSYNC signals is small compared to the time interval for a line. For the width of the HSYNC signal, the counter is in state one; when HSYNC goes inactive, the row counter goes to state two and remains in state two for the duration of the displayable line.

Another set HSYNC signal occurs at device 3216. The first displayable line is line zero and the second displayable line is line two. At the end of the second displayable line, the system determines whether the next horizontal sync falls into a similar transition through states three. The next displayable line is accordingly line four, and so on.

All of the even lines are displayed. When the system reaches the last character in character line one, the last displayable line is line 14. Starting with line zero, fifteen lines are scanned, as the two fields are taken together. For character line two, the next displayable line is line one. The next HSYNC signal reaches state two, state three and so on. In this case all of the odd numbered lines are displayed. The last displayable line in this field for character row two is line 13. The counter is then advanced to state 15. From there it returns to state zero, the next character row. State 15 for both character rows does not correspond to a displayable scan line, but is used to properly increment the counter.

Referring again to FIG. 31, the row counter 31132 is advanced by two every time an HSYNC pulse occurs in most cases. Decoder 31142 decodes the present line. One of the outputs of the decoder 31142 is marked row count equals 13 (ROWCNT=—) at pin 10. For the row that corresponds to row 13, a signal is applied from an inverter 31113 to a NAND gate 31144. The other side of the NAND gate 31144 at pin 2 is a signal called SET Z. The output of the NAND gate 31144 is connected to the load (LD) input terminal pin 9 on the row counter 31132. During a load operation, since the A, B, C and D inputs to row counter 31132 are all connected to a voltage potential, the counter 31132 is loaded to state 15.

The source of the SET Z signal via an inverter 31141 is an AND function 31125 of SET HSYNC bar. The other side of the AND gate 31125 is energized by the ZOOM bar signal. The horizontal sync is propagated through gate 31125 when the zoom is not functioning and is designated SET Z. When not in zoom mode, and state 13 of the counter 31132 is reached, the SET Z signal generates a load and the counter is incremented to state 15.

One of the input lines to NOR gate 31103 is tied to an AND gate 311041, one side of which is row counter equal zero (ROWCTR=0), which is derived from a decoder referred to generally as reference numeral 3127. The other input line of the AND gate 311041 at pin 4 is connected to another AND gate 311042. One of the signals to AND gate 311042 is ZOOM bar. The other signal to AND gate 311042 is connected to flip flop 3184. The preset input pin 4 of flip flop 3184 is activated by the output of NAND gate 3194. The inputs to NAND gate 3194 are VSYNC and FIELD bar. The clear input on this flip flop 3184 pin 15 is connected to NAND gate 31942. The same signals VSYNC and FIELD bar energize NAND gate 31942. When the FIELD bar signal is true, a pulse at VSYNC time through 3194 pin 6 is generated to set flip flop 3184. If the FIELD bar signal is false, the VSYNC pulse goes through AND gate 31942 pin 3 to clear flip flop 3184. This occurs during the vertical blanking interval.

The clock input pin 1 to flip flop 3184 is energized by the row counter equals 15 signal. The flip flop 3184 is toggled every time a row is processed. For every displayable row, the counter 31132 passes through state 15. Initially, flip flop 3184 is either set or reset depending on the field being displayed. It is toggled for every displayable row.

The row counter starts at state zero for every field. Flip flop 3184 is toggled at the end of every line. It is either in set or reset depending upon which field is being displayed. When not in the zoom mode, the Q output signal of flip flop 3184 is connected to AND gate 311042. The row counter 31132 equals zero at the beginning of each field because the counter has been set to zero by the vertical blank signal. Thus, an output signal from 311042 is applied to gate 311041 and other logic circuitry to the enable P input pin 7 of the row counter 31132.

The row counter 31132 is incremented from zero to one. The clock signal to the line space counter 3153 is the horizontal character clock (HCHCK) signal, which is also the clock signal for the row counter 31132.

The enable P input on the line space counter 3153 is tied to an AND gate 31125. One side of the AND gate 31125 is the set horizontal sync (SETHSYNC) signal which is active at the beginning of a horizontal sync operation. The other side of the AND gate 31125 is tied to the row counter equals 15 (ROWCTR=15) signal. The row counter 31132 is set to 15 for the last state of the counter for a line. For every line displayed, the row counter 31132 is incremented to state 15.

Once the state of 31132 is at state 15, pulses are applied to the line space counter 3153. If the contents of the line space counter 3153 is other than 15 the line space counter 3153 has been loaded during row count 13. Accordingly, if the contents of the line space counter 3153 is less than 15, the line space counter equals 15 (LSCTR=15) signal is false. The input to NAND gate 31115 is therefore true at count 15. The output of NAND gate 31115 goes false which terminates the enable pulses that allow the row counter 31132 to count. Consequently when row counter 31132 represents the last state in a displayable row state 15, the line space counter 3153 is loaded with a value other than 15. The row counter 31132 is set to 15 and remains in that state.

The line space counter 3153 then begins counting horizontal sync pulses. Accordingly, blank lines are displayed on the screen at the end of displayable lines. The row counter equals 15 signal is applied to the input of NAND gate 311151. The other input to NAND gate 311151 is a line space counter equals 15 signal. If the row counter 31132 equals 15 and the line space counter 3153 equals 15, a new line can be displayed. The output from 311151 goes false, is inverted at device 31105 and NANDed at device 311152 with the output signal from AND gate 31125. This output is the result of restart horizontal sync (RSTHSYNC) and horizontal character clock (HCHCK).

The output of NAND gate 311152 is applied to OR gate 311251 to produce a row end (ROWEND) bar signal. The ROWEND bar signal is synchronized, as previously described on the CRT1 board. It is the signal that toggles the ping pong buffers. The ROWEND bar signal is active at the end. If both ROWCTR=15 and LSCTR=15 are not true, the output of NAND gate 31151 is true. That output is gated at device 31152 with the output of the AND gate 31125 to produce a gated line end (GLNEND) bar signal. The GLNEND bar signal occurs once for every line trace, at the end of the HSYNC signal. It occurs for every line except the last displayable line for the row, given that the line space counter 3153 has also exhausted itself. The GLNEND bar signal is used to indicate the start of a new scan line, not the start of a new row.

The ROWEND bar signal is also driven by another signal from CRT1 called start row (STRTROW) connected from a timing generator. The STRTROW signal occurs once per field and is used to start the display operation.

If the system is in the zoom mode and not in state 15 of the row counter 31132, the output of NAND gate 31114 is false. When that goes false, it prevents the restart horizontal sync (RSTHSYNC) signal from being gated through AND gate 31104.

As previously described, the row counter 31132 is advanced once on SETHSYNC and once on RESETHSYNC. In the zoom mode, except for row counter state 15, the reset horizontal signal is disabled. Accordingly, the count advances only on the SETHSYNC signal and increments through all of its states for a particular field. By doing so, the row counter 31132 expands all characters by a factor of two. The circuitry for advancing the row counter 31132 from zero for some of the lines in each field is also disabled. In the zoom mode, the input to AND gate 31104 is false.

When not in the zoom mode, with gate 311042 enabled, the row counter 31132 is loaded so that it advances from count 13 to count 15. Part of the SET Z signal is derived from an AND gate 31125 which includes the zoom bar signal. Accordingly, in the ZOOM mode, no SET Z signal is generated. In this way the counter 31132 increments from state zero through state 14, through state 15, and back to state zero again.

The row counter 31132 with its associated decoding circuitry is used to generate the attribute signals such as underline, double underline and cursor. The 3-to-8 line decoder 31142 decodes the states eight through 15 of the row counter 31132. The QC, QB and QA inputs of row counter 31132 are tied to the C, B and A inputs of the decoder 31142. Four output signals are ORed together at OR gate 31123 to generate a cursor line (CURSLINE) signal. These four signals are generated by decoder 31142 at output terminals 5, 3, 4 and 6, pins 10, 12, 11 and 9, respectively. CURSLINE represents lines 11 through 14 on the screen. When the cursor attribute is active, a wide underline is displayed.

A row count 12 signal is gated with a signal from an attribute latch 31121 at AND gate 31144 to generate an underline attribute (UNDERL) signal. When row count 12 is reached, the underline signal goes active. The row count 14 signal is also generated. The attribute latch 31121 is coupled to CRT1 through address lines ADDB8 through ADDB11 corresponding to the lines that are attached to the four most significant bits of the line buffers previously described. The attribute latch 31121 is cleared by the row counter equals 15 signal at the end of every line. The attribute latch 31121 is clocked by the character clock (CHLCK) signal. Accordingly, each attribute from the line buffer is clocked in to the latch 31121 sequentially.

The least significant bit of the latch 31121 pin 2 (1Q) corresponds to the underline function. The next most significant bit of the latch 31121 pin 15 (2Q) corresponds to the double underscore, and applied to one input terminal of a NAND gate 31133. The other input to the NAND gate 31133 is tied to an OR gate 311331 which ORs row count equals 12 and row count equals 14 signals. When the row counter 31132 reaches those two rows (12 and 14) it produces an active signal on the output of the NAND gate 31133 pin 6.

A 6-D flip flop 31131 is clocked by a proportional character clock (PCHCK2) signal. The flip flop 31131 is active when a new character is to be displayed. Accordingly, the flip flop 31131 delays the attribute signal by one character at the start and end of an attribute.

The double underscore signal from the attribute latch 31121 is applied to the flip flop 31131 and is delayed to generate the double underscore sync (DUNDSYNC) signal. The DUNDSYNC signal is active during lines 12 and 14 of the display. Accordingly, the signal is gated such that two lines that run across the CRT screen are displayed.

The next most significant bit pin 7 (3Q) on the attribute latch 31121 is applied to an OR gate 31143 through the delay flip flops 31131 to generate a BOLD signal. The most significant bit of the attribute latch 31121 pin 10 (4Q) drives the bold line via OR gate 31143 to generate the BOLD signal and is also applied to NAND gate 311331. The other input of the NAND gate 311331 is the cursor line (CURSLINE) signal. The cursor line is active for lines 11 through 14. The output of that NAND gate 311331 is applied to the delay flip flop 31131 to generate a CURSOR bar signal. When the cursor attribute is active an underline is generated on the display for lines 11 through 14 for the characters to which the attribute applies.

A composite blanking (CBLANK) signal is applied to flip flop 31131 to generate a composite blank sync (CBLANKSYNC) signal. The UNDERL signal is also applied to flip flop 31131 to generate the (UNDSYNC) signal, which is a combination in NAND gate 31144 of the underline attribute and row count equals 12 (ROWCNT=12) signal.

Figure 33:
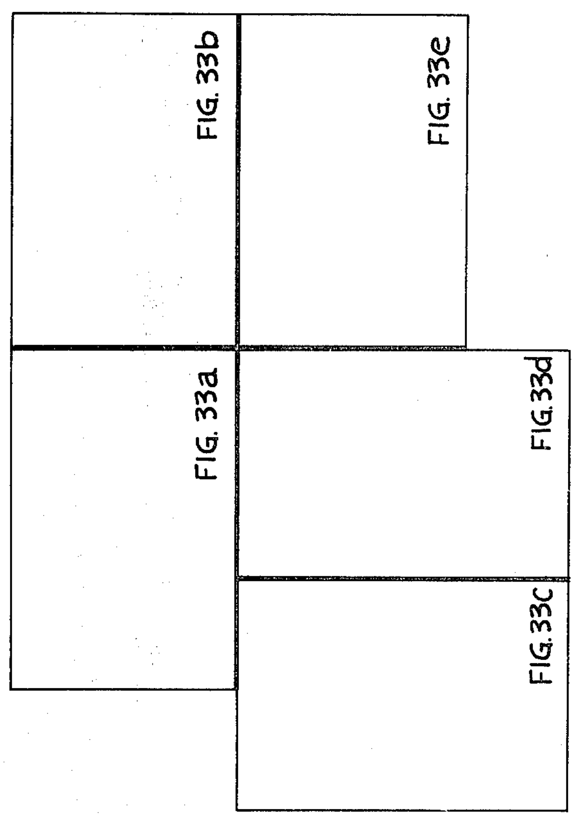
Figure 33A:
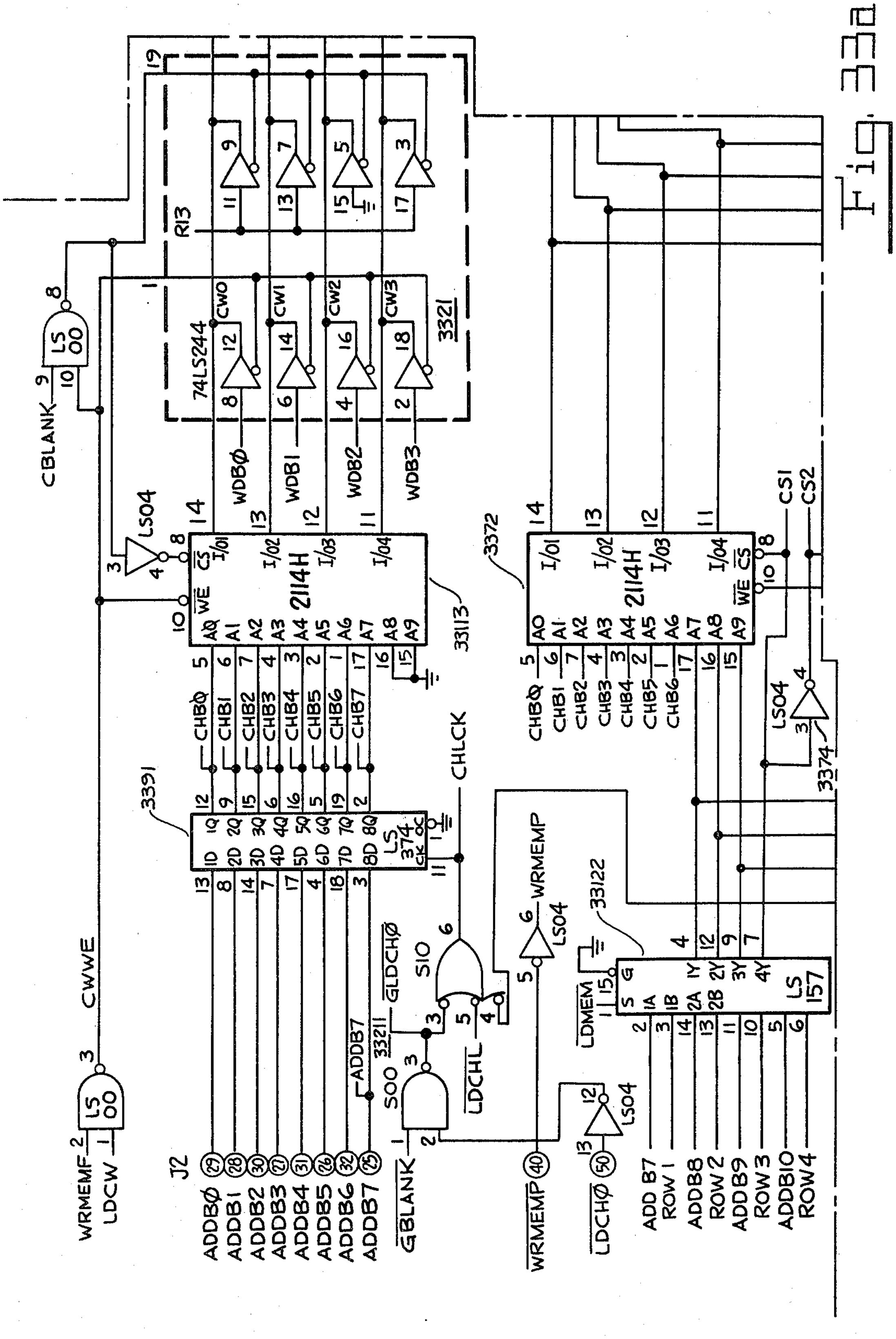
Figure 33B:
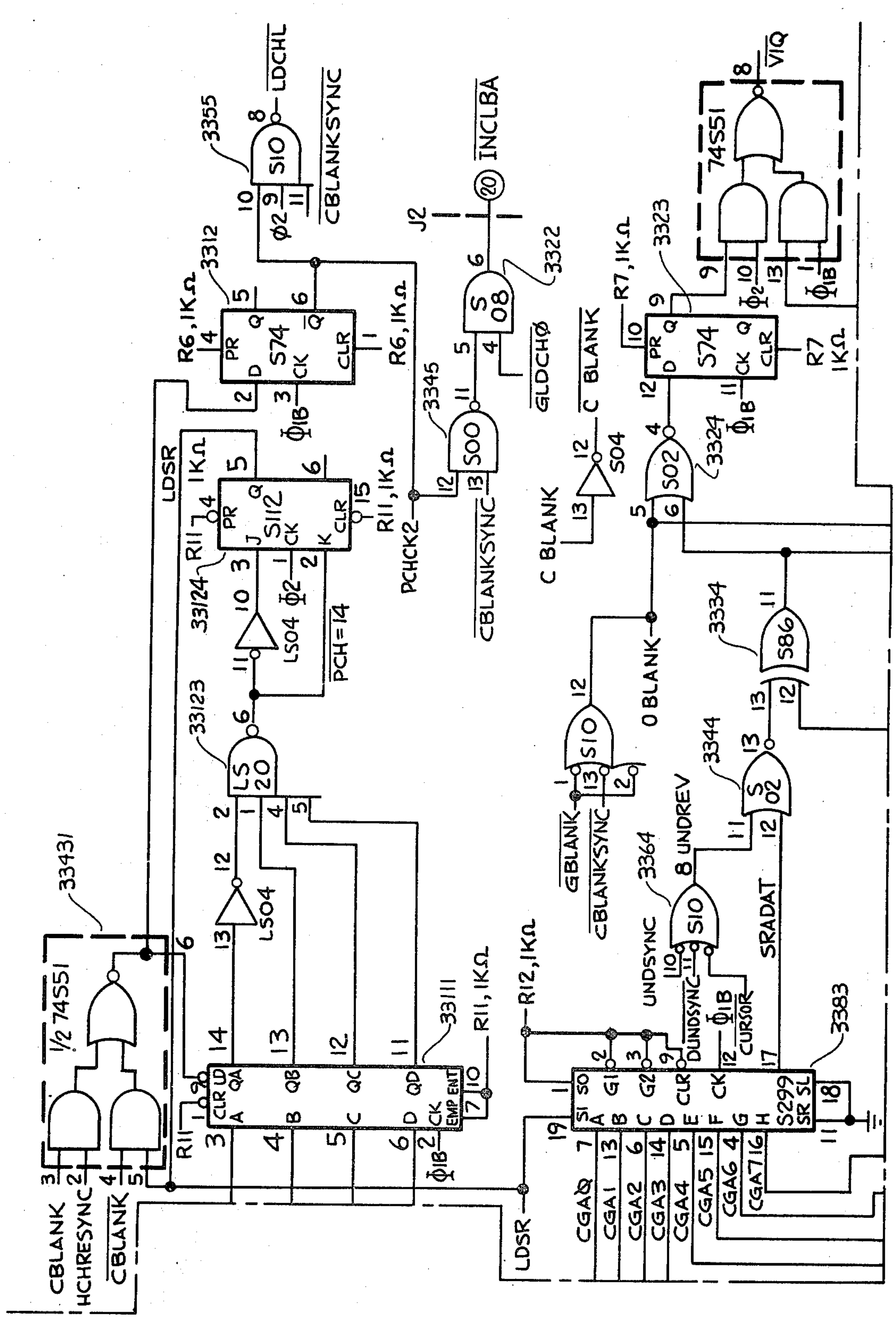
Figure 33C:
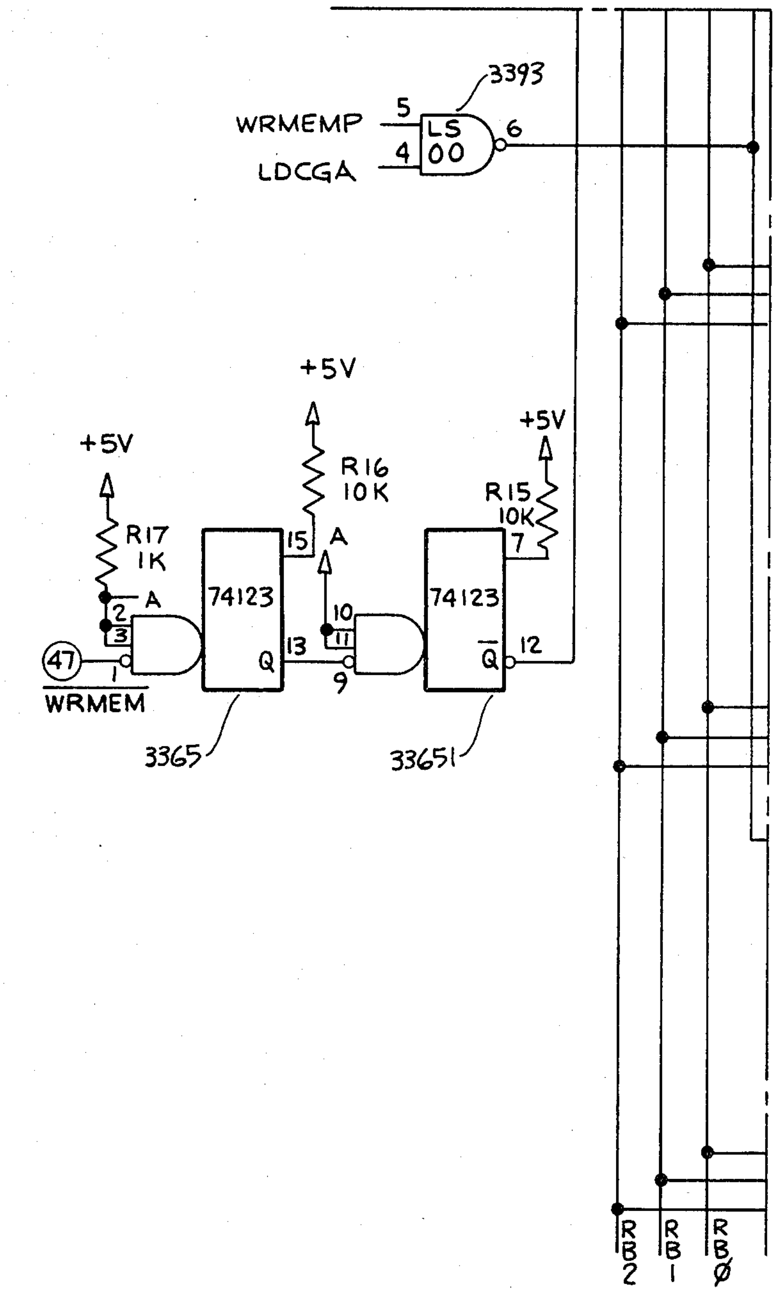
Figure 33D:
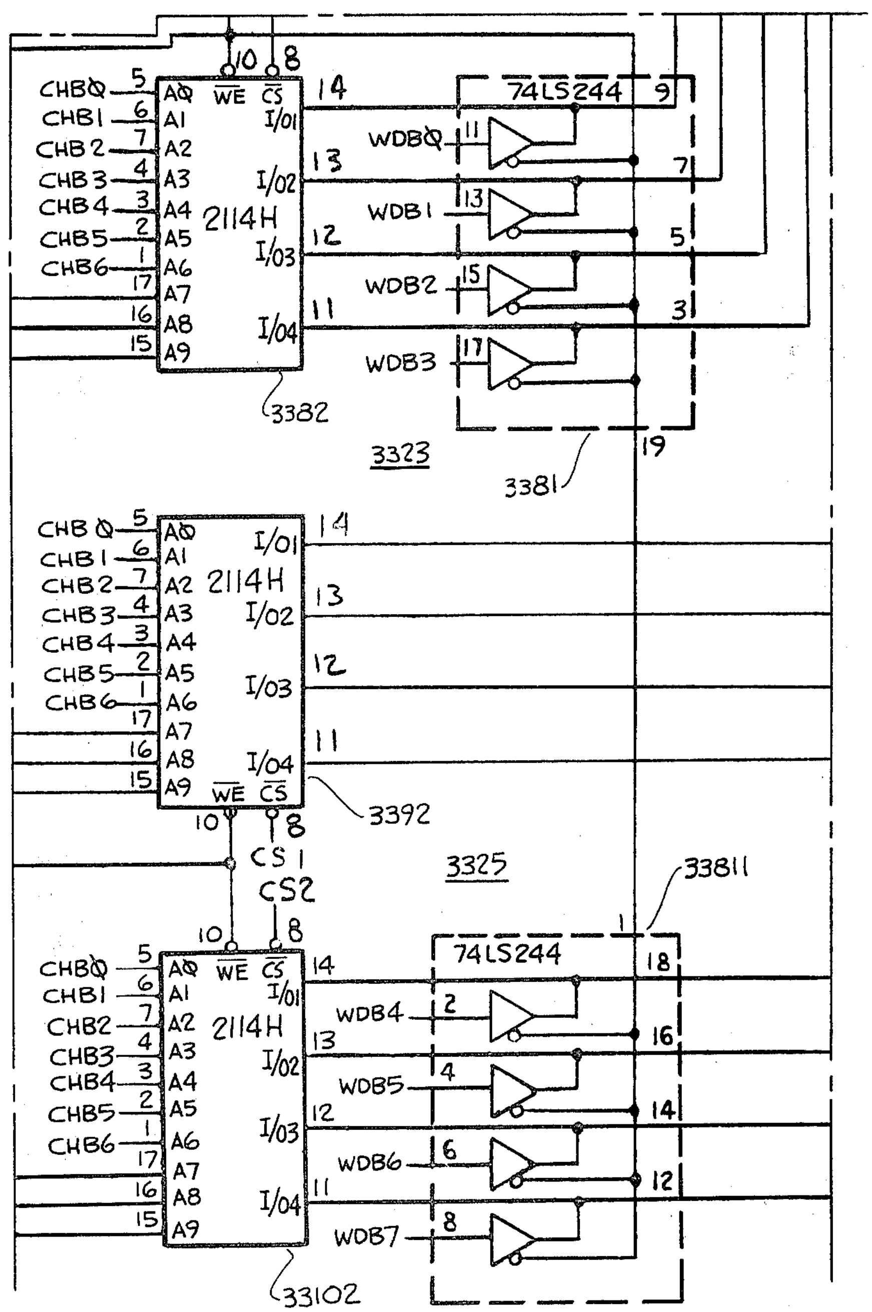
Figure 33E:
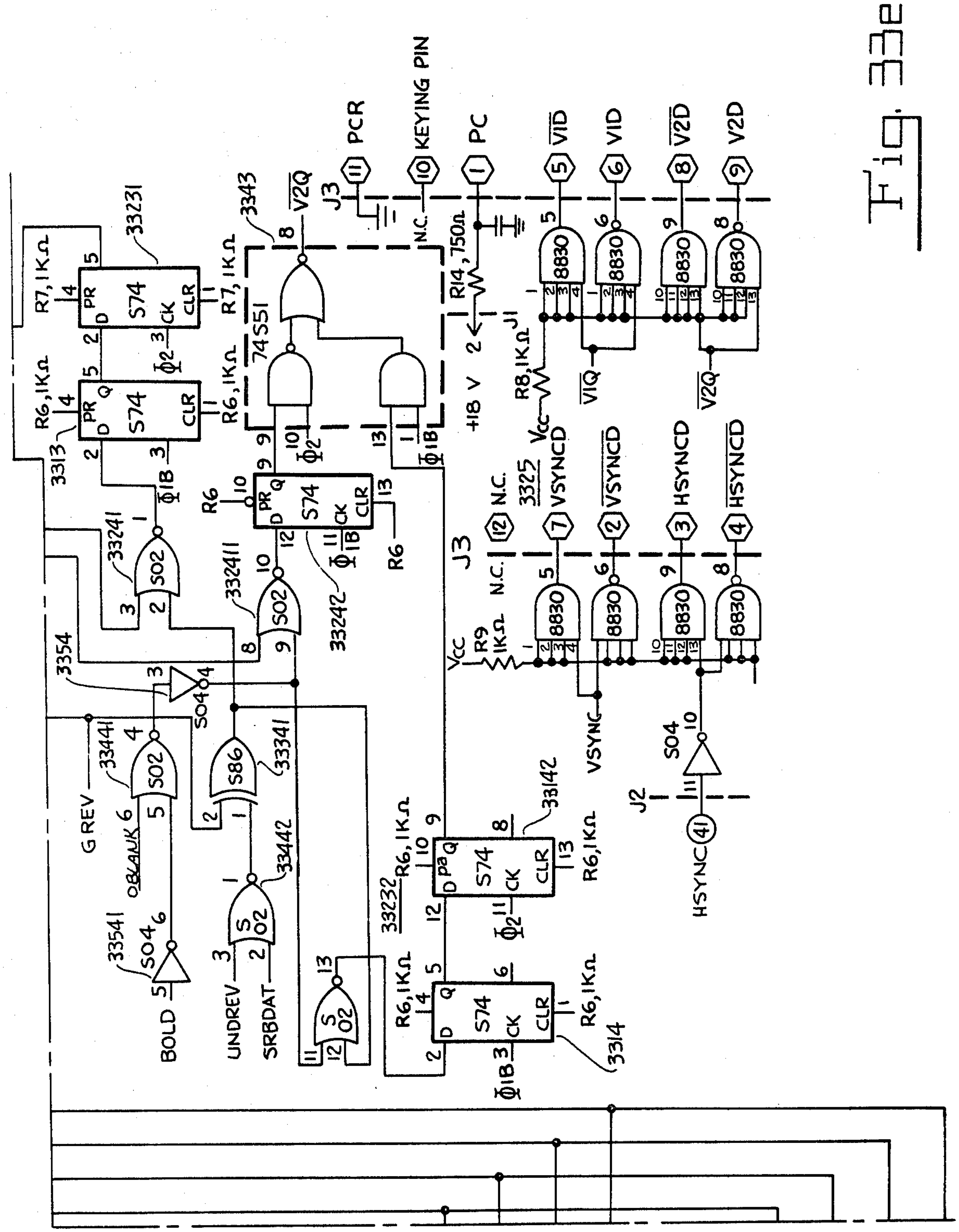

Referring not to FIG. 33, data is input from the CRT1 board over connector J2, on bus ADDB0 through ADDB7 into a latch 3391. Latch 3391 has output terminals forming a bus CHB0 through CHB7 common to the character generators. CHB0 through CHB7 accommodates both data from the line buffers and data from the processor's memory when the character set is loaded.

A multiplexer 33122 is provided. One set of input terminals is connected to ADDB7 through ADDB10, which are used when a character set load operation is performed. Another set of input terminals to multiplexer 33122 is connected to row one (ROW1) through row four (ROW4), representing the four bit outputs from the row counter and normally used when information is displayed on the screen. The output of that multiplexer 33122 drives the three most significant bits of each character generator 3372, 3382, 3392 and 33102. The fourth, most significant bit from 33122 pin 7 (4Y) is used to generate a chip select one (CS1) signal to drive the chip select input terminals for the character generators 3372 through 33102. The complemented version from inverter 3374 is marked chip select two (CS2).

The chip select signals determine which bank of the character generator is being accessed. The select signal on the multiplexer 33122 is a signal marked load memory (LDMEM). When the load memory signal is active, the address lines ADDB7 through ADDB10 to the three most significant bit input terminals of each of the character generators 3372 through 33102 fill the character generators 3372 through 33102 with information. There are, therefore, 11 bits of information, ADDB0 through ADDB10, corresponding to 2,048 different loactions.

The write enable (WE) inputs on the character generator 3372 through 33102 are connected to the output terminal of a NAND gate 3393, one input side of which is connected to a load character generator A (LDCGA) signal from command latch 3173 (FIG. 31). The other input side of the NAND gate 3393 is connected to a write memory pulse (WRMEMP) signal connected to the CRT1 board. NAND gate 3393 is used to properly strobe WE inputs to 3372 through 33102 during the write operation. A pair of one-shots 3365 and 33651 are driven by a write memory (WRMEM) bar signal from CRT1 NOR gate 24135 (FIG. 24). The output of the one-shot pair 3365 and 33651 is coupled to logic circuits 33211. The character latch signal loads the character latch 3391. The one-shots 3365 and 33651 provide a narrow pulse which is a delayed version of the write memory signal for latching data from the processor.

During a read operation, the lower seven bits of the address space for the character generator is driven by the lower seven bits of the data coming across. The character set is 128 characters. That is sufficient to represent an entire ASCII set, special characters and graphic symbols to operate with the special purpose circuitry provided herein. The lower seven bits of the address space for the character generators 3372 through 33102 comes from the data bus coming from CRT1.

The upper three bits of the character generator address space is a function of the designated row. The most significant bit of the row counter 31132 determines which of the character generator parts 3372 through 33102 was accessed. Each of the character generator RAMs 3372 through 33102 has four bits of the 16 possible horizontal bits for a character. Thus, each has ¼ of the character. Character generator 3372 through 33102 provides all of the even dots, and character generator 3132 through 3162 (FIG. 31) provides all of the odd dots.

For character generators 3372 through 33102, one pair 3372 and 3382 displays lines zero through seven, and the other pair 3392 and 33102 displays lines eight to 14. The other character generator 3132 through 3162 (FIG. 31) operates in a similar manner.

Device 33113 is the width table. Since the width of a character is independent of the line on which it is displayed, only the least significant seven bits from the data bus are considered. The output of the character generator 3372 through 33102 is applied to a tri-state bus including tri-state driver sets 3381 and 33811, to drive the eight input lines on a shift register 3383. The register 3383 is clocked by the Φ1B signal at pin 12. The other character generator's shift register 3351 is clocked by the Φ1A signal. Φ1A and Φ1B are the same signal, driven from different sources, but in phase with each other. The output from the two shift registers 3383 and 3151 (FIG. 31) is a synchronized serial stream of data. The output signal from register 3383 on pin 17 is a shift register A (SRADAT) signal.

The SRADAT signal is applied to a NOR gate 3344. The other input to the NOR gate 3344 is connected via gate 3364 to the signals: underline sync (UNDSYNC), double underline sync (DUNDSYNC), and cursor (CURSOR). If any of those attributes are set and the correct row is accessed, the output of the NOR gate 3344 is active, regardless of the shift register output signals. Accordingly, an underline operation can proceed concurrently with a descender type character such as a lower case "y".

The output from NOR gate 3344 is applied to an exclusive OR gate 3334. This component and its associated circuitry are high speed logic circuits. The other side of the exclusive OR gate 3334 is coupled to a global reverse (GREV) signal. If GREV is zero, the signal from the shift register 3383 is passed through the OR gate 3334. If GREV is true, however, the output from OR gate 3334 is inverted, to provide reverse video.

The output of the exclusive OR gate 3334 is NORed by gate 3324 with an overall blanking (OBLANK) signal, which is a combination of overall blanking and composite blanking.

The output of the NOR gate 3324 is applied to flip flop 3323 which is clocked by the Φ1B signal. The output of the flip flop 3323 is gated with signal Φ2 at gating circuit 3333 to provide a video output (V1Q) signal.

The shift register signal output from the exclusive OR gate 3334 drives a NOR gate 33241. The source for the 33241 input via a gate 33441 and an inverter 3354 is a form of the OBLANK and BOLD signals. If BOLD is true, it is inverted in device 33541 and the output signal is false. If the overall blanking signal is not true, the output signal is false. The output of the NOR gate 33441 is true and inverted in 3354. The input signal to NOR gate 33241 is false.

The output of the shift register 3383 is passed through the NOR gate 332411 and into a synchronizing flip flop 33242 clocked by the Φ1B signal at pin 11. The output of that signal is ANDed with the Φ2 signal in gating circuits 3343 to generate video signal V2Q. If BOLD is on, the output of shift register A 3383 is output to both the V1 and the V2 output.

The V1 and V2 outputs control separate intensity controls on the monitor. If V1 and V2 are both true at the same time, a bold character is displayed on the screen. If BOLD is false, a normal video signal is generated using V1Q. The other shift register (B 3151—FIG. 31) operates in a similar manner providing a shift register B data (SRBDAT) signal to NOR gate 33441. The other input to the gate 33441 is the underline reverse (UNDREV) signal. The UNDREV signal is a combination of the signals double underline sync (DUNDSYNC), underline sync (UNDSYNC) and cursor (CURSOR).

There is a symmetry between the processing of the SRADAT and SRBDAT signals. The output signal from NOR gate 33442 is applied to exclusive OR gate 33341, similar to the output of shift register A. The other side of exclusive OR gate 33341 is coupled to the global reverse GREV signal, as before. The output signal of exclusive OR 33341 is applied to NOR gate 33241 as it was for the other shift register 3383. The other side of the NOR gate 33241 is connected to the overall blanking OBLANK signal.

The output of the NOR gate 33241 is applied to a second synchronizer including flip flops 3313 and 33231, clocked by the Φ1B and Φ2 signals, respectively. The output of flip flop 33231 is gated with the Φ1B signal in logic circuits 3333. The effect of this circuitry is to move a dot one half of a Φ1 clock period from the output of shift register A 3383 through gates 3333 to V1Q. Similarly, circuitry shown at reference numeral 33232 processes the output of shift register B 3151 into video signal V2Q via flip flop 3314, 33142 and logic circuits 3343. This is achieved in a similar manner to that just described. In this way the outputs of the two shift registers 3383 and 3151 are interleaved.

Proportional spacing is achieved in the following manner. The output of width generator 33113 is applied to a four bit dot counter 33111. When a new character is to be displayed on the screen, the dot counter 33111 is loaded with the contents of the width generator 33113 for that particular character. The counter 33111 is clocked by Φ1B which is a dot clock. Φ1 operates at half the dot rate due to interleaving of dots. For every Φ1 cycle, two dots are generated. Accordingly, this counter is counting in two dot increments.

Decoder 33123 decodes state 14 to the counter 33111. The output of the decoder 33123 is applied to flip flop 33124. The flip flop 33124 is set on the state after 14. It is clocked by the Φ2 signal. The output of that state derives a load shift register (LDSR) signal applied to pin 19 of shift register 3383 and pin 19 of shift register 3151 (FIG. 31). LDSR is also applied to logic circuits 33431.

If the system is not performing a blanking interval, the LDSR signal is propogated through logic circuits 33431 and is applied to flip flop 3312 which is clocked by Φ1B. A second clock signal, load character latch (LDCHL), is generated by NOR gate 3355 slightly later than the first one (LDSR) and is used to load the character latch 3391 with the next character. The other function of flip flop 3312 is to generate an increment line buffer A (INCLBA) signal in connection with NOR gate 3345 and AND gate 3322 and via connector J2 applied to CRT1. The line buffer counter is thus instructed to perform an increment operation to step to the next character.

The line buffer counter increments and the information from the last character is latched in 3391. The dot counter 33111 is loaded with the value from the width table 33113 and counts by two dot increments until it reaches 14. It then proceeds to latch the next character into latch 3391 and to load the pair of shift registers 3383 and 3151.

Circuitry shown generally at reference numeral 3325 is a set of video differential drivers to provide the proper signal levels to the monitor. The signals driven by circuits 3325 include HSYNC and VSYNC from CRT1 and V1Q and V2Q.

These drivers 3325 take the same signal. For each signal, its drivers are inverting and non inverting to provide a differential output signal between the two output lines. The two output lines are marked, for example, VSYNCD, VSYNCD bar. A power control (PC) line is also passed.

RO PRINTER SYSTEM MODULE

The receive only (RO) printer module is a desk-top unit containing a bi-directional daisy wheel printer, such as a Model 1355 WP Hy Type II manufactured by Diablo Systems Inc. or a printer manufactured by Ricoh Company, a printer controller, a power supply, and a solid-state relay. This module is cable-connected via a serial interface cable to the electronic floor module. Power is supplied to this unit via one 8-foot AC power cord.

The dual display printer produces letter quality copies at speeds of up to 40 characters per second. It prints according to character spacing commands (pica, elite, and proportional) embedded in the text, so that the printed page appears identical to the CRT image.

The printer and keyboard operate independently. Once a document has begun to be printed, another document can be drafted or edited.

The printer power supply provides DC power to the printer and controller. Regulated output voltages are +5, ±15 and +250 DC. When used in the typewriter module, the power supply provides DC power to the display and keyboard in addition to the printer and controller. The supply is a direct-line, switching unit and is fully protected against shorted outputs and over-voltage conditions.

The AC line voltage passes through an RFI filter and is rectified, voltage doubled and filtered to raw DC. If the unit is operated at 230 AC, this section acts as a normal bridge/filter and the jumper is removed. The transistor switch, together with the control circuit and inverter circuit, provide a regulated DC voltage to the transformer primary. Switching frequency is greater than 20 KHz, which is outside audible range. Multi-tapped secondary transformer voltages are rectified and filtered to produce the regulated outputs.

Regulation is accomplished by sensing the 5 volt line and optically coupling the sense line back to the control circuit. If the output drops, the control circuit keeps the switching transistor on for a longer period and vice versa if the output rises too high.

Current in the primary circuit is sensed by a resistor. In the event of a shorted output, the excessive current is sensed and activates the current-limiting function. Output current is reduced to a low level when the short is removed. The supply automatically recovers.

If a failure occurs causing the output voltage to rise above the zener diode rating, the SCR will turn on, shorting the output to ground and causing the current-limiting mode to function.

The RO printer controller is designed to allow a general purpose processor (GPP) board in the electronic system floor module to control a remotely located printer.

The controller outputs paper motion, carriage motion, and print wheel information to the printer and receives status from the printer in parallel form. It communicates to the GPP in serial form. The controller translates commands from the processor into the form required by the printer's parallel interface. The GPP sends commands to the controller one character at a time or in blocks. At any time, the processor may send a command requesting the controller to transmit the current printer status to the processor. The RO printer controller translates the eight bits of status available from the printer parallel interface into serial format and sends it to the processor.

The RO printer controller includes a dedicated 8085 microprocessor which supervises the data passed on the communication link and controls print operations. The controller contains a memory of 256 bytes of PROM and 3K bytes of RAM. Operating software is loaded into the RAM via the serial interface during system initialization.

The GPP issues commands to the printer controller as command sequences which are transmitted via the communications interface. The printer controller must then translate these commands into the parallel format required by the printer and send the commands to the printer.

A select printer input must be true before the printer receives commands or output its ready status.

A restore line initializes the printer. During the restore sequence, all ready lines become false, the carriage and print wheel move to their home positions, and all internal logic circuits are reset. At the end of the restore sequence, the printer, if selected, again becomes ready and can receive commands. The restore is initialized from within the printer by the power on circuit or by the restore line.

A ribbon lift line controls the print ribbon position. When true, the ribbon lifts to the up position for printing in the primary ribbon color. When false, the ribbon remains in its down position for printing in the second color of a two-color ribbon, or to provide printed character visibility when using a single-color ribbon. The ribbon lift disables the print wheel ready status for an appropriate length of time following each ribbon position change to allow for mechanical settling.

The printer uses metal print wheels, which may contain up to 96 character petals, including proportional width character sets. To print a given character, the printer controller outputs a print wheel strobe sequence with a 12-bit command word to the printer.

The lower order seven bits specify petal position on the print wheel; the next three bits specify proportional ribbon advance, and two bits specify hammer intensity. The print wheel ready status must be true before the command is sent, or it is lost. The print wheel strobe initiates an internal sequence which positions the print wheel to the selected character. When all motion, including carriage and paper motion, is completed, it fires the print hammer.

To effect printer carriage motion, the printer controller outputs a carriage strobe sequence and a 12-bit command word to the printer. The lower order 10 data bits represent carriage movement in multiples of 1/60 inch. Data bit 12 specifies an additional 1/120 inch, and data bit 11 indicates motion to the left if true and to the right if false. The controller keeps track of the carriage location not to exceed a total count of 792 increments of 1/60 inch, to prevent the printer from entering a check condition. When proportionally spaced printing is specified, the carriage advance value is calculated on the basis of the proportional space value assigned to each character.

To effect paper feed movement, the printer controller outputs a paper feed strobe sequence to the printer. The 10 low order data bits represent vertical paper feed movement in multiples of 1/48 inch. The eleventh bit indicates movement down if true and up if false, and the twelfth bit is maintained in the false state.

When the printer is enabled by select printer, four lines indicate the status of the several printer operations. A printer ready signal indicates that the printer is receiving proper input power. A print wheel ready signal indicates that the printer is ready to accept and execute a new print wheel or ribbon lift command. A carriage ready signal indicates that the printer is ready to accept and execute a new carriage motor command. A paper feed ready signal indicates that the printer is ready to accept and execute a new paper feed command.

A true signal on a check line indicates that a previously received print wheel or carriage command was not successfully completed due to a malfunction. This condition stops the printer and disables the carriage, paper feed and print wheel ready lines. Only a restore sequence, initialized by either a command from the printer controller or by removal and re-application of power, clears a check condition. A paper out line signal indicates an out-of-paper condition. A cover open signal indicates that the printer front access cover is open. An end-of-ribbon line signal indicates that the ribbon cartridge has been depleted for multistrike ribbons.

The printer controller includes a serial communications channel to support data exchange between the printer module and the electronic module. The communications channel is fully duplex, asynchronous, and operates at a programmable transmission rate of 300 to 9600 baud.

Two additional RS232 lines driven by the GPP in the electronic floor module are provided on the serial communications channel for power control. The power control line activates a solid state relay to apply power to the printer module. When this line is true, printer module power is on; when the line is false, power is off.

The operating software for the printer controller resides in the board RAM. When the system is first powered up, the processor in the printer controller begins execution of a 256-byte bootstrap program located in a PROM on the controller. The bootstrap program uses the serial interface to communicate with the electronic floor module, receive the operating software, store it in the on-board RAM and finally transfer control to RAM. Control can be returned from the RAM to the PROM to reload the program via a command on the serial interface or via a separate reset line under control of the GPP in the electronic floor module.

The printer controller includes circuitry to interface a dual tray automatic sheet feeder to the printer. Signals pass from the controller to the sheet feeder via 12-pin connector J3. The on-board processor generates five command instructions. These instructions are used by the sheet feeder to control form ejection and insertion. The sheet feeder, in turn, applies three control signals to the controller to indicate sheet feeder status.

The RO Printer is a unit designed for word processing applications that require high speed and high quality printing. Electronic control techniques, including inductive transducers coupled to servo drives for fast and accurate positioning of the carriage and print wheel, eliminate many moving parts.

The printer uses metalized proportional space print wheels in 10 and 12 pitch. It includes ribbon advance proportional to the width of the characters to be printed and produces high quality print at speeds up to 40 characters per second.

Carriage movement is bi-directional along the horizontal print line, with the carriage velocity a function of the distance to be traveled to the next print position. The design of the carriage and its drive system allows movement in either direction with equal ease and speed, enabling printing in either direction.

Paper feed is bi-directional. Paper feed options include friction feed forward (up) only and tractor feed forward and forward/reverse. The paper carrier, which includes the platen and drive train, can be adjusted by the operator (platen position lever) for paper thickness up to six part multiple forms.

Table I lists the ASCII code and print wheel position for all of the 88 characters on the word processing print wheel. This table also lists the proportional spacing unit values and the hammer energy level for each print character.

TABLE I

| ASCII Code MSB LSB | Print Wheel Position | Character | Proportional Ribbon Advance Unit Value | Hammer |
|---|---|---|---|---|
| XXXXX | 0 | — | — | — |
| XXXXX | 95 | — | — | — |
| XXXXX | 94 | — | — | — |
| XXXXX | 93 | — | — | — |
| 0100011 | 92 | # | 6 | 4 |
| 0111001 | 91 | 9 | 5 | 3 |
| 0111000 | 90 | 8 | 5 | 4 |
| 0110111 | 89 | 7 | 5 | 3 |
| 0110110 | 88 | 6 | 5 | 3 |
| 0110101 | 87 | 5 | 5 | 3 |
| 0110000 | 86 | 0 (zero) | 5 | 4 |
| 0110100 | 85 | 4 | 5 | 3 |
| 0110011 | 84 | 3 | 5 | 3 |
| 0110010 | 83 | 2 | 5 | 3 |
| 0110001 | 82 | 1 (one) | 5 | 2 |
| 0111100 | 81 | ¼ | 6 | 4 |
| 1111011 | 80 | . | 3 | 1 |
| 0100101 | 79 | % | 8 | 4 |
| 1100000 | 78 | , | 3 | 1 |
| 1011001 | 77 | & | 7 | 4 |
| 0101000 | 76 | ( | 3 | 2 |
| 1000000 | 75 | @ | 8 | 4 |
| 0101001 | 74 | ) | 3 | 2 |
| 0111110 | 73 | ½ | 6 | 4 |
| 1110001 | 72 | q | 5 | 4 |
| 1111010 | 71 | z | 5 | 3 |
| 1111000 | 70 | x | 5 | 3 |
| 1101011 | 69 | k | 5 | 3 |
| 1100010 | 68 | b | 5 | 3 |
| 1110000 | 67 | p | 5 | 4 |
| 1111001 | 66 | y | 5 | 3 |
| 1100111 | 65 | g | 5 | 4 |
| 1110110 | 64 | v | 5 | 3 |
| 1110101 | 63 | u | 5 | 3 |
| 1100011 | 62 | c | 5 | 3 |
| 1101000 | 61 | h | 5 | 3 |
| 1100100 | 60 | d | 5 | 3 |
| 1100001 | 59 | a | 5 | 3 |
| 1100101 | 58 | e | 5 | 3 |
| 1101110 | 57 | n | 5 | 3 |
| 1101111 | 56 | o | 5 | 3 |
| 1110010 | 55 | r | 4 | 2 |
| 1110111 | 54 | 2 | 7 | 3 |
| 1110100 | 53 | t | 4 | 3 |

TABLE I-continued

| ASCII Code MSB LSB | Print Wheel Position | Character | Proportional Ribbon Advance Unit Value | Hammer |
|---|---|---|---|---|
| 1010001 | 52 | Q | 7 | 4 |
| 1110011 | 52 | s | 4 | 3 |
| 1011000 | 50 | X | 7 | 4 |
| 1101010 | 49 | j | 3 | 3 |
| 1101101 | 48 | m | 8 | 4 |
| 1101001 | 47 | i | 3 | 2 |
| 1001011 | 46 | K | 7 | 4 |
| 1100110 | 45 | f | 4 | 3 |
| 1011001 | 44 | Y | 7 | 4 |
| 1101101 | 43 | l | 3 | 2 |
| 1010111 | 42 | W | 8 | 4 |
| 0101100 | 41 | , | 3 | 1 |
| 1000111 | 40 | G | 7 | 4 |
| 0101110 | 39 | . | 3 | 1 |
| 1001101 | 38 | M | 8 | 4 |
| 0100001 | 37 | ! | 3 | 2 |
| 1000011 | 36 | C | 7 | 3 |
| 0101101 | 35 | - (hyphen) | 4 | 1 |
| 1010101 | 34 | U | 7 | 4 |
| 0100010 | 33 | " | 4 | 2 |
| 1000100 | 32 | D | 7 | 4 |
| 0101111 | 31 | / | 4 | 2 |
| 1001111 | 30 | O | 7 | 4 |
| 0111010 | 29 | : | 3 | 2 |
| 1010010 | 28 | R | 7 | 4 |
| 0111011 | 27 | ; | 3 | 2 |
| 1001000 | 26 | H | 7 | 4 |
| 1001001 | 25 | I | 3 | 3 |
| 1001110 | 24 | N | 7 | 4 |
| 0100111 | 23 | ' | 2 | 1 |
| 1000110 | 22 | F | 6 | 4 |
| 1001010 | 21 | J | 5 | 3 |
| 1001100 | 20 | L | 6 | 3 |
| 1010100 | 19 | T | 6 | 3 |
| 1000001 | 18 | A | 7 | 4 |
| 0111111 | 17 | ? | 5 | 2 |
| 1000101 | 16 | E | 6 | 4 |
| 0101010 | 15 | * | 5 | 3 |
| 1010011 | 14 | S | 5 | 4 |
| 1011111 | 13 | _ (underscore) | 5 | 1 |
| 1010110 | 12 | V | 6 | 4 |
| 0101011 | 11 | + | 5 | 2 |
| 1010000 | 10 | P | 6 | 4 |
| 0111101 | 9 | + | 5 | 2 |
| 1000010 | 8 | B | 6 | 4 |
| 0100100 | 7 | $ | 5 | 4 |
| 1011010 | 6 | Z | 6 | 3 |
| 0100000 | 5 | ¢ | 5 | 3 |
| XXXXX | 4 | | | |
| XXXXX | 3 | | | |
| XXXXX | 2 | | | |
| XXXXX | 1 | | | |

Input to the printer from the printer controller consists of four individual strobe lines, 12 common data lines, a select printer line, a ribbon lift line, and a restore line. Output from the printer to the controller consists of five individual ready lines, a check line, and three optional status lines (paper out, end-of-ribbon, and cover open). All of these lines channel through the I/O connector J7 located along the top edge of the printed circuit board (PCB) in the printer's electronic compartment to the RO printer controller PCB.

The printer uses a microprocessor based logic system. Data portions of the several types of commands are multiplexed together on the 12 common data lines, and share common input and control circuits. The microprocessor continuously circulates command and situation data for each of the several printer functions. It performs an arithmetical update operation for each function on every program pass or cycle. The processed data is channeled out to the individual drive circuits to activate the function.

When power is applied to the printer, its internal circuits are all reset and ready to receive commands. Prior to issuing any commands, the controller must first issue a SELECT PRINTER=LO signal to select the printer, and must receive from the selected printer an LO signal on each of the five ready lines to ensure that the printer's systems are ready to receive and execute commands.

Movement commands are accepted from the controller by the printer. They are then gated out at the proper time to the microprocessor storage and processing circuits. The microprocessor's program then controls the step-by-step handling of all data throughout the circuit.

Processed print wheel and carriage commands are applied to the servo PCB, where, in conjunction with position feedback transducers, positional error signals are generated. These error signals are channeled to the appropriate power amplifier PCB's, where they become servo drive signals for the print wheel and carriage servo motors. Feedback loops, beginning at the position transducers on each of these motors, introduce continuously updated true position status to the servo circuits and to the microprocessor for an ongoing comparison of present-to-commanded position. The results of these comparisons are the positional error signals mentioned above.

Processed ribbon commands are applied directly to the ribbon drive circuits on the print wheel power amplifier PCB. Processed paper feed commands are applied directly to the paper feed drive circuits on the carriage power amplifier PCB. Both of these are one-way instructions which do not rely on position status feedback to the logic circuits for position update. All printer functions may be in motion except during print hammer fire time. Since the act of imprinting a character mechanically bridges all moving functions, they must all be at rest prior to energizing the print hammer solenoid. A system of firmware interlocks ensures that these preconditions are all met before firing of the print hammer is allowed.

The printer's electronic design includes firmware for resetting and initializing carriage and print wheel servos. This is called RESTORE, a program activated by conditions within the printer, or by command from the controller. The RESTORE operation is divided into two parts: carriage initialization, and print wheel initialization.

Carriage initialization is performed first in any sequence. The carriage is commanded to move to the left (reverse at low velocity). When carriage home is detected (a sensor located under the left end of the front carriage rail where a light beam is interrupted by the arrival of the carriage), the carriage servo is hailed. After 0.1 second, the carriage is commanded to move to the right (forward). After the microprocessor detects the absence of carriage home, it allows the carriage to move two more position increments of 1/120 inch each, or 1/60 inch, and stops the carriage. This location is designated as the carriage home position.

Print wheel initialization is performed after the carriage has been initialized. The print wheel is commanded to rotate clockwise at a velocity corresponding to a move of 30 counts (15 character "petals"). After the third time that the microprocessor detects print wheel home, the absolute counter is set to zero and the print stops after 30 difference counts. This is the print wheel home position and is at the tab on the print wheel.

Logic I PCB is the interface between the printer's microprocessor and the printer controller. This PCB channels commands to the microprocessor and printer status signals to the controller. It routes print wheel and carriage servo position feedback to the microprocessor to update these activities, and contains the main system clock.

Figure 34:
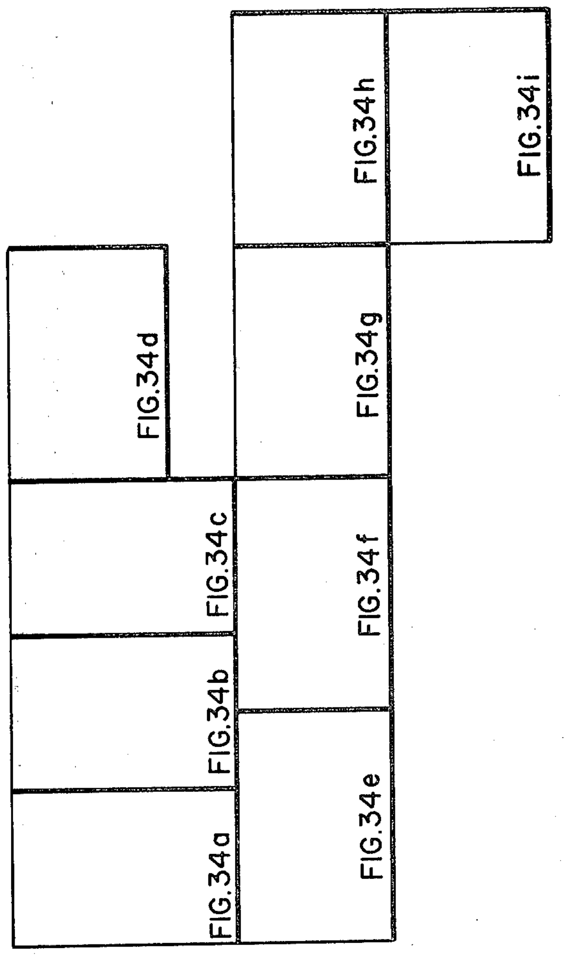
FIG. 34 which is an interconnection diagram of FIGS. 34*a* through 34*i* which when taken together are a schematic circuit diagram of the receive only printer controller.
Figure 34A:
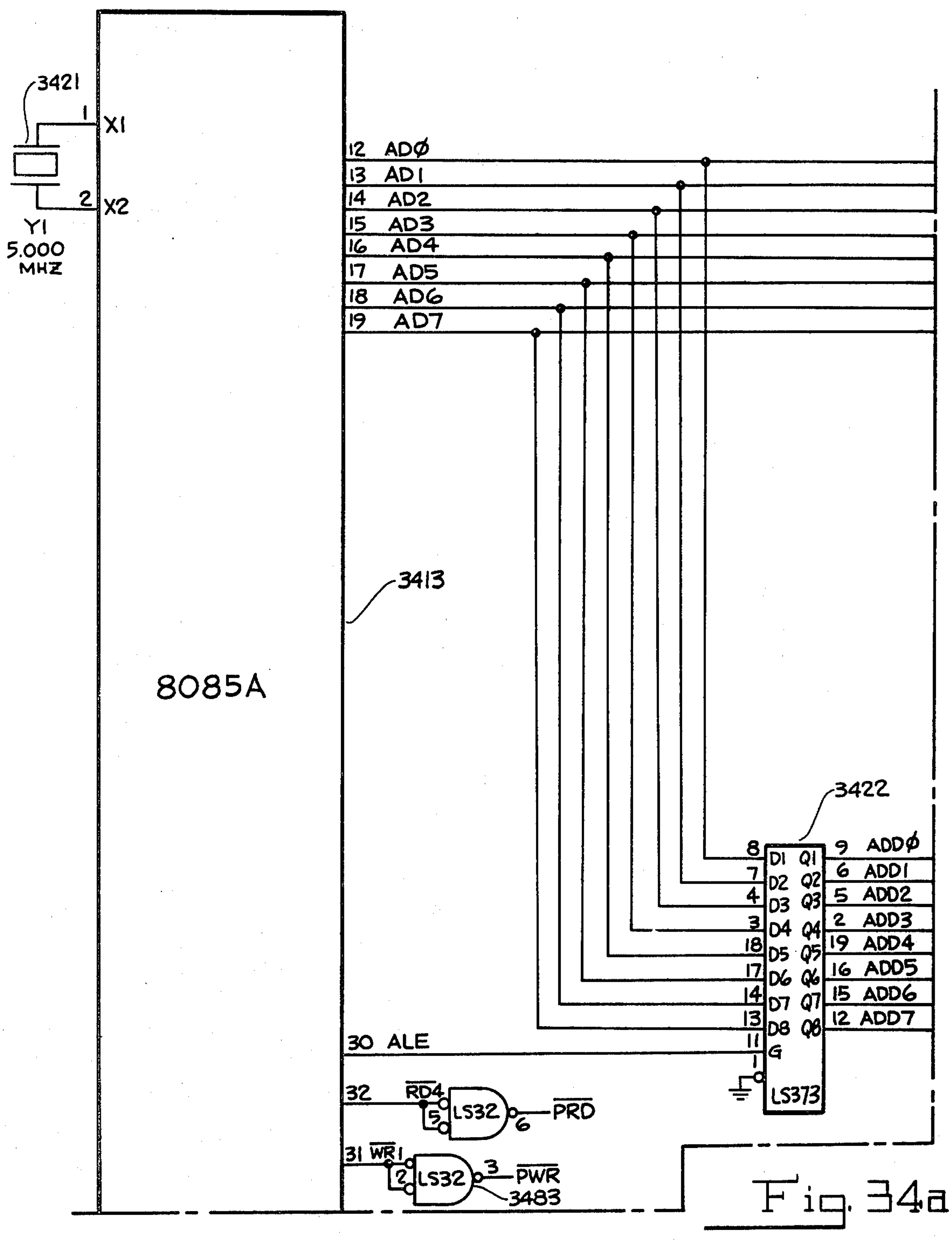
Figure 34B:
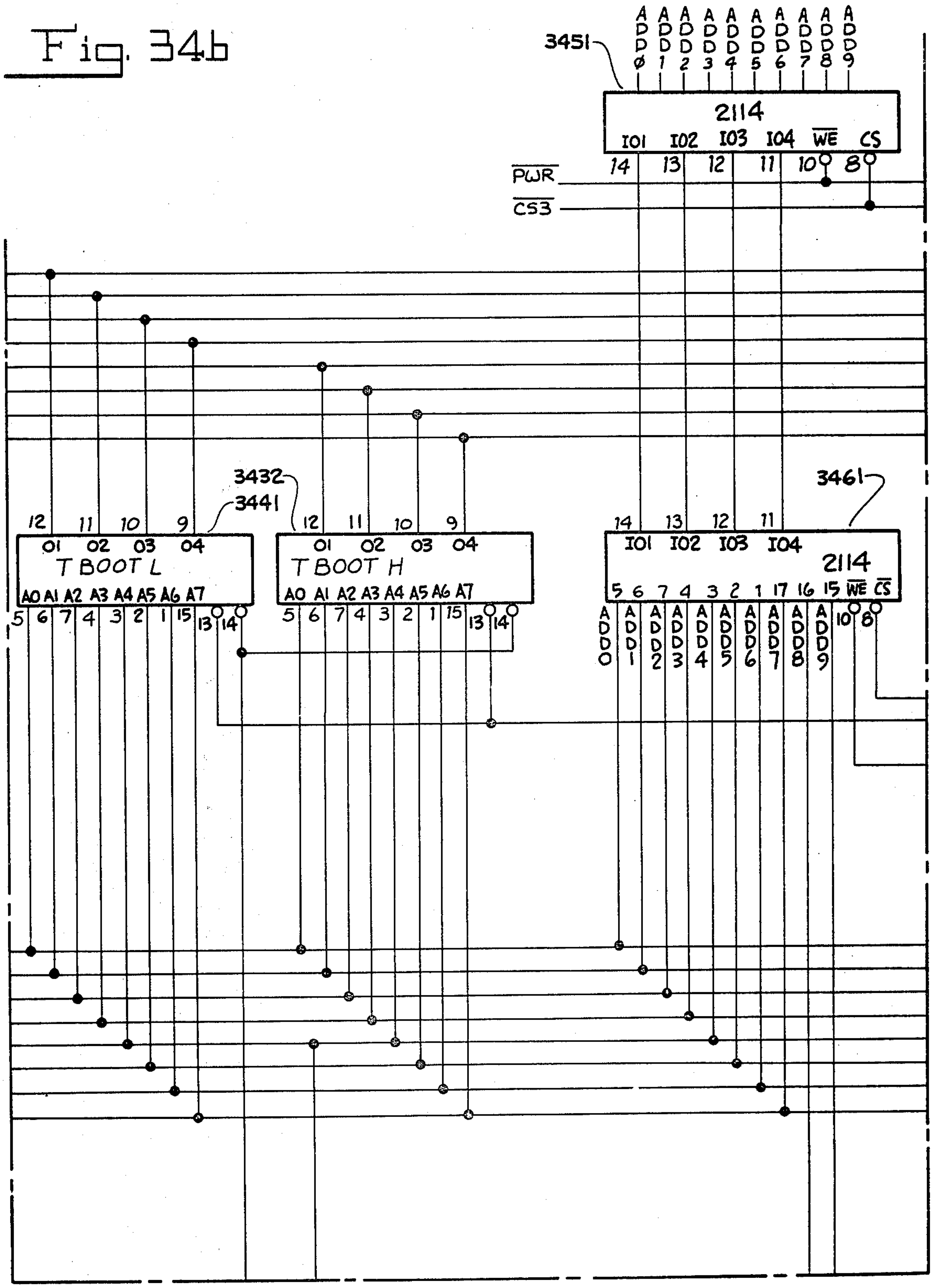
Figure 34C:
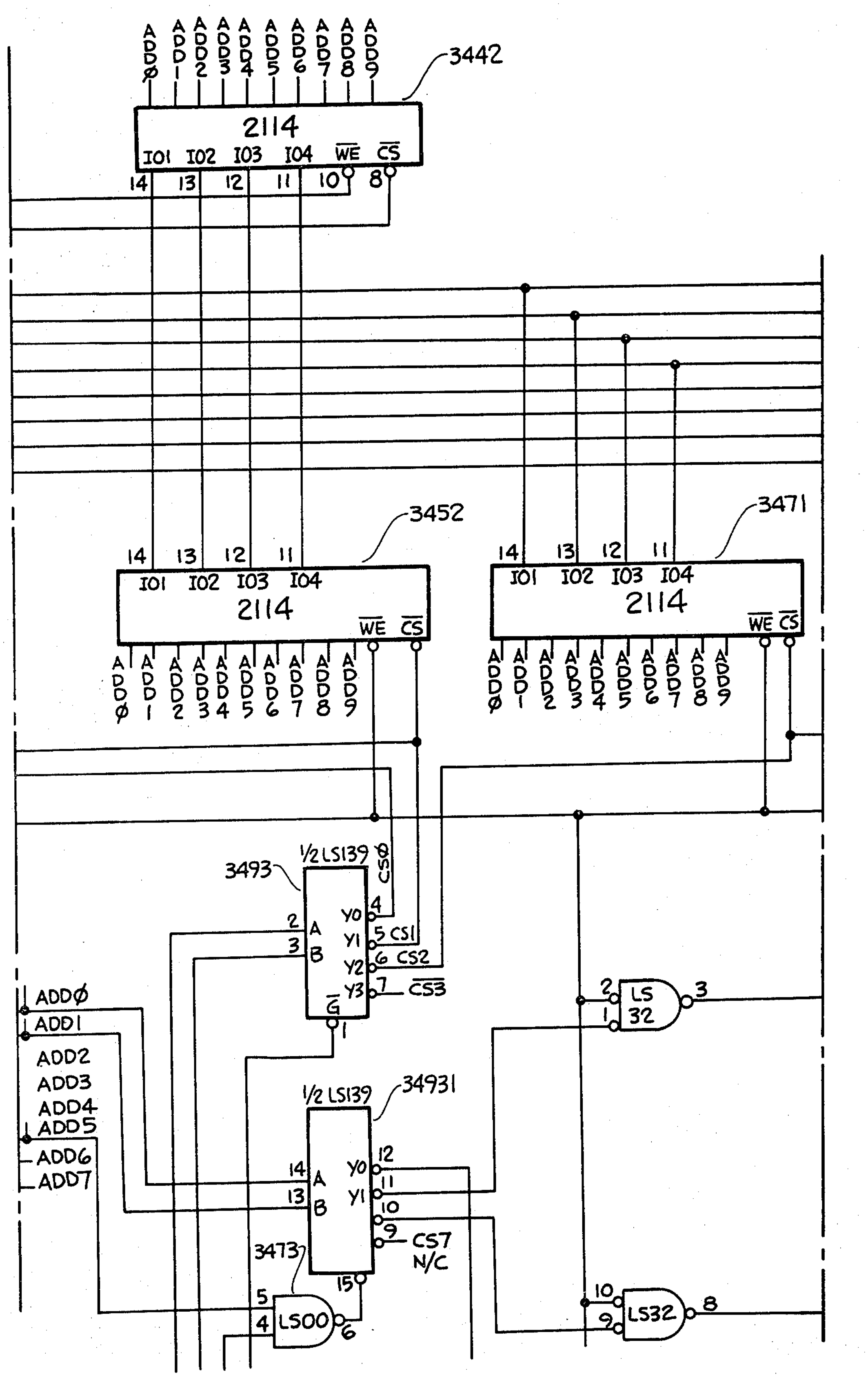
Figure 34D:
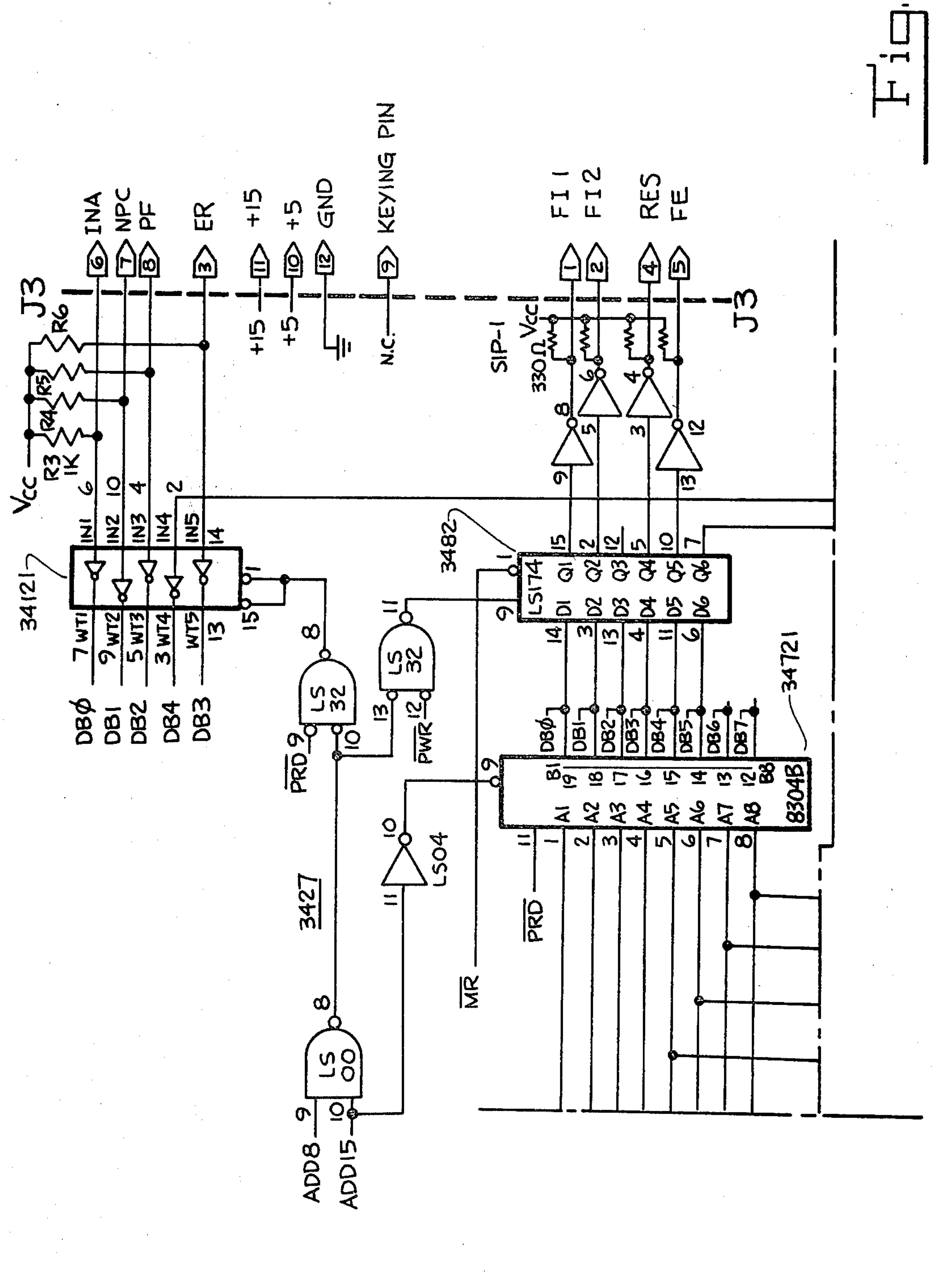
Figure 34E:
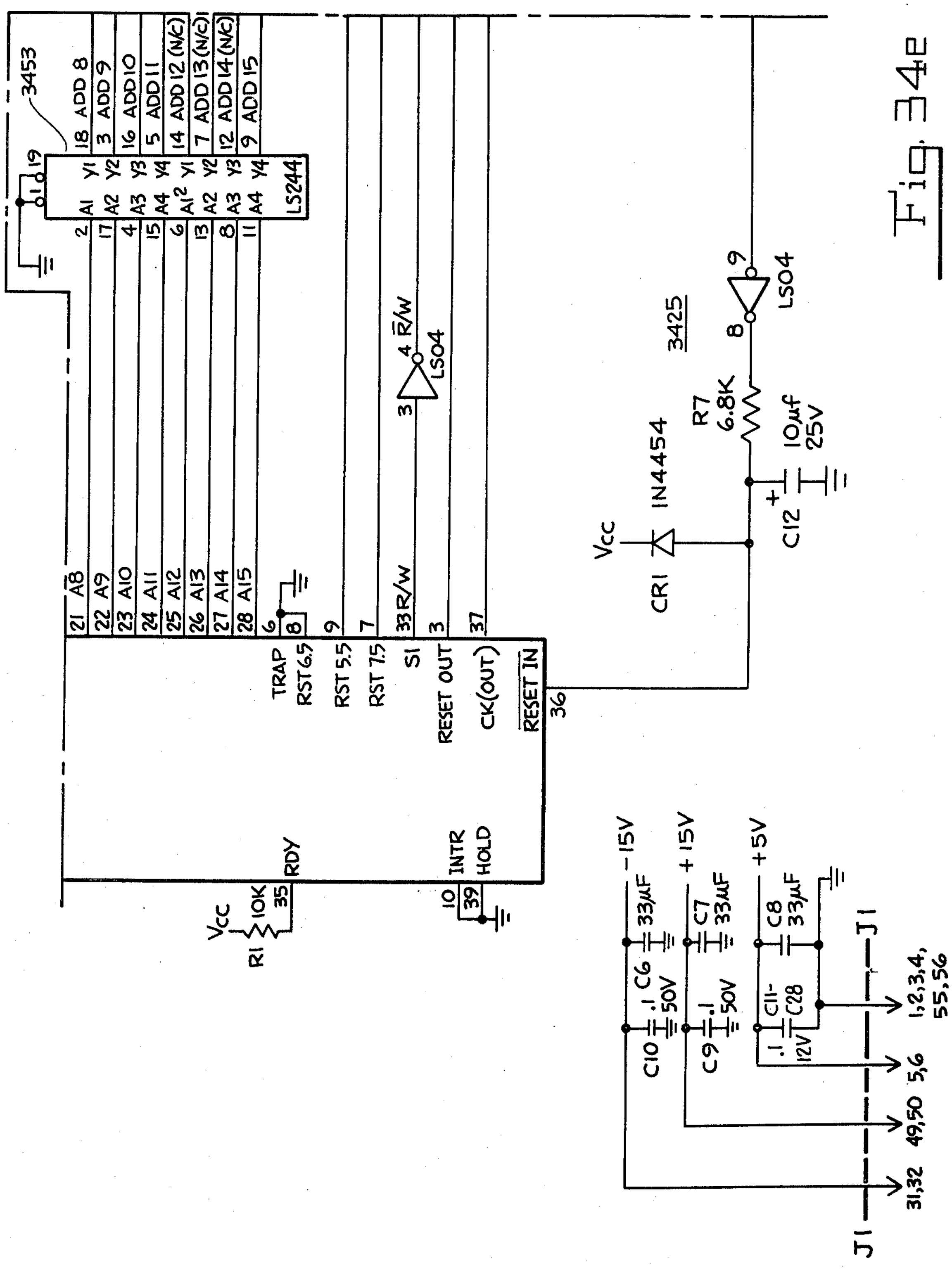
Figure 34F:
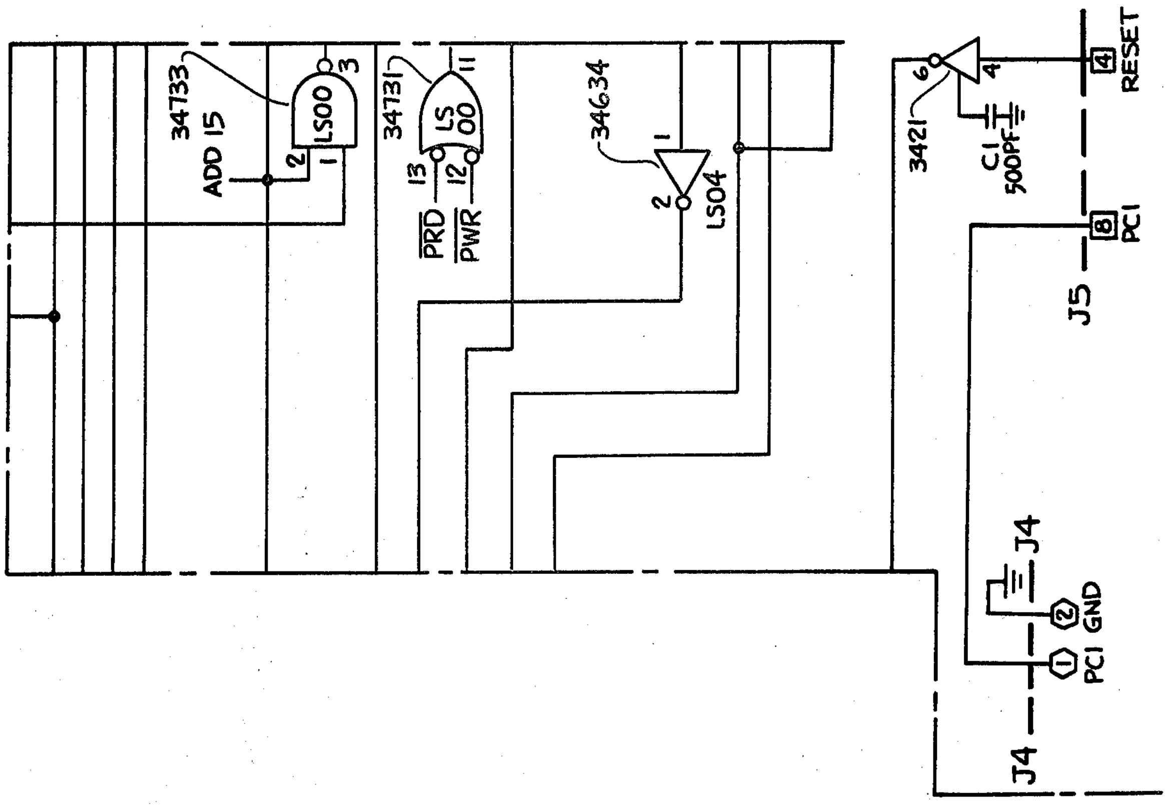
Figure 34G:
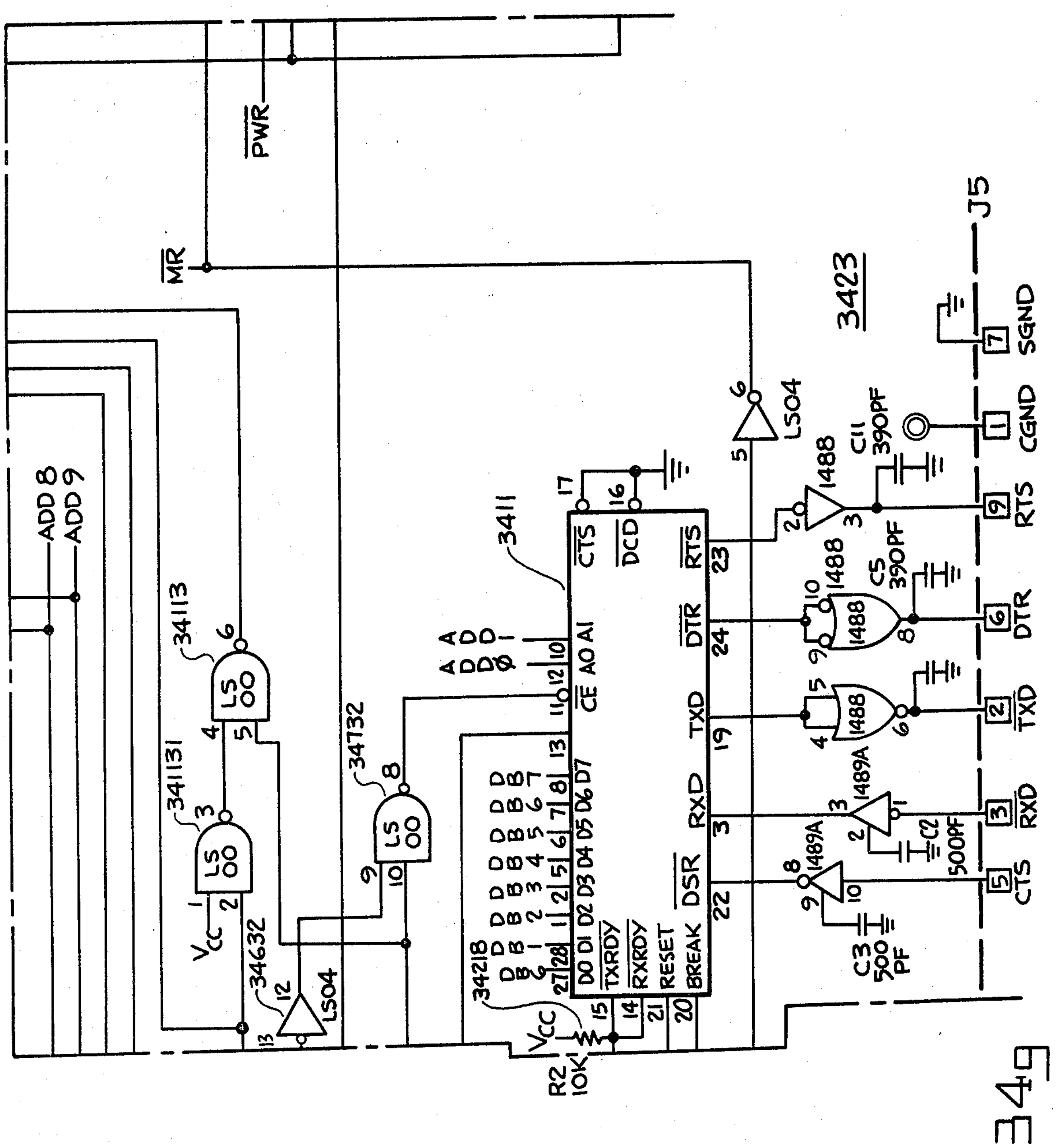
Figure 34H:
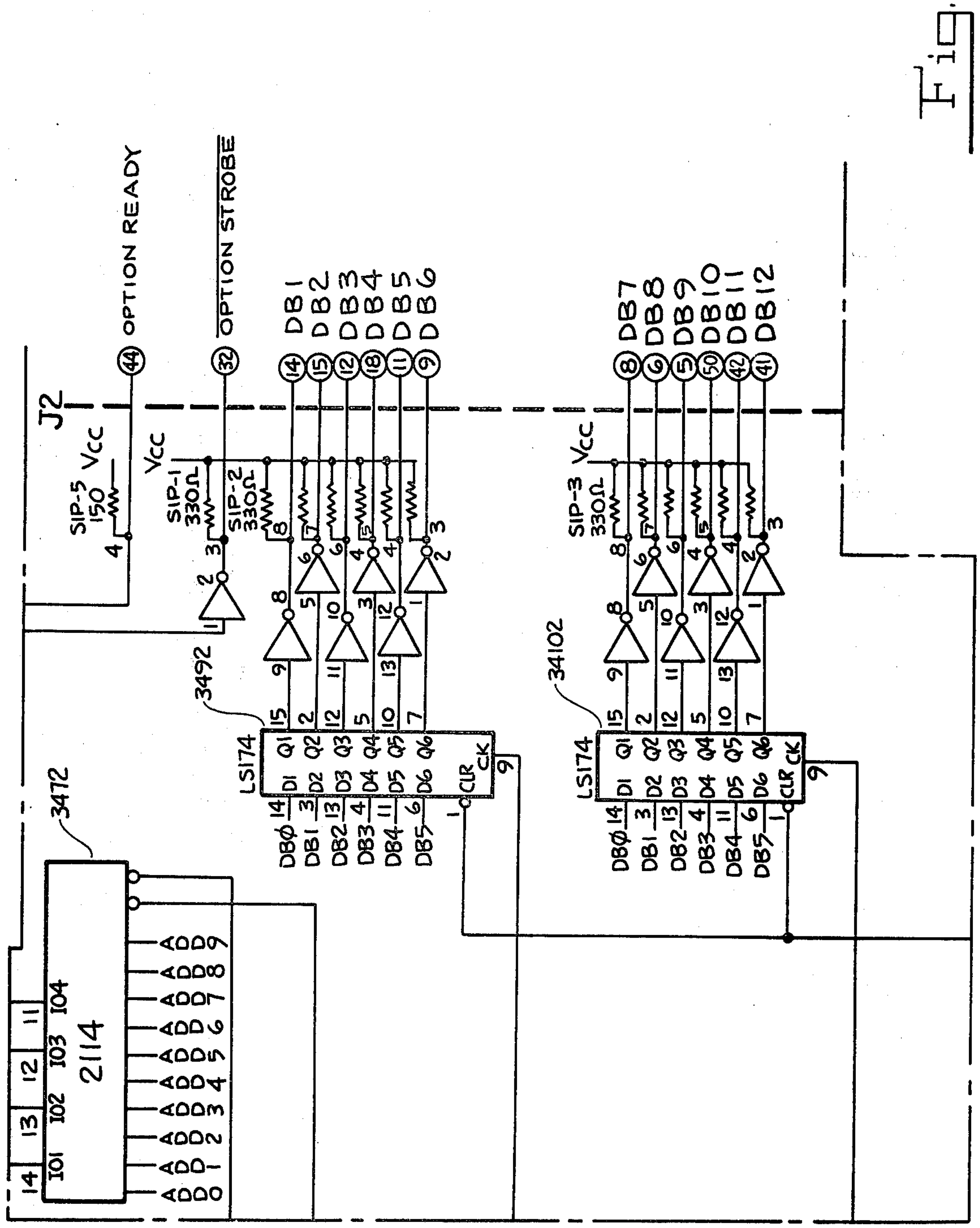
Figure 34I:
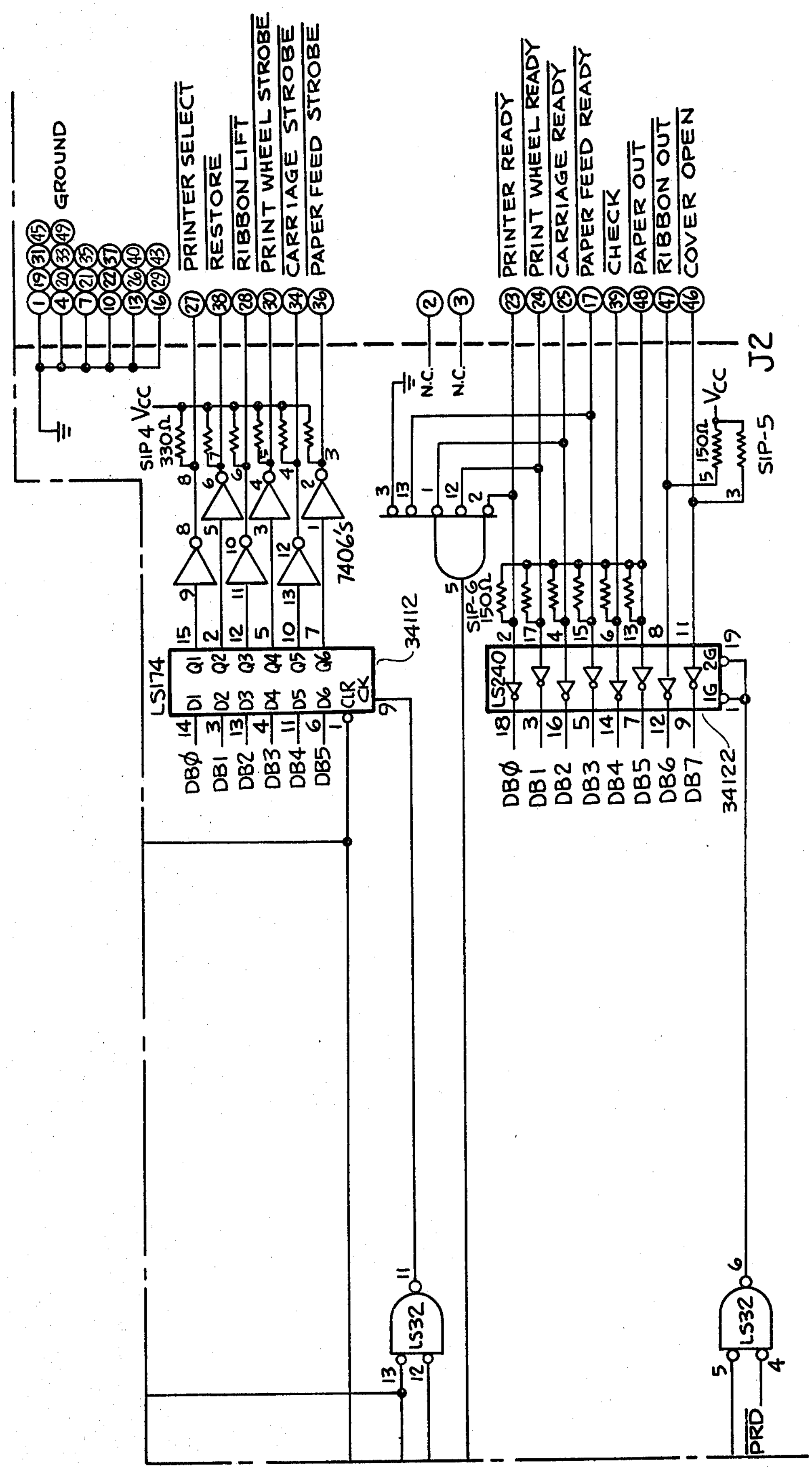

Referring now to FIG. 34, a read only printer controller is shown. This controller provides a serial interface to the floor module and converts the serial signals received from the floor module to a parallel form that can be used by the printer. It also supports an optional sheet feeder for the printer. This board is a subset of the typewriter controller circuitry, described above. A multiplexed data address bus AD0 through AD7 is provided for microprocessor 3413. The most significant byte in the address bus is AD8 through AD15. Lines AD0 through AD7 are connected to a latch 3422 to demultiplex the address from the AD bus. The latch 3422 is driven by the address latch enable (ALE) signal from the processor 3413. The upper half of the address bus A8 through A15 is connected to a buffer 3453.

A crystal 3421 is attached directly to the X1 and X2 inputs of the processor 3413. The crystal 3421 operates at five megahertz.

The baud rate clock input pin 20 of USART 3411 is connected to the clock output terminal (CK(OUT) on the processor 3413 pin 37. A divide by two function in the processor 3413 provides the clock output signal at 2.5 MHz.

Two 256 by 12 boot PROMs 3441 and 3432 are provided to supply 256 bytes of bootstrap information.

Six 1K by 4 memory devices 3451, 3442, 3461, 3452, 3471 and 3472 provide 3K by 8 of RAM memory. The function of the boot PROMs 3441 and 3431 is similar to that of the typewriter controller. When the card is initialized, the processor 3413 begins to execute the boot code. The processor 3413 thereby initializes the USART 3411. The program is loaded into RAM memory via USART 3411. Once the load operation is complete, program control is transferred to the program loaded into RAM. That program is used in operation of the printer to support the protocol required to the floor module.

A set of decoders 3493 and 34931 is provided. The gate input of the decoders is controlled by NAND gates 34113 and 3473, respectively. The inputs to NAND gate 3473 are ADD5 and ADD15. The A and B inputs of the decoder 34931 are tied to ADD0 and ADD1. The output of the decoder 34931 corresponds to addresses 8020-8022. Memory mapped I/O techniques are employed. Accordingly, instead of performing input and output instructions, the processor 3413 performs reads and writes to memory locations. The gate of decoder 3493 is coupled to NAND gate 34113. One input terminal of 34113 is connected to ADD15 via NAND gate 341131. That corresponds to processor read or write at a location less than 8000 hex, in the lower 32K of the memory space.

The A and B inputs of the decoder 3493 are coupled to ADD10 and ADD11 respectively. The CS0 output signal pin 4 of 3493 corresponds to address 0 through 3FF hex. The CS1 output (pin 5 of 3493) corresponds to addresses 400 through 7FF hex. The CS2 line pin 6 corresponds to addresses 800 through BFF, and the CS3 output pin 7 corresponds to addresses C00 to FFF hex. The address 0 decode is used as a chip select for the boot PROMs.

The memory starting at location 400 is associated with the RAMs 3461 and 3452. The memory starting at location 800 is associated with RAMs 3471 and 3472. Memory block starting at C00 is associated with the memory on RAM 3451 and 3442.

The write enable on all of the RAMs is connected directly to a processor write (PWR) signal from the processor 3413 via driver 3483. The address lines of the RAMs 3451, 3461, 3442, 3452, 3471 and 3472 are connected to the address (ADD) bus. The outputs of the RAMs are coupled to the multiplexed address data bus AD0 through AD7. A bidirectional transceiver buffer 34721 separates the memory from the data bus used to drive the registers on the card. Decoding via OR gate 34731 and 34732 is applied to the chip enable (CE) terminal pin 11 of USART 3411. One input to AND gate 34732 is coupled to the processor read (PRD) and processor write (PWR) signal via OR gate 34731. The other input terminal of gate 34732 is connected to ADD15 and ADD4 via devices 34632 and 34733. The A0 and A1 lines of USART 3411 are connected to ADD0 and ADD1. There are four read and four write registers inside USART 3411, so it responds to addresses in that range. The addresses of the pair of read and write registers is 8010 through 8013.

The RS232 interface is shown generally at 3423. Received data is input to the USART 3411 and transmitted data is output through interface devices 3423. A reset (RESET) signal at pin 4 of connector J5 is applied through the RS232 interface to energize a power on clear network 3425 to energize the RESET IN terminal of the processor 3413. This provides a means for the floor module to reset the printer controller. The other signal applied from the RS232 line is power control 1 (PC1) used to turn power on to the printer. When the floor module is energized, all the print codes are loaded. The same arrangement is used as for the CRT. The transmit ready (TXRDY) and receive ready (RXRDY) lines on 3411 are wire ORed together through 10K resistor 34218. The signal is inverted via inverter 3463 and applied to the restart 7.5 interrupt (RST7.5) at pin 7 of 3413. The RESET line on the USART 3411 is connected to the RESET OUT terminal on the processor 3413. When the processor 3413 is reset, so is the USART 3411. Two control lines effect transmission and reception to the USART 3411: carrier detect (DCD) bar signal and clear to send (CTS) bar signal. They are active at all times.

Six line registers shown at reference numerals 3492 and 34102 are used to allow the printer controller to communicate with the printer. Accordingly, 12 data bus lines are provided to carry information concerning print wheel location, paper movement, and carriage movement. One of the registers 34112 is used for control purposes, and consists of six lines: PRINTER SELECT, RESTORE to initialize the printer, RIBBON LIFT for multiple colored ribbons, PRINT WHEEL STROBE, CARRIAGE STROBE, and PAPER FEED STROBE to signal the printer when it has valid data on the 12 lines.

A status register 34122 carries status: PRINTER READY, PRINT WHEEL READY, CARRIAGE READY, PAPER FEED READY CHECK, PAPER OUT, RIBBON OUT, and COVER OPEN.

The sheet feeder interface includes two registers. The status register 34121 is gated via circuitry 3427 when the processor 3413 performs a read (PRD) and when there is an access to any address where ADD15 and ADD8 are both set. When the processor 3413 performs a write (PWR), it loads the control register in the sheet feeder. Four lines are coupled to the sheet feeder to control this operation. A fifth line to the printer is the OPTION STROBE signal, provided only if a special option is provided on the printer. Similarly, an OPTION READY signal is provided from the printer.

In word processing systems it is often necessary to revise a given document one or more times. Normally it becomes difficult to determine what parts of the document have been changed. A line by line or word by word comparison between an old version of the document and an edited updated version of the document is often necessary.

It is desirable to be able to analyze a revised document and to tell therefrom what changes (insertions and/or deletions) have been made since the previous version.

In the present system, called "Marked Revisions", inserted text is printed out with a dash underscored line under the text that has been inserted. The inserted text appears on the CRT display without a hypenated underscore, thus reflecting the updated version of the document to be printed.

Deletions in the system are indicated in the printout with overstruck dashed lines through the text. Once again, the display on the CRT reflects the updated version of the document, so that deleted text does not appear on the display. In a further embodiment of this invention the marked revisions can be deleted with one command to restore an updated version of a document to its immediately previous form.

If the marked revision feature is enabled, a document can be printed with both the old text and new revisions printed thereon. If the feature is disabled, however, the printout reflects only the most updated version of the document without insertions or deletions indicated. In either case, the display reflects the current updated version. Underscored and overstruch hyphens are proportionally spaced corresponding to the characters with which they are associated.

An insert key and a delete key on the keyboard indicate the commencement and termination of both the insert and delete modes respectively. In operation, the insert key is depressed to begin the insert mode, which includes displaying an insert control character on the one line plasma display (not on the CRT display), after which all characters entered are deemed to be inserted. The insert key is then depressed again to terminate the insert mode which prints a end of insert mode control character on the one line display. No further characters are inserted. The delete key on the keyboard functions in a similar but opposite manner.

The present invention is particularly directed to use in a word processing which will employ varying features and functions, described in differing aspects, in any one or more of the following groups of copending patent applications, including this one, all filed concurrently: ART-100 to Johnson et al for "WORD PROCESSING SYSTEM EMPLOYING A PLURALITY OF GENERAL PURPOSE PROCESSOR CIRCUITS"; ART-101 to Frediani et al for "COMMUNICATIONS SYSTEMS FOR A WORD PROCESSING SYSTEM EMPLOYING DISTRIBUTED PROCESSING CIRCUITRY"; ART-102 to Frediani et al for "CIRCUIT FOR CONTROLLING INFORMATION ON A DISPLAY"; ART-103 to Couper et al for "CURSOR CONTROL CIRCUIT FOR PLURAL DISPLAYS FOR USE IN A WORD PROCESSING SYSTEM"; ART-104 to Couper et al for "CIRCUIT TO ENABLE FOREGROUND AND BACKGROUND PROCESSING IN A WORD PROCESSING SYSTEM WITH CIRCUITS FOR PERFORMING A PLURALITY OF INDEPENDENTLY CONTROLLED FUNCTIONS"; ART-105 to Couper et al for "CIRCUIT FOR CONTROLLING CHARACTER ATTRIBUTES IN A WORD PROCESSING SYSTEM HAVING A DISPLAY"; ART-106 to Lillie et al for "CIRCUIT FOR CONTROLLING START UP OPERATION IN A WORD PROCESSING SYSTEM EMPLOYING A PLURALITY OF GENERAL PURPOSE PROCESSOR CIRCUITS"; ART-107 to Couper et al for "PRINT CONTROL CIRCUIT FOR A WORD PROCESSING SYSTEM"; and ART-108 to Arjani et al for "WORD PROCESSING SYSTEM HAVING KEYBOARD WITH ONE LINE DISPLAY AND CRT DISPLAY".

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

What is claimed is:

1. A system for character attribute control comprising:

(a) a display for displaying a plurality of lines of such characters;

(b) a display control circuit means for controlling the information exhibited on said display, said display control circuit means being responsive to an input of digital words, a first portion of said input words defining particular characters and a second portion of said input words defining the attributes associated with said defined characters, whereby a sequence of said input words will define a line of characters and associated attributes to be displayed;

(c) a refresh memory for storing sequences of data words, said data words comprising data words defining characters and control words defining information about the display of said characters, said control words further comprising attribute control words for controllng the attributes associated with characters defined by character data words stored between said attribute control words and the next control word belonging to a preselected subgroup of said control words; and (d) line buffer means operatively connected between said refresh memory and said display control circuit means for transferring lines of characters from said memory to said display control circuit means, said line buffer means further comprising:

(1) memory access means for controlling access to a selected subsequence of said data words in said refresh memory, said subsequences defining at least a line of characters to be displayed;

(2) buffer storage wherein data words from said memory may be stored under control of said memory access means, said buffer storage being operatively associated with said display control circuit means so that the output of said storage provides said input word to said display control circuit means;

(3) character attribute control circuit means for recognizing said control data words as they are read from said memory and preventing said attribute control words from being stored in said buffer storage and for storing the attribute information in additional bits provided in each word of said buffer storage so that the attribute information is stored in the same buffer storage word as each of the associated character data words, whereby said input words are formed and stored in said buffer storage; and (4) buffer control means operatively associated with said display control means for controlling said buffer means so that said sequence is stored in said buffer storage and at least a portion of said subsequence is then output to said display control circuit means whereby a line of characters with associated attributes is displayed.

2. A system for character attribute control as defined in claim 1 wherein said latch means is coupled to an OR gate such that any input signal to said OR will clear said attribute latch.

3. A system for character attribute control as defined in claim 2 wherein one of the input signals to said OR gate is a signal generated in response to a control word indicating the end of line of characters to be exhibited on said display.

4. A system for character attribute control as defined in claim 2 wherein one of said input signals to said OR gate is a signal generated in response to a control word indicating the end of the information to be exhibited on said display.

5. A system for character attribute control as defined in claim 3 wherein one of said input signals to said OR gate is a signal generated at the end of the information exhibited on said display.

6. A character attribute control system as defined in claim 1 wherein said synchronization circuit means generates signals which cause said attribute latch to be cleared.

7. A character attribute control system as defined in claim 6 wherein said synchronization circuit means signals are related to the end of a line of characters displayed on said CRT.

8. A character attribute control system as defined in claim 6 wherein said synchronization circuit means signals are related to the end of a field displayed on said CRT.

9. A character attribute system as defined in claim 6, wherein said characters exhibited on said CRT vary in width and said character attributes exhibited on said CRT vary correspondingly in width.

10. A system for character attribute control as defined in claim 1, wherein said attributed control means further comprises a latch for latching character attribute information read from said refresh memory, said attribute information remaining in said latch until a control data word belonging to said subgroup is read from said memory or said latch is cleared.

11. A system for character attribute control as described in claim 10 wherein said latch attribute information may be overwritten by the next character attribute information read from said refresh memory.

12. A system for character attribute control as described in claims 1, 10, or 11, wherein said line buffer means comprises at least two units of buffer storage operatively associated with said buffer control means so that one of said units may be reading from said refresh memory while another outputs to said display control circuit means.

13. A system for character attribute control as described in claim 12 wherein said buffer storage comprises random access memory.

14. A system for character attribute control as described in claims 1, 10, or 11, further comprising a processor operatively associated with said refresh memory to load said sequences of data words into said refresh memory and operatively associated with said memory access means of said buffer means to define said lines of characters to be transferred to said display control circuit means.

15. A system for character attribute control comprising:

(a) a CRT for displaying a plurality of lines of such characters;

(b) a CRT control circuit means for controlling the information Exhibited on said CRT, said CRT control circuit means being responsive to an input of digital words, a first portion of said input words defining particular characters and a second portion of said input words defining the attribute associated with said defined characters, whereby a sequence of said input words will define a line of characters and associated attributes to be displayed;

(c) a refresh memory for storing sequences of data words, said data words comprising data words defining particular characters and control words defining information about the display of said characters, said control words further comprising attribute control words for controlling the attributes associated with characters defined by said character data words stored between said attribute control words and the next control word belonging to a preselected subgroup of said control words;

(d) line buffer means operatively connected between said refresh memory and said CRT control circuit means for transferring lines of characters from said refresh memory to said CRT control circuit means said line buffer means further comprising:

(1) memory access means for controlling access to a selected subsequence of said data words in said refresh memory, said subsequence defining at least a line of characters to be displayed;

(2) buffer storage wherein data words from said refresh memory may be stored under control of said memory access means, said buffer storage being operatively associated with said CRT control means so that the output of said buffer storage provides said input words to said CRT control means;

(3) character attribute control circuit means for recognizing said control words as they are read from said refresh memory and preventing said attribute control words from being stored in said buffer storage and for storing the attribute information in additional bits provided in each word of said buffer storage so that the attribute information is stored in the same buffer storage word as each of the associated character words, whereby said input words are formed and stored in said buffer storage, said attribute control circuit means further comprising a latch for latching character attribute information read from said refresh memory, said attribute information remaining in said latch until a control word belonging to said subgroup is read from said refresh memory or said latch is cleared;

(4) buffer control means operatively associated with said CRT control means for controlling said buffer means so that said sequence is stored in said buffer and a portion of said subsequence is then output to said CRT control circuit means whereby a line of characters with associated attributes is displayed;

(e) synchroniziation circuit means for controlling the synchronization of said CRT, said synchronization circuit means being coupled to said latch.

* * * * *